United States Patent
Alboszta et al.

(10) Patent No.: US 10,007,884 B2
(45) Date of Patent: Jun. 26, 2018

(54) QUANTUM STATE DYNAMICS IN A COMMUNITY OF SUBJECTS ASSIGNED QUANTUM STATES MODULO A PROPOSITION PERCEIVED IN A SOCIAL VALUE CONTEXT

(71) Applicant: Invent.ly LLC, Woodside, CA (US)

(72) Inventors: Marek Alboszta, Montara, CA (US);
Stephen J. Brown, Woodside, CA (US)

(73) Assignee: INVENT.LY, Woodside, CA (US)

( * ) Notice: Subject to any disclaimer, the term of this patent is extended or adjusted under 35 U.S.C. 154(b) by 390 days.

(21) Appl. No.: 14/324,127

(22) Filed: Jul. 4, 2014

(65) Prior Publication Data

US 2014/0324766 A1   Oct. 30, 2014

(51) Int. Cl.
*G06N 99/00* (2010.01)
(52) U.S. Cl.
CPC ................... *G06N 99/002* (2013.01)
(58) Field of Classification Search
CPC .................................................... G06N 99/002
USPC ............................................................. 706/46
See application file for complete search history.

(56) References Cited

U.S. PATENT DOCUMENTS

| | | | |
|---|---|---|---|
| 7,653,646 B2 | 1/2010 | Horn et al. | |
| 7,664,627 B2 | 2/2010 | Mitsuyoshi | |
| 8,226,417 B2 | 7/2012 | Mitsuyoshi | |
| 8,639,702 B2 | 1/2014 | Davis, III | |
| 8,744,197 B2 | 6/2014 | Fertik et al. | |
| 2010/0119141 A1 | 5/2010 | Weinstein et al. | |
| 2012/0071333 A1 | 3/2012 | Kauffman et al. | |

OTHER PUBLICATIONS

Bisconti et al ("Quantum Modeling of Social Networks the Q.NET Project" 2009).*
Benjamin Renoust ("Analysis and Visualisation of Edge Entanglement in Multiplex Networks" Dec. 2013).*
Seth Lloyd ("Quantum Information Processing" 2012).*
Alberto Javarone ("Models and Frameworks for Studying Social Behaviors" 2012).*
Ranjan et al ("Geometry of Complex Networks and Topological Centrality" 2012).*

(Continued)

*Primary Examiner* — Lut Wong
(74) *Attorney, Agent, or Firm* — Marek Alboszta

(57) ABSTRACT

The present invention is directed to methods and apparatus for predicting the quantum state, including the dynamics of such quantum state in so far as it represents a subject embedded in a community of community subjects. In the quantum representation adopted herein the internal states of all subjects are assigned to quantum subject states defined with respect to an underlying proposition about an item that can be instantiated by an object, a subject or by an experience. Contextualization of the proposition about the item is identified with a basis (eigenbasis of a spectral decomposition) referred to herein as the social value context. The dynamics are obtained from quantum interactions on a graph onto which the quantum states of all the subjects are mapped by a surjective mapping dictated by subject interconnections and subject-related data, including the social graph and information derived from "big data".

51 Claims, 37 Drawing Sheets

(56) References Cited

OTHER PUBLICATIONS

Aerts, et al., "Concepts and Their Dynamics: A Quantum-Theoretic Modeling of Human Thought", Topics in Cognitive Sciences, 2013, pp. 1-36, Cognitive Science Society Inc., Digital Object Identifier: 10.1111/tops.12042
Abramsky, et al., "Introduction to Categories and Categorical Logic", arXiv:1102.1313v1 [math.CT], New Structures for Physics, B. Coecke (ed). Lecture Notes in Physics vol. 813, pp. 3-94, Springer-Verlag 2011.
Abramsky, et al., "Logical Bell Inequalities", arXiv:1203.1352v6 [quant-ph], Jun. 20, 2012, Digital Object Identifier: 10.1103/PhysRevA.85.062114.
Brandenburger, et al., "An Impossibility Theorem on Belief in Games", Studia Logica, vol. 84, Issue: 2, pp. 211-240, 2006, Digital Object Identifier: 10.1007/s11225-006-9011-z.
Garman, "A Heuristic Review of Quantum Neural Networks", Dissertation, Imperial College London, Dept. of Physics, Oct. 6, 2011.
Glanville, "A (Cybernetic) Musing: Design and Cybernetics", V!RUS, N. 3, São Carlos: Nomads.usp, 2010.
Globus, "Quantum Consciousness is Cybernetic", PSYCHE, 2(12), Aug. 1995.
Lefebvre, "An Algebraic Model of Ethical Cognition", Journal of Mathematical Psychology, vol. 22, No. 2, Oct. 1980, Academic Press, New York.
Lefebvre, "Modelling of Quantum-Mechanical Phenomena With the Help of the Algebraic Model of Ethical Cognition", Mathematical Modelling, vol. 4, pp. 361-366, 1983, Pergamon Press, USA.
Pask, "Conversation Theory: Applications in Education and Epistemology", Elsevier Scientific Publishing Company, 1976, Amsterdam, The Netherlands.
Wang, et al., "Context effects produced by question orders reveal quantum nature of human judgments", PNAS, vol. 111, Issue: 26, pp. 9431-9436, 2014, Digital Object Identifier: 10.1073/pnas.1407756111.
Wang, et al., "A Quantum Question Order Model Supported by Empirical Tests of an A Priori and Precise Prediction", Topics in Cognitive Sciences, 5, pp. 689-710, 2013, Digital Object Identifier: 10.1111/tops.12040.
Yepez, "Lecture Notes: Qubit Representations and Rotations", Lecture Notes, Department of Physics and Astronomy, University of Hawaii at Manoa, Phys 711, Topics in Particles & Fields, Lecture 1, v.03, Spring 2013, Jan. 9, 2013, Honolulu.
Zurek, "Decoherence and the Transition from Quantum to Classical-Revisited", Los Alamos Science, vol. 27, Publisher: Springer, pp. 2-25, 2002, Digital Object Identifier: 10.1063/1.881293.
Adali, et al., Predicting Personality with Social Behavior, Aug. 2012, pp. 1-8, Department of Computer Science Rensselaer Polytechnic Institute, Troy, New York.
Aerts, et al., Do We Think and Communicate in Quantum Ways? On the Presence of Quantum Structures in Language, Faculty of Applied Physics and Mathematics, 2005, pp. 1-20, Leo Apostel Centre, Free University of Brussels.
Aimeur, et al., Quantum Clustering Alogrithms, Proceedings of the 24th Intl. Conference on Machine Learning, 2007, pp. 1-8, ACM, New York, NY, USA.
Alboszta, Marek, A Coherent Emergence of Consensus—Driven Reality, Physics Lectures by Marek Alboszta, 2009, pp. 1-61, Hosted by Entropy Consciousness Institute, http://entropy-consciousness.org, San Francisco, CA, USA.
Atmanspacher, et al., Weak Quantum Theory: Complementarity and Entanglement in Physics and Beyond, Foundations of Physics, 2002, 32, pp. 379-406, Institut fur Grenzgebiete der Psychologie and Psychohygiene.
Bachrach, et al., Personality and Patterns of Facebook Usage, Jun. 2012, pp. 1-9, Microsoft Research.

Blutner, et al., Two qubits for C.G. Jung's theory of personality, Cognitive Systems Research, 2010, pp. 243-259, Elsevier, ILLC, University of Amsterdam, Germany.
Blutner, et al., Two Qubits for C.G. Jung's Theory of Personality, Cognitive Systems Research, Elsevier, vol. 11, 2010, pp. 243-259, http://www.illc.uva.nl/Research/Publications/Reports/PP-2009-03.text.pdf.
Blutner, R., Concepts and Bounded Rationality: An Application of Niestegge's Approach to Conditional Quantum Probabilities, 2009, pp. 1-9, Universiteit van Amsterdam, ILLC, Nieuwe Doelenstraat 15, 1012 CP Amsterdam, The Netherlands.
Bohm, Quantum Theory, 1951, pp. 169-172, Dover Publications.
Bruza et al., Is There Something Quantum-Like About the Human Mental Lexicon?, NIH Public Access Author Manuscript, Oct. 2009, pp. 1-40, National Institutes of Health.
Busemeyer, et al., "Quantum dynamics of human decision-making", Journal of Mathematical Psychology, 2006, 50, pp. 220-241; Indiana University, USA.
Caves, et al., Quantum Probabilities as Bayesian Probabilities, arXiv:quant-ph/0106133, Nov. 2001, pp. 1-6, Phys. Rev. A 65, 022305 , Cornell University Libarary, USA.
Celli, Mining User Personality in Twitter, Sep. 2011, pp. 1-5, CLIC-CIMeC, University of Trento Italy.
Celli, Unsupervised Personality Recognition for Social Network Sites, The Sixth International Conference on Digital Society, 2012, pp. 1-4, University of Trento, Italy.
Chittaranjan, et al., Who's Who with Big-Five: Analyzing and Classifying Personality Traits with Smartphones, Jun. 2012, pp. 1-8, Idiap Research Institute, Switzerland.
Cohen-Tannoudji, et al., Quantum Mechanics, John Wiley & Sons, 1977.
Dirac, The Principles of Quantum Mechanics, Oxford University Press, 4th Edition, 1958.
Franco, R. Quantum mechanics and rational ignorance, Arxiv preprint physics/0702163, 2007, Dipartimento di Fisica and U.d.R. I.N.F.M., Politecnico di Torino C.so Duca degli Abruzzi 24,1-10129 Torino, Italia.
Gabora,et al., Toward an ecological theory of concepts, Ecological Psychology, 2008, pp. 84-116, Department of Psychology, University of British Columbia.
Hu, et al., A Generalized Quantum—Inspired Decision Making Model for Intelligent Agent, The Scientific World Journal, Mar. 2014, pp. 1-9, vol. 2014, Article ID 240983, http://dx.doi.org/10.1155/2014/240983.
Khrennikov, Quantum-like formalism for cognitive measurements, BioSystems, 2003, vol. 70, pp. 211-233; International Center for Mathematical Modeling in Physics and Cognitive Sciences, MSI, University of Vaxjo, S-35195, Sweden.
Klusch, M., Toward quantum computational agents, In: Nickles, M., Rovatsos, M. And Weiss, G., eds. Agents and Computational Autonomy: Potential, Risks, and Solutions. 2004, vol. 2969, pp. 170-186. (Lecture Notes in Computer Science).
Komisin, et al., Identifying Pesonality Types Using Document Classification Methods, Proceedings of the 25th International Florida Artificial Intelligene Research Society Conference, pp. 1-6, University of North Carolina, 2012, USA.
Markovikj, et al., Mining Facebook Data for Predictive Personality Modeling, 2013, pp. 1-4, Faculty of Computer Science and Engineering, Ss Cyril and Methodius University.
Mielnik, Geometry of Quantum States, Institue of Theoretical Physics, Warsaw University, 1968, pp. 1-26, ul. Hoza 69, Warsaw, Poland.
Pothos, et al., A quantum probability explanation for violations of 'rational' decision theory, Proceedings of the Royal Society B: Biological Sciences, 2009, pp. 276, rspb.royalsocietypublishing.org.
Preskill, Quantum Information and Computation, Lecture Notes Ph219/CS219, Chapters 2&3, California Institute of Technology, 2013.
Schwartz, et al., Personality, Gender, and Age in the Language of Social Media: The Open-Vocabulary Approach, Sep. 2013, pp. 1-16.

(56) References Cited

OTHER PUBLICATIONS

Srednicki, M., Quantum Field Theory, 2006, http://www.physics,ucsb.edu/~mark/qft.html, pp. 1-616, University of California, Santa Barbara, USA.
Summers, Thought and the Uncertainty Principle, Sep. 28, 2013, pp. 3-6, http://www.jasonsummers.org/thought-and-the-uncertainty-principle/.
Trueblood, et al., A Quantum Probability Model of Causal Reasoning, Hypothesis and Theory Article, May 2012, pp. 1-13, Frontiers in Psychology | Cognitive Science, www.frontiersin.org, USA.
Trueblood, et al., Quantum Probability Theory as a Common Framework for Reasoning and Similarity, Opinion Article, Apr. 2014, pp. 1-4, Frontiers in Psychology | Cognitive Science, www.frontiersin.org, USA.
Verhoeven, Ensemble Methods for Personality Recognition, AAAI Technical Report WS-13-01, 2000, pp. 35-38, CLiPS, University of Antwerp, Antwerp, Belgium.

* cited by examiner time evolution (unitary and linear) by Schroedinger differential equation:

$$i\hbar \frac{d}{dt}|qb_k(t)\rangle = H|qb(t_o)\rangle$$

expressed in the u-basis:

$$|qb_k(t)\rangle = e^{-iE_+ t/\hbar} \cos\frac{\theta}{2}|+\rangle_u + e^{-iE_- t/\hbar} \cos\frac{\theta}{2}|-\rangle_u$$

community state space $\mathcal{H}^{(C)} \otimes$ subject state space $\mathcal{H}^{(S)}$

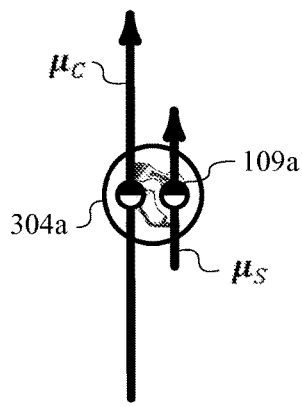
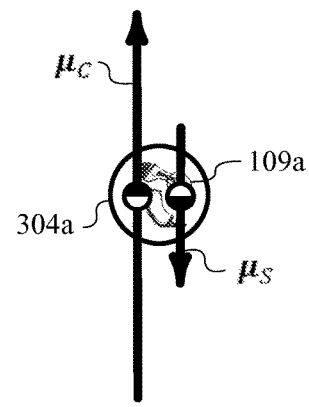
*Fig. 8A*     *Fig. 8B*
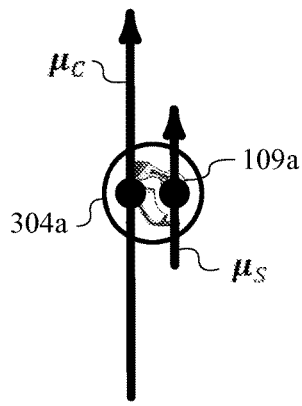
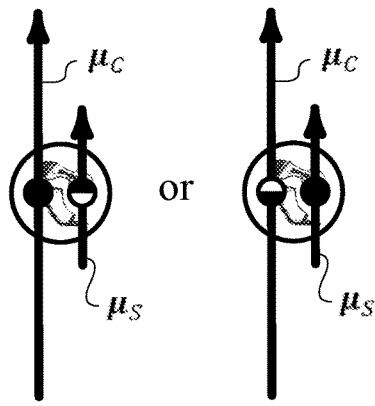
*Fig. 8C*     *Fig. 8D*

QUANTUM STATE DYNAMICS IN A COMMUNITY OF SUBJECTS ASSIGNED QUANTUM STATES MODULO A PROPOSITION PERCEIVED IN A SOCIAL VALUE CONTEXT

RELATED APPLICATIONS

This application is related to U.S. patent application Ser. No. 14/182,281 entitled "Method and Apparatus for Predicting Subject Responses to a Proposition based on a Quantum Representation of the Subject's Internal State and of the Proposition", filed on Feb. 17, 2014, and to U.S. patent application Ser. No. 14/224,041 entitled "Method and Apparatus for Predicting Joint Quantum States of Subjects modulo an Underlying Proposition based on a Quantum Representation", filed on Mar. 24, 2014, both of which are incorporated herein by reference in their entirety.

FIELD OF THE INVENTION

The present invention relates to a method and an apparatus for predicting the quantum state of one or more test subjects within a community of community subjects using a quantum representation of all subjects by quantum subject states defined with respect to an underlying proposition, which is in turn perceived or contextualized by the community subjects within a social value context. The invention extends to predicting quantum state dynamics due to quantum interactions within a graph onto which the community subject quantum states and any test subject quantum state of interest are mapped by an onto mapping (a.k.a. surjective mapping).

BACKGROUND OF THE INVENTION

1. Preliminary Overview

The insights into the workings of nature at micro-scale were captured by quantum mechanics over a century ago. These new realizations have since precipitated fundamental revisions to our picture of reality. A particularly difficult to accept change involves the inherently statistical aspects of quantum theory. Many preceding centuries of progress rooted in logical and positivist extensions of the ideas of materialism had certainly biased the human mind against the implications of the new theory. After all, it is difficult to relinquish strong notions about the existence of as-yet-undiscovered and more fundamental fully predictive description(s) of microscopic phenomena in favor of quantum's intrinsically statistical model for the emergence of measurable quantities.

Perhaps unsurprisingly, the empirically driven transition from classical to quantum thinking has provoked strong reactions among numerous groups. Many have spent considerable effort in unsuccessful attempts to attribute the statistical nature of quantum mechanics to its incompleteness. Others still attempt to interpret or reconcile it with entrenched classical intuitions rooted in Newtonian physics. However, the deep desire to contextualize quantum mechanics within a larger and more "intuitive" or even quasi-classical framework has resulted in few works of practical significance.

Meanwhile, quantum mechanics exhibits exceptional levels of agreement with fact. Its explanatory power within legitimately applicable realms remains unchallenged as it continues to defy all struggles at a classical reinterpretation. Today, quantum mechanics and the consequent quantum theory of fields (its extension and partial integration with relativity theory) have proven to be humanity's best fundamental theories of nature. Sub-atomic, atomic and many molecular phenomena are now studied based on quantum or at least quasi-quantum models of reality.

In a radical departure from classical assumption of perpetually existing and measurable quantities, quantum representation of reality posits new entities called wavefunctions or state vectors. These unobservable components of the new model of reality are prior to the emergence of measured quantities or facts. More precisely, state vectors are related to distributions of probabilities for observing any one of a range of possible experimental results. A telltale sign of the "non-physical" status of a state vector is captured in the language of mathematics, where typical state vectors are expressed as imaginary-valued objects. Further, the space spanned by such state vectors is not classical (i.e., it is not our familiar Euclidean space or even any classical configuration space such as phase space). Instead, state vectors inhabit a Hilbert space of square-integrable functions.

Given that state vectors represent complex probability amplitudes, it may appear surprising that their behavior is rather easily reconciled with previously developed physics formalisms. Indeed, after some revisions the tools of Lagrangian and Hamiltonian mechanics as well as many long-standing physical principles, such as the Principle of Least Action, are found to apply directly to state vectors and their evolution. The stark difference, of course, is that state vectors themselves represent relative propensities for observing certain measurable values associated with the objects of study, rather than these measurable quantities themselves. In other words, whereas the classical formulations, including Hamiltonian or Lagrangian mechanics, were originally devised to describe the evolution of "real" entities, their quantum mechanical equivalents apply to the evolution of probability amplitudes. Apart from that jarring fact, when left unobserved the state vectors prove to be rather well-behaved. Indeed, their continuous and unitary evolution in Hilbert space is not entirely unlike propagation of real waves in plain Euclidean space. Thus, some of our intuitions about classical wave mechanics are useful in grasping the behavior of quantum waves.

Of course, our intuitive notions about wave mechanics ultimately break down because quantum waves are not physical waves. This becomes especially clear when considering superpositions of two or more such complex-valued objects. In fact, considering such superpositions helps to bring out several unexpected aspects of quantum mechanics.

For example, quantum wave interference predicts the emergence of probability interference patterns that lead to unexpected distributions of measurable entities in real space, even when dealing with well-known particles and their trajectories. This effect is probably best illustrated by the famous Young's double slit experiment. Here, the complex phase differences between quantum mechanical waves propagating from different space points, namely the two slits where the particle wave was forced to bifurcate, manifest in a measurable effect on the path followed by the physical particle. Specifically, the particle is predicted to exhibit a type of self-interference that prevents it from reaching certain places that lie manifestly along classically computed particle trajectories. These quantum effects are confirmed by fact.

Although surprising, wave superpositions and interference patterns are ultimately not the novel aspects that challenged human intuition most. Far more mysterious is the nature of measurement during which a real value of an observable attribute of an element of reality is actually observed.

While the underlying model of pre-emerged reality constructed of quantum waves governed by differential wave equations (e.g., by the Schroedinger equation) and boundary conditions may be at least partly intuitive, measurement itself defies attempts at non-probabilistic description. According to quantum theory, the act of measurement forces the full state vector or wave packet of all possibilities to "collapse" or choose just one of the possibilities. In other words, measurement forces the normally compound wave function (i.e., a superposition of possible wave solutions to the governing differential equation) to transition discontinuously and manifest as just one of its constituents. Still differently put, measurement reduces the wave packet and selects only one component wave from the full packet that represents the superposition of all component waves contained in the state vector.

In order to properly evaluate the state of the prior art and to contextualize the contributions of the present invention, it will be necessary to review a number of important concepts from quantum mechanics, quantum information theory (e.g., the quantum version of bits also called "qubits" by skilled artisans) and several related fields. For the sake of brevity, only the most pertinent issues will be presented herein. For a more thorough review of quantum information theory the reader is referred to course materials for John P. Preskill, "Quantum Information and Computation", Lecture Notes Ph219/CS219, Chapters 2&3, California Institute of Technology, 2013 and references cited therein. Excellent reviews of the fundamentals of quantum mechanics are found in standard textbooks starting with P. A. M. Dirac, "The Principles of Quantum Mechanics", Oxford University Press, 4$^{th}$ Edition, 1958; L. D. Landau and E. M. Lifshitz, "Quantum Mechanics (Non-relativistic Theory)", Institute of Physical Problems, USSR Academy of Sciences, Butterworth Heinemann, 3$^{rd}$ Edition, 1962; Cohen-Tannoudji et al., "Quantum Mechanics", John Wiley & Sons, 1977, and many others including the more in-depth and modern treatments such as J. J. Sakurai, "Modern Quantum Mechanics", Addison-Wesley, 2011.

2. A Brief Review of Quantum Mechanics Fundamentals

In most practical applications of quantum models, the process of measurement is succinctly and elegantly described in the language of linear algebra or matrix mechanics (frequently referred to as the Heisenberg picture). Since all those skilled in the art are familiar with linear algebra, many of its fundamental theorems and corollaries will not be reviewed herein. In the language of linear algebra, a quantum wave $\psi$ is represented in a suitable eigenvector basis by a state vector $|\psi\rangle$. To provide a more rigorous definition, we will take advantage of the formal bra-ket notation used in the art.

In keeping with Dirac's bra-ket convention, a column vector $\alpha$ is written as $|\alpha\rangle$ and its corresponding row vector (dual vector) is written as $\langle\alpha|$. Additionally, because of the complex-valuedness of quantum state vectors, flipping any bra vector to its dual ket vector and vice versa implicitly includes the step of complex conjugation. After initial introduction, most textbooks do not expressly call out this step (i.e., $\langle\alpha|$ is really $\langle\alpha^*|$ where the asterisk denotes complex conjugation). The reader is cautioned that many simple errors can be avoided by recalling this fundamental rule of complex conjugation.

We now recall that a measure of norm or the dot product (which is related to a measure of length and is a scalar quantity) for a standard vector $\vec{x}$ is normally represented as a multiplication of its row vector form by its column vector form as follows: $d = \vec{x}^T \vec{x}$. This way of determining norm carries over to the bra-ket formulation. In fact, the norm of any state vector carries a special significance in quantum mechanics.

Expressed by the bra-ket $\langle\alpha|\alpha\rangle$, we note that this formulation of the norm is always positive definite and real-valued for any non-zero state vector. That condition is assured by the step of complex conjugation when switching between bra and ket vectors. Now, state vectors describe probability amplitudes while their norms correspond to probabilities. The latter are real-valued and by convention mapped to a range between 0 and 1 (with 1 representing a probability of 1 or 100% certainty). Correspondingly, all state vectors are typically normalized such that their inner product (a generalization of the dot product) is equal to one, or simply put: $\langle\alpha|\alpha\rangle = \langle\beta|\beta\rangle = \ldots = 1$.

This normalization enforces conservation of probability on objects composed of quantum mechanical state vectors.

Using the above notation, we can represent any state vector $|\psi\rangle$ in its ket form as a sum of basis ket vectors $|\varepsilon_j\rangle$ that span the Hilbert space $\mathcal{H}$ of state vector $|\psi\rangle$. In this expansion, the basis ket vectors $|\varepsilon_j\rangle$ are multiplied by their correspondent complex coefficients $c_j$. In other words, state vector $|\psi\rangle$ decomposes into a linear combination as follows:

$$|\psi\rangle = \Sigma_{j=1}^{n} c_j |\varepsilon_j\rangle \qquad \text{Eq. 1}$$

where n is the number of vectors in the chosen basis. This type of decomposition of state vector $|\psi\rangle$ is sometimes referred to as its spectral decomposition by those skilled in the art.

Of course, any given state vector $|\psi\rangle$ can be composed from a linear combination of vectors in different bases thus yielding different spectra. However, the normalization of state vector $|\psi\rangle$ is equal to one irrespective of its spectral decomposition. In other words, bra-ket $\langle\psi|\psi\rangle = 1$ in any basis. From this condition we learn that the complex coefficients $c_j$ of any expansion have to satisfy:

$$p_{tot} = 1 = \Sigma_{j=1}^{n} c_j^* c_j \qquad \text{Eq. 2}$$

where $p_{tot}$ is the total probability. This ensures the conservation of probability, as already mentioned above. Furthermore, it indicates that the probability $p_j$ associated with any given eigenvector $|\varepsilon\rangle$ in the decomposition of $|\psi\rangle$ is the norm of the complex coefficient $c_j$, or simply put:

$$p_j = c_j^* c_j. \qquad \text{Eq. 3}$$

In view of the above, it is not surprising that undisturbed evolution of any state vector $|\psi\rangle$ in time is found to be unitary or norm preserving. In other words, the evolution is such that the norms $c_j^* c_j$ do not change with time.

To better understand the last point, we use the polar representation of complex numbers by their modulus r and phase angle $\theta$. Thus, we rewrite complex coefficient $c_j$ as:

$$c_j = r_j e^{i\theta_j}, \qquad \text{Eq. 4a}$$

where $i = \sqrt{-1}$ (we use i rather than j for the imaginary number). In this form, complex conjugate of complex coefficient $c_j^*$ is just:

$$c_j^* = r_j e^{-i\theta_j}, \qquad \text{Eq. 4b}$$

and the norm becomes:

$$c_j^* c_j = r_j e^{-i\theta_j} r_j e^{-i\theta_j} = r_j^2 \qquad \text{Eq. 4c}$$

The step of complex conjugation thus makes the complex phase angle drop out of the product (since $e^{-i\theta}e^{i\theta}=e^{i(\theta-\theta)}=e^0=1$). This means that the complex phase of coefficient $c_j$ does not have any measurable effects on the real-valued probability $p_j$ associated with the corresponding eigenvector $|\varepsilon_j\rangle$. Note, however, that relative phases between different components of the decomposition will introduce measurable effects (e.g., when measuring in a different basis).

In view of the above insight about complex phases, it is perhaps unsurprising that temporal evolution of state vector $|\psi\rangle$ corresponds to the evolution of phase angles of complex coefficients $c_j$ in its spectral decomposition (see Eq. 1). In other words, evolution of state vector $|\psi\rangle$ in time is associated with a time-dependence of angles $\theta_j$ of each complex coefficient $c_j$. The complex phase thus exhibits a time dependence $e^{i\theta_j}=e^{i\omega_j t}$, where the j-th angular frequency $\omega_j$ is associated with the j-th eigenvector $|\varepsilon_j\rangle$ and t stands for time. For completeness, it should be pointed out that $\omega_j$ is related to the energy level of the correspondent eigenvector $|\varepsilon_j\rangle$ by the famous Planck relation:

$$E_j = \hbar \omega_j, \qquad \text{Eq. 5}$$

where $\hbar$ stands for the reduced Planck's constant h, namely:

$$\hbar = \frac{h}{2\pi}.$$

Correspondingly, evolution of state vector $|\psi\rangle$ is encoded in a unitary matrix U that acts on state vector $|\psi\rangle$ in such a way that it only affects the complex phases of the eigenvectors in its spectral decomposition. The unitary nature of evolution of state vectors ensures the fundamental conservation of probability. Of course, this rule applies when there are no disturbances to the overall system and states exhibiting this type of evolution are often called stationary states.

In contrast to the unitary evolution of state vectors that affects the complex phases of all eigenvectors of the state vector's spectral decomposition, the act of measurement picks out just one of the eigenvectors. Differently put, the act of measurement is related to a projection of the full state vector $|\psi\rangle$ onto the subspace defined by just one of eigenvectors $|\varepsilon_j\rangle$ in the vector's spectral decomposition (see Eq. 1). Based on the laws of quantum mechanics, the projection obeys the laws of probability. More precisely, each eigenvector $|\varepsilon_j\rangle$ has the probability $p_j$ dictated by the norm $c_j^*c_j$ (see Eq. 3) of being picked for the projection induced by the act of measurement. Besides the rules of probability, there are no hidden variables or any other constructs involved in predicting the projection. This situation is reminiscent of a probabilistic game such as a toss of a coin or the throw of a die. It is also the reason why Einstein felt uncomfortable with quantum mechanics and proclaimed that he did not believe that God would "play dice with the universe".

No experiments to date have been able to validate Einstein's position by discovering hidden variables or other predictive mechanisms behind the choice. In fact, experiments based on the famous Bell inequality and many other investigations have confirmed that the above understanding encapsulated in the projection postulate of quantum mechanics is complete. Furthermore, once the projection occurs due to the act of measurement, the emergent element of reality that is observed, i.e., the measurable quantity, is the eigenvalue $\lambda_j$ associated with eigenvector $|\varepsilon_j\rangle$ selected by the projection.

Projection is a linear operation represented by a projection matrix P that can be derived from knowledge of the basis vectors. The simplest state vectors decompose into just two distinct eigenvectors in any given basis. These vectors describe the spin states of spin ½ particles such as electrons and other spinors. The quantum states of twistors, such as photons, also decompose into just two eigenvectors. In the present case, we will refer to spinors for reasons of convenience.

It is customary to define the state space of a spinor by eigenvectors of spin along the z-axis. The first, $|\varepsilon_{z+}\rangle$ is aligned along the positive z-axis and the second, $|\varepsilon_{z-}\rangle$ is aligned along the negative z-axis. Thus, from standard rules of linear algebra, the projection along the positive z-axis (z+) can be obtained from constructing the projection matrix or, in the language of quantum mechanics the projection operator $P_{z+}$ from the z+ eigenvector $|\varepsilon_{z+}\rangle$ as follows:

$$P_{z+} = |\varepsilon_{z+}\rangle\langle\varepsilon_{z+}| = \begin{bmatrix} 1 \\ 0 \end{bmatrix} \begin{bmatrix} 1 & 0 \end{bmatrix}^* = \begin{bmatrix} 1 & 0 \\ 0 & 0 \end{bmatrix}, \qquad \text{Eq. 6}$$

where the asterisk denotes complex conjugation, as above (no change here because vector components of $|\varepsilon_{z+}\rangle$ are not complex in this example). Note that in Dirac notation obtaining the projection operator is analogous to performing an outer product in standard linear algebra. There, for a vector $\vec{x}$ we get the projection matrix onto it through the outer product, namely: $P_{\vec{x}} = \vec{x}\vec{x}^T$.

3. A Brief Introduction to Qubits

We have just seen that the simplest quantum state vector $|\psi\rangle$ corresponds to a pre-emerged quantum entity that can yield one of two distinct observables under measurement. These measures are the two eigenvalues $\lambda_1$, $\lambda_2$ of the correspondent two eigenvectors $|\varepsilon_1\rangle$, $|\varepsilon_2\rangle$ in the chosen spectral decomposition. The relative occurrence of the eigenvalues will obey the probabilistic rule laid down by the projection postulate. In particular, eigenvalue $\lambda_1$ will be observed with probability $p_j$ (see Eq. 3) equal to the probability of projection onto eigenvector $|\varepsilon_1\rangle$. Eigenvalue $\lambda_2$ will be seen with probability $p_2$ equal to the probability of projection onto eigenvector $|\varepsilon_2\rangle$.

Because of the simplicity of the two-state quantum system represented by such two-state vector $|\psi\rangle$, it has been selected in the field of quantum information theory and quantum computation as the fundamental unit of information. In analogy to the choice made in computer science, this system is commonly referred to as a qubit and so the two-state vector becomes the qubit: $|qb\rangle = |\psi\rangle$. Operations on one or more qubits are of great interest in the field of quantum information theory and its practical applications. Since the detailed description will rely extensively on qubits and their behavior, we will now introduce them with a certain amount of rigor.

From the above preliminary introduction it is perhaps not surprising to find that the simplest two-state qubit, just like a simple spinor or twistor on which it is based, can be conveniently described in 2-dimensional complex space called $\mathbb{C}^2$. The description finds a more intuitive translation to our 3-dimensional space, $\mathbb{R}^3$, with the aid of the Bloch or Poincare Sphere. This concept is introduced by FIG. 1A, in which the Bloch Sphere 10 is shown centered on the origin of orthogonal coordinates indicated by axes X, Y, Z.

Before allowing oneself to formulate an intuitive view of qubits by looking at Bloch sphere 10, the reader is cautioned that the representation of qubits inhabiting $\mathbb{C}^2$ by mapping them to a ball in $\mathbb{R}^3$ is a useful tool. The actual mapping is not one-to-one. Formally, the representation of spinors by the group of transformations defined by SO(3) (Special Orthogonal matrices in $\mathbb{R}^3$) is double-covered by the group of transformations defined by SU(2) (Special Unitary matrices in $\mathbb{C}^2$).

In the Bloch representation, a qubit 12 represented by a ray in $\mathbb{C}^2$ is spectrally decomposed into the two z-basis eigenvectors. These eigenvectors include the z-up or $|+\rangle_z$ eigenvector, and the z-down or $|-\rangle_z$ eigenvector. The spectral decomposition theorem assures us that any state of qubit 12 can be decomposed in the z-basis as long as we use the appropriate complex coefficients. In other words, any state of qubit 12 can be described in the z-basis by:

$$|\psi\rangle_z = |qb\rangle_z = \alpha|+\rangle_z + \beta|-\rangle_z, \quad \text{Eq. 7}$$

where $\alpha$ and $\beta$ are the corresponding complex coefficients. In quantum information theory, basis state $|+\rangle_z$ is frequently mapped to logical "yes" or to the value "1", while basis state $|-\rangle_z$ is frequently mapped to logical "no" or to the value "0".

In FIG. 1A basis states $|+\rangle_z$ and $|-\rangle_z$ are shown as vectors and are written out in full form for clarity of explanation. (It is worth remarking that although basis states $|+\rangle_z$ and $|-\rangle_z$ are indeed orthogonal in $\mathbb{C}^2$, they fall on the same axis (Z axis) in the Bloch sphere representation in $\mathbb{R}^3$. That is because the mapping is not one-to-one, as already mentioned above.) Further, in our chosen representation of qubit 12 in the z-basis, the X axis corresponds to the real axis and is thus also labeled by Re. Meanwhile, the Y axis corresponds to the imaginary axis and is additionally labeled by Im.

To appreciate why complex coefficients $\alpha$ and $\beta$ contain sufficient information to encode qubit 12 pointed anywhere within Bloch sphere 10 we now refer to FIG. 1B. Here the complex plane 14 spanned by real and imaginary axes Re, Im that are orthogonal to the Z axis and thus orthogonal to eigenvectors $|+\rangle_z$ and $|-\rangle_z$ of our chosen z-basis is hatched for better visualization. Note that eigenvectors for the x-basis $|+\rangle_x$, $|-\rangle_x$ as well as eigenvectors for the y-basis $|+\rangle_y$, $|-\rangle_y$ are in complex plane 14. Most importantly, note that each one of the alternative basis vectors in the two alternative basis choices we could have made finds a representation using the eigenvectors in the chosen z-basis. As shown in FIG. 1B, the following linear combinations of eigenvectors $|+\rangle_z$ and $|-\rangle_z$ describe vectors $|+\rangle_x$, $|-\rangle_x$ and $|+\rangle_y$, $|-\rangle_y$:

$$|+\rangle_x = \frac{1}{\sqrt{2}}|+\rangle_z + \frac{1}{\sqrt{2}}|-\rangle_z, \quad \text{Eq. 8a}$$

$$|-\rangle_x = \frac{1}{\sqrt{2}}|+\rangle_z - \frac{1}{\sqrt{2}}|-\rangle_z, \quad \text{Eq. 8b}$$

$$|+\rangle_y = \frac{1}{\sqrt{2}}|+\rangle_z + \frac{i}{\sqrt{2}}|-\rangle_z, \quad \text{Eq. 8c}$$

$$|-\rangle_y = \frac{1}{\sqrt{2}}|+\rangle_z - \frac{i}{\sqrt{2}}|-\rangle_z, \quad \text{Eq. 8d}$$

Clearly, admission of complex coefficients $\alpha$ and $\beta$ permits a complete description of qubit 12 anywhere within Bloch sphere 10 thus furnishing the desired map from $\mathbb{C}^2$ to $\mathbb{R}^3$ for this representation. The representation is compact and leads directly to the introduction of Pauli matrices.

FIG. 1C shows the three Pauli matrices $\sigma_1$, $\sigma_2$, $\sigma_3$ (sometimes also referred to as $\sigma_x$, $\sigma_y$, $\sigma_z$) that represent the matrices corresponding to three different measurements that can be performed on spinors.

Specifically, Pauli matrix $\sigma_1$ corresponds to measurement of spin along the X axis (or the real axis Re). Pauli matrix $\sigma_2$ corresponds to measurement of spin along the Y axis (or the imaginary axis Im). Finally, Pauli matrix $\sigma_3$ corresponds to measurement of spin along the Z axis (which coincides with measurements in the z-basis that we have selected). The measurement of spin along any of these three orthogonal axes will force projection of qubit 12 to one of the eigenvectors of the corresponding Pauli matrix. Correspondingly, the measurable value will be the eigenvalue that is associated with the eigenvector.

To appreciate the possible outcomes of measurement we notice that all Pauli matrices $\sigma_1$, $\sigma_2$, $\sigma_3$ share the same two orthogonal eigenvectors, namely $|\varepsilon_1\rangle = [1,0]$ and $|\varepsilon_2\rangle = [0,1]$. Further, Pauli matrices are Hermitian (an analogue of real-valued symmetric matrices) such that:

$$\sigma_k = \sigma_k^\dagger, \quad \text{Eq. 9}$$

for k=1, 2, 3 (for all Pauli matrices). These properties ensure that the eigenvalues $\lambda_1$, $\lambda_2$, $\lambda_3$ of Pauli matrices are real and the same for each Pauli matrix. In particular, for spin ½ particles such as electrons, the Pauli matrices are multiplied by a factor of $\hbar/2$ to obtain the corresponding spin angular momentum matrices $S_k$. Hence, the eigenvalues are shifted to $$\lambda_1 = \frac{\hbar}{2} \text{ and } \lambda_2 = -\frac{\hbar}{2}$$

(where $\hbar$ is the reduced Planck's constant already defined above). Here we also notice that Pauli matrices $\sigma_1$, $\sigma_2$, $\sigma_3$ are constructed to apply to spinors, which change their sign under a $2\pi$ rotation and require a rotation by $4\pi$ to return to initial state (formally, an operator S is a spinor if $S(\theta+2\pi) = S(\theta)$).

As previously pointed out, in quantum information theory and its applications the physical aspect of spinors becomes unimportant and thus the multiplying factor of $\hbar/2$ is dropped. Pauli matrices $\sigma_1$, $\sigma_2$, $\sigma_3$ are used in unmodified form with corresponded eigenvalues $\lambda_1=1$ and $\lambda_2=-1$ mapped to two opposite logical values, such as "yes" and "no". For the sake of rigor and completeness, one should state that the Pauli matrices are traceless, each of them squares to the Identity matrix I, their determinants are −1 and they are involutory. A more thorough introduction to their importance and properties can be found in the many foundational texts on Quantum Mechanics, including the above mentioned textbook by P. A. M. Dirac, "The Principles of Quantum Mechanics", Oxford University Press, 4th Edition, 1958 in the section on the spin of the electron.

Based on these preliminaries, the probabilistic aspect of quantum mechanics encoded in qubit 12 can be re-stated more precisely. In particular, we have already remarked that the probability of projecting onto an eigenvector of a measurement operator is proportional to the norm of the complex coefficient multiplying that eigenvector in the spectral decomposition of the full state vector. This rather abstract statement can now be recast as a complex linear algebra prescription for computing an expectation value $\langle O \rangle$ of an operator matrix O for a given quantum state $|\psi\rangle$ as follows:

$$\langle O \rangle_\psi = \langle \psi | O | \psi \rangle, \qquad \text{Eq. 10a}$$

where the reader is reminded of the implicit complex conjugation between the bra vector $\langle \psi |$ and the dual ket vector $|\psi\rangle$. The expectation value $\langle O \rangle_\psi$ is a number that corresponds to the average result of the measurement obtained by operating with matrix O on a system described by state vector $|\psi\rangle$. For better understanding, FIG. 1C visualizes the expectation value $\langle \sigma_3 \rangle$ for qubit 12 whose ket in the z-basis is written as $|qb\rangle_z$ for a measurement along the Z axis represented by Pauli matrix $\sigma_3$ (note that the subscript on the expectation value is left out, since we know what state vector is being measured).

Although the drawing may suggests that expectation value $\langle \sigma_3 \rangle$ is a projection of qubit 12 onto the Z axis, the value of this projection is not the observable. Instead, the value $\langle \sigma_3 \rangle$ is the expectation value of collapse of qubit 12 represented by ket vector $|qb\rangle_z$, in other words, a value that can range anywhere between 1 and −1 ("yes" and "no") and will be found upon collecting the results of a large number of actual measurements.

In the present case, since operator $\sigma_3$ has a complete set of eigenvectors (namely $|+\rangle_z$ and $|-\rangle_z$) and since the qubit $|qb\rangle_z$ we are interested in is described in the same z-basis, the probabilities are easy to compute. The expression follows directly from Eq. 10a:

$$\langle \sigma_3 \rangle_\psi = \Sigma_j \lambda_j |\langle \psi | \varepsilon_j \rangle|^2, \qquad \text{Eq. 10b}$$

where $\lambda_j$ are the eigenvalues (or the "yes" and "no" outcomes of the experiment) and the norms $|\langle \psi | \varepsilon_j \rangle|^2$ are the probabilities that these outcomes will occur. Eq. 10b is thus more useful for elucidating how the expectation value of an operator brings out the probabilities of collapse to respective eigenvectors $|\varepsilon_j\rangle$ that will obtain when a large number of measurements are performed in practice.

For the specific case in FIG. 1C, we show the probabilities from Eq. 10b can be found explicitly in terms of the complex coefficients $\alpha$ and $\beta$. Their values are computed from the definition of quantum mechanical probabilities already introduced above (see Eqs. 2 and 3):

$$p_1 = p_{\text{"yes"}} = |\langle qb | \varepsilon_1 \rangle|^2 = |(\alpha^* \langle +| + \beta^* \langle -|) |+\rangle_z|^2 = \alpha^* \alpha$$

$$p_2 = p_{\text{"no"}} = |\langle qb | \varepsilon_2 \rangle|^2 = |(\alpha^* \langle +| + \beta^* \langle -|) |-\rangle_z|^2 = \beta^* \beta$$

$$p_1 + p_2 = p_{\text{"yes"}} + p_{\text{"no"}} = \alpha^* \alpha + \beta^* \beta = 1$$

These two probabilities are indicated by visual aids at the antipodes of Bloch sphere 10 for clarification. The sizes of the circles that indicate them denote their relative values. In the present case $p_{\text{"yes"}} > p_{\text{"no"}}$ given the exemplary orientation of qubit 12.

Representation of qubit 12 in Bloch sphere 10 brings out an additional and very useful aspect to the study, namely a more intuitive polar representation. This representation will also make it easier to point out several important aspects of quantum mechanical states that will be pertinent to the present invention.

FIG. 1D illustrates qubit 12 by deploying polar angle $\theta$ and azimuthal angle $\phi$ routinely used to parameterize the surface of a sphere in $\mathbb{R}^3$. Qubit 12 described by state vector $|qb\rangle_z$ has the property that its vector representation in Bloch sphere 10 intersects the sphere's surface at point 16. That is apparent from the fact that the norm of state vector $|qb\rangle_z$ is equal to one and the radius of Bloch sphere 10 is also one.

Still differently put, qubit 12 is represented by quantum state $|qb\rangle_z$ that is pure; i.e., it is considered in isolation from the environment and from any other qubits for the time being. Pure state $|qb\rangle_z$ is represented with polar and azimuth angles $\theta$, $\phi$ of the Bloch representation as follows:

$$|qb\rangle_z = \cos\frac{\theta}{2} |+\rangle_z + e^{i\phi} \sin\frac{\theta}{2} |-\rangle_z, \qquad \text{Eq. 11}$$

where the half-angles are due to the state being a spinor (see definition above). The advantage of this description becomes even more clear in comparing the form of Eq. 11 with Eq. 7. State $|qb\rangle_z$ is insensitive to any overall phase or overall sign thus permitting several alternative formulations.

Additionally, we note that the Bloch representation of qubit 12 also provides an easy parameterization of point 16 in terms of $\{x,y,z\}$ coordinates directly from polar and azimuth angles $\theta$, $\phi$. In particular, the coordinates of point 16 are just:

$$\{x,y,z\} = \{\sin\theta\cos\phi, \sin\theta\sin\phi, \cos\theta\}, \qquad \text{Eq. 12}$$

in agreement with standard transformation between polar and Cartesian coordinates.

We now return to the question of measurement equipped with some basic tools and a useful representation of qubit 12 as a unit vector terminating at the surface of Bloch sphere 10 at point 16 (whose coordinates $\{x,y,z\}$ are found from Eq. 12) and pointing in some direction characterized by angles $\theta$, $\phi$. The three Pauli matrices $\sigma_1$, $\sigma_2$, $\sigma_3$ can be seen as associating with measurements along the three orthogonal axes X, Y, Z in real 3-dimensional space $\mathbb{R}^3$.

A measurement represented by a direction in $\mathbb{R}^3$ can be constructed from the Pauli matrices. This is done with the aid of a unit vector $\hat{u}$ pointing along a proposed measurement direction, as shown in FIG. 1D. Using the dot-product rule, we now compose the desired operator $\sigma_u$ using unit vector $\hat{u}$ and the Pauli matrices as follows:

$$\sigma_u = \hat{u} \cdot \vec{\sigma} = u_x \sigma_1 + u_y \sigma_2 + u_z \sigma_3. \qquad \text{Eq. 13}$$

Having thus built up a representation of quantum mechanical state vectors, we are in a position to understand a few facts about the pure state of qubit 12. Namely, an ideal or pure state of qubit 12 is represented by a Bloch vector of unit norm pointing along a well-defined direction. It can also be expressed by Cartesian coordinates $\{x,y,z\}$ of point 16. Unit vector $\hat{u}$ defining any desired direction of measurement can also be defined in Cartesian coordinates $\{x,y,z\}$ of its point of intersection 18 with Bloch sphere 10.

When the direction of measurement coincides with the direction of the state vector of qubit 12, or rather when the Bloch vector is aligned with unit vector $\hat{u}$, the result of the quantum measurement will not be probabilistic. In other words, the measurement will yield the result $|+\rangle_u$ with certainty (probability equal to 1 as may be confirmed by applying Eq. 10b), where the subscript u here indicates the basis vector along unit vector $\hat{u}$. Progressive misalignment between the direction of measurement and qubit 12 will result in an increasing probability of measuring the opposite state, $|-\rangle_u$.

The realization that it is possible to predict the value of qubit 12 with certainty under above-mentioned circumstances suggests we ask the opposite question. When do we encounter the least certainty about the outcome of measuring qubit 12? With the aid of FIG. 1E, we see that in the Bloch representation this occurs when we pick a direction of measurement along a unit vector v̂ that is in a plane 20 perpendicular to unit vector û after establishing the state |+⟩$_u$ (or the state |−⟩$_u$) by measuring qubit 12 eigenvalue "yes" along û (or "no" opposite to û). Note that establishing a certain state in this manner is frequently called "preparing the state" by those skilled in the art. After preparation in state |+⟩$_u$ or in state |−⟩$_u$, measurement of qubit 12 along vector v̂ will produce outcomes |+⟩$_v$ and |−⟩$_v$ with equal probabilities (50/50).

Indeed, we see that this same condition holds among all three orthogonal measurements encoded in the Pauli matrices. To wit, preparing a certain measurement along Z by application of matrix $\sigma_3$ to qubit 12 makes its subsequent measurement along X or Y axes maximally uncertain (see also plane 14 in FIG. 1B). This suggests some underlying relationship between Pauli matrices $\sigma_1$, $\sigma_2$, $\sigma_3$ that encodes for this indeterminacy. Even based on standard linear algebra we expect that since the order of application of matrix operations usually matters (since any two matrices A and B typically do not commute) the lack of commutation between Pauli matrices could be signaling a fundamental limit to the simultaneous observation of multiple orthogonal components of spin or, by extension, of qubit 12.

In fact, we find that the commutation relations for the Pauli matrices, here explicitly rewritten with the x,y,z indices rather than 1, 2, 3, are as follows:

$$[\sigma_x,\sigma_y]=i\sigma_z; [\sigma_y,\sigma_z]=i\sigma_x; [\sigma_z,\sigma_x]=i\sigma_y.$$ Eq. 14

The square brackets denote the traditional commutator defined between any two matrices A, B as [A,B]=AB−BA. When actual quantities rather than qubits are under study, this relationship leads directly to the famous Heisenberg Uncertainty Principle. This fundamental limitation on the emergence of elements of reality prevents the simultaneous measurement of incompatible observables and places a bound related to Planck's constant h (and more precisely to the reduced Planck's constant ℏ) on the commutator. This happens because matrices encoding real observables bring in a factor of Planck's constant and the commutator thus acquires this familiar bound.

The above finding is general and extends beyond the commutation relations between Pauli matrices. According to quantum mechanics, the measurement of two or more incompatible observables is always associated with matrices that do not commute. Another way to understand this new limitation on our ability to simultaneously discern separate elements of reality, is to note that the matrices for incompatible elements of reality cannot be simultaneously diagonalized. Differently still, matrices for incompatible elements of reality do not share the same eigenvectors. Given this fact of nature, it is clear why modern day applications strive to classify quantum systems with as many commuting observables as possible up to the famous Complete Set of Commuting Observables (CSCO).

Whenever the matrices used in the quantum description of a system do commute, then they correspond to physical quantities of the system that are simultaneously measurable. A particularly important example is the matrix that corresponds to the total energy of the system known as the Hamiltonian H. When an observable is described by a matrix M that commutes with Hamiltonian H, and the system is not subject to varying external conditions, (i.e., there is no explicit time dependence) then that physical quantity that corresponds to operator M is a constant of motion.

4. A Basic Measurement Arrangement

In practice, pure states are rare due to interactions between individual qubits as well as their coupling to the environment. All such interactions lead to a loss of quantum state coherency, also referred to as decoherence, and the consequent emergence of "classical" statistics. Thus, many additional tools have been devised for practical applications of quantum models under typical conditions. However, under conditions where the experimenter has access to entities exhibiting relatively pure quantum states many aspects of the quantum mechanical description can be recovered from appropriately devised measurements.

To recover the desired quantum state information it is important to start with collections of states that are large. This situation is illustrated by FIG. 1F, where an experimental apparatus 22 is set up to perform a measurement of spin along the Z axis. Apparatus 22 has two magnets 24A, 24B for separating a stream of quantum systems 26 (e.g., electrons) according to spin. The spin states of systems 26 are treated as qubits 12a, 12b, . . . , 12n for the purposes of the experiment. The eigenvectors and eigenvalues are as before, but the subscript "z" that was there to remind us of the z-basis decomposition, which is now implicitly assumed, has been dropped.

Apparatus 22 has detectors 28A, 28B that intercept systems 26 after separation to measure and amplify the readings. It is important to realize that the act of measurement is performed during the interaction between the field created between magnets 24A, 24B and systems 26. Therefore, detectors 28A, 28B are merely providing the ability to record and amplify the measurements for human use. These operations remain consistent with the original result of quantum measurements. Hence, their operation can be treated classically. (The careful reader will discover a more in-depth explanation of how measurement can be understood as entanglement that preserves consistency between measured events given an already completed micro-level measurement. By contrast, the naïve interpretation allowing amplification to lead to macro-level superpositions and quantum interference is incompatible with the consistency requirement. A detailed analysis of these fine points is found in any of the previously mentioned foundational texts on quantum mechanics.)

For systems 26 prepared in various pure states that are unknown to the experimenter, the measurements along Z will not be sufficient to deduce these original states. Consider that each system 26 is described by Eq. 7. Thus, each system 26 passing through apparatus 22 will be deflected according to its own distinct probabilities $p_{|+\rangle}=\alpha^*\alpha$ (or $p_{"yes"}$) and $p_{|-\rangle}=\beta^*\beta$ (or $p_{"no"}$). Hence, other than knowing the state of each system 26 with certainty after its measurement, general information about the preparation of systems 26 prior to measurement will be very difficult to deduce.

FIG. 1G shows the more common situation, where systems 26 are all prepared in the same, albeit unknown pure state (for "state preparation" see section 3 above). Under these circumstances, apparatus 22 can be used to deduce more about the original pure state that is unknown to the experimenter. In particular, a large number of measurements of |+⟩ ("yes") and |−⟩ ("no") outcomes, for example N such measurements assuming all qubits 12a through 12n are properly measured, can be analyzed probabilistically. Thus, the number $72_{1+}$ of |+⟩ measurements divided by the total number of qubits 12 that were measured, namely N, has to equal $\alpha^*\alpha$. Similarly, the number $n_{|-\rangle}$ of |−⟩ measurements divided by N has to equal $\beta^*\beta$. From this information the experimenter can recover the projection of the unknown pure state onto the Z axis. In FIG. 1G this projection 26' is shown as an orbit on which the state vector can be surmised to lie. Without any additional measurements, this is all the information that can be easily gleaned from a pure Z axis measurement with apparatus 22.

5. Observables Emerging on Discrete and Continuous Coordinates

By now it will have become apparent to the reader that the quantum mechanical underpinnings of qubits are considerably more complicated than the physics of regular bits. Regular bits can be treated in a manner that is completely divorced from their physicality. A computer scientist dealing with a bit does not need to known what the physical system embodying the bit happens to be, as long as it satisfies the typical criteria of performance (e.g., low probability of bit errors and containment of other failure modes). Unfortunately, as already remarked and further based on the reviews found in U.S. patent application Ser. Nos. 14/182,281 and 14/224,041 the same is not true for qubits.

In light of the invention, it is important to better understand the physical systems that underlie qubits. For a very basic review of the effects of entanglement, decoherence and types of permissible wave functions (symmetric and anti-symmetric) for physical systems on which qubits are often based the reader is referred to the above-cited patent application Ser. Nos. 14/182,281; 14/224,041. More complete information is given in the standard textbooks on Quantum Mechanics also mentioned above.

Presently, we turn our attention to the problem of representation of quantum mechanical systems in coordinate space. Those skilled in the art frequently refer to such space as the configuration space and parameterize it by generalized coordinates q. For a single "particle" a small differential unit of these coordinates is represented by dq and it corresponds to an element of volume dV in ordinary space.

According to standard quantum mechanics, a wave function $\Psi$ is not directly observable. Instead, it reifies in a stable context defined by some already emerged classical parameters. (Quantum field theory moves beyond this limitation by introducing a second level of quantization and positing virtual interactions.) Typically, a stable context in which wave function $\Psi$ is to manifest is given (e.g., in the form of a suitable basis). Without this context the contents of wave function $\Psi$ cannot be inspected. Traditionally, wave function $\Psi$ is examined in space parameterized by generalized coordinates q, thus satisfying the criterion for emergence or "precipitation" onto a stable context in its contextualized form $\Psi(q)$. Despite being decomposed over stable and real parameter q, $\Psi(q)$ remains a complex function.

The other traditional parameterization is over a momentum p conjugate to space coordinate q thus yielding contextualized form $\Psi(p)$. Form $\Psi(p)$ is usually designated with a different letter, e.g., $\Phi(p)$, and it is also generally a complex function. As the reader is likely already expecting from the topics in section 3, these two parameterizations or bases are incompatible in the Heisenberg sense. Wave function $\Psi$ cannot be observed in both contexts simultaneously. The relationship between wave function $\Phi(p)$ contextualized in p and then in q as wave function $\Psi(q)$ is governed by the Heisenberg Uncertainty Relation (see also Eq. 14). Written in its continuous integral form, this relation is the familiar Fourier transformation between functions of conjugate variables, namely:

$$\Psi(q) = \frac{1}{\sqrt{2\pi\hbar}} \int_{-\infty}^{+\infty} \Phi(p) \cdot e^{-ipq/\hbar} dp. \qquad \text{Eq. 15}$$

We note here that $t\Phi(p)$'s are amplitudes.

The important question in examining wave function $\Psi$ in any context or basis is how it couples to or precipitates on the coordinate that parameterizes the chosen context. FIG. 1H illustrates a few possible precipitation types based on several admissible forms of space coordinate q.

A first possibility is demonstrated at specific and disjoint locations in space parameterized by discrete and separate space points $q_a$ and $q_b$. When only precipitation on such discrete space points $q_a$ and $q_b$ is possible, then $\Psi$ becomes a complex-valued discrete function precipitating at those points as $\Psi_{q_a}$ and $\Psi_{q_b}$. Note that these functions reside in Hilbert space $\mathcal{H}$. They are indicated in FIG. 1H merely as a visualization aid, since they are not directly representable in real three-dimensional space $\mathbb{R}^3$ presumed by the drawing. Also, no specific symmetry (e.g., spherical symmetry) is implied. In the event that this two-part system is truly disjoint, then the probabilities at coordinate $q_a$ are independent of probabilities at coordinate $q_b$. Under these conditions the total wave function at these coordinate points is a product. In other words, we can express wave function $\Psi$ as precipitating on $q_a$ and $q_b$ in the form of a product:

$$\Psi = \Psi_{q_a} \Psi_{q_b}. \qquad \text{Eq. 16}$$

Such non-interacting situation is reminiscent of classical conditions where total probabilities are obtained from products of constituent probabilities. Wave functions that obey this condition are separable and thus not subject to entanglement (also see U.S. patent application Ser. No. 12/182,281).

A second possibility is shown along a continuous segment 29 of general space coordinate q. We use the italic font to distinguish between continuous vs. discrete realms of the context parameterized by space coordinate q. Continuous segment 29 conforms to a topology embedded in real three-dimensional space as dictated by any permissible externalities and conditions. For example, segment 29 may conform to a geodesic curve in the space. For background teachings on geodesic curves the reader is referred to Einstein's theory of General Relativity. A few excellent references include Steven Weinberg, "Gravitation and Cosmology: Principles and Applications of the General Theory of Relativity", Wiley & Sons, 1972; Sean Carroll, "Spacetime and Geometry: An Introduction to General Relativity", Addison-Wesley 2003; and the thorough and rigorous treatment by Robert M. Wald, "General Relativity", University of Chicago Press, 1984. Although relativity itself is not directly related to the present invention, it is important to realize that it is, at its core, a classical theory that is still not reconciled with quantum mechanics. The anticipated joinder of Quantum Mechanics and General Relativity at some future date is expected to lead to a more complete quantum gravity framework.

Returning to segment 29, we note that in general wave function $\Psi$ can experience complicated precipitation conditions. These can lead to more difficult to compute probability distributions over the emerged coordinate. In the present example, the most general form governing precipitation from Hilbert space $\mathcal{H}$ onto emerged continuous coordinate q to yield a measurable probability distribution is:

$$\iint \Psi(q)\Psi^*(q')\phi(q,q')dqdq'. \qquad \text{Eq. 17}$$

This expression is bilinear in $\Psi$ and its complex conjugate $\Psi^*$. It is subject to integration over both. This double integration is performed in the standard manner by using two integration variables q, q' and their correspondent differential units dq, dq' running over all values of continuous coordinate q on bounded segment 29. (Corresponding bounds of integration could be placed on the integrals in Eq. 17). Furthermore, the general case admits a function φ(q,q') dependent on overall precipitation and measurement conditions.

FIG. 1I, shows the most common situation in which function φ(q,q') encodes a rather straightforward precipitation rule on space coordinate q. In this case function φ(q,q') is based on the well-known Dirac delta function δ for every specific value of coordinate $q_o$:

$$\phi(q,q')=\delta(q-q_o)\delta(q'-q_o). \quad \text{Eq. 18}$$

This function picks out the probability only at the specific value of space coordinate $q_o$. The diligent reader may wish to refer to standard textbooks on the mathematics of distributions and their behavior to gain a better appreciation of the properties of the Dirac delta function δ.

In FIG. 1I a probability distribution p(q) over space coordinate q parameterizing segment 29 is recovered by allowing $q_o$ to vary over entire segment 29 as indicated by arrow 29'. The probability is computed at each point $q_o$ using Eq. 17 under substitution of Eq. 18 for function φ(q,q'). The resultant probability curve p(q) over segment 29 thus obtained is graphed in the top inset in FIG. 1I. Note that in this bounded case we expect the total probability over segment 29 to be equal to one (standard normalization condition: $\int |\Psi|^2 dq=1$). The reader is again referred to the above-referenced textbooks on Quantum Mechanics to gain a more in-depth understanding of normalization in the case of discrete and continuous coordinates. These prior art reference also show how to use integral kernels and Green's functions, which are the tools for solving differential equations under boundary conditions that Ψ must satisfy.

Returning to FIG. 1H, we see yet another possibility in which space coordinate q on which wave function Ψ precipitates is simple and discrete. It is just a direction in real three-dimensional space. In other words, the measurable can only be up or down along a real axis we label as $\bar{q}$ (note that in this particular case the over-bar is not intended to denote a vector, as it sometimes does in standard literature). Of course, this is the case that includes spin ½ spinors we have reviewed above. We now can appreciate the relative simplicity of this type of precipitation in comparison, for example, with precipitation on a continuous and unbounded coordinate. It is this relatively straightforward precipitation type of quantum spin entities that make them so useful. Given that even this type of precipitation contains all the basic features of quantum mechanics, many standard textbooks use spin systems as the most pedagogically appropriate starting point. In practice, the same features render collections of quantum spin entities ideally suited for many quantum models.

To gain a better appreciation for the last point, we examine two spin ½ spinor precipitations at two different spatial locations (x,y,z) in real three-dimensional space $\mathbb{R}^3$. For convenience, we parameterize the space with a Cartesian coordinate system 30 of world coordinate axes $(X_w,Y_w,Z_w)$. These three orthogonal axes define the three emerged and continuous space coordinates q. The two spatial locations of interest are succinctly expressed with vectors $r_j$ and $r_k$ from the origin of coordinate system 30. Axes $\bar{q}_j$ and $\bar{q}_k$ along which the up and down spins are to precipitate under measurement are aligned with world coordinate axes $Y_w$ and $Z_w$, respectively. From section 3 we recall that measurements of spin along Y and Z axes correspond to matrices $\sigma_2$ (or $\sigma_y$) and $\sigma_3$ (or $\sigma_z$), respectively. In other words, quantum state $\psi_j$ is decomposed in eigenvectors of matrix $\sigma_2$ and quantum state $\psi_k$ is decomposed in eigenvectors of matrix $\sigma_3$.

Note that quantum states $\psi_j$, $\psi_k$ could be non-interacting and therefore separable (see Eq. 13 above) in the simple case. However, they could also be interacting via some field (e.g., the electro-magnetic field described by its EM Lagrangian $\mathcal{L}$) and thus subject to entanglement. In the latter case, the quantum statistics, namely Bose-Einstein (B-E) or Fermi-Dirac (F-D) need to be known in order to derive the correct symmetric or anti-symmetric joint quantum states. The spin½ entities chosen here are fermions, as is known from the spin statistics theorem. They yield anti-symmetric joint states and obey the Pauli Exclusion Principle according to which no two fermions can occupy the same quantum state simultaneously. U.S. patent application Ser. No. 14/224,041 reviews some basic aspects of fermions and bosons while a more in-depth treatment of this well-known subject is found in the above-cited references.

The formal description of quantum state $\psi_j$ that precipitates on axis $\bar{q}_j$ is presented by wave function $\psi_j(x,y,z;\sigma_y)$. The first part of this wave function relates to a position or location expressed with the aid of Cartesian coordinate system 30. More precisely, by position or location we mean a volume $dV_j$ centered on (x,y,z) within which quantum state $\psi_j$ is most likely to precipitate on continuous three-dimensional space $\mathbb{R}^3$. Using vector $r_j$ from the origin to the center of volume dV we can now write state $\psi_j$ as wave function $\psi_j(r_j;\sigma_y)$. The same can be done with state $\psi_k(x,y,z;\sigma_z)$ that is to precipitate at the center of a volume $dV_k$ that is not explicitly shown but whose center is indicated by vector $r_k$. We thus obtain wave function $\psi_k(r_k;\sigma_z)$.

It is helpful to indicate quantum entities 32j and 32k that inhabit Hilbert space $\mathcal{H}$ and are logically prior to their presentation as spectral decompositions. Although indicated as "balls" in the drawing figure their representation should be treated with utmost care and as a visualization aid only. That is because quantum entities 32j and 32k cannot be properly indicated in $\mathbb{R}^3$ due to insufficient dimensionality afforded by real three-dimensional space. It is for this reason, among other, that practical quantum mechanics focuses on functions $\psi_j(r_j;\sigma_y)$, $\psi_k(r_k;\sigma_z)$ that are descriptions of quantum entities 32j and 32k already presented in the chosen bases.

Of course, the choice of basis is open. In other words, rather than using space coordinates q in continuous three-dimensional space $\mathbb{R}^3$ to define positions where wave functions $\psi_j(r_j;\sigma_y)$, $\psi_k(r_k;\sigma_z)$ can precipitate, we could have sought a spectral decomposition in the canonically conjugate momentum basis p. Instead of eigenvectors and eigenvalues of position $r_j$, $r_k$, the precipitation of quantum entities 32j, 32k would then be viewed in terms of eigenvectors and eigenvalues of momenta p (i.e., $p_k$, $p_j$). The physically measurable quantities or observables would be the eigenvalues in either decomposition. However, one cannot obtain measurements for decompositions of quantum entities 32j, 32k in both bases simultaneously due to the Uncertainty Principle (see Eq. 15 for the relationship between wave functions expressed in position basis vs. momentum basis).

The quantum mechanical description also admits of observables that, unlike the canonical position and momenta (also referred to simply as the q's and p's), are compatible with each other. Such observables are not subject to the Uncertainty Principle and can be measured simultaneously without affecting each other. In other words, quantum entities 32j, 32k will permit simultaneous measurement of observables that are compatible. Matrices representing such observables are simultaneously diagonalizable and their commutators are zero. Consequently, specifying quantum entities $32j$, $32k$ by wave functions decomposed in such compatible observables permits us to split them by those observables and treat them separately. It is the separability of certain aspects of the quantum mechanical description that permits the practitioners of quantum information theory to divorce the qubit aspect of a quantum entity from the remainder of its physical instantiation.

The description of entity $32j$ has two separable properties, namely position $r_j$ and spin $\sigma_y$. To indicate that we can consider them separately we interpose the semicolon in the wave function $\psi_j(r_j;\sigma_y)$ of entity $32j$ between these separate arguments. A more formal way to understand separability of the two wave function arguments is to realize that the Hilbert space of position $\mathcal{H}_r$ of entity $32j$ does not overlap with the Hilbert space of its spin $\mathcal{H}_\sigma$. This means that any operator acting on one of these arguments, e.g., the specific operator $\sigma_y$ of spin along Y acting on the spin of entity $32j$, does not act on the other argument, i.e., it does not act on the position of entity $32j$. A person skilled in the art would say that an operator acting in one of these Hilbert spaces acts as the identity operator in the other Hilbert space. Differently put, the spin operator acting on entity $32j$ should really be thought of as a composite operator $\sigma_y \otimes \mathbf{1}$ with its spin part $\sigma_y$ acting as a proper spin operator in $\mathcal{H}_\sigma$ but behaving just as the identity matrix $\mathbf{1}$ in $\mathcal{H}_r$. The exact same is true for entity $32k$ and the separate arguments of its wave function $\psi_k(r_k;\sigma_z)$.

The reader is cautioned that separability only holds when considering a single component of spin, since more than one component cannot be simultaneously known due to the Uncertainty Principle. In the general case, spin $\sigma$ can be taken as one measurable spin component along any desired direction u (defined by unit vector û). Spin along u is measurable by spin operator $\sigma_u$ composed of the Pauli matrices in accordance with Eq. 13. In many typical applications of quantum mechanics and for the sake of simplicity, spin is defined along the Z axis, as in the case of entity $32k$ with wave function $\psi(r_k;\sigma_z)$.

We are thus justified to consider separately and on their own the precipitations of spin portions of wave functions $\psi_j(r_j;\sigma_y)$, $\psi_k(r_k;\sigma_z)$ that capture entities $32j$, $32k$ in the Y and Z spin bases. Our wave functions reduce to just $\psi_j(\sigma_y)$ and $\psi_k(\sigma_z)$. In FIG. 1H we arranged for world coordinate axis $Z_w$ to be parallel to axis Z of entity $32k$ (sometimes also referred to as object axis Z of object coordinates). In general, such alignment may not exist and a corresponding coordinate transformation from world coordinates to object coordinates may be required. Transformations of this variety are well-known to those skilled in the art and will not be described herein. For details on coordinate transformations see, e.g., G. B. Arfken and H. J. Weber, "Mathematical Methods for Physicists", Harcourt Academic Press, 5$^{th}$ Edition, 2001.

We now focus on an enlarged view of entity $32k$ as shown in FIG. 1J. For visualization, we show entity $32k$ with its spin state vector expressed once again in the Dirac notation with ket vector $|qb_k\rangle$. We are dropping reference to the full wave function $\psi_k(r_k;\sigma_z)$ because only the Z spin of entity $32k$ is being considered here. In fact, we consider $|qb_k\rangle$ to be just the type of spinor-based qubit we have discussed earlier.

Of course, we cannot actually know that qubit $|qb_k\rangle$ is oriented in the Bloch sphere as shown in FIG. 1J unless we prepare it in that state by a previous measurement and model it shortly after that preparation (such that no significant amount of temporal evolution has taken place). The next best thing we could have is knowledge of this z-spin component by selecting entity $32k$ from among systems $26$ that yielded the same known Z projection value upon repeated z-spin measurements as shown in FIG. 1G. Entity $32k$ would have to be selected from systems $26$ that have not yet been subjected to measurement. Such act would collapse wave function $\psi_k(\sigma_z)$ that we wish to study (recall that measurement yields one of two possibilities for z-spin: up or down). Thus, without actually subjecting qubit $|qb_k\rangle$ to any measurement, we infer its wave function $\psi_k(\sigma_z)$ because of the fact that all qubits $12a$-$12n$ derived from systems $26$ are identically prepared and they all evolve along orbit $26'$ (see also FIG. 1G and corresponding explanation) that has a constant projection on the Z axis with time.

Knowledge of z-spin component of wave function $\psi_k(\sigma_z)$ now considered as qubit $|qb_k\rangle$ evolving along orbit $26'$, however, does not tell us where it is along orbit $26'$ at any specific instant. In FIG. 1H we have arbitrarily picked a location along orbit $26'$ for qubit $|qb_k\rangle$ indicated by the black ball for the purposes of present explanation.

We now wish to expand our intuition about the role played by the dual bra vector $\langle qb_k^*|$ (note express indication of complex conjugation here and in the drawing figure). As we already know from FIG. 1C and Eq. 10b, the expectation value of z-spin is computed by "sandwiching" the $\sigma_z$ matrix between bra vector $\langle qb_k^*|$ from the left and ket vector $|qb_k\rangle$ from the right. Besides noting that this form is analogous to that used to test for positive definiteness of matrices in linear algebra, we also note that bra vector $\langle qb_k^*|$ is a reflection of ket vector $|qb_k\rangle$. The reflection is about the real X-Z plane.

To better visualize the reflection, the bra vector $\langle qb_k^*|$ is indicated by a white ball and a dashed outline of the reflection is indicated in the X-Z plane. In other words, the real X-Z plane acts as a kind of "mirror" in the measurement process. The state and its reflection are thus combined in the measurement prescription to obtain the expectation value. It is noted that such "mirror reflection" will occur at all points of orbit $26'$ with the exception of points $33a$, $33b$. These two points are contained in orbit $26'$ but they are also in the X-Z plane. At points $33a$, $33b$ the bra and ket vectors are real and thus equal to each other. In other words, at points $33a$, $33b$ the imaginary part of the qubit is zero and thus the step of complex conjugation does not alter it. At other points along orbit $26'$ the qubit has an imaginary component and thus complex conjugation distinguishes between the bra and ket vectors. This is made explicit in FIG. 1J by showing the imaginary component $-iy$ of ket vector $|qb_k\rangle$ and the imaginary component $+iy$ of bra vector $\langle qb_k^*|$ under complex conjugation.

Next we turn to FIG. 1K for a simple model of interaction between qubits $|qb_j\rangle$ and $|qb_k\rangle$ derived from full wave functions $\psi_j(r_j;\sigma_y)$, $\psi_k(r_k;\sigma_z)$ of entities $32j$, $32k$ thanks to separability. In order not to forget about spatial positions, we indicate "trajectories" along a general space coordinate q and locations $q_j$ and $q_k$ of qubits $|qb_j\rangle$ and $|qb_k\rangle$ on that space coordinate q. Locations $q_j$ and $q_k$ correspond to the expectation values of position or to precipitated, i.e., actually measured positions. We note that space coordinate q can be continuous and permit travel, as shown, but it may also be discrete (see FIG. 1H and discrete spatial coordinates q, $q_b$). In the latter situation, qubits $|qb_j\rangle$, $|qb_k\rangle$ can be considered spatially fixed in some cases (we will later return to this issue).

The interaction between qubits $|qb_j\rangle$, $|qb_k\rangle$ is considered as being mediated by a field $34$ whose wave function is designated by $\Phi_{j,k}$. Note that it is not a coincidence that field 34 uses the Greek letter Φ that we have previously assigned to symmetric wave functions describing joint bosonic entities. Field interactions are mediated by special bosons whose joint states are indeed symmetric. These bosons are dictated by the gauge freedom afforded by the Lagrangian and are thus referred to as gauge bosons by those skilled in the art. The reader is here referred to textbooks on Quantum Field Theory for a more thorough review of the state of the art and better understanding of the properties of gauge fields. Among the many excellent references are the popular standards such as: Peskin, M. E. and Schroeder, D. V., "An Introduction to Quantum Field Theory", Perseus Books Publishing, Reading, Mass., 1995; Weinberg, S. "The Quantum Theory of Fields", Cambridge University Press, Third Printing, 2009 and many other references including Srednicki, M., "Quantum Field Theory", University of California, Santa Barbara, 2006 found online at: http://www.physics.ucsb.edu/~marek/qft.html.

In our case, the Lagrangian of interest is the EM Lagrangian and the gauge bosons are quanta of the electro-magnetic field (EM-field) also known as photons. They are individually considered as field oscillations and designated by γ in most standard literature. More precisely, based on the relativistically covariant Maxwell's equations, field 34 can be regarded as a composite of a magnetic field component $\mathcal{B}_o$ and an electric field component $\varepsilon_o$. Both field components oscillate sinusoidally, or in proportion to $e^{i\omega t}$, as a function of angular frequency ω and time t. Magnetic field $\mathcal{B}_o$ oscillates in a plane that is perpendicular to the plane of oscillation of electric field $\varepsilon_o$. The direction of propagation is in turn orthogonal to both $\varepsilon_o$ and $\mathcal{B}_o$ fields. Two possible directions of propagation in our example are indicated by vectors k and –k in FIG. 1K. Further, the freedom of fields $\varepsilon_o$, $\mathcal{B}_o$ in their oscillation manifests in two orthogonal polarization states: right-hand polarized and left-hand polarized. All polarizations are obtained from linear combinations of the right- and left-handed polarization states (also see the definitions of Jones vector, Jones matrix and Stokes parameters).

In the case shown, photons γ of field 34 are polarized linearly along the Z axis in keeping with standard convention where polarization is taken to be aligned with the electric field component. This polarization is aligned with the spin axis $\bar{q}_k$ of qubit $|qb_k\rangle$ but not with spin axis $\bar{q}_j$ of qubit $|qb_j\rangle$. Hence, qubit $|qb_k\rangle$ would have a probability to emit or absorb a photon γ of field 34 in such linear z-polarization (depending on its energy state) while qubit $|qb_j\rangle$ would not.

In many practical contexts the above description for interactions mediated by field 34 will be sufficient. This is especially so when such interactions are considered without regard to time. In those situations, it is common practice to treat any interaction between qubits $|qb_j\rangle$, $|qb_k\rangle$ due to emission and absorption of field quanta γ over sufficiently long periods of times to ensure that absorption and emission dynamics are not pertinent. The fundamental interactions obey well-known conservation laws and dictate the energies and polarizations of quanta γ that can be absorbed and emitted. As already hinted at above, interactions via field 34 under these conditions mainly require wave function $\Phi_{j,k}$ to track the polarization states to determine permissible absorption and emission events.

When a more rigorous description of field 34, or rather its quanta γ is required, second quantization under the rules of Quantum Field Theory is unavoidable. We turn to FIG. 1L for an extremely brief overview of a few aspects of this more complete picture. The diagram in FIG. 1L is a simplified Feynman diagram illustrating a field quantum or photon γ travelling along the null ray (on the light cone; not shown). The null ray indicates the separation between space-time region in which events are in causal connection, namely the time-like region within the light cone, and the region where events cannot be causally related to events taking place within the light cone, namely events in the space-like region. For more clarity, time-like region with respect to events of interest that are causally connected and discussed below is indicated with hatching.

Photons γ arise due to second quantization of the field at all permissible space-time points with a certain probability. Second quantization may be viewed as the act of distributing harmonic oscillators representing field excitations by photons γ over permissible space-time points. Once created, a photon γ always travels along a null ray. Differently, put, a photon γ always travels at the speed of light c. In the present diagram, the scale relationship between time coordinate t and space coordinate q was chosen such that the speed of light c corresponds to a slope of 1 or a line at 45° (as indicated by the dashed and dotted null ray separating the time-like and space-like regions).

Given that photons γ are confined to propagate along null rays it is easy to see that they cannot even in principle behave in the same manner as common particles bound to move at velocities v smaller than c. Massive particles, taking an electron $e^-$ as an example in the Feynman diagram of FIG. 1L, move inside the time-like region or within light cones bounded by null rays. In the time-like region four-vector velocities of such mass-bound entities transform under the well-known Lorentz transformation. The latter ensures that a rest frame can be found for any particle within the light cone. This is impossible for photons γ. They cannot be brought to rest in any frame (no rest-frame).

We now consider an interaction between photon γ and electron $e^-$ in space-time neighborhood 36a. Specifically, we are interested in the probability of electron $e^-$ absorbing photon γ at space coordinate $q_o$ and time coordinate $t_1$ in the time-like region. Since we are not computing a formal vertex we use a simplified interaction model for the transition between the initial state described by the ket vector of "unexcited electron and photon enter" and the final state described by the bra vector "excited electron exits". The "matrix for interaction" connecting these initial and final states contains appropriate terms to account for the probability of absorption of photon γ given the spin of electron $e^-$. In general, the sum of all non-zero matrix elements for the ways in which an event can happen will yield the probability of the event. Here, the transition probability is just for the absorption event to take place.

We also consider an emission event in some other space-time neighborhood 36b that is causally connected with space-time neighborhood 36a. In other words, space-time neighborhood 36b is in the time-like region with respect to neighborhood 36a. For this event the matrix elements are computed given the ket vector of "excited electron enters" and final state given by the bra vector of "unexcited electron and photon exit". Once again, the outcome of the computation is the probability of the event.

For interactions mediated by electro-magnetic field quanta γ the various event probabilities (i.e., absorptions and emissions) will always be related to the fine-structure constant α, which is approximately equal to $1/137$. In natural units this fundamental constant of nature takes on the form $\alpha = e^2/4\pi$ (where e is the fundamental electric charge unit (equal to the charge of an electron $e^-$), and where the permittivity of free space $\varepsilon_o$, Planck's reduced constant $\hbar$ and the speed of light c are all set equal to one). Given the extraordinarily simplified and rapid-coverage presented here, the reader is strongly advised to consult any of the above-cited references on Quantum Field Theory for a complete treatment, which includes formal rules for constructing interaction matrices, higher-order corrections to transition probabilities (e.g., loops) and efficient ways of computing the matrix elements.

6. Brief Overview of Lattice Models

Having thus reviewed in broad strokes the very basics governing the emergence of physical entities in accordance with quantum rules, we turn our attention to practical applications of these insights. Many quantum-based models work with regularized spatial coordinates q where precipitation of the measurable or observable quantity takes place. The simplest ones subdivide space into regular intervals or discrete points (see, e.g., points $q_a$, $q_b$ shown in FIG. 1H and corresponding description). This is justified, as we have seen above, by the permissible precipitation of wave functions from Hilbert space $\mathcal{H}$ onto discrete spatial coordinates q (see Eq. 17).

Entities emerged at discrete points can be allowed to interact via any permissible field mechanism typically instantiated by gauge bosons at the level of emergence under consideration. In other words, the field interaction type will dictate the geometry of the problem. In essence, this leads to the postulation of a lattice where entities fixed at the vertices are allowed to interact via links that interconnect them. In most models the entities are also allowed to hop between the vertices and their number (lattice filling) is permitted to vary. The lattice approaches have been applied with success to very distant and to very familiar realms. They are used to study nuclear dynamics governed by Quantum Chromodynamics (QCD) based on its QCD Lagrangian, which imposes an SU(3) symmetry on quark and gluon events. They are also used at the level of Quantum Electrodynamics (QED) we have been concentrating on thus far in our review examples with its U(1) symmetry. For a more formal review of symmetry groups that those skilled in the art are deploying the reader is referred to the Standard Model and references dealing with Lie Algebras.

FIG. 1M shows a rudimentary cubic lattice 40 postulated in real three-dimensional space $\mathbb{R}^3$. This space may be parameterized by the previously-introduced Cartesian coordinate system 30. Alternatively, it may be simply parameterized within lattice 40 itself without reference to external coordinates. Quantum entities 32a, 32b, . . . , 32z are placed at vertices 42a, 42b, . . . , 42z of lattice 40. Since the observable of interest is usually just the separable spin aspect, all wave functions of entities 32 are designated with lower-case ψ's rather than upper-case Ψ's that commonly refer to full wave functions. To indicate the spin, entities 32 are therefore described by wave functions $\psi_a$ (σ), $\psi_b(\sigma)$, . . . , $\psi_z(\sigma)$.

Note that some vertices 42 may remain unfilled whereas some vertices may accommodate more than one entity 32 (e.g., two entities 32), depending on the type of lattice model. In some models the occupation of vertices 42 is further subject to change due to lattice hopping by entities 32. Typically, hopping is permitted between adjacent vertices 42 and it is accounted for by a kinetic term in the lattice Hamiltonian Ĥ operator.

Common tools for handling entities 32 in lattice models (e.g., in the Hubbard model) are the 'fermion' creation and annihilation operators $\hat{c}^\dagger$, $\hat{c}$ (where "†" denotes the Hermitian conjugate, as introduced above, and the "hats" denote operators). These operators conveniently account for entities 32 precipitating on discrete and disjoint space coordinates q instantiated by vertices 42 of lattice 40. The reason these operators are 'fermionic' is that they obey the Pauli Exclusion Principle, as most commonly entities 32 populating lattice 40 in practical models are electrons. Hence, the action of creation and annihilation operators $\hat{c}^\dagger$, $\hat{c}$ is summarized by their anti-commutation relations:

$$\{\hat{c}_{j,\sigma}, \hat{c}_{k,\sigma'}^\dagger\} = \delta_{j,k}\delta_{\sigma,\sigma'}$$

$$\{\hat{c}_{j,\sigma}^\dagger, \hat{c}_{k,\sigma'}^\dagger\} = 0$$

$$\{\hat{c}_{j,\sigma}, \hat{c}_{k,\sigma'}\} = 0 \qquad \text{Eq. 19}$$

where, in contrast to the commutator [A,B], the anti-commutator {A,B} of two operators is defined as {A,B}=AB+BA. The first subscripts refer here to the lattice site or vertex 42 and the second subscripts refer to the spin σ.

FIG. 1M in fact depicts the j-th and k-th vertices, i.e., vertices 42j, 42k both occupied by entities 32j, 32k. According to the anti-commutation relations, only one entity 32 with a given spin can be accommodated on either vertex 42j, 42k. In general, for two entities 32 to co-exist on a single vertex 42, they would have to have opposite spins (i.e., up and down along any chosen direction û in the representation using Bloch sphere 10) in agreement with Pauli's Exclusion Principle. Meanwhile, the creation and annihilation operators $\hat{a}^\dagger$, $\hat{a}$ for the bosonic photons γ obey standard commutation relations and resemble those used for generating quanta in a harmonic oscillator.

Of course, entities 32 on vertices 42 of lattice 40 can be considered to be the underlying physical embodiments for qubits |qb⟩. In FIG. 1M lattice site 42k is enlarged to reveal entity 32k in its representation as qubit $|qb_k\rangle$. In any case, the standard tools for computing the dynamics on lattice 40 involve the introduction of the appropriate lattice Hamiltonian Ĥ. The Hamiltonian assigns an energy term to all aspects of motions and interactions of entities 32 on lattice 40. Simple Hamiltonians assume vertices 42 to be fixed (no lattice vibrations) and accommodate at most two entities 32 per vertex 42 (one with spin up and one with spin down). In this sense, one can imagine each vertex 42 to be a type of simplified atom with just one energy level.

In a solid, such as a crystal, entities 32 can stand for electrons that are mobile. They interact with electrons that are not on the same vertex 42 by a screened Coulomb interaction. Of course, by far the largest interaction is due to entities 32 sitting on the same vertex 42. Interactions with entities 32 that are further away from each other disappear quickly due to the Coulomb screening effect. Therefore, in the simplest lattice models interactions between entities 32 that are further away than one site or even those that are just one site away may be disregarded. On the other hand, a certain interaction energy value U is assigned to any vertex 42 that has two entities 32.

The kinetic energy term in the lattice Hamiltonian Ĥ is due to hopping of entities 32 between neighboring vertices 42. Taking entities 32j, 32k as an example, the energy scale governing the hopping is based on the overlap of the spatial argument of wave functions $\psi_j(r_j;\sigma_y)$, $\psi_k(r_k;\sigma_z)$. In accordance with typical solutions to these wave functions (see Eq. 15), their drop-off away from the point of precipitation on spatial coordinate q, i.e., away from vertex 42 in question, is exponential. Hence, in most lattice models it is safe to assume that hopping can take place between neighboring vertices 42.

Finally, a third energy term in a typical lattice Hamiltonian $\hat{H}$ is related to the filling of lattice 40 by entities 32. This term is sometimes referred to as the chemical potential $\mu$. The chemical potential is usually negative and predisposes lattice 40 to certain more preferential filling orders as well as clustering effects.

Hamiltonians with some or all of the above-described terms, as well as any additional terms have provided many valuable insights to practitioners of solid state physics. Corresponding lattice models have been studied under various types of lattice filling conditions, including sparse filling, half-filled and essentially or completely filled. Both bosonic and fermionic entities have been included in these studies. As a result, effects such as insulating gaps, antiferromagnetic order, phase transitions (e.g., second-order phase transitions), super-conductivity and many others have been explained in detail with lattice models and their relatives.

7. Basic Renormalization Considerations

Until now, we have looked at each prior art example through a "pair of eyes" trained at the level of emergence of the phenomena under consideration. In other words, we have confined ourselves to the realm of the model in terms of sizes and energy scales. According to standard knowledge in the art, examination of any physical entity should be performed at relevant scale. It is for this reason that exploring small structures requires probing entities, e.g., photons or electrons, of wavelengths that are on the order of the size of the structures under examination. This resolution criterion usually holds to within an order in size and/or energy. At vastly disparate size and energy scales the probing entities and the structures under examination will not interact to provide the desired information.

The renormalization group is used to ensure that scale relationships are properly taken into account. In fact, renormalization has to be invoked in computing transition probabilities per typical quantum field formalisms (e.g., Feynmann path integrals). This is done to avoid divergent or infinite results (see, e.g., ultra-violet cutoff). In the present prior art overview, we shall confine ourselves to a very cursory look at this important topic; merely sufficient to contextualize the invention. The diligent reader should once again refer to the previously cited references about Quantum Field Theory for more in-depth information.

FIG. 1N illustrates realms at vastly disparate sizes and hence energies. This drawing figure shows an object 50 of size order HS designating "human scale". In other words, object 50 can be on the order of one meter or thereabout ($\approx 1 \cdot 10^0$ m). A segment 52 covering about $\frac{1}{10}^{th}$ of object 50 is exploded to show an approximately 100:1 scale change. Within segment 52, we find smaller constituent entities 54. One of these, namely constituent entity 54A is dimensioned to show that it is still another order of magnitude smaller than segment 52. In other words, its size order CS is about 10,000 in relationship to human scale HS. Thus, the size of constituent entity 54 is on the order of one tenth of one millimeter or about 100 micrometers ($\approx 1 \cdot 10^{-4}$ m).

Now we magnify a portion 56 that represents $\frac{1}{100}^{th}$ of constituent entity 54B, which is roughly the same size as constituent entity 54A, by another two orders of magnitude. We thus arrive at a patch 58. Patch 58 has a size order MS of about one nanometer ($\approx 1 \cdot 10^{-9}$ m). Size order MS thus roughly designates a "molecule scale". Within patch 58 we discover the still smaller atomic-sized entities $32j$ and $32k$ that we have been discussing in the above review examples.

The energy of a photon $\gamma$ that corresponds to an atomic energy level transition is often in the visible range (optical EM-radiation). The corresponding wavelengths are on the order of several hundred nanometers. A photon $\gamma$ of green light, for example, has a wavelength $\lambda \approx 530$ nm and thus and energy of about 2.3 electro-Volts (eV). The exact numbers can be computed from the Planck relation we introduced above (see Eq. 5) and by recalling the inverse relationship between wavelength $\lambda$ and frequency $\nu$ ($\lambda = c/\nu$, where c is the speed of light and the conversion to angular frequency is found through $\omega = 2\pi\nu$). As we decrease the wavelength (or increase the frequency) the energy of the corresponding photon $\gamma$ increases. In the ultra-violet range photons have sufficient energy to strip electrons from their nuclei (dissociation). Moving in the opposite direction, we find that wavelengths in the infra-red range correspond to much lower energies typically on the order of thermal vibrations of molecules. EM-radiation on human scale HS corresponds to radio-waves of very low energy.

In view of the above, it is important to take into account the scale and energies associated with that scale in considering entities and events between them. As the separation in terms of scale exceeds an order of magnitude or more, we can consider the entities and events as belonging to different realms. They do not interact directly with one another and mathematical simplifications, e.g., approximations by points or lines, can be justified. Note also that the interactions in the different realms may or may not exhibit self-similarity in other realms at smaller or larger scales.

8. Time and Wavefunctions

We have previously remarked that over sufficiently long time periods with respect to the energies and scales of the realm in question, temporal considerations can be minimized. In those realms, quantum models that neglect the exact nature of the field and field quanta interactions are viable. These approaches concentrate on finding steady states and attaining thermal equilibria. They are very useful and have contributed immensely to our understanding.

Nevertheless, temporal evolution and dynamics are a fact that needs to be addressed in order to contextualize the present invention. To start, we take a closer look at the fundamental features of the Hamiltonian H that governs the evolution of wave functions. As already indicated above, the Hamiltonian H is a linear and unitary (norm-preserving) operator. This means that under its action the norm of any state vector $|\psi\rangle$ does not change with time. Further, the inner product between different state vectors $|\psi_j\rangle$, $|\psi_k\rangle$ being acted on by the same Hamiltonian H does not change either (it is time independent). Additionally, the Hamiltonian H has to evolve correctly the bra and ket vectors (in acting to the right and to the left). To satisfy the requisite conditions, the qualifying operator H must involve time t and be Hermitian:

$$H(t) = H^\dagger(t) \text{ and } H^\dagger(t)H(t) = 1. \quad \text{Eq. 20}$$

There are various ways to obtain operator H from the above requirements, typically involving the introduction of small time increments $\varepsilon$ and keeping only its linear order in any expansions.

Most situations involve no explicit dependence of the Hamiltonian H itself on time. In such systems energy is conserved and one obtains states with definite values of energy (eigenvalues of Hamiltonian H). These types of states are referred to as stationary states by those skilled in the art. They are the solutions to the Schroedinger equation in which the Hamiltonian H acts on the state vector $|\psi\rangle$ at time $t=t_o$ to advance it to time $t=t_i$ by the small time increment ε or differential dt. Without considering any potential energy terms V, the form of Schroedinger's equation is:

$$i\hbar \frac{d}{dt} |\psi(t_i)\rangle = H |\psi(t_o)\rangle. \qquad \text{Eq. 21}$$

Those experienced in solving differential equations will likely intuit at this point that the solutions will involve complex exponentials.

Practical applications of quantum mechanics often involve finding the invariant quantities, i.e., the energy levels $E_1, \ldots, E_n$ that are the eigenvalues which go with the Hamiltonian's eigenvectors. Decoupling the energy levels with methods of linear algebra for matrix diagonalization and discovering any degeneracies in it is thus of considerable interest to an average practitioner. Any small changes to a system characterized by a known Hamiltonian H are then handled by adding small shifts (see also perturbation theory).

In FIG. 1O we examine the time evolution of the spin of our familiar entity $32k$, namely the electron. Thanks to separability, we are free to consider just this spin aspect captured by qubit $|qb_k\rangle$. The energy in this situation is due to interaction between the electron's magnetic dipole moment μ, which is directly related to spin σ, and an external forcing field $\overline{B}$ of constant magnitude.

The direction of $\overline{B}$ is along the Z axis for a significant length of time prior to $t_o$. This is denoted by the subscript z and the dashed vector, namely $\overline{B}_z(t<t_o)$. At time $t=t_o$ the direction of $\overline{B}$ is changed to be along the u-axis (unit vector û, not shown, is pointing up in this drawing). This is denoted by the subscript u and the solid vector $\overline{B}_2(t \geq t_o)$. Other than the change in direction, the magnitude of the field is held constant so that: $|\overline{B}_z|=|\overline{B}_u|=B$.

At time $t=t_o$ we start with the prepared state of qubit $|qb_k\rangle$ ascertained by keeping field $\overline{B}_z$ on for a long time as the up eigenvector of $\sigma_3$, i.e., $|+\rangle_z$ (see also FIG. 1A). In other words, at time $t=t_o$ we have $|qb_k(t_o)\rangle = |+\rangle_z$. The Hamiltonian H that describes the behavior of spin σ in external forcing field $\overline{B}_z$ is:

$$H = -\mu \cdot \overline{B}_z, \qquad \text{Eq. 22}$$

To examine how each of the three observables represented by matrices $\sigma_1, \sigma_2, \sigma_3$ changes with time, we can use the fact that the time evolution of the expectation value of any operator $\overline{A}$ is directly related to its commutator with the Hamiltonian H. In particular:

$$\dot{\overline{A}} = \frac{i}{\hbar}[H, A], \qquad \text{Eq. 23}$$

where the over-dot designates the time derivative of the expectation value.

With forcing field $\overline{B}_z$ aligned along the Z axis we had originally prepared state $|qb_k(t_o)\rangle = |+\rangle_z$. The dot product in Eq. 22 was then just a simple multiplication yielding $-\mu B \approx -\sigma_3 B$ for the energy. The remaining two spin components $\sigma_1$, $\sigma_2$ produced zero dot products with $\overline{B}_z$ and thus did not contribute to the interaction energy between the spin and forcing field $\overline{B}_z$. The time evolution of the expectation value for spin $\sigma_3$ before $t_o$ but after preparation of qubit $|qb_k(t)\rangle = |+\rangle_z$ was thus:

$$\dot{\sigma}_3 = -\frac{i}{\hbar} B[\sigma_3, \sigma_3] = 0. \qquad \text{Eq. 24}$$

This is clear from the fact that the commutator $[\sigma_3,\sigma_3]$ is zero. In other words, once prepared by forcing field $\overline{B}_z$ in state $|+\rangle_z$ qubit $|qb_k\rangle$ was fixed.

After time $t_o$, with the external field $\overline{B}_u$ set along u, as indicated by the solid vector qubit $|qb_k\rangle$ will evolve in time. In particular, qubit $|qb_k\rangle$ will start precessing about the direction defined by $\overline{B}_u$ (or about u). With the magnitude B of forcing field unchanged, the angular frequency ω of precession (also known as Larmor precession) of qubit $|qb_k\rangle$ is found to be:

$$\omega = \frac{eB}{m_e c}, \qquad \text{Eq. 25}$$

where $m_e$ is the mass of the electron. We thus know what happens to qubit $|qb_k\rangle$ at a later time $t=t_i$. The projection of qubit $|qb_k(t)\rangle$ for time $(t \geq t_o)$ onto the u-axis remains constant while it precesses. Time $t_i$ in FIG. 1O is chosen such that qubit $|qb_k(t_i)\rangle$ has just completed half of its precession cycle or $\omega t_i = \pi$.

By keeping track of time, we can thus know where the qubit is along its precession orbit. Given a sufficiently long time, however, there is an increasing probability that field $\overline{B}_u$ will measure the spin along u (in the anti-aligned state of lowest energy $E_-$). In other words, it will be prepared along u, just as it was earlier prepared along the Z axis by field $\overline{B}_z$. Given that the measurement involves an EM interaction, the fine-structure constant α will be involved in dictating the probability. Until that time, the spin will precess, as expressed in the u-eigenbasis $\{|+\rangle_u, |-\rangle_u\}$ of the inset in FIG. 1O. Furthermore, given the direction of the field and difference between energy levels $E_+$ and $E_-$ associated with the u-eigenvectors interesting effects including spin flipping can occur. For more in-depth review the reader should consult a full account of spin dynamics including the Rabi formula in any of the standard texts cited above.

We have thus exposed a few key aspects of the complex nature of the underlying physical entities from which qubits are derived. A reader wishing to get a more succinct initial overview highlighting some of the mathematical reasons for these complexities without delving into standard textbooks and following their entire course, may first wish to review the book by Roger Penrose, "The Road to Reality", Alfred A. Knopf, 2004. This same book may also serve as an excellent refresher for others. This being given, the reader is likely to have developed by now a certain sense of caution. Specifically, it should be apparent by now that a naïve and simplistic adaptation or mapping of quantum mechanical concepts to quantum information theory is not possible. It is therefore incumbent on those wishing to deploy qubits for computation to also study their underlying physical instantiations.

Besides this issue, there are many other practical limitations to the application of quantum mechanical models in settings beyond the traditional microscopic realms where quantum mechanical tools are routinely deployed. Some of these limitations, including decoherence and the necessity to use the density matrix approach, are outlined in U.S. patent application Ser. No. 14/128,821 entitled "Method and Apparatus for Predicting Subject Responses to a Proposition based on Quantum Representation of the Subject's Internal State and of the Proposition", filed on Feb. 17, 2014. Other limitations having to do with spin statistics and construction of joint quantum states are outlined in U.S. patent application Ser. No. 14/224,041 entitled "Method and Apparatus for Predicting Joint Quantum States of Subjects modulo an Underlying Proposition based on a Quantum Representation", filed on Mar. 24, 2014. Still others will be found in the technical references cited above. Taken together, these form a set of fundamental obstacles that thwart the deployment of quantum mechanical methods in practical situations of interest. The problems are exacerbated when attempting to extend the applicability of quantum methods to other realms (e.g., at larger scales—see also FIG. 1N). These render a systematic study of our reality with quantum models and the development of a "full picture" beyond current human capabilities.

9. Prior Art Applications of Quantum Theory to Subject States

Since the advent of quantum mechanics, many have realized that some of its non-classical features may better reflect the state of affairs at the human grade of existence. In particular, the fact that state vectors inherently encode incompatible measurement outcomes and the probabilistic nature of measurement do seem quite intuitive upon contemplation. Thus, many of the fathers of quantum mechanics did speculate on the meaning and applicability of quantum mechanics to human existence. Of course, the fact that rampant quantum decoherence above microscopic levels tends to destroy any underlying traces of coherent quantum states was never helpful. Based on the conclusion of the prior section, one can immediately surmise that such extension of quantum mechanical models in a rigorous manner during the early days of quantum mechanics could not even be legitimately contemplated.

Nevertheless, among the more notable early attempts at applying quantum techniques to characterize human states are those of C. G. Jung and Wolfgang Pauli. Although they did not meet with success, their bold move to export quantum formalisms to large scale realms without too much concern for justifying such procedures paved the way others. More recently, the textbook by physicist David Bohm, "Quantum Theory", Prentice Hall, 1979 ISBN 0-486-65969-0, pp. 169-172 also indicates a motivation for exporting quantum mechanical concepts to applications on human subjects. More specifically, Bohm speculates about employing aspects of the quantum description to characterize human thoughts and feelings.

In a review article published online by J. Summers, "Thought and the Uncertainty Principle", http://www.jasonsummers.org/thought-and-the-uncertainty-principle/, 2013 the author suggests that a number of close analogies between quantum processes and our inner experience and through processes could be more than mere coincidence. The author shows that this suggestion is in line with certain thoughts on the subject expressed by Niels Bohr, one of the fathers of quantum mechanics. Bohr's suggestion involves the idea that certain key points controlling the mechanism in the brain are so sensitive and delicately balanced that they must be described in an essentially quantum-mechanical way. Still, Summers recognizes that the absence of any experimental data on these issues prevents the establishment of any formal mapping between quantum mechanics and human subject states.

The early attempts at lifting quantum mechanics from their micro-scale realm to describe human states cast new light on the already known problem with standard classical logic, typically expressed by Bayesian models. In particular, it had long been known that Bayesian models are not sufficient or even incompatible with properties observed in human decision-making. The mathematical nature of these properties, which are quite different from Bayesian probabilities, were later investigated in quantum information science by Vedral, V., "Introduction to quantum information science", New York: Oxford University Press 2006.

Taking the early attempts and more recent related motivations into account, it is perhaps not surprising that an increasing number of authors argue that the basic framework of quantum theory can be somehow extrapolated from the micro-domain to find useful applications in the cognitive domain. Some of the most notable contributions are found in: Aerts, D., Czachor, M., & D'Hooghe, B. (2005), "Do we think and communicate in quantum ways? On the presence of quantum structures in language", In N. Gontier, J. P. V. Bendegem, & D. Aerts (Eds.), Evolutionary epistemology, language and culture. Studies in language, companion series. Amsterdam: John Benjamins Publishing Company; Atmanspacher, H., Roemer, H., & Walach, H. (2002), "Weak quantum theory: Complementarity and entanglement in physics and beyond", Foundations of Physics, 32, pp. 379-406.; Blutner, R. (2009), "Concepts and bounded rationality: An application of Niestegge's approach to conditional quantum probabilities", In Accardi, L. et al. (Eds.), Foundations of probability and physics-5, American institute of physics conference proceedings, New York (pp. 302-310); Busemeyer, J. R., Wang, Z., & Townsend, J. T. (2006), "Quantum dynamics of human decision-making", Journal of Mathematical Psychology, 50, pp. 220-241; Franco, R. (2007), "Quantum mechanics and rational ignorance", Arxiv preprint physics/0702163; Khrennikov, A. Y., "Quantum-like formalism for cognitive measurements", BioSystems, 2003, Vol. 70, pp. 211-233; Pothos, E. M., & Busemeyer, J. R. (2009), "A quantum probability explanation for violations of 'rational' decision theory", Proceedings of the Royal Society B: Biological Sciences, 276. Recently, Gabora, L., Rosch, E., & Aerts, D. (2008), "Toward an ecological theory of concepts", Ecological Psychology, 20, pp. 84-116 have even demonstrated how this framework can account for the creative, context-sensitive manner in which concepts are used, and they have discussed empirical data supporting their view.

An exciting direction for the application of quantum theory to the modeling of inner states of subjects was provided by the paper of R. Blutner and E. Hochnadel, "Two qubits for C. G. Jung's theory of personality", Cognitive Systems Research, Elsevier, Vol. 11, 2010, pp. 243-259. The authors propose a formalization of C. G. Jung's theory of personality using a four-dimensional Hilbert space for representation of two qubits. This approach makes a certain assumption about the relationship of the first qubit assigned to psychological functions (Thinking, Feeling, Sensing and iNtuiting) and the second qubit representing the two perspectives (Introversion and Extroversion). The mapping of the psychological functions and perspectives presumes certain relationships between incompatible observables as well as the state of entanglement between the qubits that does not appear to be borne out in practice, as admitted by the authors. Despite this insufficiency, the paper is of great value and marks an important contribution to techniques for mapping problems regarding the behaviors and states of human subjects to qubits using standard tools and models afforded by quantum mechanics.

Thus, attempts at applying quantum mechanics to phenomena involving subjects at macro-levels have been mostly unsuccessful. A main and admitted source of problems lies in the translation of quantum mechanical models to human situations. More precisely, it is not at all clear how to map subject states as well as subject actions or reactions to quantum states. In fact, it is not even clear what is the correct correspondence between subject states, subject reactions and measurements of these quantities, as well as the unitary evolution of these states when not subject to measurement.

Finally, the prior art does not provide for a quantum informed approach to gathering data. Instead, the state of the art for development of predictive personality models based on "big data" collected on the web is ostensibly limited to classical data collection and classification approaches. Some of the most representative descriptions of these are provided by: D. Markvikj et al., "Mining Facebook Data for Predictive Personality Modeling", Association for the Advancement of Artificial Intelligence, www.aaai.org, 2013; G. Chittaranjan et al., "Who's Who with Big-Five: Analyzing and Classifying Personality Traits with Smartphones", Idiap Research Institute, 2011, pp. 1-8; B. Verhoeven et al., "Ensemble Methods for Personality Recognition", CLiPS, University of Antwerp, Association for the Advancement of Artificial Intelligence, Technical Report WS-13-01, www.aaai.org, 2013; M. Komisin et al., "Identifying Personality Types Using Document Classification Methods", Dept. of Computer Science, Proceedings of the Twenty-Fifth International Florida Artificial Intelligence Research Society Conference, 2012, pp. 232-237.

OBJECTS AND ADVANTAGES

In view of the shortcomings of the prior art, it is an object of the present invention to provide for a quantum mechanical representation of internal states of subjects making up communities and of the propositions they confront in a way that enables deployment on computers systems, including clusters having access to "big data" and "thick data" about the subjects.

Further, it is an object of the invention to provide for methods that build on the quantum representation adopted herein to make predictions about the dynamics of such communities of subjects as well as the influence such communities exhibit on individual subjects of interest entering these communities.

Yet another object of the invention is to ensure that the quantum representation is of a type that is robust and transferrable to graphs by proper mappings that, after re-interpretations dictated by the present model, support the extension to and application of standard applied physics tools, e.g., Hamiltonians in lattice-type settings for predicting dynamics between entities exhibiting Bose-Einstein and Fermi-Dirac statistics.

Still other objects and advantages of the invention will become apparent upon reading the detailed specification and reviewing the accompanying drawing figures.

SUMMARY OF THE INVENTION

The present invention relates to computer implemented methods that are based on quantum representations and computer systems for implementing methods based on such quantum representations. In accordance with one aspect of the invention, the computer implemented method is designed for predicting a quantum state of a subject, e.g., a human being, modulo an underlying proposition. The proposition is considered based on how it is contextualized by a community within a social value context of that community. The steps of the method include positing by a creation module a number of community subjects that belong to the community and share a community values space. An assignment module is tasked with assigning to each one of the community subjects posited by the creation module a community subject state $|C_k\rangle$ that resides in a community state space $\mathcal{H}^{(C)}$ associated with the community values space. The quantum representation adopted herein requires that each community subject state $|C_k\rangle$ be a quantum state and that the community state space $z,263^{(C)}$ be a Hilbert space. Further, the assignment module extends the quantum representation by assigning a subject state $|S\rangle$ in a subject state space $\mathcal{H}^{(S)}$ that is associated with an internal state of the subject and is related to the underlying proposition.

The method further deploys a graphing module for placing the subject state $|S\rangle$ and each community subject state $|C_k\rangle$ on a graph as dictated by a surjective mapping. In other words, the mapping is onto the graph but not typically one-to-one. The quantum interactions between the various quantum states thus imported onto the graph are used by a prediction module for predicting the quantum state of subject state $|S\rangle$ that relates to the underlying proposition.

According to the method, it is convenient to measure a mean measurable indication modulo the underlying proposition as exhibited by the community of interest. Then, the assignment module is tasked with assigning a community value matrix $PR_C$ that is computed based on the mean measurable indication. In the quantum representation adopted herein, community value matrix $PR_C$ is a proper quantum mechanical operator that represents the social value context in which the underlying proposition is apprehended or contextualized by the community of interest. When the community is a networked community the step of measuring the mean measurable indication is preferably performed by a network behavior monitoring unit.

Convenient and relatively computationally efficient embodiments of the method are possible when the mean measurable indication can be broken down into one of at least two mutually exclusive responses a, b with respect to the underlying proposition. In such situations the at least two mutually exclusive responses a, b can be set to correspond to at least two eigenvalues $\lambda_1$, $\lambda_2$ of the community value matrix $PR_C$.

In an analogous manner, the method also calls for estimating a measurable indication modulo the underlying proposition likely to be exhibited by the subject. The indication is expressed in the quantum mechanical subject state $|S\rangle$. The assignment module then assigns a subject value matrix $PR_S$ based on the measurable indication. The subject value matrix $PR_S$ represents an estimated subject value context in which the subject of interest apprehends or contextualizes the underlying proposition.

It is not a given that the community values space and the subject state space overlap. The vernacular understanding of this situation is that the community and the subject may not have any values in common modulo the underlying proposition and hence not "see eye to eye" or be "on the same page". To account for this, the method tasks a mapping module with estimating an overlap between the community state space $\mathcal{H}^{(C)}$ associated with the community values space and the subject state space $\mathcal{H}^{(S)}$ associated with the internal state of the subject. When state spaces do overlap, there is the question of compatibility between the social value context and the subject value context. The method therefore provides a statistics module for estimating a degree of incompatibility between the community value matrix $PR_C$, which represents the social value context in which the underlying proposition is contextualized by the community, and the subject value matrix $PR_S$, which represents the estimated subject value context in which the underlying proposition is contextualized by the subject. Since matrices $PR_C$, $PR_S$ are quantum mechanical operators, their degree of incompatibility is most easily quantified by their commutator $[PR_C, PR_S]$.

While data about community subjects is typically easier to collect and analyze due to quantity of community subjects and persistence of typically communities, the same may not always be true for any given subject of interest. Thus, estimating the measurable indication modulo the underlying proposition from the subject and capturing it in subject state $|S\rangle$ may not be as straightforward. It is thus most convenient to collect a stream of data related to the internal state of the subject and generated by the subject online. Similarly, it is preferred to collect a stream of data related to the underlying proposition generated by the subject online. Some persons skilled in the art might refer to such streams of data as "thick data".

In general, the underlying proposition can be associated with one or more items. An item can be embodied by either a test subject, a test object or by a test experience. To qualify as a test experience, the experience in question has to be of the kind that can be experienced by either the subject or by the community subjects in order to be perceivable in their respective state spaces and contextualizable in accordance with their value matrices. The step of estimating the measurable indication of the subject modulo the underlying proposition associated with any such item is preferably based on collecting a stream of data of all known references that the subject has made in relation to that item. Of course, it is preferable that the data stream be originated by the subject. If such information is not available, someone most nearly like the subject in terms of their internal subject space $\mathcal{H}^{(S)}$ and value matrix $PR_S$ could be substituted.

The surjective mapping onto the graph needs to properly reflect the quantum statistics of the wave functions. Any joint states have to be either symmetric or anti-symmetric (they might also obey fractional statistics in some cases). This is true for the quantum spin statistics of the subject state $|S\rangle$ as well as those of each of the community subject states $|C_k\rangle$. Most typically, the spin statistic will either be a consensus statistic B-E (Bose-Einstein statistics for bosons) or an anti-consensus statistic F-D (Fermi-Dirac statistics for fermions). Those skilled in the art will refer to joint wave functions as even and odd parity functions depending on the final composition (in terms of bosons and fermions).

The mapping itself will depend on the exact choice of model. In any case, however, the graph will have one or more vertices and one or more edges. The subject state $|S\rangle$ and each of the community subject states $|C_k\rangle$ will be posited or placed on one of the vertices in accordance with the mapping. The graph can be a lattice based on any typical quantum mechanical model known to those skilled in the art. For example, the lattice is based on an Ising Model, a Heisenberg Model or a Hubbard Model. In any case, the lattice can be configured to reflect interactions only on the vertices, i.e., between the states mapped onto that vertex, and/or also between nearest neighbor vertices. Of course, weaker interactions between more remote neighbors can also be included if sufficient computational resources are available to the computer system.

Furthermore, the lattice may include provisions for determining factors such as filling order and clustering. In some embodiments they will be reflected by a chemical potential μ. In the same or still other embodiments standard lattice tools can be deployed. Specifically, the interactions on the lattice can be simulated at a thermodynamic equilibrium. Also, the lattice can be immersed in an external field (i.e., a biasing field or even a forcing field) that reflects a global value axis associated with a global contextualization of the underlying proposition. Furthermore, the lattice may support lattice hopping. The computer system can deploy any suitable simulation engine to perform these tasks.

In some embodiments the graph is specifically set up to reflect a networked system. In those cases, the subject and the community subjects are already networked (e.g., they already are members of the community). The graph is then constructed to reflect the connections between the subject of interest and the community subjects in accordance with the best available information about the community. In preferred applications, the subject and the community subjects are members of a social network and thus the network behavior monitoring unit is recruited to monitor the interactions between members of the social network and provide the requisite information. Any predictions can thus be based on large amounts of real data that will help with the performance of the quantum models that yield better predictions with larger statistics.

The quantum representation chosen here is based on assignment of wave functions or state vectors to entities that exist at the human scale. This scale is many orders of magnitude larger and involves drastically lower energy levels than the realm in which quantum mechanical models are normally deployed. The present invention is thus a prediction and modeling tool that is based on the insights of quantum mechanics but is not meant to imply or be an actual model of reality at the human grade of existence or in the human realm. Hence, in many applications it will be most convenient to represent community subject states and subject state by appropriately selected qubits rather than full wave functions. In other words, even though any legitimate wave function of any dimensionality and symmetry group (i.e., solution under any known gauge groups such as U(1), SU(2), SU(3), etc.) it will be most convenient to use separability to divorce the computational aspects from the physical instantiation of the quantum state representation related to the subjects.

By deploying the quantum representation of the present invention, the computer implemented method can also be used to predict quantum state dynamics of community subjects modulo the underlying proposition as contextualized by them in their social value context. As before, the creation module posits the community made up of community subjects that are modeled by community subject states $|C_k\rangle$ assigned by the assignment module. The community subjects share the community values space represented quantum-mechanically by community state space $\mathcal{H}^{(C)}$. The graphing module places each of the community subject states $|C_k\rangle$ on the graph in accordance with the surjective mapping and the prediction module runs its prediction of quantum state dynamics based on the quantum interactions on the graph. In order for the predicting step to offer useful information, the prediction module has to model quantum state dynamics emerging between a statistically significant number N of community subjects. For notational convenience, community subject states are indexed by k running from 1 through N (i.e., $|C_k\rangle$, where k=1, 2, . . . , N).

In following the dynamics of community subjects it is again useful to obtain the mean measurable indication modulo the underlying proposition as exhibited by the community and capture it in the form of community value matrix $PR_C$. It is also useful in many practical situations to posit a test subject matrix $PR_{St}$ that represents an estimated test subject value context in which the underlying proposition is contextualized by the test subject. The test subject in this case may not correspond to an actual subject, but rather a test entity designed to further explore the quantum state dynamics.

Once again, the most convenient foundation for setting up tests and predictions for quantum state dynamics are networked communities that exist online and generate continuous streams of data. These data can be used to verify and test and tune the prediction model under the direction of a human curator. Furthermore, in situations where all data is generated by a social network the network behavior monitoring unit can be recruited to perform the step of measuring the mean measurable indication.

The social graph connecting the subjects in the networked community can inform the subjective mapping. Specifically, the social graph can be the basis for the mapping. Thus, connections between the community subjects can be imported into the graph in the form of directed edges. Directed edges can represent transmit connections (uni-directional), receive connections (uni-directional) and transceive connections (bi-directional) between the community members represented by community subject states $|C_k\rangle$ on the graph. As before, it is most convenient and computationally effective to concentrate on simple situations where subject states are spanned by two orthogonal eigenvectors and are representable by qubits.

A computer system according to the invention can be embodied by various types of architectures, including local, distributed, cloud-based, cluster-based as well as any hybrid version of such systems. The system is intended for predicting quantum state dynamics of community subjects with respect to an underlying proposition that is contextualized in a social value context by members of the community referred herein simply as community subjects. The system has a creation module that creates or posits the community made up of the community subjects who share the community values space. The system also has an assignment module in charge of assigning community subject states $|C_k\rangle$ in a community state space $\mathcal{H}^{(C)}$ associated with community values space to each community subject. In cases where a specific subject or even a test subject is/are posited, the assignment module performs the corresponding quantum state and state space assignments for those subjects as well.

The graphing module in charge of placing the community subject states $|C_k\rangle$ on the graph according to the surjective mapping is preferably a unit with sufficient computational resources to rapidly translate network information into the requisite graph. In some applications units with graphic processing units (GPUs) will be best-suited for this task. The prediction module that actually runs the predictions of quantum state dynamics based on quantum interactions on the graph should also be equipped with appropriate computational resources that may include GPUs. As already noted, community subject states $|C_k\rangle$ that stand in for the community subjects are placed on vertices as dictated by the onto map. In the simplest case, where the graph corresponds to a social graph representing a networked community, the subjects are placed on vertices and connected by edges to mirror as closely as possible their actual social connections.

When the graph is embodied by a lattice such as the Ising Model, the Heisenberg Model, the Hubbard Model or even a less ordered Spin-Glass Model it can be useful to include a physical embodiment of the lattice in the computer system. In fact, since the lattice corresponds to the social situation being modeled by the surjective mapping, an appropriately initialized real lattice may be deployed by the computer system in running the predictions and/or simulations. The simulation engine that simulates the quantum interactions on the lattice can thus be the physical model itself. On the other hand, it can also be a simulator with appropriate computing resources. In most cases, the situations of interest will be those when the lattice is near or at a thermodynamic equilibrium. Of course, perturbation theories can be applied to study conditions that deviate from equilibrium.

In some instances the community in question will itself be embedded in a much larger community, society or even a larger group. Such groups can be nations, large organizations, social movements, religions and any other groups with marked overall proclivities, tendencies, opinions and/or any other articulated ways of judging situations. In the present case, such overarching groups exert a certain biasing or forcing function on the community and the subject(s) under consideration. For this reason, the computer system can further include an external field simulation module for simulation an external field along a global value axis associated with a global contextualization of the underlying proposition by the large group.

Practical implementations of the computer system will further benefit from dedicated modules for certain computations. For example, a statistics module should be provided for estimating the quantum interactions on the graph. In cases where an actual lattice is used, that lattice assumes the function of the statistics module. The same is true for the prediction module that is used to predict the outcome of quantum interactions on the graph and the simulation engine for simulating the quantum interactions.

Indeed, when available in the future, quantum computers can be deployed to instantiate the modules of the computer system wherever practicable. In other embodiments, the creation module, the assignment module, the graphing module and the prediction module are implemented in nodes of a computer cluster. The computer system preferably employs a mapping module for finding the community state space $\mathcal{H}^{(C)}$ and the subject state space $\mathcal{H}^{(S)}$ associated with the internal state of the subject related to the underlying proposition. This mapping module can also be instantiated on a node of a computer cluster. In any embodiment, however, the computer system also has a non-volatile memory for storing information about at least one of the community subjects, the assignments of community subject states $|C_k\rangle$ where k=1, 2, . . . , N, the community state space $\mathcal{H}^{(C)}$ associated with the community values space, the surjective mapping, the graph, the quantum state dynamics and the quantum interactions.

The underlying proposition itself is associated with at least one item or "thing". Such item has to register in the mind(s) of the subject(s) in order to be used by the computer systems and methods of the invention. Typical items that satisfy this criterion include a test subject (e.g., another human being in the case where the subjects are human beings), a test object and/or a test experience. The experience is of the kind that can be experienced by at least one of the subjects making up the community, the subject of interest and the test subject.

The present invention, including the preferred embodiment, will now be described in detail in the below detailed description with reference to the attached drawing figures.

BRIEF DESCRIPTION OF THE DRAWING FIGURES

FIG. 1O (Prior Art) is a diagram illustrating the basic aspects of unitary evolution of electron spin in a magnetic field as governed by the Schroedinger equation.

FIGS. 8A-D are diagrams illustrating the fundamental spin-based rules for quantum interactions on the graph as taken into account by the prediction module in making its quantum state predictions based on quantum interactions on the graph.

Figure 9:
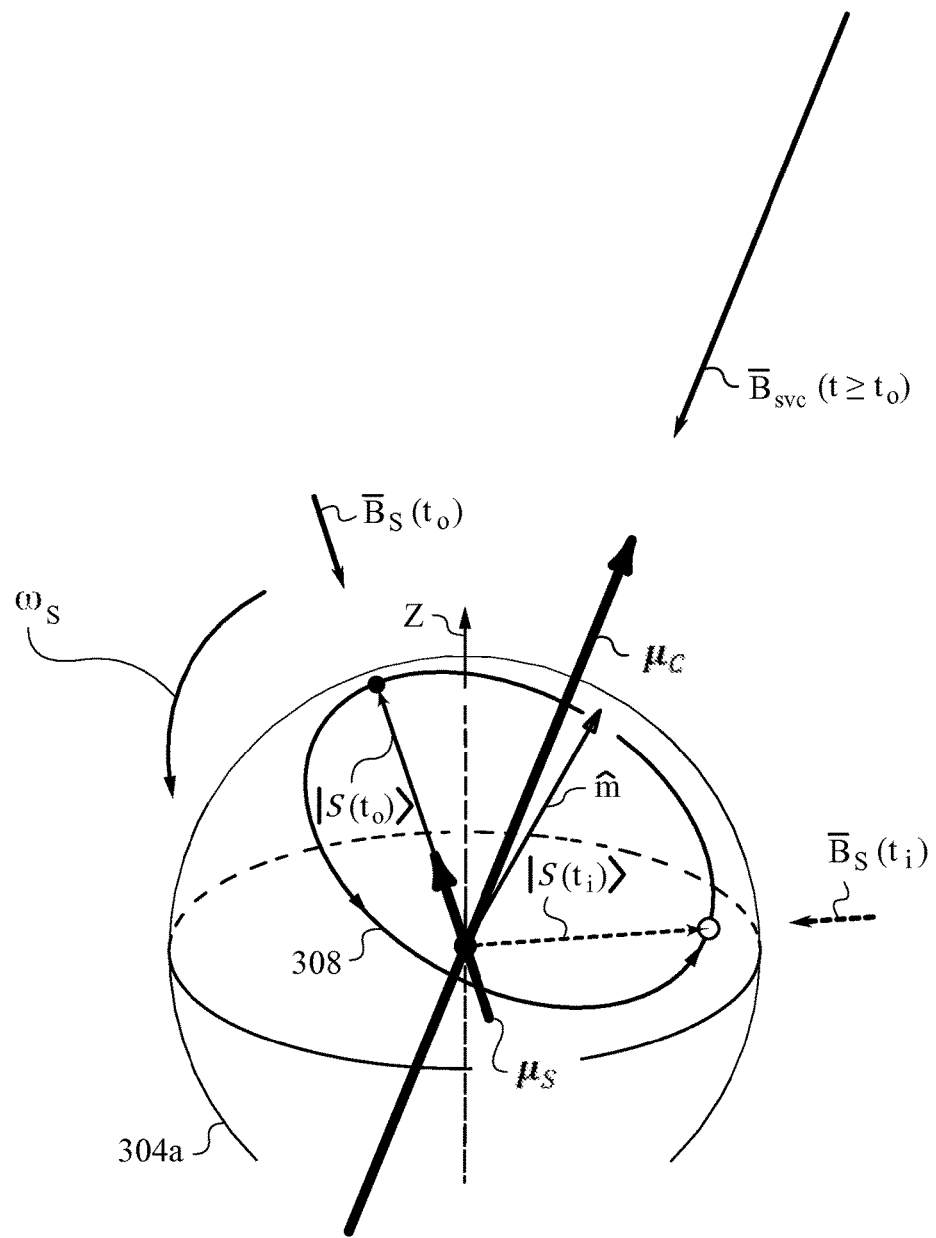

FIG. 9 is a diagram illustrating the basics of time evolution of a subject state instantiated by a dipole in the presence of a much larger dipole representing the community and providing a field that overwhelms the field generated by the dipole standing in for the subject state.

Figure 10:
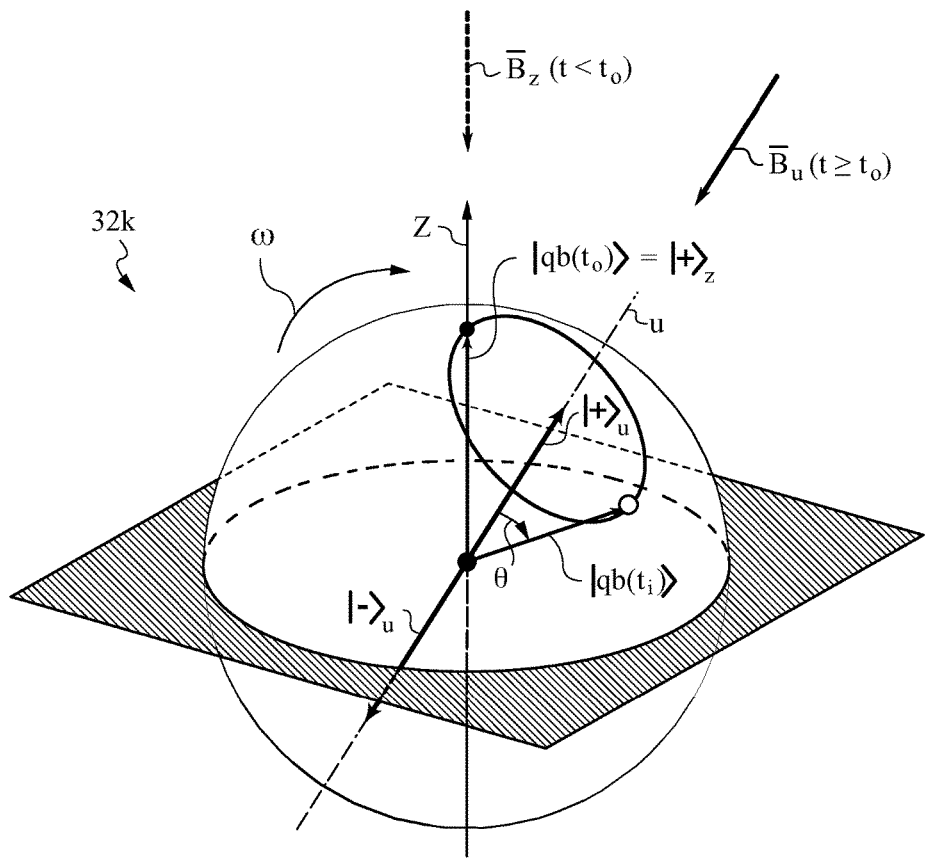
Figure 10A:
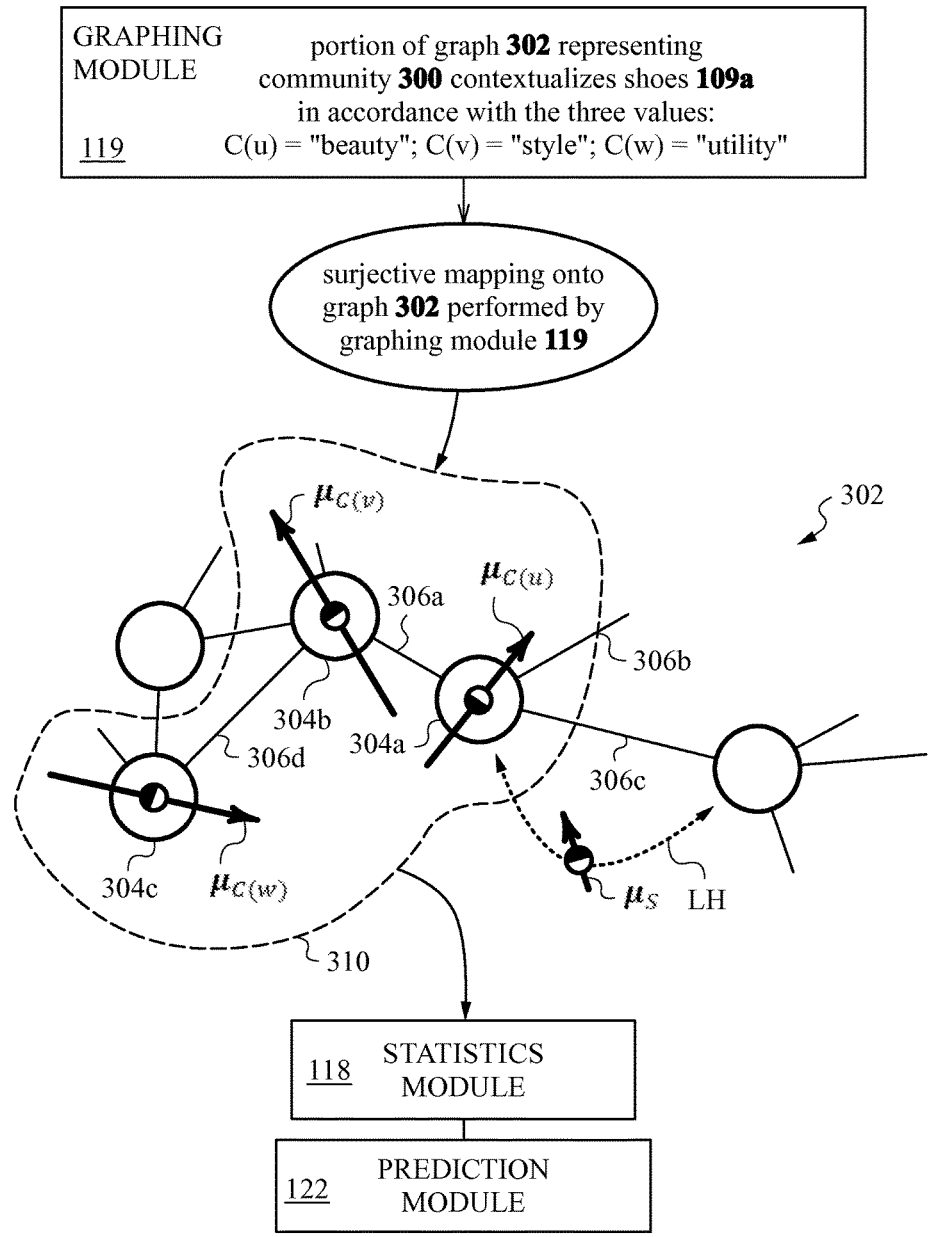

FIG. 10A is a diagram showing the operation of the graphing module in performing a more granular surjective mapping onto a graph.

Figure 10B:
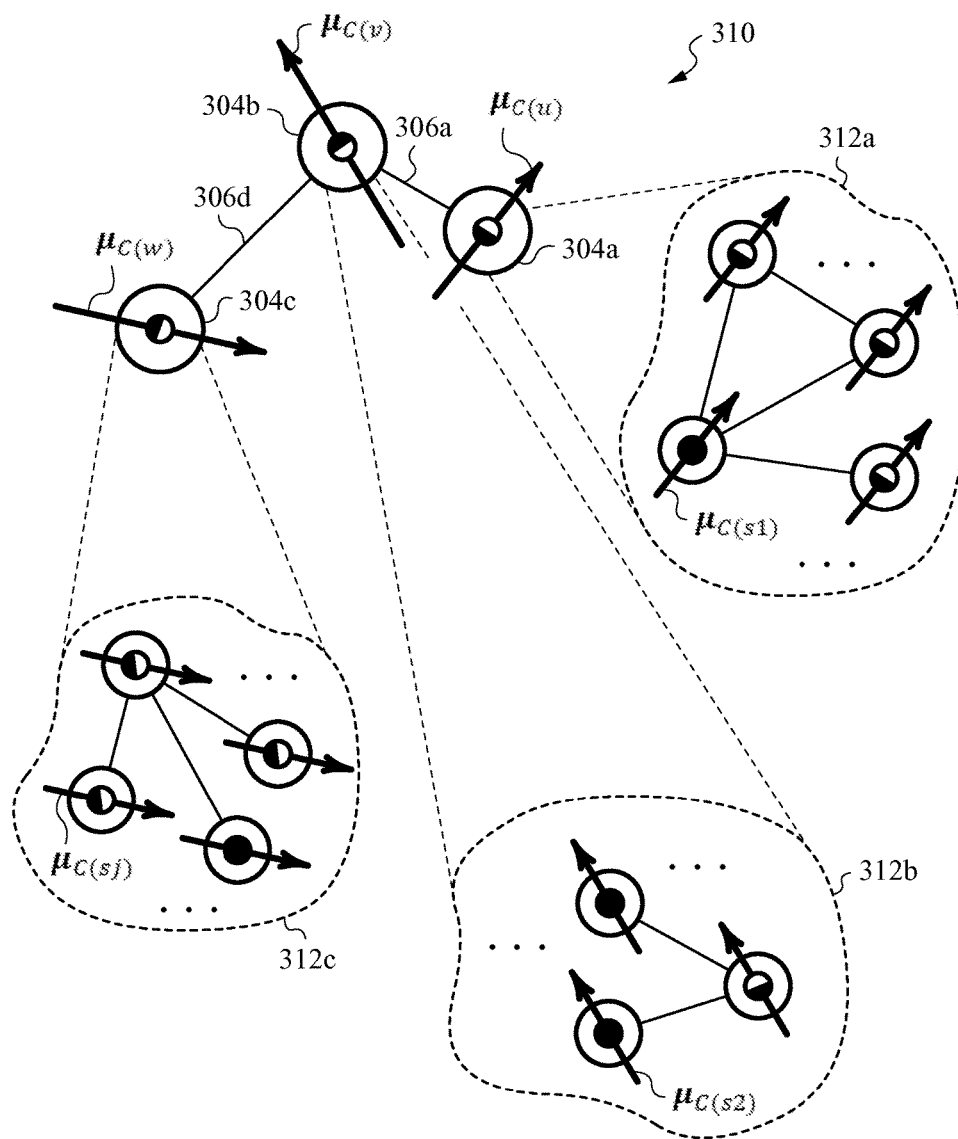

FIG. 10B is a diagram showing the operation of the graphing module in performing a still more granular surjective mapping onto a graph.

Figure 11A:
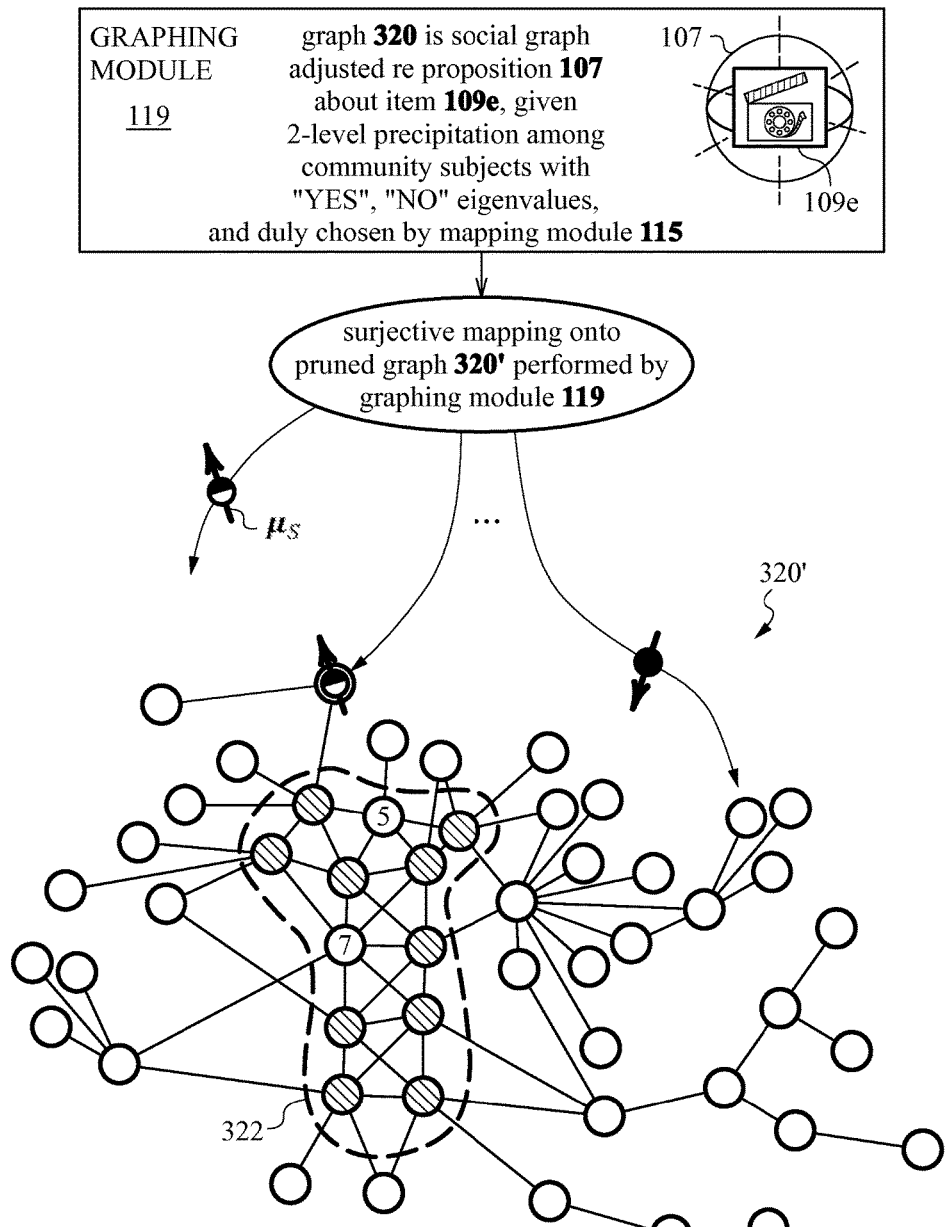

FIG. 11A is a diagram illustrating a surjective mapping approach that builds on pre-existing social graph.

Figure 11B:
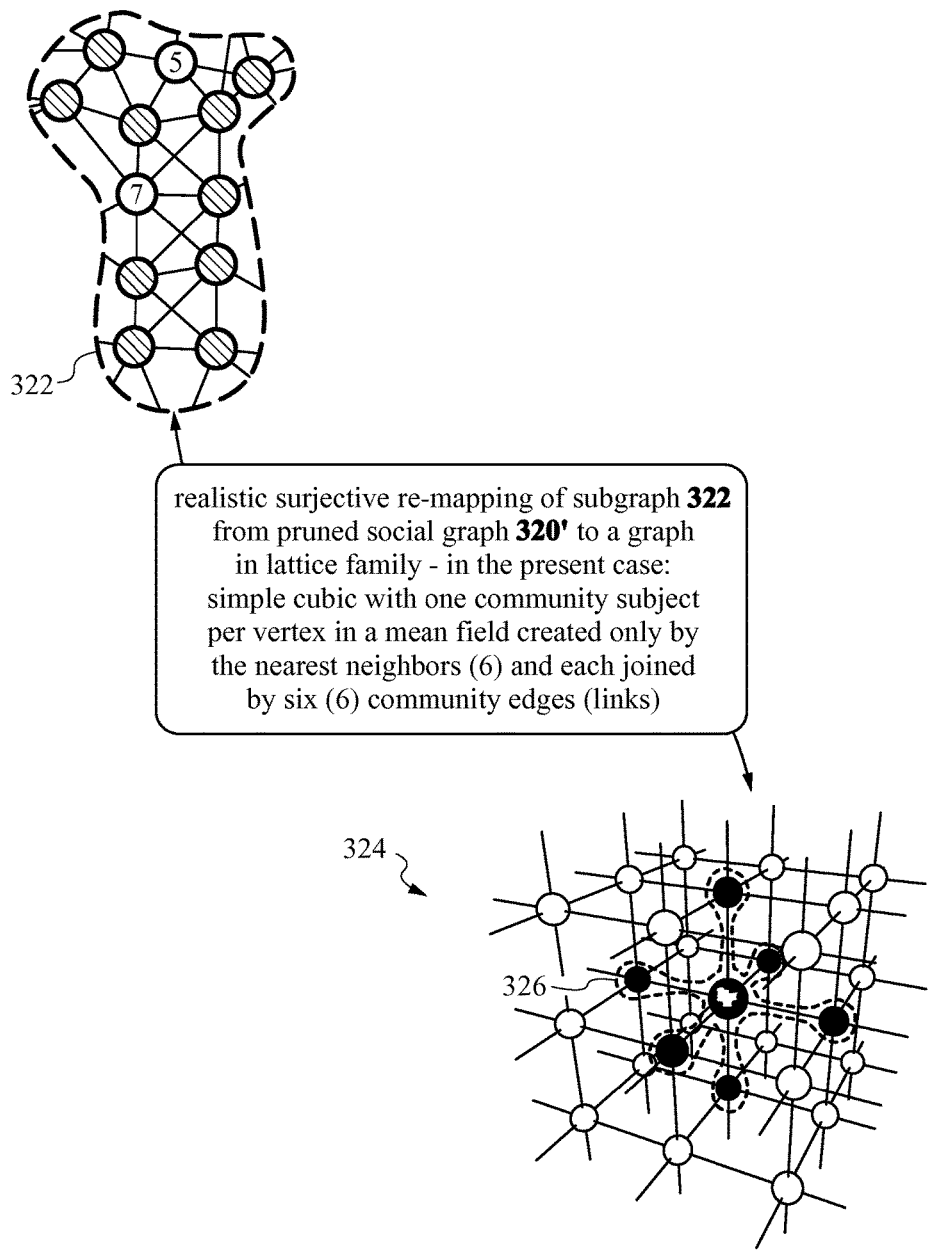

FIG. 11B is a diagram illustrating a re-mapping of a suitable portion of a pruned social graph to a lattice.

Figure 12:
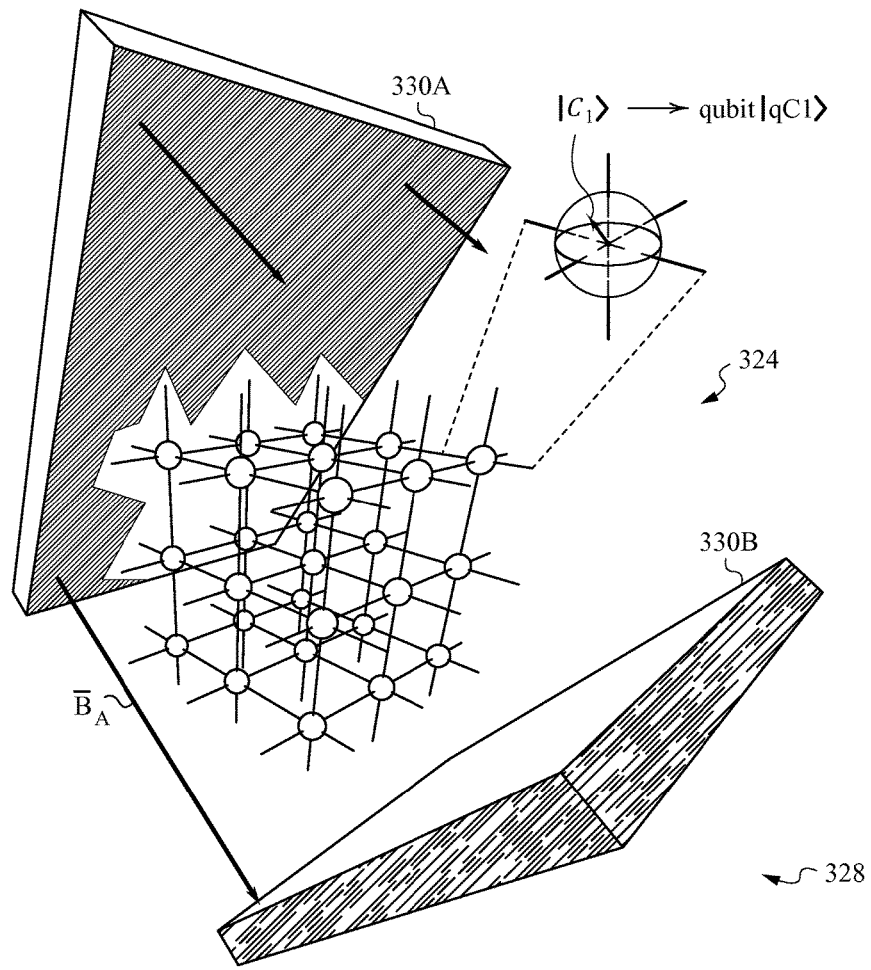

FIG. 12 is a diagram illustrating the use of an applied field in the lattice re-mapping embodiment to account for two different types of group effect.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without straying from the principles of the claimed invention. Likewise, the figures depict embodiments of the present invention for purposes of illustration only.

Prior to describing the embodiments of the apparatus or computer systems and methods of the present invention it is important to articulate what this invention is not attempting to imply or teach. This invention does not take any ideological positions on the nature of the human mind, nor does it attempt to answer any philosophical questions related to epistemology or ontology. The instant invention does not attempt, nor does it presume to be able to follow up on the suggestions of Niels Bohr and actually find which particular processes or mechanisms in the brain need or should be modeled with the tools of quantum mechanics. This work is also not a formalization of the theory of personality based on a correspondent quantum state or qubit representation. Such formalization may someday follow, but would require a full formal motivation of the transition from Bayesian probability models to quantum mechanical ones. Formal arguments would also require a justification of the mapping between non-classical portions of human emotional and thought spaces/processes and their quantum representation. The latter would include a description of the correspondent Hilbert space, including a proper basis, support, rules for unitary evolution, formal commutation and anti-commutation relations between observables as well as explanation of which aspects are subject to entanglement with each other and the environment (decoherence). The justification would extend to discussion of time scales (decoherence time) and general scaling (renormalization considerations).

Instead, the present invention takes a highly data-driven approach to modeling subject states with respect to underlying propositions using pragmatic state vector assignments. In preferred implementations, the state vectors are represented by quantum bits or qubits. The availability of "big data" that documents the online life, and in particular the online (as well as real-life) responses of subjects to various propositions including simple "yes/no" type questions, has made extremely large amounts of subject data ubiquitous. Given that quantum mechanical tests require large numbers of identically or at least similarly prepared states to examine in order to ascertain any quantum effects, this practical development permits one to apply the tools of quantum mechanics to uncover such quantum aspects of subject behaviors. Specifically, it permits to set up a quantum mechanical model of subject states and test for signs of quantum mechanical relationships and quantum mechanical statistics in the context of certain propositions that the subjects perceive.

Thus, rather than postulating any a priori relationships between different states, e.g., the Jungian categories, we only assume that self-reported or otherwise obtained/derived data about subjects and their contextualization of underlying propositions of interest is reasonably accurate. In particular, we rely on the data to be sufficiently accurate to permit the assignment of state vectors or qubits to the subjects. We also assume that the states suffer relatively limited perturbation and that they do not evolve quickly enough over time-frames of measurement(s) (long decoherence time) to affect the model. Additional qualifications as to the regimes or realms of validity of the model will be presented below at appropriate locations.

No a priori relationship between different state vectors or qubits representing subjects and the contextualized propositions is presumed. Thus, the assignment of state vectors or qubits in the present invention is performed in the most agnostic manner possible. This is done prior to testing for any complicated relationships. Preferably, the subject state assignments with respect to the underlying proposition are first tested empirically based on historical data available for the subjects. Curation of relevant metrics is performed to aid in the process of discovering quantum mechanical relationships in the data. The curation step preferably includes a final review by human experts that may have direct experience of relevant state(s) as well as well as experience(s) when confronted by the underlying proposition under investigation. Specifically, the human curator has a "personal understanding" of the various ways in which the underlying proposition may be contextualized by the different subjects being considered.

Figure 2:
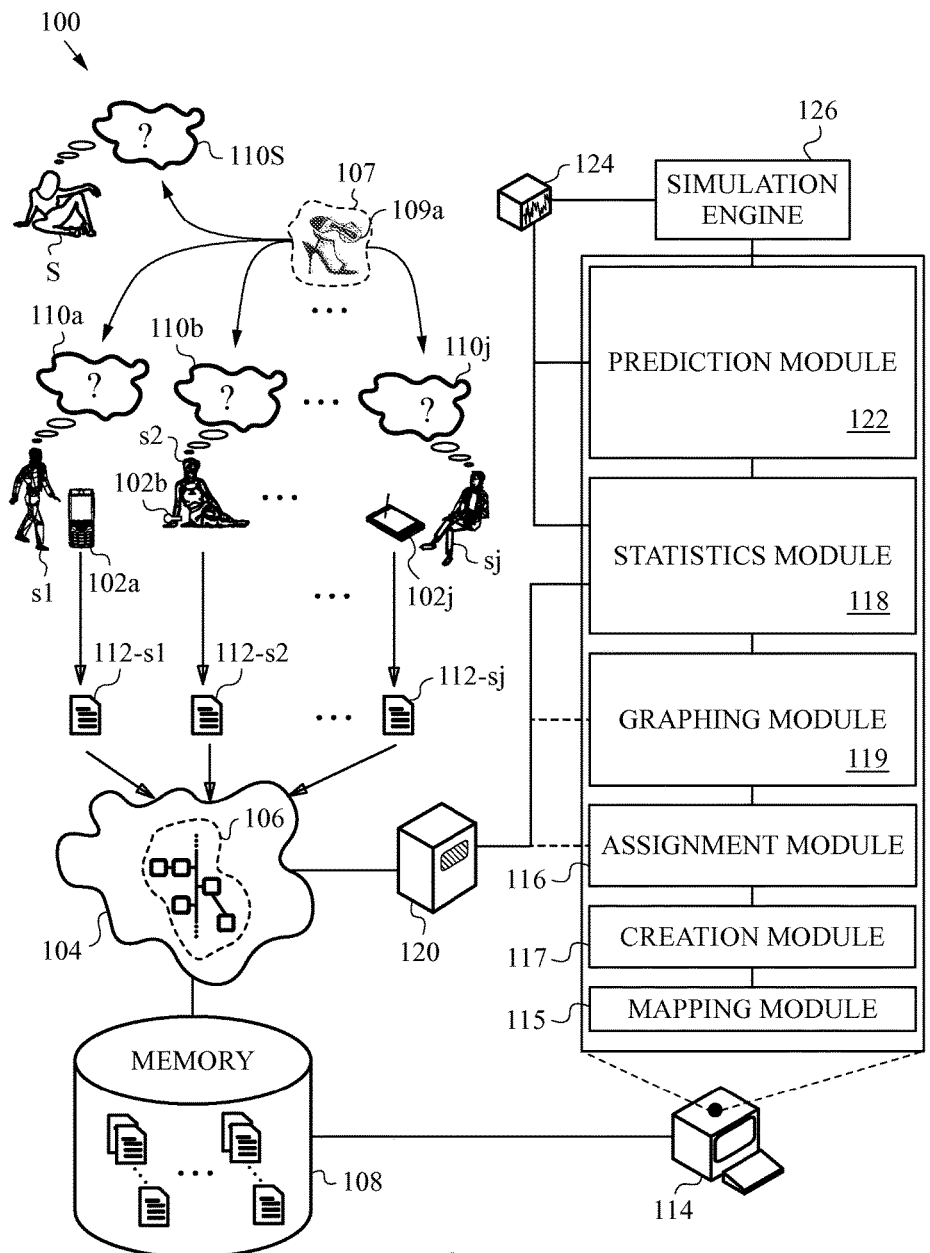
FIG. 2 is a diagram illustrating the most important parts and modules of a computer system according to the invention in a basic configuration.

The main parts and modules of an apparatus embodied by a computer system 100 designed for predicting a quantum state of a subject modulo an underlying proposition involving an item instantiated by a test subject, an object, or an experience that is also contextualized by a community within a social value context are illustrated in FIG. 2. Computer system 100 is designed around a number of community subjects s1, s2, . . . , sj and a subject of interest designated S. All community subjects s1, s2, . . . , sj and subject S are human beings selected here from a group of many such subjects that are not expressly shown. In the subsequent description some of these additional community subjects will be introduced with the same reference numeral convention—i.e., community subjects s3, s4, . . . , and so forth. In principle, community subjects s1, s2, . . . , sj and subject S can embody any sentient beings other than humans, e.g., animals. However, the efficacy in applying the methods of invention will usually be highest when dealing with human subjects.

Community subject s1 has a networked device 102a, here embodied by a smartphone, to enable him or her to communicate data about them in a way that can be captured and processed. In this embodiment, smartphone 102a is connected to a network 104 that is highly efficient at capturing, classifying, sorting, and storing data as well as making it highly available. Thus, although community subject s1 could be known from their actions observed and reported in regular life, in the present case community subject s1 is known from their online presence and communications as documented on network 104.

Similarly, community subject s2 has a networked device 102b, embodied by a smart watch. Smart watch 102b enables community subject s2 to share personal data just like community subject s1. For this reason, watch 102b is also connected to network 104 to capture the data generated by community subject s2. Other community subjects are similarly provisioned, with the last community subject sj shown here deploying a tablet computer with a stylus as his networked device 102j. Tablet computer 102b is also connected to network 104 that captures data from subjects. The average practitioner will realize that any networked device can share some aspect of the subject's personal data. In fact, devices on the internet of things, including simple networked sensors that are carried, worn or otherwise coupled to some aspect of the subject's personal data (e.g., movement, state of health, or other physical or emotional parameter that is measurable by the networked sensor) are contemplated to belong to networked devices in the sense of the present invention.

Network 104 can be the Internet, the World Wide Web or any other wide area network (WAN) or local area network (LAN) that is private or public. Furthermore, some or all community subjects s1, s2, . . . , sj may be members of a social group 106 that is hosted on network 104. Social group or social network 106 can include any online community such as Facebook, LinkedIn, Google+, MySpace, Instagram, Tumblr, YouTube or any number of other groups or networks in which community subjects s1, s2, . . . , sj are active or passive participants. Additionally, documented online presence of community subjects s1, s2, . . . , sj includes relationships with product sites such as Amazon.com, Walmart.com, bestbuy.com as well as affinity groups such as Groupon.com and even with shopping sites specialized by media type and purchasing behavior, such as Netflix.com, iTunes, Pandora and Spotify. Relationships from network 106 that is erected around an explicit social graph or friend/follower model are preferred due to the richness of relationship data that augments documented online presence of community subjects s1, s2, . . . , sj.

Computer system 100 has a memory 108 for storing measurable indications a, b that correspond to states 110a, 110b, . . . , 110j of community subjects s1, s2, . . . , sj modulo an underlying proposition 107. In accordance with the present invention, measurable indications a, b are preferably chosen to be mutually exclusive indications. Mutually exclusive indications are actions, responses or still other indications that community subjects s1, s2, . . . , sj cannot manifest simultaneously. For example, measurable indications a, b are mutually exclusive when they correspond to "YES"/"NO" type responses, choices, actions or other indications of which community subjects s1, s2, . . . , sj can manifest just one at a time with respect to underlying proposition 107. Community subjects s1, s2, . . . , sj also preferably report, either directly or indirectly (in indirect terms contained in their on-line communications) about the response or action taken via their networked devices 102a, 102b, . . . , 102j.

In the first example, underlying proposition 107 is associated with an item that is instantiated by a specific object 109a. It is noted that specific object 109a is selected here in order to ground the rather intricate quantum-mechanical explanation to follow in a very concrete setting for purposes of better understanding and more practical teaching of the invention. Thus, underlying proposition 107 revolves around object 109a being a pair of shoes that community subjects s1, s2, . . . , sj have been exposed to on their home log-in pages to network 104. For example, the log-in page could have been Yahoo News and shoes 109a were presented next to typical items such as Khardashians or Snookies. The nature of measurable indications and contextualization of underlying proposition 107 by community subjects s1, s2, . . . , sj will be discussed in much more detail below.

In the present embodiment, measurable indications a, b are captured in data files 112-s1, 112-s2, . . . , 112-sj that are generated by community subjects s1, s2, . . . , sj, respectively. Conveniently, following socially acceptable standards, data files 112-s1, 112-s2, . . . , 112-sj are shared by community subjects s1, s2, . . . , sj with network 104 by transmission via their respective networked devices 102a, 102b, . . . , 102j. Network 104 either delivers data files 112-s1, 112-s2, . . . , 112-sj to any authorized network requestor or channels it to memory 108 for archiving and/or later use. Memory 108 can be a mass storage device for archiving all activities on network 104, or a dedicated device of smaller capacity for tracking just the activities of some subjects.

It should be pointed out that in principle any method or manner of obtaining the chosen measurable indications, i.e., either a or b, from community subjects s1, s2, . . . , sj is acceptable. Thus, the measurable indications can be produced in response to direct questions posed to community subjects s1, s2, . . . , sj, a "push" of prompting message(s), or externally unprovoked self-reports that are conscious or even unconscious (e.g., when deploying a personal sensor as the networked device that reports on some body parameter such as, for example, heartbeat). Preferably, however, the measurable indications are delivered in data files 112-s1, 112-s2, . . . , 112-sj generated by community subjects s1, s2, . . . , sj. This mode enables efficient collection, classification, sorting as well as reliable storage and retrieval from memory 108 of computer system 100. The advantage of the modern connected world is that large quantities of self-reported measurable indications of states 110a, 110b, . . . , 110j are generated by community subjects s1, s2, . . . , sj and shared, frequently even in real time, with network 104. This represents a massive improvement in terms of data collection time, data freshness and, of course, sheer quantity of reported data.

Community subjects s1, s2, . . . , sj can either be aware or not aware of their respective measurable indications. For example, data files 112-s1, 112-s2, . . . , 112-sj of community subjects s1, s2, . . . , sj reporting of their responses, actions or other indications can be shared among subjects s1, s2, . . . , sj such that everyone is informed. This may happen upon request, e.g., because community subjects s1, s2, . . . , sj are fiends in social network 106 and may have elected to be appraised of their friends' responses, actions and other indications such as parameters of their well-being (e.g., those measured by personal sensors mentioned above), or it may be unsolicited. The nature of the communications broadcasting the choices can be one-to-one, one-to-many or many-to-many. In principle, any mode of communication between community subjects s1, s2, . . . , sj is permissible including blind, one-directional transmission. For this reason, in the present situation any given subject can be referred to as the transmitting subject and another subject can be referred to as the receiving subject to more clearly indicate the direction of communication in any particular case. Note that broadcasts of responses, actions or other indications from the subjects need not be carried via network 104 at all. They may occur via any medium, e.g., during a physical encounter between transmitting and receiving community subjects s1, s2, . . . , sj or by the mere act of one subject observing the chosen response, action or other indication of another subject.

Preferably, of course, the exposure of receiving subjects to broadcasts of transmitting subjects carrying any type of information about the transmitter's choice of measurable indication vis-à-vis underlying proposition 107 takes place online. More preferably still, all broadcasts are carried via network 104 or even within social network 106, if all transmitting and receiving community subjects s1, s2, . . . , sj are members of network 106.

Computer system 100 is equipped with a separate computer or processor 114 for making a number of crucial assignments based on measurable indications a, b contained in data files 112-s1, 112-s2, . . . , 112-sj of community subjects s1, s2, . . . , sj. For this reason, computer 114 is either connected to network 104 directly, or, preferably, it is connected to memory 108 from where it can retrieve data files 112-s1, 112-s2, . . . , 112-sj at its own convenience. It is noted that the quantum models underlying the present invention will perform best when large amounts of data are available. Therefore, it is preferred that computer 114 leave the task of storing and organizing data files 112-s1, 112-s2, . . . , 112-sj as well as any relevant data files from other subjects to the resources of network 104 and memory 108, rather than deploying its own resources for this job.

Computer 114 has a mapping module 115 for finding an internal space or a community values space that is shared by community subjects s1, s2, . . . , sj. Module 115 can be embodied by a simple non-quantum unit that compares records from network 104 and or social network 106 to ascertain that community subjects s1, s2, sj are friends or otherwise in some relationship to one another. Based on this relationship and/or just propositions over which community subjects s1, s2, . . . , sj have interacted in the past, mapping module 115 can find the shared or common internal space that will henceforth be referred to herein as community values space. The community values space corresponds to a regime or realm of shared excitement, likes, dislikes and/or opinions over various items represented, among other, by objects, subjects or experiences (e.g., activities). Just for the sake of a simple example, all community subjects s1, s2, . . . , sj can be lovers of motorcycles, shoes, movie actors and making money on the stock market. More commonly, however, community subjects s1, s2, . . . , sj can all be aware of the same items, meaning that they perceive them in the community values space, but they may not all value it the same way. The meaning of this last statement will be explained in much more detail below.

Computer 114 is equipped with a creation module 117 that is connected to mapping module 115. Creation module 117 is designed for positing community subjects s1, s2, . . . , sj that belong to the community and share the community values space. The action of positing is connected with the quantum mechanical action associated with the application of creation (as well annihilation) operators. The action and purpose of creation module 117 will be described in much more detail below.

Further, computer 114 has an assignment module 116 that is connected to creation module 117. Assignment module 116 is designed for the task of making certain assignments based on the quantum representations adopted by the instant invention. More precisely, assignment module is tasked with assigning to each one of community subjects s1, s2, . . . , sj discovered by mapping module 115 and posited by creation module 117 a community subject state $|C_k\rangle$. All assigned subject states $|C_k\rangle$, where k=1, 2, . . . , j, reside in a community state space $\mathcal{H}^{(C)}$ associated with the community values space. The quantum representation adopted herein requires that each community subject state $|C_k\rangle$ be a quantum state and that the community state space $\mathcal{H}^{(C)}$ be a Hilbert space. Further, assignment module 116 extends the quantum representation by assigning a subject state $|S\rangle$ in a subject state space $\mathcal{H}^{(S)}$ that is associated with an internal state of subject S and is related to underlying proposition 107. The details of the quantum representation leading to these assignments are discussed below.

Module 116 is indicated as residing in computer 114, but in many embodiments it can be located in a separate processing unit altogether. This is mainly due to the nature of the assignments being made and the processing required. More precisely, assignments related to quantum mechanical representations are very computationally intensive for central processing units (CPUs) of regular computers. In many cases, units with graphic processing units (GPUs) are more suitable for implementing the linear algebra instructions associated with assignments dictated by the quantum model that assignment module 116 has to effectuate.

Next, we find a graphing module 119 connected to assignment module 116. Computer 114 deploys graphing module 119 for placing subject state $|S\rangle$ and each community subject state $|C_k\rangle$, as assigned by assignment module 116, on a graph as dictated by a surjective mapping. In other words, the mapping is onto the graph but not typically one-to-one. Graphs as defined herein include any type of structures that include interconnections, e.g., links or edges, between entities that may be related to one or more vertices, nodes or points. For example, the graph may be a social graph, a tree graph, a general interconnected diagram or chart (also see graph theory and category theory). In some embodiments described herein the chosen graph corresponds to a physical system, such as a lattice or other less-organized structures such as spin-glass. Embodiments built around different types of exemplary graph choices will be introduced below.

Computer 114 also has a statistics module 118 designed for estimating various fundamental quantum parameters of the graph model that lead to classical probabilities and/or large-scale phenomena and behaviors. In some embodiments statistics module 118 also estimates or computes classical probabilities. Most importantly, however, statistics module 118 estimates a degree of incompatibility between the community values in the social value context and the subject value estimated in the subject value context. The estimate is important in determining how underlying proposition 107 about item 109*a* is contextualized by community subjects s1, s2, . . . , sj versus subject of interest S.

Computer 114 is further provisioned with a prediction module 122. The quantum interactions between the various quantum states $|C_k\rangle$, $|S\rangle$ thus imported onto the graph by graphing module 119 are used by a prediction module 122 for predicting subject state $|S\rangle$ about the underlying proposition 107. Prediction module 122 is connected to statistics module 118 to receive the estimated probabilities and context information. Of course, it also receives as input the data generated and prepared by the previous modules, including data about the graph generated by graphing module 119 based on prior inputs from assignment module 116, creation module 117 and mapping module 115.

Prediction module 122 can reside in computer 114, as shown in this embodiment or it can be a separate unit. For reasons analogous to those affecting assignment module 116, prediction module 122 can benefit from being implemented in a GPU with associated hardware well known to those skilled in the art.

Computer system 100 has a network behavior monitoring unit 120. Unit 120 monitors and tracks at the very least the network behaviors and communications of community subjects s1, s2, . . . , sj and subject of interest S on network 104. Network behavior monitoring unit 120 preferably monitors entire network 104 including members of specific social groups 106. When specific community subjects s1, s2, . . . , sj and subject of interest S are selected for any particular model and prediction, they thus fall into a subset of subjects tracked by behavior monitoring unit 120. To be effective, unit 120 is preferably equipped with wire-rate data interception capabilities for rapid ingestion and processing. This enables unit 120 to capture and process data from data files 112 of large numbers of subjects connected to network 104 and discern large-scale patterns in nearly real-time.

Statistics module 118 is connected to network behavior monitoring unit 120 to obtain from it information for maintaining up-to-date its classical event probabilities as well as quantum parameters, especially including subject context compatibilities. It is duly noted, that computer 104 can gather relevant information about the subjects on its own from archived data files 112 in memory 108. This approach is not preferred, however, due to concerns about data freshness and the additional computational burden placed on computer 104.

Computer system 100 has a random event mechanism 124 connected to both statistics module 118 and prediction module 122. From those modules, random event mechanism can be seeded with certain estimated quantum parameters as well as other statistical information, including classical probabilities to randomly generate events on the graph in accordance with those probabilities and statistical information. Advantageously, random event mechanism 124 is further connected to a simulation engine 126 to supply it with input data. In the present embodiment simulation engine 126 is also connected to prediction module 122 to be properly initialized in advance of any simulation runs. The output of simulation engine 126 can be delivered to other useful apparatus where it can serve as input to secondary applications such as large-scale prediction mechanisms for social or commercial purposes or to market analysis tools and online sales engines. Furthermore, simulation engine 126 is also connected to network behavior monitoring unit 120 in this embodiment in order to aid unit 120 in its task in discerning patterns affecting community subjects s1, s2, . . . , sj and subject of interest S (as well as other subjects, as may be required) based on data passing through network 104.

Figure 3A:
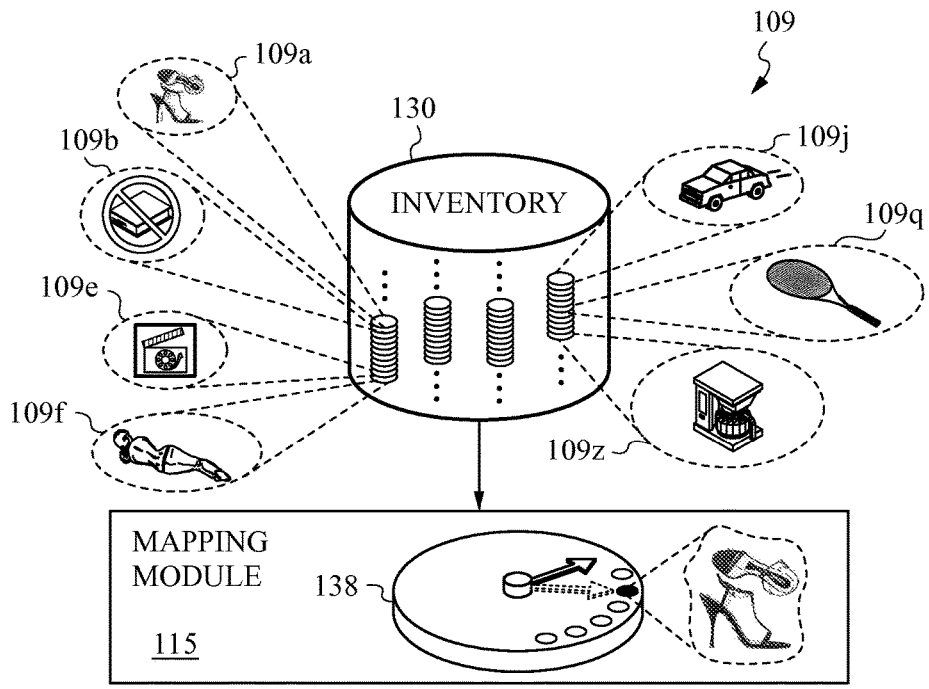
FIG. 3A is a diagram showing in more detail the mapping module of the computer system from FIG. 2 and the inventory store of relevant items.

We will now examine the operation of computer system 100 in incremental steps guided by the functions performed by the modules introduced in FIG. 2 and any requisite secondary resources. Our starting point is mapping module 115 in conjunction with an inventory store 130 to which it is connected as shown in FIG. 3A. Computer system 100 is designed to test many underlying propositions 107 about different items 109. In other words, item 109a that is an object instantiated by the pair of shoes depicted in FIG. 2 is merely one exemplary object that is used for the purpose of a more clear and practical explanation of the present invention.

Meanwhile, inventory store 130 contains a large number of eligible items. As understood herein, items 109 include objects, subjects, experiences and any other items that community subjects s1, s2, . . . , sj and subject of interest S can conceptualize or contextualize in their minds to yield underlying proposition 107. Preferably, a human curator familiar with human experience and specifically with the lives and cognitive expectations of subjects under consideration should review the final inventory of items 109. The curator should not include among items 109 any that do not register any response, i.e., those generating a null response among the subjects. Responses obtained in a context that is not of interest may be considered as mis-contextualized and the item that provokes them should be left out if their consideration is outside the scope of study or prediction. All null responses and mis-contextualizations should preferably be confirmed by prior encounters with the potentially irrelevant item by community subjects s1, s2, . . . , sj and subject S. The curator may be able to further understand the reasons for irrelevance and mis-contextualization to thus rule out the specific item from inventory store 130.

For example, a specific item 109b embodied by a book about ordinary and partial differential equations is shown as being deselected in FIG. 3A. The elimination of book 109b is affirmed by the human curator, who understands the human reasons for the book's lack of appeal. In the case at hand, all subjects reporting on network 104 are members of a group that does not consider the language of mathematics relevant to their lives. Thus, most of the time that book 109b is encountered by the subjects it evokes a null response as they are unlikely to register its existence. The possible exception is in the case of unanticipated contextualization, e.g., as a "heavy object" for purposes of "weighing something down". If the prediction does not want to take into account such mis-contextualization then book should be 109b left out. If, on the other hand, contextualization of textbooks as heavy objects were of interest in the prediction, then book 109b should be kept in inventory store 130.

It is also possible to supplement or, under some circumstances even replace the vetting of items 109 by a human curator with a cross-check deploying network behavior monitoring unit 120. That is because monitoring unit 120 is in charge of reviewing all data files 112 to track and monitor communications and behaviors of all subjects on network 104. Hence, it possesses the necessary information to at the very least supplement human insights about reactions to items 109 and their most common contextualization. For example, despite the intuition of the human curator book 109b could have provoked a reaction and anticipated contextualization, e.g., as a study resource, by at least a few subjects. Such findings would be discovered by network behavior monitoring unit 120 in reviewing data files 112. These findings should override the human curator's judgment in a purely data-driven approach to predictions and simulations. Such pragmatism is indeed recommended in the preferred embodiments of the present invention to ensure discovery of quantum effects and derivation of correspondent practical benefits from these findings.

After vetting by the human curator and corroboration by network behavior monitoring unit 120, inventory store 130 will contain all items of interest to the subjects and presenting to them in contextualizations that are within the scope of prediction or simulation. For example, items 109a, 109q and 109z from store 130 all fall into the category of objects embodied here by shoes, a tennis racket and a coffee maker. A subject 109f embodied by a possible romantic interest to one or more community subjects s1, s2, . . . , sj and to subject S to be confronted by proposition 107 is also shown. Further, store 130 contains many experience goods of which two are shown. These are experiences 109e, 109j embodied by watching a movie and taking a ride in a sports car, respectively. Numerous other objects, subjects and experiences are kept within store 130 for building different types of propositions 107.

In order to follow the next steps with reference to a concrete example to help ground the explanation, we consider shoes 109a that were chosen by mapping module 115 from among all vetted items 109 in inventory store 130. To make the choice module 115 has a selection mechanism 138. Mechanism 138 is any suitable apparatus for performing the selection among items 109 in store 130. It is noted that selection mechanism 138 can either be fully computer-implemented for picking items 109 in accordance with a computerized schedule or it can include an input mechanism that responds to human input. In other words, mechanism 138 can support automatic or human-initiated selection of items 109 for predictions and simulations under the quantum representation of the present invention.

Figure 3B:
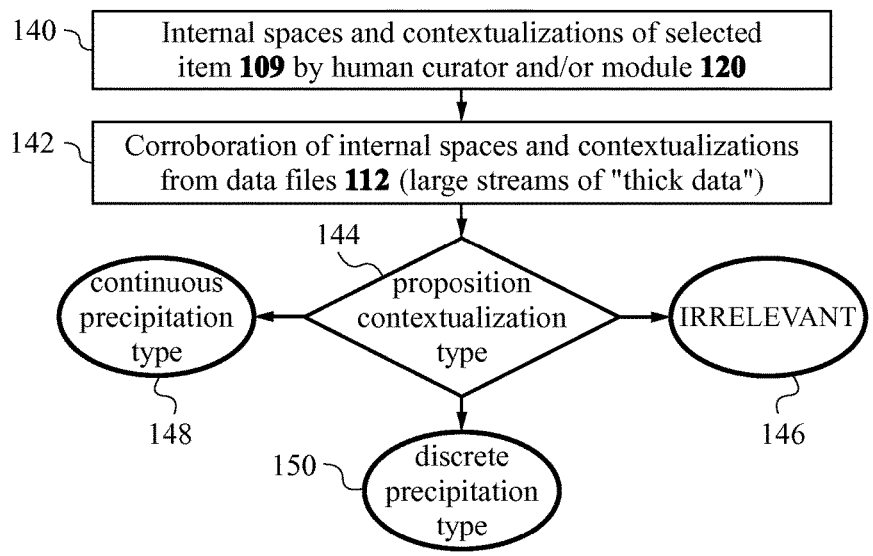
FIG. 3B is a flow diagram of several initial steps performed by the mapping module.

FIG. 3B illustrates the steps performed by mapping module 115 in further examining the internal spaces of subjects and their contextualizations. More precisely, mapping module 115 takes the first formal steps to treating these concepts in accordance with the quantum representation adopted herein. The quantum representation applies to the community values space postulated to exist between community subjects s1, s2, . . . , sj and also to the internal subject space postulated to belong to the subject of interest S.

In a first step 140, mapping module 115 selects item 109 and presumes that item 109 registers in the community values space. The observed contextualizations of item 109 as found by network behavior monitoring module 120 and/or the human curator are also imported by mapping module 115.

In a second step 142, mapping module 115 corroborates the existence of the internal spaces, namely community values space and internal subject space and of the contextualizations by cross-checking data files 112. In performing step 142, mapping module 115 typically accesses memory 108 and archived data files 112. This allows mapping module 115 to look over "thick data", i.e., data files 112 that present a historically large stream of information that relates to item 109. In this manner the relevance of item 109 and hence its registration in the internal spaces can be further ascertained and more carefully quantified. For example, a number of occurrences of a response, a reference to or an action involving item 109 over time is counted. At this point, if item 109 has an ephemeral existence in the minds of the subjects then mapping module 115 could provide that information to the human user. Should prediction of fads not be of interest for the prediction or simulation, then the human user of computer system 100 could stop the process and induce the choice of a different item 109.

Assuming that item 109 remains of interest, then mapping module 115 proceeds to step three 144. Step 144 is important from the point of view of the quantum representation as it relates to the type of contextualization of underlying proposition 107 about item 109 by the subjects. We consider two precipitation types and a null result or "IRRELEVANT" designated by 146. Of course, the careful reader will have noticed that items 109 that induce a null response encoded here by "IRRELEVANT" 146 were previously eliminated. However, since step 144 determines the precipitation for each subject concerned, and some of the subjects may not register item 109 despite the fact that a large number of their peers do, it is necessary to retain the option of null outcome 146 in step 144.

Figure 1A:
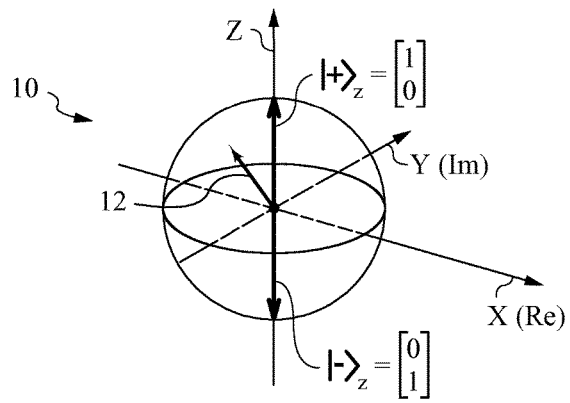
FIG. 1A (Prior Art) is a diagram illustrating the basic aspects of a quantum bit or qubit.
Figure 1B:
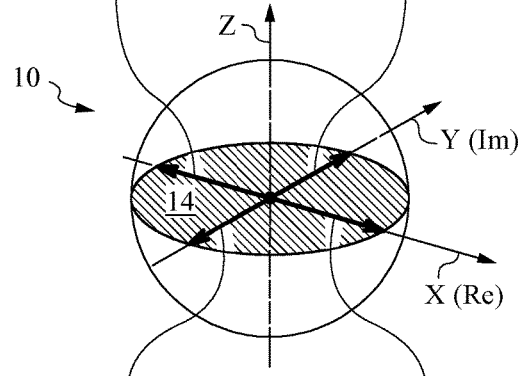
FIG. 1B (Prior Art) is a diagram illustrating the set of orthogonal basis vectors in the complex plane of the qubit shown in FIG. 1A.
Figure 1C:
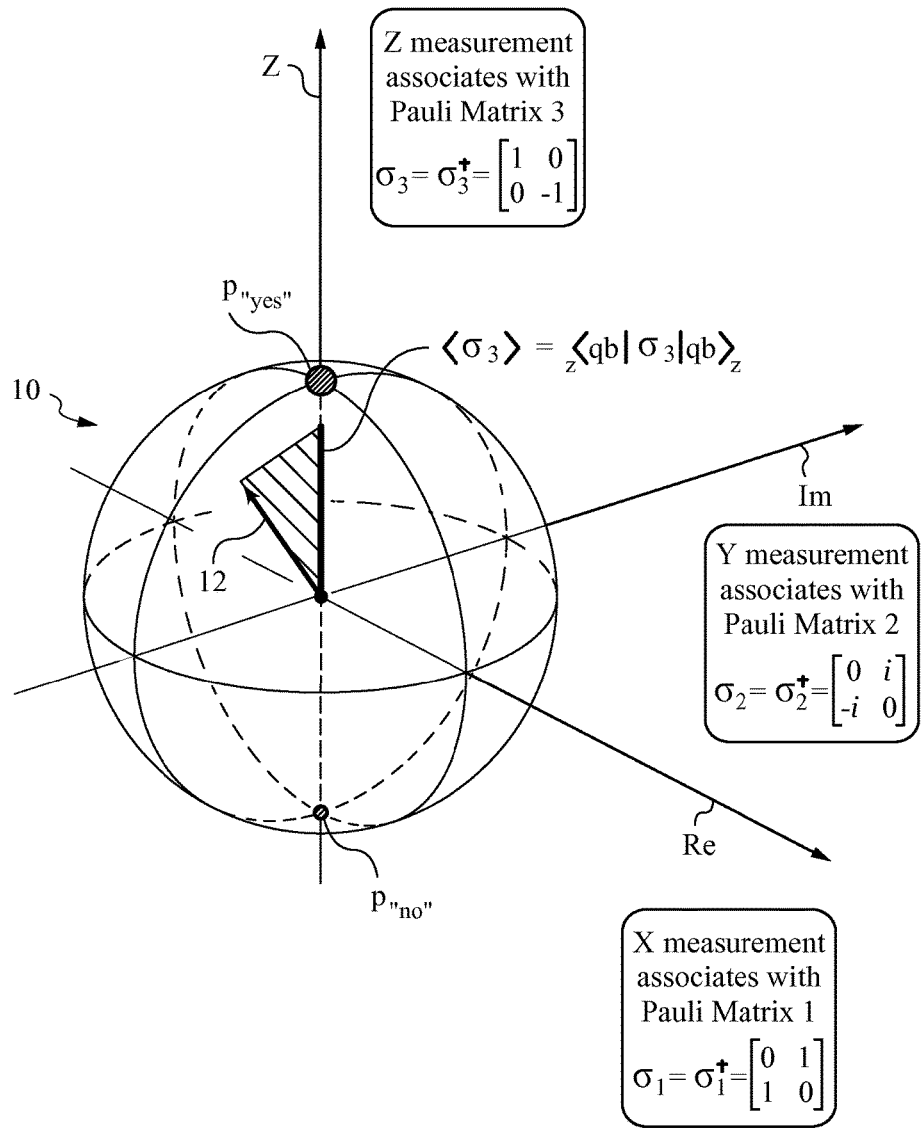
FIG. 1C (Prior Art) is a diagram illustrating the qubit of FIG. 1A in more detail and the three Pauli matrices associated with measurements.
Figure 1D:
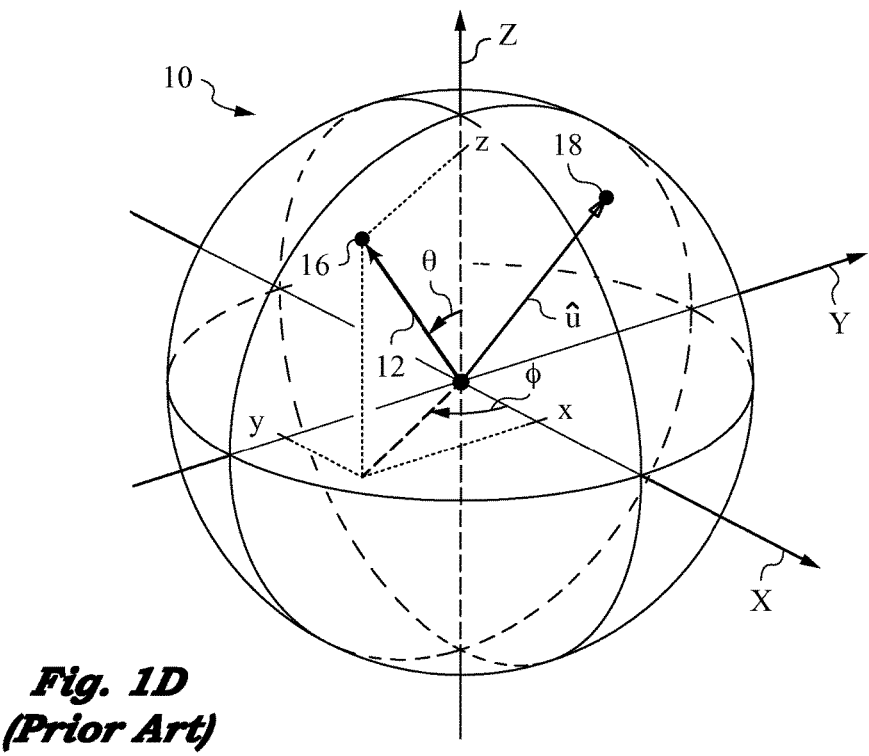
FIG. 1D (Prior Art) is a diagram illustrating the polar representation of the qubit of FIG. 1A.
Figure 1E:
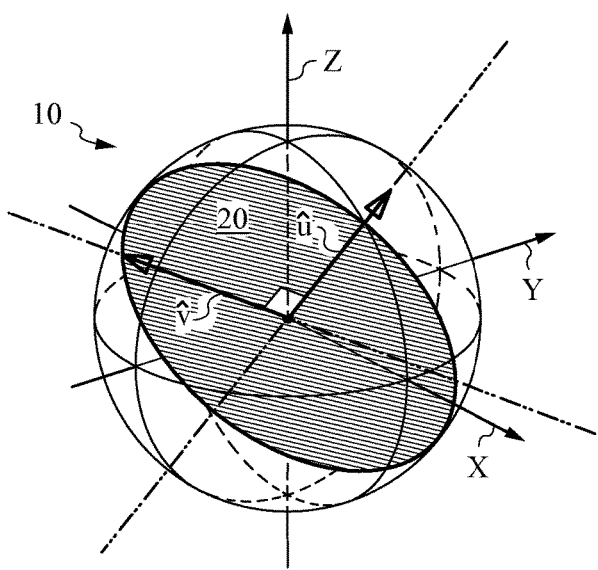
FIG. 1E (Prior Art) is a diagram illustrating the plane orthogonal to a state vector in an eigenstate along the u-axis (indicated by unit vector û).
Figure 1F:
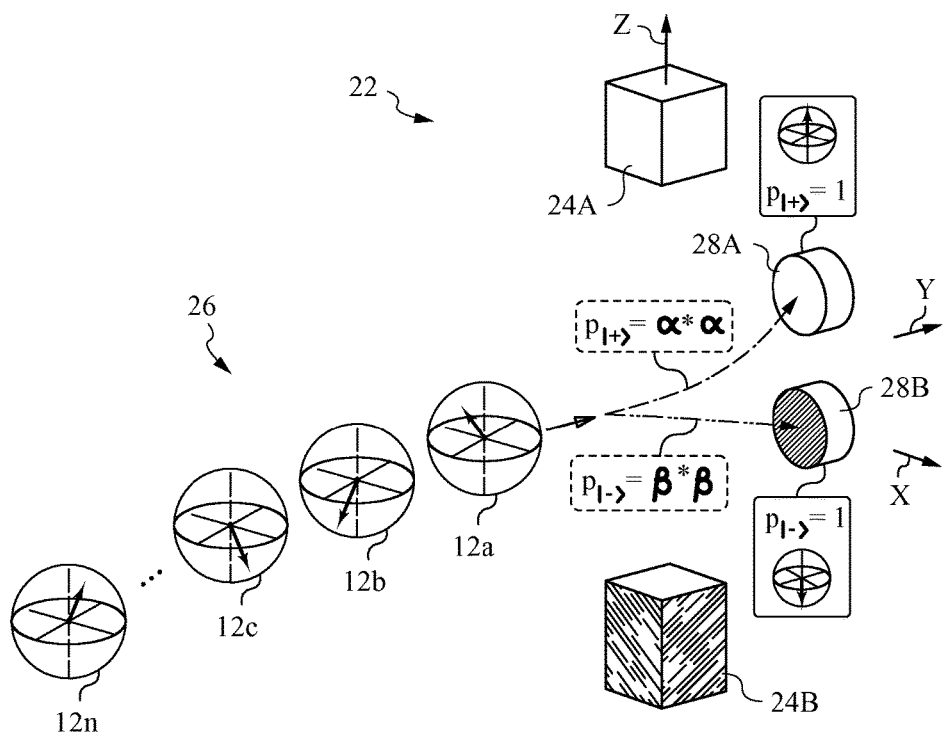
FIG. 1F (Prior Art) is a diagram illustrating a simple measuring apparatus for measuring two-state quantum systems such as electron spins (spinors).
Figure 1G:
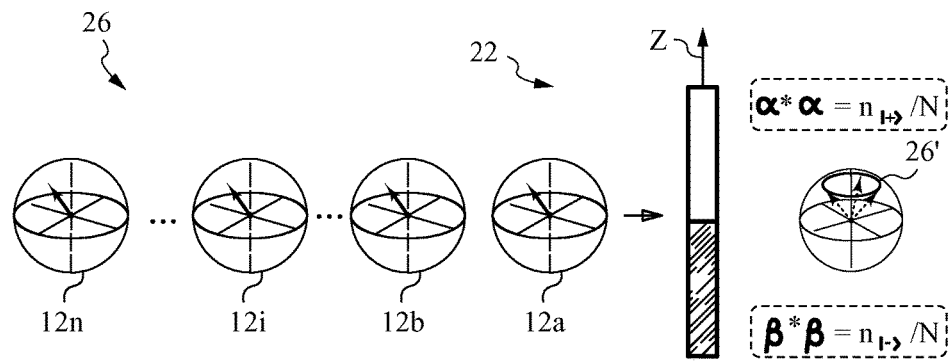
FIG. 1G (Prior Art) is a diagram illustrating the fundamental limitations to finding the state vector of an identically prepared ensemble of spinors with single-axis measurements.
Figure 1H:
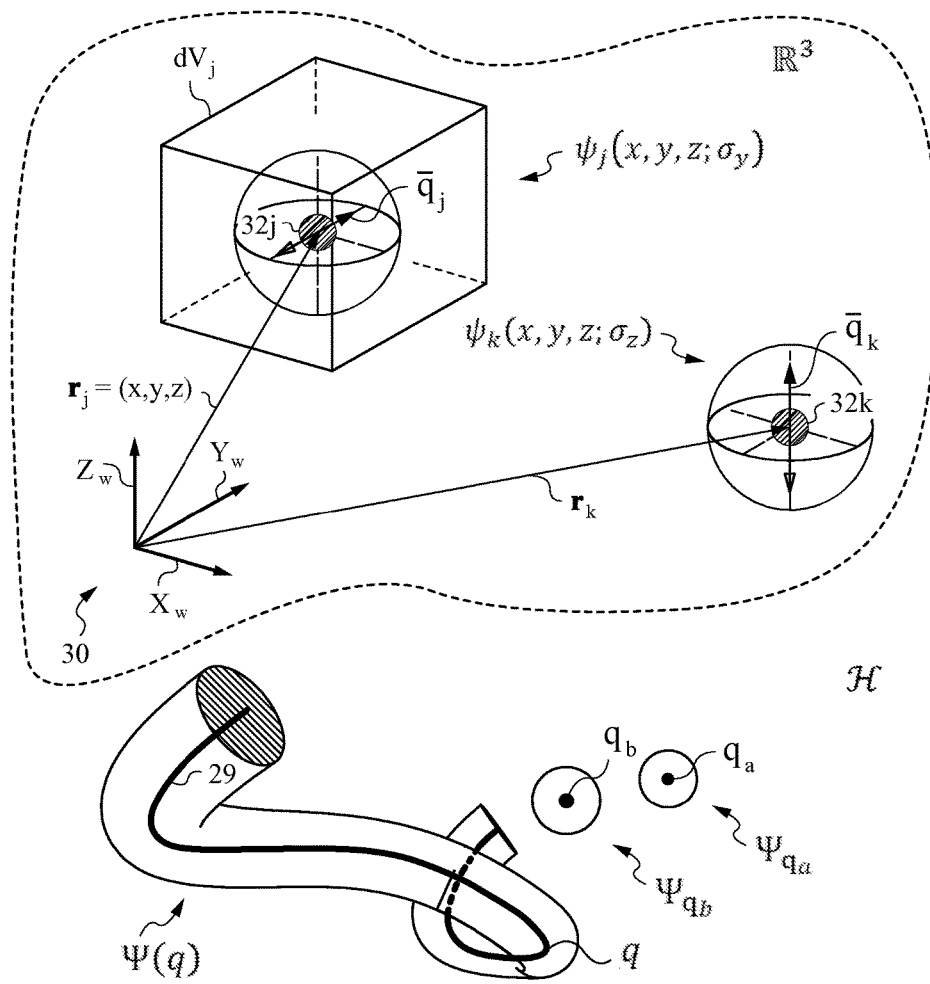
FIG. 1H (Prior Art) is a diagram showing several possible types of precipitation of quantum mechanical wave functions onto a space coordinate.
Figure 1I:
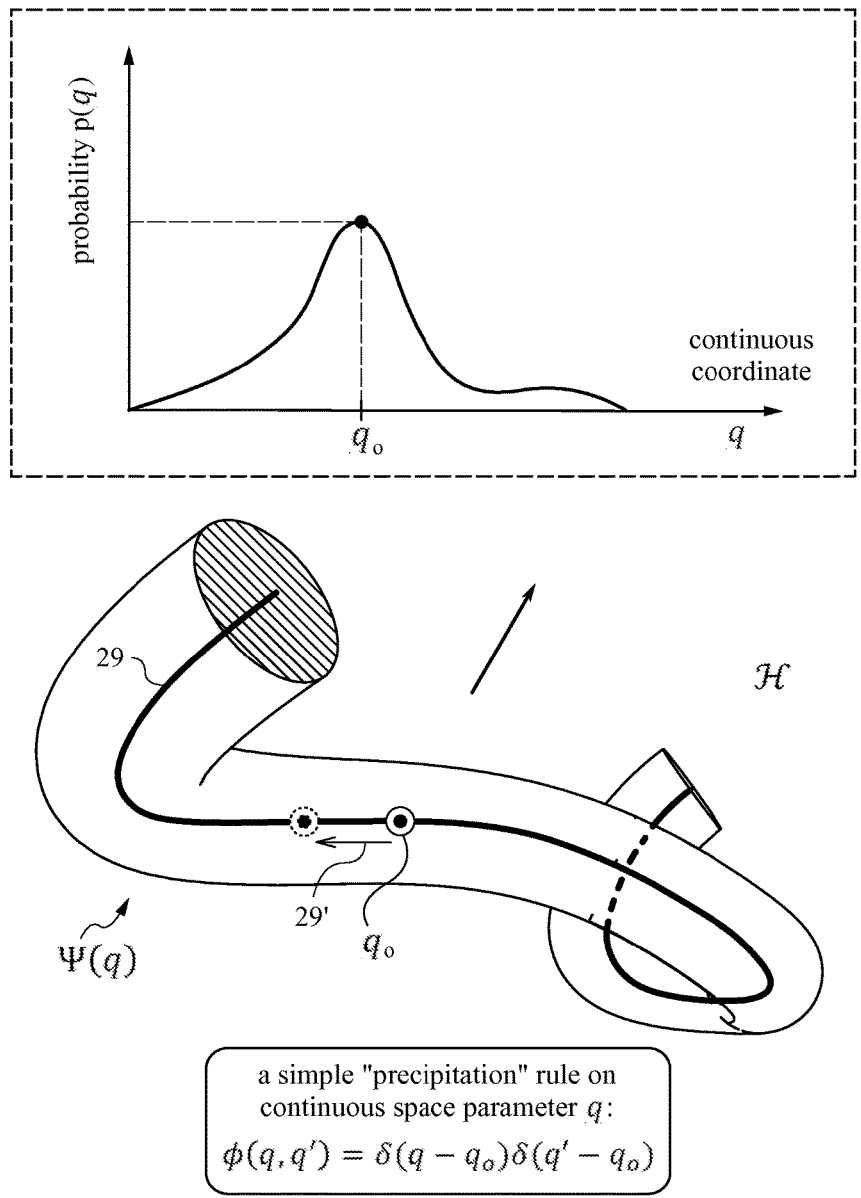
FIG. 1I (Prior Art) is a diagram illustrating in more detail the precipitation of a wave function on a continuous space coordinate.
Figure 1J:
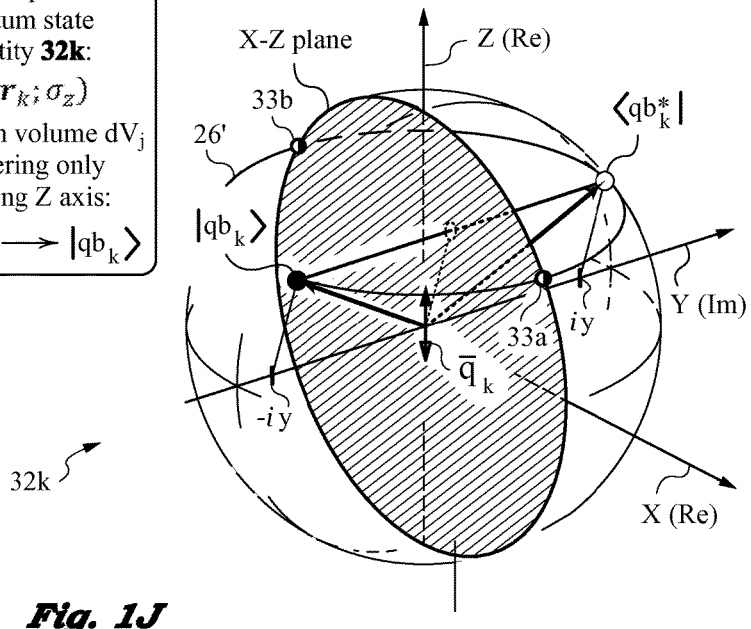
FIG. 1J (Prior Art) is a diagram illustrating the behavior of a spin state using the Bloch Sphere to demonstrate the effects of complex conjugation in moving from the bra to the dual ket vector representation.

The first precipitation type being considered herein is a continuous precipitation type 148. The second type is a discrete precipitation type 150. These find their correspondent analogues as previously introduced in the background section. Specifically, the reader will recall the properties for the most general precipitation of a quantum mechanical state or wave function over a continuous parameter q or a discrete parameter such as a point q or an axis $\bar{q}$ (see also FIGS. 1H&1I and corresponding text).

Figure 3C:
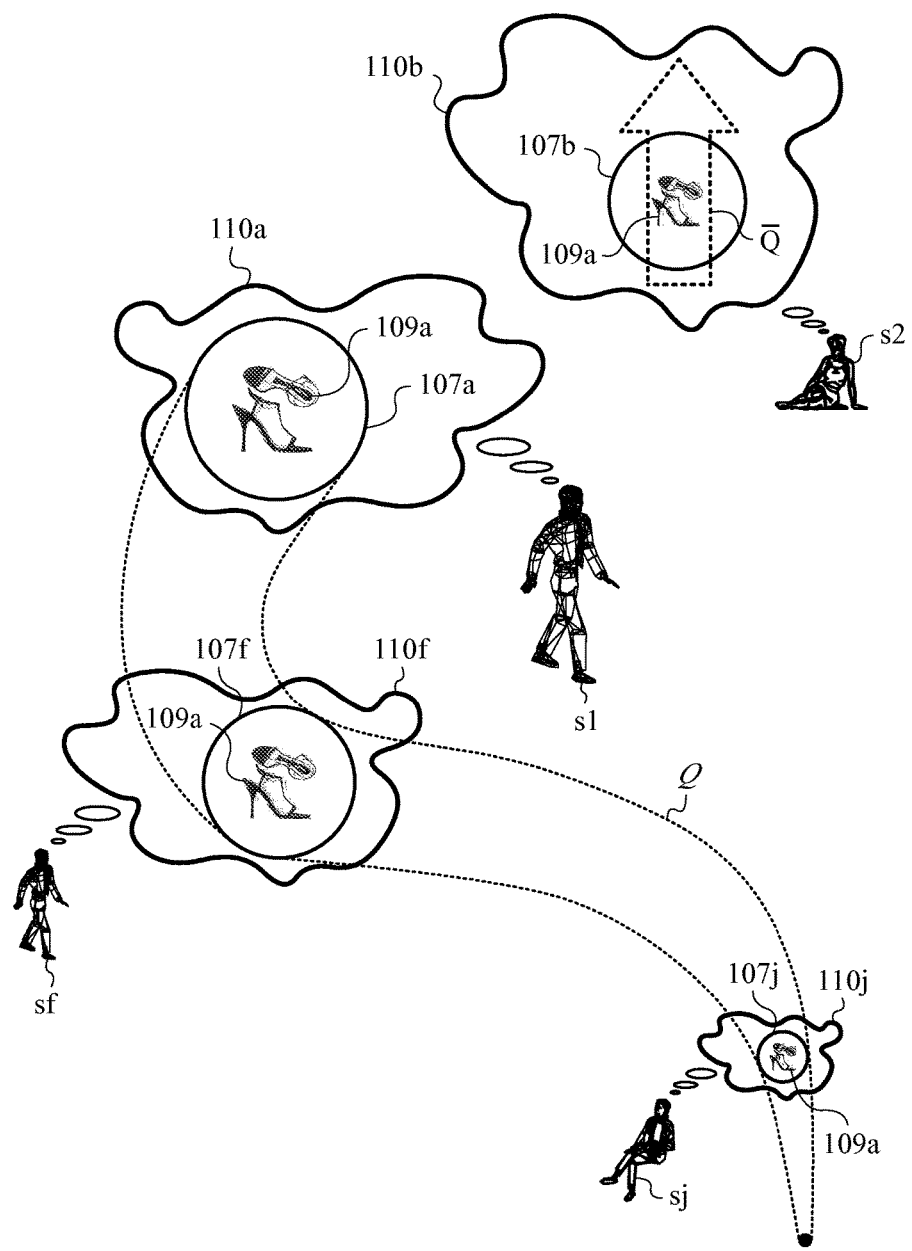
FIG. 3C is a diagram showing how to determine the quantum mechanical precipitation type exhibited by the subjects.

FIG. 3C illustrates the manner in which these concepts are applied herein. Specifically, a continuous parameter Q is indicated as an extended entity in dashed lines. Three community subjects s1, sf and sj are exhibiting continuous precipitation type 148 on continuous parameter Q in their conceptualization of shoes 109a (which are shown here explicitly as the selected item). In other words, whatever notions subjects s1, sf and sj have of shoes 109a as reflected in their states 110a, 110f and 110j, the measurable outcome or precipitation of these notions has a continuous form. This is in analogy to precipitation of the wave function on continuous spatial coordinate q.

Although continuous precipitation type 148 can be used in apparatus and methods of the invention and a person skilled in the art will understand how to apply the appropriate tools to handle such precipitation, it is more difficult to model it with graphs. Furthermore, such precipitation does not typically yield clearly discernible, mutually exclusive responses by the subjects modulo underlying proposition 107 about shoes 109a. In other words, in the case of shoes 109a as an example, continuous precipitation type 148 could yield a wide spread in the degree of liking of shoes 109a for a multitude of reasons and considerations.

In human terms, and merely to give some indication of possible explanations, subject sj may formulate their notion about shoes 109a as generally necessary items without any clear ideas as to how to differentiate between types under any given circumstances. Subject sf may consider shoes 109a within a general merchantability framework with their notions being bound to profit-making. Their notions may thus be additionally influenced by overall notions and judgments (measurements) about shoes 109a rendered by others. Subject s1 may formulate their notion about shoes 109a as extraneous but necessary items better left for someone else to procure. Hence, underlying proposition 107, or more precisely propositions 107a, 107f, 107j about shoes 109a as contextualized by subjects s1, sf, and sj in continuous precipitation type 148 are not simple to represent.

In preferred embodiments of the invention we seek simple precipitation types corresponding to simple contextualization of underlying proposition 107. In other words, we seek to find the community of subjects in whose minds proposition 107 about shoes 109a induces discrete precipitation type 150. This precipitation type should apply individually to each community subject making up such a community. Of course, subjects embedded in their normal lives cannot be tested for precipitation type entirely outside the context they inhabit. Some error may thus be present in the assessment of precipitation type for each subject. To the extent possible, such error can be kept low by reviewing previous precipitation types the subject under review exhibited with respect to similar propositions and ideally similar propositions about the same item. Further, a review of precipitation type by the human curator is advantageous to corroborate precipitation type.

It is further preferred that the contextualization be just in terms of a few mutually exclusive states and correspondent mutually exclusive responses that the subject can exhibit. Most preferably, the contextualization of underlying proposition 107 corresponds to discrete precipitation type 150 that manifests only two orthogonal internal states and associated mutually exclusive responses such as "YES" and "NO". In fact, for most of the present application we will be concerned with exactly such cases for reasons of clarity of explanation. Once again, review by the human curator is highly desirable in estimating the number of internal states.

Additionally, discrete precipitation type 150 as found along an axis $\bar{q}$ into just two orthogonal states associated with two distinct eigenvalues corresponds to the physical example of spinors that we have already explored in the background section. Many mathematical and applied physics tools have been developed over the past decades to handle these entities. Thus, although more complex precipitation types and numerous orthogonal states can certainly be handled by the tools available to those skilled in the art (see, e.g., references on working in the energy or Hamiltonian eigen-basis of general systems), cases where subjects' internal states are mapped to two-level quantum systems are by far the most efficient. Also, two-level systems tend to keep the computational burden on computer system 100 within a reasonable range and do not require excessively large amounts of data files 112 to set up in practice.

The case of discrete precipitation type 150 modulo proposition 107 about shoes 109a admitting of only two orthogonal eigenstates (subject's internal states) that can be associated with an axis $\overline{Q}$ is illustrated on the example of subject s2. In this most preferred case, discrete precipitation type 150 induces subject s2 to contextualize underlying proposition 107b about shoes 109a in terms of just two mutually exclusive states manifesting in mutually exclusive responses such as "YES" and "NO". Thus, the manner in which subject s2 contextualizes proposition 107b in this preferred two-level form can be mapped to quantum-mechanically well-understood entities such as spinors. However, before proceeding to the next step performed by mapping module 115 with community subjects that do fall into the above preferred discrete precipitation type 150 with two eigenstates and eigenvalues, it is important to review a few important aspects of generally complex-valued wave functions and Hilbert space $\mathcal{H}$.

Figure 3D:
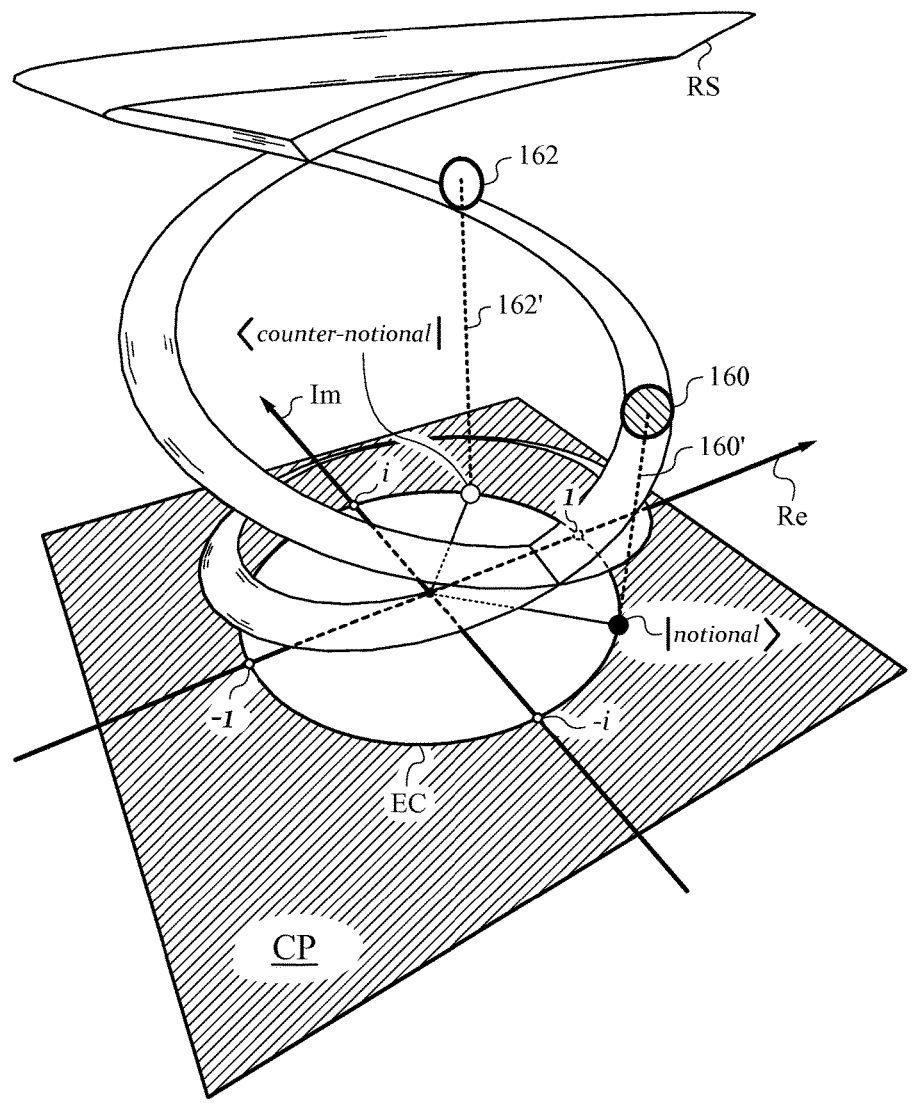
FIG. 3D is a complex diagram visualizing a Riemann surface and its projection onto the Euler Circle in the complex plane to aid in the explication of several aspects of wave functions that are recruited to model internal states of subjects according to the present quantum representation.

FIG. 3D illustrates a Riemann surface RS and its projection onto the unit circle or Euler circle EC in the complex plane CP. The real axis Re intersects Euler circle EC as two possible mutually exclusive measurable values +1 and −1 for some observable of interest in this two-level system analogy. The inaccessible quantum state of this exemplary system constructed for didactic purposes is linked to the position of a hatched ball 160. The instantaneous quantum state that corresponds to a notional state of a subject is denoted by state vector $|\text{notional}\rangle$. State vector $|\text{notional}\rangle$ is visualized by a black dot that resides on Euler circle EC in complex plane CP. The location of the black dot is always taken as the projection of ball 160 from Riemann surface RS as indicated by dashed line 160'.

Ball 160 is free to "roll" on the topologically non-trivial Riemann surface RS. We can already see that irrespective of where ball 160 rolls, state vector $|\text{notional}\rangle$ modeled by the projection will preserve unit norm. In other words, the black dot that is its projection onto complex plane CP will always remain on Euler circle EC. This guarantees that any evolution of state $|\text{notional}\rangle$ generated by this exemplary "mechanism" remains unitary. Indeed, such evolution of $|\text{notional}\rangle$ is in agreement with the demands of quantum mechanics imposed on state vectors.

We introduce a blank ball 162 onto Riemann surface RS and designate its projection onto Euler circle EC to be the complex-conjugated state designated by state vector $\langle\text{counter-notional}|$. State vector $\langle\text{counter-notional}|$ is visualized by a white dot to which blank ball 162 projects along dashed line 162'. Ball 162 is also allowed to roll on Riemann surface RS as well but, in order to obey unitary evolution, it has to roll is such a way that its projection to the white dot designating complex-conjugated state $\langle\text{counter-notional}|$ remains the proper complex-conjugate of state $|\text{notional}\rangle$. In other words, the evolution is such that the generalized dot product is equal to unity, i.e., $\langle\text{counter-notional}|\text{notional}\rangle=1$. This type of evolution automatically satisfies the Schroedinger equation (see FIG. 1O and corresponding description).

In view of this example, we remain cautious because Hilbert space $\mathcal{H}$ is not directly inspectable to us, even in cases of simple discrete precipitation with only two measurable eigenvalues. Indeed, the example we have just reviewed will turn out to be related to spin statistics that we shall return to later (also see U.S. patent application Ser. No. 14/224,041). Meanwhile, we eschew any attempts to draw direct intuition from the representations used to visualize state vectors assigned to subjects' notions about underlying propositions and the items these propositions are about. One example of a representation that has to be treated with care is the Bloch sphere we have previously used in our visualizations. For a more in-depth treatment of the mathematics associated with state vector representations the diligent reader is referred to any standard textbooks treating topics such as complex analysis and conformal mapping (see, e.g., Alan Jeffrey, "Complex Analysis and Applications", $2^{nd}$ Edition, Chapman & Hall/CRC, 2006).

Figure 3E:
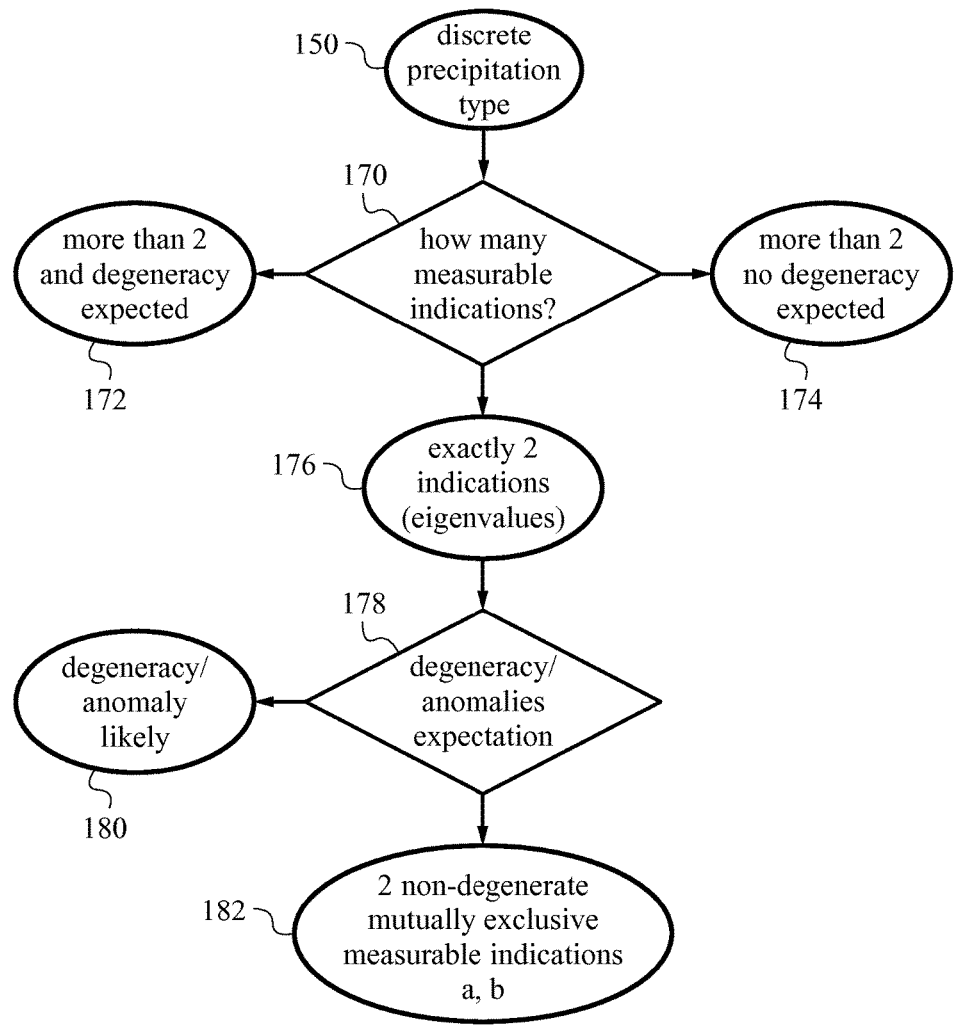
FIG. 3E is a continuation of the flow diagram of FIG. 3B showing subsequent steps executed by the mapping module.

In FIG. 3E we turn our attention to subsequent steps performed by mapping module 115. Just to recall, we start with results of step 144 that selected all subjects exhibiting discrete precipitation type 150 modulo proposition 107 about shoes 109a while dropping continuous precipitation type 148 and "IRRELEVANT" 146 for the reasons outlined above. In step 170 mapping module 115 determines the number of measurable indications or eigenvalues associated with discrete precipitation type 150.

In case 172 more than two eigenvalues are expected and some of them are associated with different state vectors. This is a classic case of a quantum mechanical system with degeneracy. In other words, the system has several linearly independent state vectors that have the same eigenvalues or measurable indications. Those skilled in the art will recognize that this typical situation is encountered often when working in the "energy-basis" dictated by the Hamiltonian.

In case 174 more than two eigenvalues are expected and all of them are associated with different state vectors. Such systems can correspond to more complicated quantum entities including spin systems with more than two possible projections along the axis on which they precipitate (e.g., total spin 1 systems). Quantum mechanical systems that are more than two-level but non-degenerate are normally easier to track than systems with degeneracy. Those skilled in the art will recognize that cases 172 and 174 can be treated with available tools.

In the preferred embodiment of the instant invention, however, we concentrate on case 176 in which there are only two eigenvalues or two measurable indications. In other words, we prefer to base the apparatus and methods of invention on the two-level system. As mentioned above, it is desirable for the human curator that understands the subjects to review these findings to limit possible errors due to misjudgment of whether the precipitation is non-degenerate and really two-level. This is preferably done by reviewing historical data of the subject's responses, actions and any indications available (e.g., from data files 112 archived in memory 108) that are used by mapping module 115 in making the determinations. We thus arrive at a corroborated selection of community subjects that exhibit discrete precipitation with just two eigenvalues and whose internal states can therefore be assigned to two-level wave functions.

A final two-level system review step 178 may optionally be performed by mapping module 115. This step should only be undertaken when the subjects can be considered based on all available data and, in the human curator's opinion, as largely independent of their social context. This may apply to subjects that are extremely individualistic and formulate their own opinions without apparent influence by others. When such radically individualistic subjects are found, their further examination is advantageous to further bound potential error in state vector assignment. Specifically, mapping module 115 should divide case 176 into sub-group 180 and sub-group 182. Sub-group 180 is reserved for subjects that despite having passed previous selections exhibit some anomalies or couplings that cause degeneracy or other unforeseen issues. These subjects could be eliminated from being used in further prediction or simulation.

Meanwhile, sub-group 182 is reserved for confirmed well-behaved subjects that reliably manifest two-level non-degenerate indications a and b modulo underlying proposition 107 about the chosen item 109 as confirmed by historical data. These subjects will be assigned two-level state vectors by assignment module 116 as explained in more detail below. At this point the reader may also refer to U.S. patent application Ser. No. 14/182,281 that explains qubit-type state vector assignments in situations that center on individual subjects divorced from community effects.

Figure 3F:
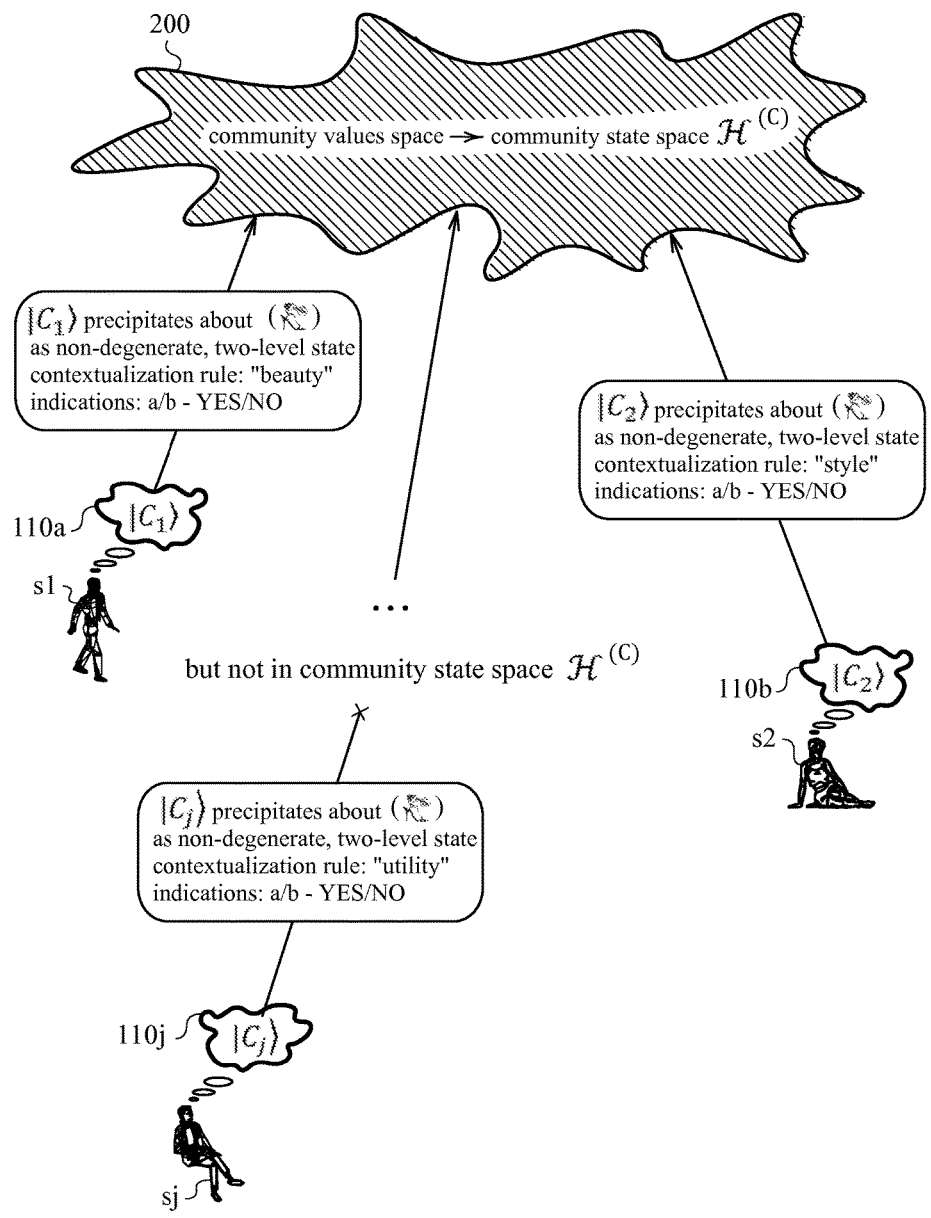
FIG. 3F is a diagram illustrating the assignment of community subjects to the community values space and its quantum representation by community state space $\mathcal{H}^{(C)}$, which is a Hilbert space.

In addition to selecting out subjects that can be assigned to two-level state vectors, mapping module 115 also examines the community values space. FIG. 3F indicates community values space 200 in a general and pictorial way for illustration purposes only. Note that to simplify matters we presume in FIG. 3F that all community subjects s1, s2, ..., sj are found to exhibit the desired discrete, non-degenerate, two-level precipitation type with respect to proposition 107 about item 109a. In other words, we presume for the purposes of the following discussion that mapping module 115 in conjunction with the human curator found that all community subjects s1, s2, ..., sj are in sub-group 182 (refer back to FIG. 3E).

FIG. 3F shows community subject s1 with state 110a already assigned to a two-level quantum state vector or community subject state $|C_1\rangle$. Furthermore, based on historical data in data files 112-s1 stored in memory 108, mapping module 115 has determined that the most likely value applied by community subject s1 modulo proposition 107 about item 109, i.e., shoes 109a in the present example, concerns their "beauty". Of course, since the precipitation type of community subject state $|C_1\rangle$ is two-level the two possible indications a, b map to a "YES" indication and a "NO" indication. Given that indications can include actions, choices or responses, the manifestation of indications a, b will differ depending on overall context.

Furthermore, community subject state $|C_1\rangle$ of community subject s1 exists in community values space that is associated by mapping module 115 to community state space $\mathcal{H}^{(C)}$. This association is made in accordance with the quantum representation, since all proper state vectors inhabit Hilbert space.

Community subject s2 with state 110b is also assigned their discrete, two-level community subject state $|C_2\rangle$. Further, mapping module 115 has determined that the most common value applied by community subject s2 modulo proposition 107 about shoes 109a concerns their "style".

Thus, in any measurement the a or "YES" indication would most likely indicate that community subject s2 judges shoes 109a to be stylish. The b or "NO" indication would most likely indicate that community subject s2 judges shoes 109a to not be stylish.

Community subject state $|C_2\rangle$ designating community subject s2 is posited to also reside in the same Hilbert space as community subject state $|C_1\rangle$ of community subject s1, namely in community state space $\mathcal{H}^{(C)}$. This is proper because community subjects s1 and s2 are known from their contemporaneous and historical data files 112-s1, 112-s2 (see FIG. 2) to discuss similar items 109 as well as shoes 109a in particular. Remaining community subjects are treated in the same manner by mapping module 115 regarding community subject states and community state space $\mathcal{H}^{(C)}$ that represents community values space 200.

Mapping module 115 thus ascribes common community values space 200 in situations where possible candidates for community subjects can have a similar range of responses modulo proposition 107. In the model adopted herein, common values space 200 is postulated to exist by module 115 between any two subjects that are known to communicate with each other if at least one of the following conditions is fulfilled:

1) subjects perceive underlying propositions about same item; or
2) subjects show independent interest in the same item; or
3) subjects are known to contextualize similar underlying propositions in a similar manner (similar bases) but not necessarily about same item.

Condition 1) is satisfied by subjects s1, s2 based on data files 112-s1, 112-s2 and other communications between subjects s1, s2 (these may include communications online and/or in real life). Consequently, mapping module 115 had properly places these community subjects together in the same community values space 200 and then assigns it to community state space $\mathcal{H}^{(C)}$.

Loosening of these conditions is possible for items that are known to be of vital importance to any subject and thus necessarily require contextualization and interaction. For example, objects such as food, water, shelter and subjects such as parents, children, family members and experiences such as war, peace necessarily affect all subjects. Therefore, common internal spaces corresponding to contextualization of underlying propositions about these objects, subjects, experiences may be postulated a priori. Again, a human curator with requisite knowledge and experience should be involved in making decisions on how the above conditions can be relaxed in practice. Furthermore, a scaling parameter can be introduced as an aid in determining the possible existence of community values space 200 between any set of candidate subjects. This tool will be described in more detail below.

The last community subject sj is assigned community subject state $|C_j\rangle$ with the most likely value axis for judgment of shoes 109a being "utility". It is noted, that the formal assignment of state vectors or subject states $|C_k\rangle$, where k=1, 2, ..., j in the present case, as well as of community state space $\mathcal{H}^{(C)}$ is performed by assignment module 116, but indicating these assignment already in FIG. 3F is useful for pedagogical reasons.

Based on the same historical data as well as other information about interactions between community subjects s1, s2, sj as may be documented online in network 104 or known via other sources (real life), mapping module 115 discovers, however, that last community subject sj does not actually interact with remaining community subjects s1, s2, ..., si (note that community subjects s3 through si are not explicitly shown) about proposition 107 concerning shoes 109a. This means that the conditions listed above are not fulfilled. Therefore, although subject sj exhibits the desired two-level discrete precipitation type fully justifying assignment to community subject state $|C_j\rangle$, subject sj cannot be considered in community values space 200 and thus his quantum representation by community subject state $|C_j\rangle$ cannot be placed in community state space $\mathcal{H}^{(C)}$.

Figure 3G:
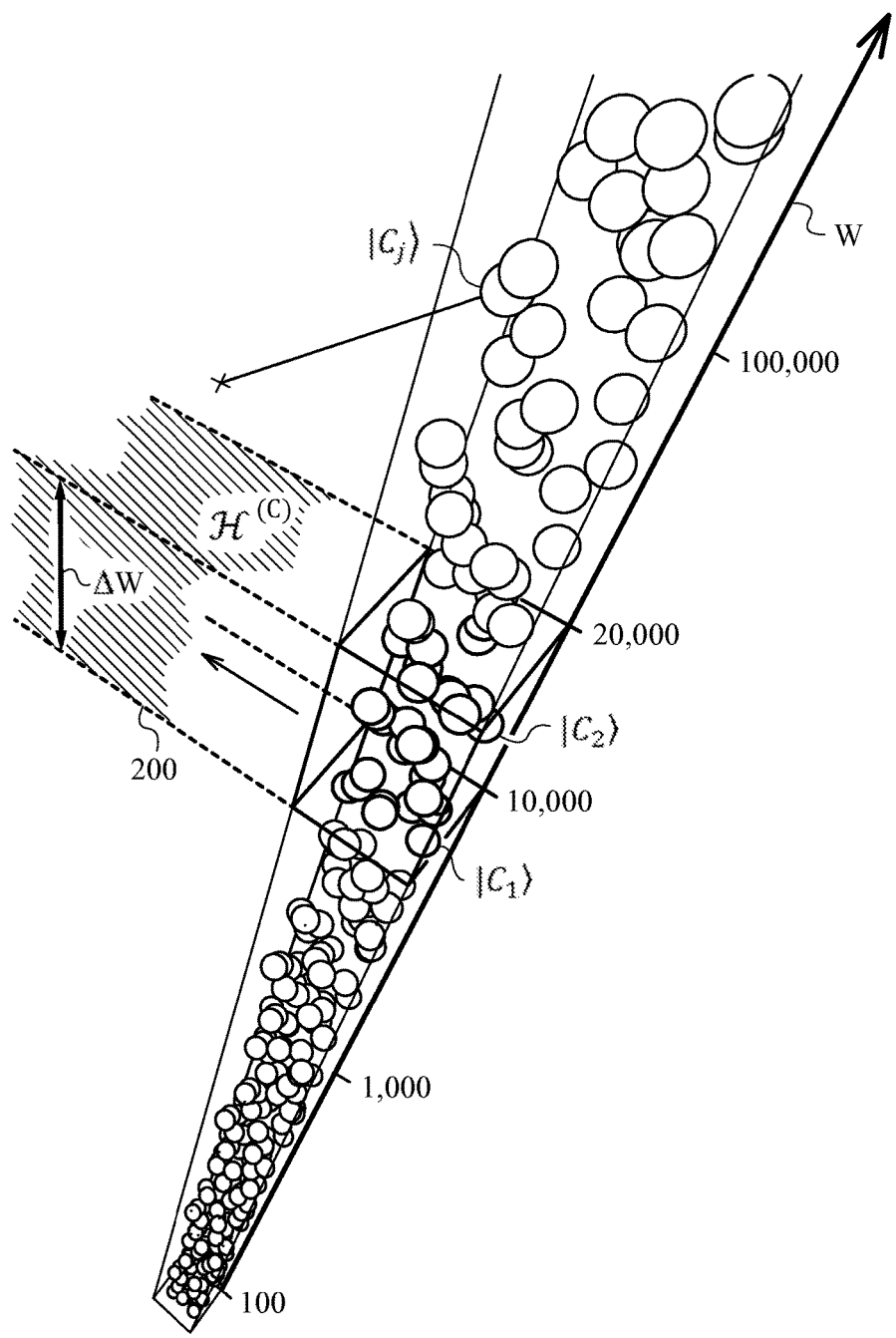
FIG. 3G is a diagram introducing the concept of a scaling parameter W to quantify different realms and to be used in preferred embodiments of the quantum representation to help determine the bounds of a community and other important parameters due to scaling (renormalization).

FIG. 3G illustrates how a scaling parameter W is used in preferred embodiments to expose one of the main reasons why community subject sj cannot be posited in community state space $\mathcal{H}^{(C)}$ that stands for community values space 200 in accordance with the quantum representation adopted herein. As ordered along scaling parameter W subjects that belong to the community are found to interact over shoes 109a in a similar manner because when they are within a certain range ΔW of that scaling parameter. For example, community subjects s1, s2 whose community subject states are $|C_1\rangle$, $|C_2\rangle$ happen to also be close enough along scaling parameter W and thus can be presumed to interact. They are indicated within a slice 202 along scaling parameter W. Meanwhile, subject sj is far outside slice 202. Thus, proposition 107 about shoes 109a presents itself to subject sj in a different regime or realm, as quantified by scaling parameter W.

In most typical applications, scaling parameter W is directly related to proposition 107 about item 109. For example, in the case of shoes 109a proposition 107 scales with price. Let us assume that shoes 109a cost $1,000 in 2014 dollars and scaling parameter W is the subject's yearly disposable income. Then, with respect to actually considering shoes 109a with the potential of acting out in one's judgment context (e.g., buying them because of manifesting the "YES" indication in accordance with one's contextualization rules such as those already introduced above, namely: "beauty", "style" or "utility"), it is clear that subject sj can take proposition 107 seriously. A yearly disposable income of about $100,000 certainly puts shoes 109a within subject's sj reach. On the other hand, community subjects s1, s2 cannot seriously consider shoes 109a in contexts that might involve purchasing them because their disposable incomes are in the range between $10,000 and $20,000.

Clearly, when placing community subject states $|C_k\rangle$ in community state space $\mathcal{H}^{(C)}$ scaling parameter W has to be considered. It is preferable that scaling parameter W and the appropriate range ΔW given proposition 107 be vetted by the human curator prior to its use by mapping module 115 to associate subjects in the community. It will be apparent to the reader that subjects that may belong to the same community in the context of one proposition may not belong to the same community in the context of a different proposition. Furthermore, it will be apparent to those skilled in the art that many communities at different levels of scaling parameter W can be posited contemporaneously. Considering the associated constraints and issues herein would unduly complicate the explanation. However, combining communities in graph structures that sport layers at micro-, intermediate- and macro-levels along scaling parameter W is practicable. The tools to implement such multi-layer models will be familiar to those skilled in the art (also consider correspondent super-lattices or super-graphs and sub-graphs).

For the purposes of the remainder of the discussion we shall assume that subject sj has lost their high-paid job or inheritance yielding the high disposable income. Their net disposable income is now in the same range ΔW as for the other community subjects. Further, we assume that shoes 109a are abundant, on sale at $100 in 2014 dollars and available to all those who want to buy them.

Figure 3H:
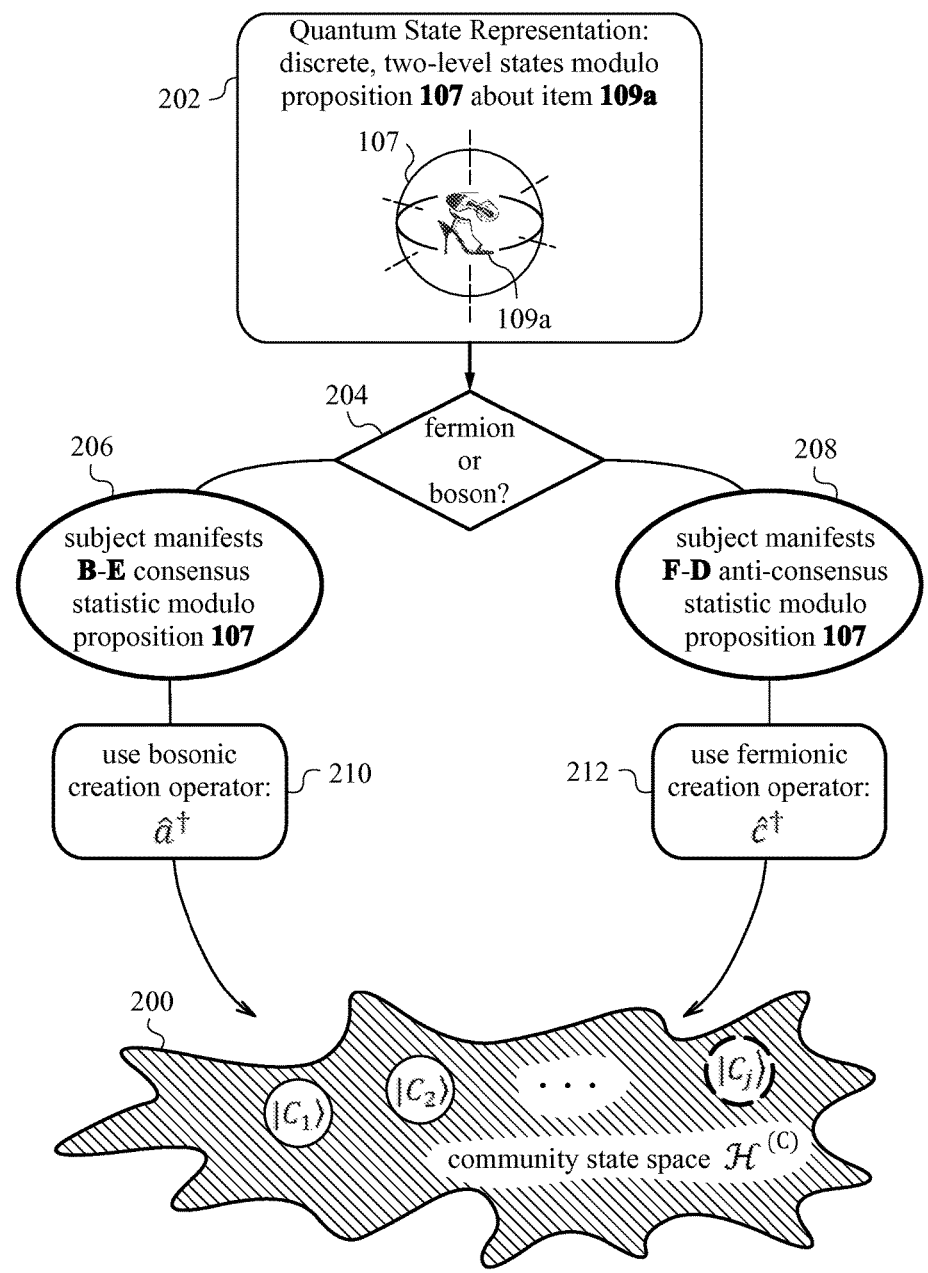
FIG. 3H is a diagram illustrating the steps performed by the creation module of the computer system from FIG. 2 in positing community subjects.

FIG. 3H illustrates the actions executed by creation module 117 (see FIG. 2) under the above assumptions. Specifically, creation module 117 generates or posits with the aid of creation operators $\hat{a}^\dagger$ and $\hat{c}^\dagger$ community subjects s1, s2, ..., sj that are all placed in community state space $\mathcal{H}^{(C)}$ given their shared community values space 200. In other words, creation module 117 formally executes the creation of wave functions or state vectors $|C_k\rangle$ that represent community subjects s1, s2, ..., sj and posits them in community state space $\mathcal{H}^{(C)}$ in accordance with their spin-statistics.

The spin statistics theorem and the different nature of bosonic and fermionic quantum entities in the context of quantum representations of subjects have been previously introduced in U.S. patent application Ser. No. 14/224,041. It is duly noted that Fermi-Dirac (F-D), Bose-Einstein (B-E) and fractional spin statistics are well understood in standard physics contexts. Moreover, even though we will focus on F-D and B-E statistics exclusively in the present teachings, fractional statistics can also be implemented under appropriate conditions.

Creation module 117 takes into account the F-D or B-E spin-statistics assigned to community subjects s1, s2, ..., sj modulo proposition 107 about item 109a. It does so by first collecting in step 202 all subjects s1, s2, ..., sj that mapping module 115 has confirmed proper for the intended quantum state representation; namely discrete, non-degenerate two-level systems in community state space $\mathcal{H}^{(C)}$. Then, in step 204 creation module 117 reviews information contained in data files 112 (see FIG. 2) about interactions between community subjects s1, s2, ..., sj finally selected by mapping module 115.

In performing step 204 module 117 attempts to find community subjects that behave in a way that promotes inter-subject consensus. It also finds the community subjects that behave in ways that exhibit anti-consensus. Community subjects of the first type are then tagged as group 206. Each one of them exhibits B-E consensus statistic modulo proposition 107. This is in analogy to bosons that obey B-E statistics. Community subjects of the second type are placed in group 208. They exhibit F-D anti-consensus statistics in analogy to physical fermions. To better appreciate the two types of spin-statistics and why we designate them as B-E consensus and F-D anti-consensus we review two examples that use the previously introduced concept of Riemann surface RS, the complex plane CP and the Euler circle EC onto which the Riemann surface RS projects (see FIG. 3D and accompanying description).

Figure 3I:
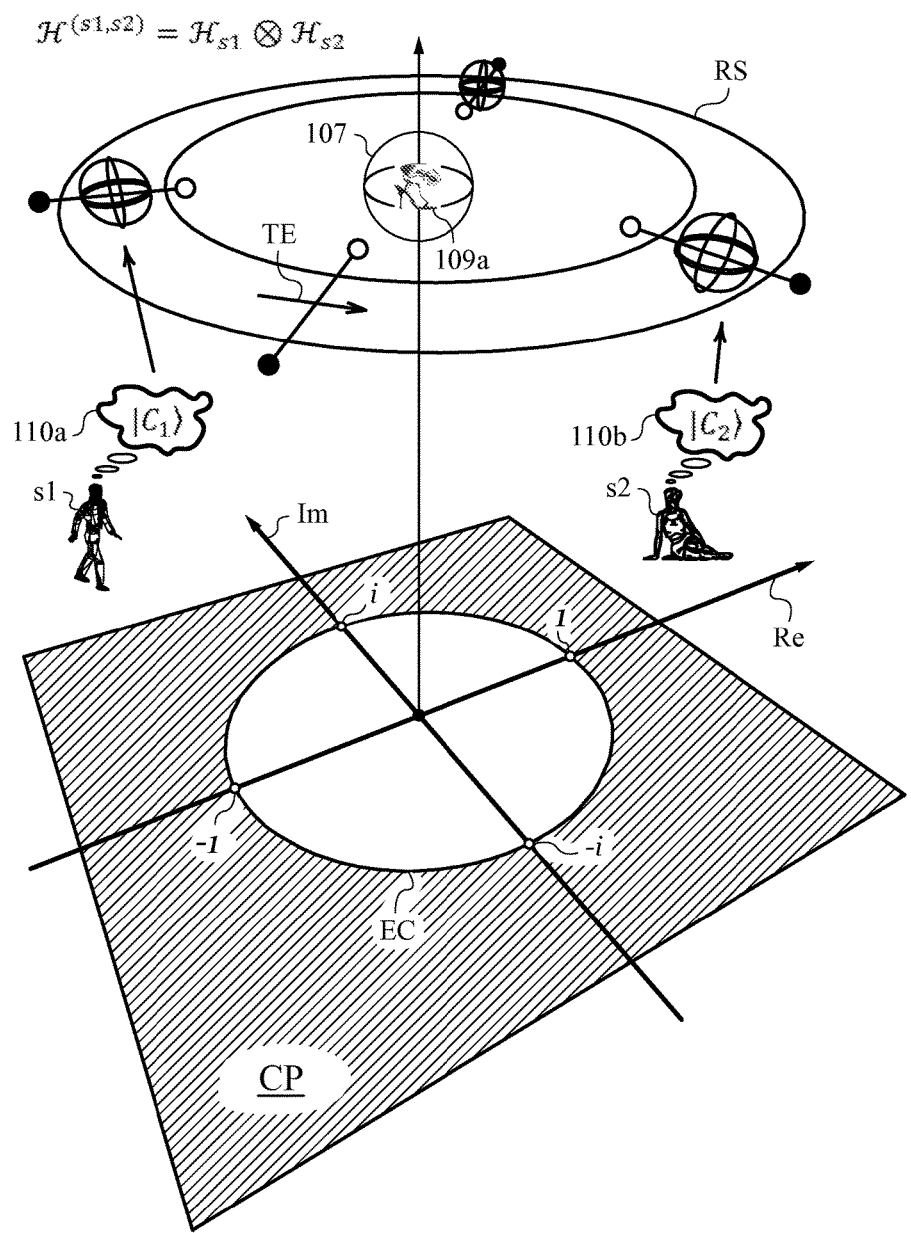
FIG. 3I is a complex diagram using a Riemann surface for the explication of B-E consensus statistics of certain community subjects.

Leveraging on these previously introduced concepts, FIG. 3I focuses on community subjects s1, s2 and considers their states $|C_1\rangle$, $|C_2\rangle$ modulo proposition 107 about shoes 109a jointly. In other words, during step 204 that tests for membership of community subjects s1, s2 in group 206 exhibiting B-E consensus statistic modulo proposition 107, module 117 contemplates the possibility of a joint state of subjects s1, s2. Formally, such state would occur in a sub-set of community state space $\mathcal{H}^{(C)}$ that is just the tensor product of community subject state spaces $\mathcal{H}_{s1}$, $\mathcal{H}_{s2}$ of community subjects s1, s2. Formally, this tensor product space $\mathcal{H}^{(s1,s2)}$ is written as:

$$\mathcal{H}^{(s1,s2)} = \mathcal{H}_{s1} \otimes \mathcal{H}_{s2}, \qquad \text{Eq. 26}$$

and it can be expanded in terms of tensor products of eigenvectors of the two component spaces $\mathcal{H}_{s1}$, $\mathcal{H}_{s2}$, as is well-known to those skilled in the art.

Clear evidence for B-E consensus statistic modulo proposition 107 exists if, according to data files 112-s1, 122-s2, communications in network 104, social network 106 and corroboration from human curator, subjects s1, s2 exhibit conscious agreement or consensus when considering shoes 109a in the same contextualization. For example, they both judge shoes 109a in the context of "beauty" and are fine with either one of them judging shoes 109a to be a "YES" or a "NO" in that context (the a being the "YES" indication and the b being the "NO" indication). Such lack of strife with respect to each other over shoes 109a should be the case even when only one pair of shoes 109a is available to them and only one of them is able to act on their judgment of "YES" and buys shoes 109a.

In terms of the quantum representation, this means that their community subject states $|C_1\rangle$, $|C_2\rangle$ can produce a joint state that evolves, as indicated by arrow TE in FIG. 3I; without producing a flip or sign change. Such quantum states are also referred to as symmetric. The lack of any flip is indicated by the black and white dots that "travel" with the quantum mechanical state representations visualized by "balls" for illustration purposes, as they evolve in a unitary manner along Riemann surface RS. Differently put, there is no impediment to the co-existence of subject states $|C_1\rangle$, $|C_2\rangle$ in Hilbert space $\mathcal{H}^{(s1,s2)}$ while occupying the same quantum state vis-à-vis proposition 107 about shoes 109a. Indeed, subjects s1, s2 could accommodate even more community subjects that exhibit B-E consensus statistic modulo proposition 107 and judge shoes 109a as "YES" in the "beauty" context while only one of them can buy them (e.g., due to limited availability).

In practice, it may be difficult to discern that subjects s1, s2 are inclined to produce such cooperative or symmetric state modulo the exact same proposition 107 from data files 112 and communications found in traffic in network 104 and within social network 106. This is why creation module 117 has to review data files 112 as well as communications of community subjects s1, s2 containing indications exhibited in situations where both were present and modulo propositions as close as possible to proposition 107 about shoes 109a. The prevalence of "big data" as well as "thick data" that subjects produce in self-reports is very useful in this task. Furthermore, the human curator that understands the lives of both community subjects s1, s2 can help in reviewing and approving the proposed B-E consensus statistic for each subject modulo proposition 107 about shoes 109a.

Figure 3J:
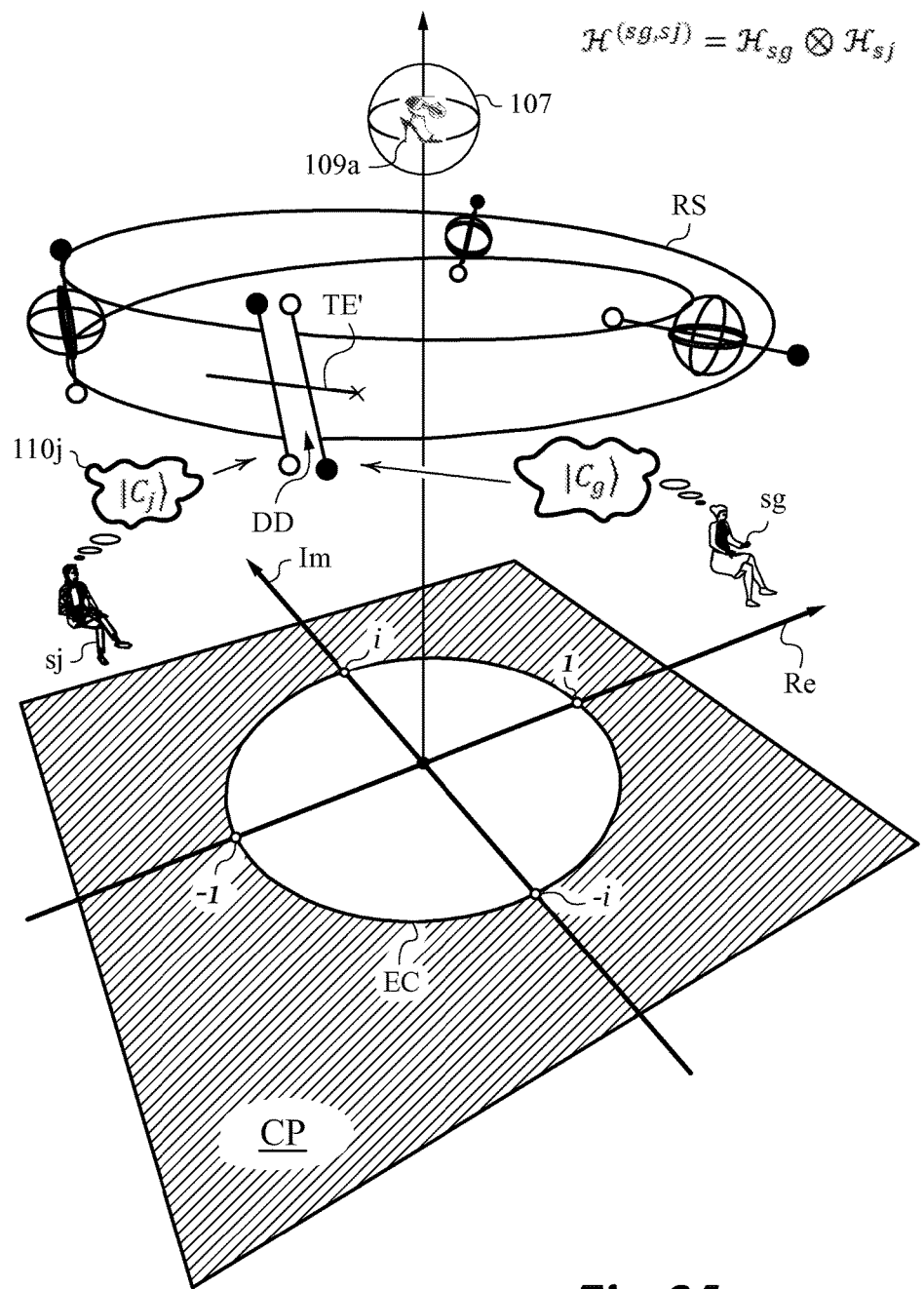
FIG. 3J is a complex diagram using a Riemann surface for the explication of F-D anti-consensus statistics of certain community subjects.

FIG. 3J illustrates two subjects sg and sj that exhibit F-D anti-consensus statistic. In terms of the quantum representation, this means that their community subject states $|C_g\rangle$, $|C_j\rangle$ inhabiting tensor space $\mathcal{H}^{(sg,sj)}=\mathcal{H}_{sg} \otimes \mathcal{H}_{sj}$ cannot produce a joint state in which both are on the same Riemann surface RS or in the same quantum state that evolves without producing a disruption due to a flip or sign change. The impediment is indicated by arrow TE' in FIG. 3J. The fact that there is an obstacle is also visually indicated by discontinuity DD in Riemann surface RS for two adjacent states to which we attempt to assign community subject states $|C_g\rangle$, $|C_j\rangle$.

The strictly pedagogical visualization is reinforced by the black and white dots that "travel" with the quantum mechanical state representations visualized by "balls" for illustration purposes. The dots indicate that the twist after completing one cycle or loop along Riemann surface RS prevents the two states from being identical while at the same time, however, producing an identical projection onto Euler circle EC. Differently put, there is an impediment to the co-existence of subject states $|C_g\rangle$, $|C_j\rangle$ in Hilbert space $\mathcal{H}^{(sg,sj)}$ while occupying the same quantum state vis-à-vis proposition 107 about shoes 109a.

Subjects sg, sj each exhibit F-D anti-consensus statistic and thus their wave function representations $|C_g\rangle$, $|C_j\rangle$ cannot be simultaneously placed in the same quantum state modulo proposition 107 about shoes 109a. Instead, they may only occupy this state individually. When subjects obeying F-D anti-consensus statistics do form joint states, they are not found in the exact same quantum state and their joint wave function is anti-symmetric. This is in analogy to fermions whose joint states are anti-symmetric.

Just to recall the physics assumptions being used herein, symmetric wave functions are associated with elementary (gauge) and composite bosons. Bosons have a tendency to occupy the same quantum state under suitable conditions (e.g., low enough temperature and appropriate confinement parameters). Fermions do not occupy the same quantum state under any conditions and give rise to the Pauli Exclusion Principle. For a short discussion of realms of validity of these assumptions in the context of the quantum representation of subject states the reader is referred again to U.S. patent application Ser. No. 14/224,041.

Again, it may be difficult to discern such competitive dynamic modulo the proposition 107 about the same pair of shoes 109a or the need for an anti-symmetric joint state from data files 112 and communications found in traffic propagating via network 104 and within social network 106. This is why creation module 117 has to review data files 112 as well as communications of community subjects sg, sj containing indications exhibited in situations where both were present and were confronted by propositions as close as possible to proposition 107 about shoes 109a. The prevalence of "big data" as well as "thick data" that subjects produce in self-reports is again very helpful. The human curator that understands the lives of both community subjects sg, sj should preferably exercise their intuition in reviewing and approving the proposed F-D anti-consensus statistic for each subject modulo proposition 107 about shoes 109a.

We now return to the operation of creation module 117 as shown in FIG. 3H. Once all subjects s1, s2, . . . , sj have their statistics determined to be either B-E consensus group 206 or F-D anti-consensus group 208 creation module 117 can properly posit them in community values space 210. All among community subject states $|C_k\rangle$ that belong to group 206 are created by bosonic creation operator at in step 210. All of those community subject states $|C_k\rangle$ that belong to group 208 are created by fermionic creation operator $\hat{c}^{\dagger}$ in step 212. All subjects states $|C_k\rangle$ are posited in their shared community values space 200 represented by community state space $\mathcal{H}^{(C)}$.

After the above steps are complete, mapping module 115 has mapped out community values space 200 in terms of its state space $\mathcal{H}^{(C)}$. Further, creation module 117 has posited the correct quantum representations of community subjects s1, s2, . . . , sj by corresponding quantum subject states $|C_k\rangle$ exhibiting proper consensus or anti-consensus behavior type. At this stage, assignment module 116 can deploy to finalize the quantum assignments and complete the quantum translation of the prediction or modeling task. A person skilled in the art will note that, depending on the embodiment, the distribution of functions between modules 115, 117 and 116 can be adjusted. Irrespective of the division of tasks, these modules need to share information to ensure that the most accurate possible quantum representation is achieved.

Assignment module 116 assigns community subject states $|C_k\rangle$ that are posited in community state space $\mathcal{H}^{(C)}$ to each one of community subjects s1, s2, . . . , sj. This is done based on the best available and most recent information from data files 112 as well as communications gleaned from network 104. To ensure data freshness, assignment module 116 is preferably connected to network behavior monitoring unit 120. The latter can provide most up-to-date information about subjects s1, s2, . . . , sj to allow assignment module 116 to assign the best possible estimates of states $|C_k\rangle$ at the start of a prediction or simulation run. A person skilled in the art may consider the actions of assignment module 116 to represent assignment of estimates and may indicate this by an additional notational convenience. In some cases a "hat" or an "over-bar" are used. In order to avoid undue notational rigor we will not use such notation herein and simply caution the practitioner that the assigned state vectors as well as matrix operators are estimates.

Figure 3K:
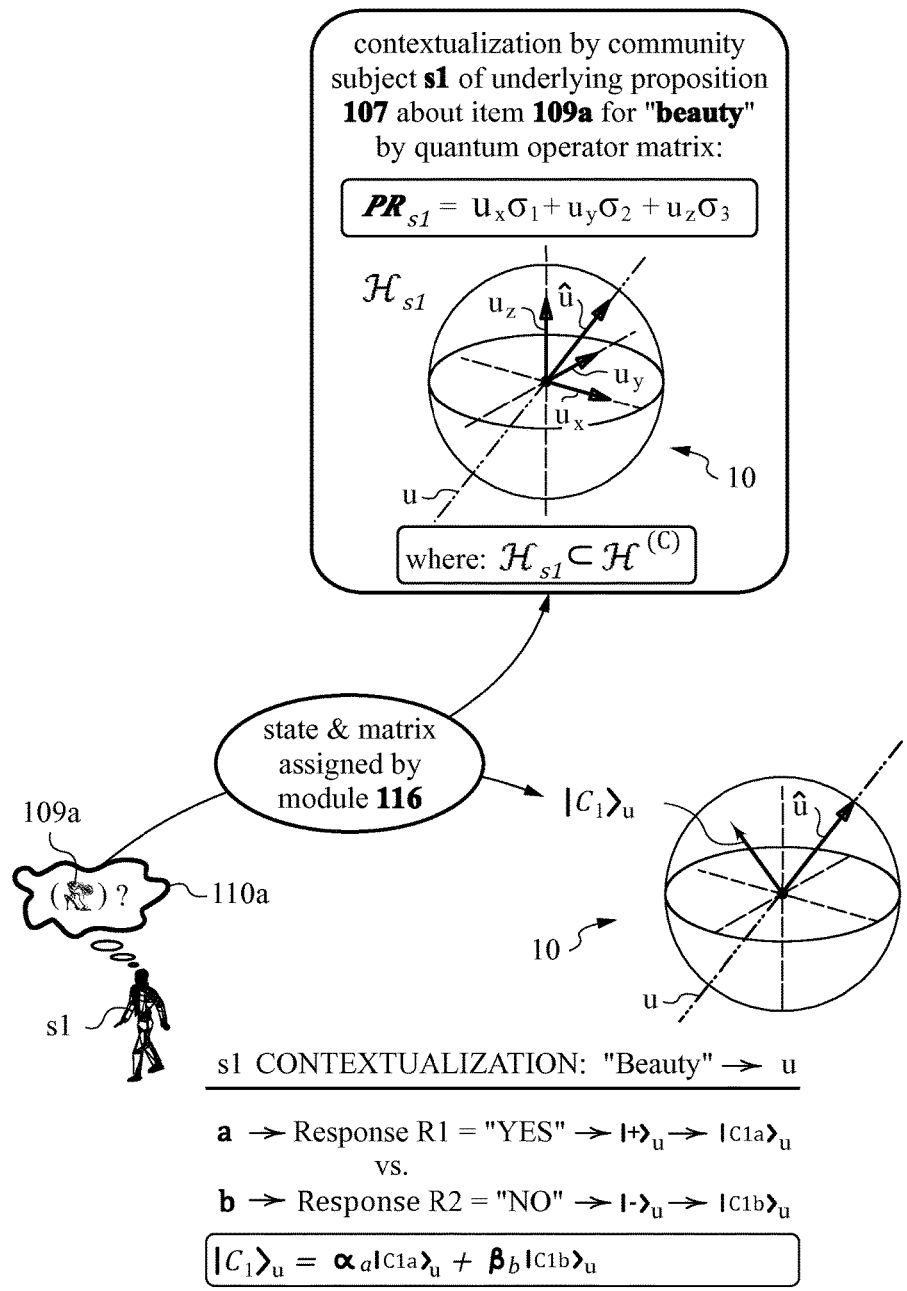
FIG. 3K is a diagram illustrating the assignment of estimated community subject state and contextualization (basis) to a first community subject by the assignment module belonging to the computer system shown in FIG. 2.

FIG. 3K shows the assignment by assignment module 116 of estimated community subject state $|C_1\rangle$ to first community subject s1. We again use the representation based on Bloch sphere 10 for clarity. The assigned estimate is valid for underlying proposition 107 about shoes 109a. Further the assignment reflects the contextualization by community subject s1 at a certain time and is subject to change as the state of the subject evolves. The practitioner is cautioned that states modulo certain propositions may, exhibit very slow evolution on human time scales, e.g., on the order of months or even years. On the other hand, states modulo some other propositions may evolve rapidly on human time scales. For example the change in state from "fight" to "flight" modulo an underlying proposition 107 about item 109 instantiated by a wild tiger can evolve on the order of split seconds. Therefore, in considering any particular proposition data freshness may be crucial to some predictions and simulations while barely at all for others. A review of estimates and their freshness by the human curator is thus recommended before commencing any prediction or simulation run.

In the present example, the contextualization of proposition 107 about shoes 109a by community subject s1 at the time of interest is from the point of view of an admirer who judges shoes 109a according to their own concept of "beauty". Possibly, community subject s1 is a connoisseur of shoes (professionally or as a hobby).

The measurable indications a, b in this case are not actions but two mutually exclusive responses that are denoted by R1, R2. These responses are "YES" for R1 and "NO" for R2. In general, measurable indications a, b transcend the set of just mutually exclusive responses that can be articulated in data files 112-s1 or otherwise transmitted by a medium carrying any communications generated by community subject s1. Such indications can include actions, choices between non-communicable internal responses, as well as any other choices that community subject s1 can make but is unable to communicate about externally. Because such choices are difficult to track, unless community subject s1 is under direct observation by another human that understands them, they may not be of practical use in the present invention. On the other hand, mutually exclusive responses that can be easily articulated by community subject s1 are suitable in the context of the present invention.

Before proceeding to explain the assignment shown in FIG. 3K in detail, we will first take some time to review the work performed by assignment module 116 as well as other parts of computer system 100 (see FIG. 2) to enable estimation of community subject state $|C_1\rangle$. This review will provide further grounding in the quantum mechanical concepts used for the quantum representation adopted herein.

For the two opposite measurable responses R1, R2 to proposition 107 about shoes 109a standing for "YES", "NO" in the context of "beauty", data files 112-s1 generated by community subject s1 can clearly be used to infer the most likely or expected measurable response. In the preferred mode of operation, network behavior monitoring unit 120 reviews data files 112-s1 from community subject s1 self-reporting on social network 106 without involving computer 114. Unit 120 by itself determines the occurrence of measurable indications "YES", "NO". It can then attach metadata to data files 112-s1 stored in memory 108 or otherwise communicate to computer 114 and thence to assignment module 116 the measurable indications "YES", "NO" that were manifested by community subject s1 with respect to shoes 109a. In other words, assignment module 116 can obtain processed data files 112-s1 already indicating the expected measured indication "YES" or "NO".

Operating in this mode network behavior monitoring unit 120 can curate what we will consider herein to be estimated quantum probabilities $p_a$, $p_b$ for the corresponding measurable indications a, b in this case represented by responses "YES" for R1 and "NO" for R2. These are the probabilities of observing the community subject s1 yield response "YES" or response "NO" to quantum measurement or an act of observation of community subject s1 modulo underlying proposition 107 about shoes 109a judged in the context of "beauty". Of course, a human expert curator or other agent informed about the human meaning of the posts provided by community subject s1 should be involved in setting the parameters on unit 120. The expert human curator should also verify the measurement in case the derivation of measurable indications actually generated is elusive or not clear from the posts in data files 112-s1. Such review by an expert human curator will ensure proper derivation of estimated quantum probabilities $p_a$, $p_b$. Appropriate human experts may include psychiatrists, psychologists, counselors and social workers with relevant experience.

In simple cases, measurable indications a, b such as responses "YES" and "NO" present unambiguously in data files 112-s1 and inference is not required. Under these conditions the use of unit 120 to curate estimated quantum probabilities $p_a$, $p_b$ may even be superfluous. Unambiguous data can be represented by direct answers or honest self-reports of measurable indications a, b by community subject s1. Alternatively, such data can present as network behaviors of unambiguous meaning, reported real life behaviors as well as strongly held opinions, beliefs or mores that dictate responses or actions. Since relatively pure quantum states should be sought for internal subject states, it is important that self-reports be unaffected by $3^{rd}$ parties and untainted by processing that involves speculative assignments going beyond curation of estimated quantum probabilities $p_a$, $p_b$ for community subject s1.

In some embodiments assignment module 116 may itself be connected to network 104 such that it has access to documented online presence and all data generated by community subject s1 in real time. Assignment module 116 can then monitor the state and online actions of community subject s1 without having to rely on archived data from memory 108. Of course, when assignment module 116 resides in a typical local device such as computer 114, this may only be practicable for tracking a few very specific community subjects or when tracking subjects that are members of a relatively small social group 106 or other small subgroups of subjects of known affiliations.

In the present example, proposition 107 about shoes 109a has two of the most typical opposite responses, namely "YES" and "NO". In general, however, mutually exclusive measurable indications or responses can also be opposites such as "high" and "low", "left" and "right", "buy" and "sell", "near" and "far", and so on. Proposition 107 may evoke actions or feelings that cannot be manifested simultaneously, such as liking and disliking the same item at the same time, or performing and not performing some physical action, such as buying and not buying an item at the same time. Frequently, situations in which two or more mutually exclusive responses are considered to simultaneously exist lead to nonsensical or paradoxical conclusions. Thus, in a more general sense mutually exclusive responses in the sense of the invention are such that the postulation of their contemporaneous existence would lead to logical inconsistencies and/or disagreements with fact.

In addition to the at least two mutually exclusive responses the model adopted herein presumes the possibility of a null response or "IRRELEVANT" 146, as already introduced above in FIG. 3B. Although community subject s1 has passed all the tests, it is important to recall that null response 146 expresses an irrelevance of proposition 107 to community subject s1 after his or her engagement with it or exposure thereto. In other words, null response 146 indicates a failure of engagement by community subject s1 with proposition 107. Null response 146 is assigned a classical null response probability $p_{null}$. In the present case, null response 146 corresponds to community subject s1 leaving shoes 109a at center of proposition 107 alone.

More generally, null response 146 to proposition 107 can be any non-sequitur response or action. The irrelevance of proposition 107 may be attributable to any number of reasons including inattention, boredom, forgetfulness, deliberate disengagement and a host of other factors. Experienced online marketers sometimes refer to such situations in their jargon as "hovering and not clicking" by intended leads that have been steered to the intended advertising content but fail to click on any offers. It is therefore advantageous to monitor subject s1 even after their selection (as detailed above), to ensure that he or she does not change their state 110a in such a way as to render proposition 107 irrelevant.

Whenever after exposure to proposition 107 community subject s1 reacts in an unanticipated way and no legitimate response can be obtained modulo proposition 107 then the prediction or simulation will be affected by such "non-results". Under these circumstances devoting resources to assigning their community subject state $|C_1\rangle$ and monitoring their expectation value becomes an unnecessary expenditure. Such non-response can be accounted for by classical null response probability $p_{null}$, and as also indicated in prior teachings (see U.S. patent application Ser. Nos. 14/182,281 and 14/224,041).

In preferred embodiments of computer system 100 and methods of the present invention, when dealing with a community of subjects it is preferable to remove non-responsive ones. Thus, when community subject s1 is observed to generate "non-results" creation module 117 is tasked with re-processing and undoing the creation of community subject state $|C_1\rangle$ in community state space $\mathcal{H}^{(C)}$. This is tantamount to removing community subject s1 in community values space 200 from the model. This action is also referred to as annihilation in the field of quantum field theory. It is here executed in analogy to its action in a field theory by the application of fermionic or bosonic annihilation operator ĉ or â (depending on whether subject state $|C_1\rangle$ was assigned B-E consensus or F-D anti-consensus statistic during its original creation). When community subject s1 does not generate the null response and instead personally experiences state 110a upon confrontation with underlying proposition 107 about shoes 109a then subject s1 is kept for purposes of predictions or simulations according to the invention.

The subject's s1 experience of proposition 107 about shoes 109a is considered to be an existing internal subject state. The quantum mechanical representation assigns this experience of state 110a to community subject state $|C_1\rangle$. Assignment module 116 uses data files 112-s1 from community subject s1 collected via network 104 to make the assignment. It also uses information from unit 120; namely the curated quantum probabilities $p_a$, $p_b$ and the corresponding expectation values.

Community subject state $|C_1\rangle$ is thus a model of internal state 110a. Given the precipitation type selected in the present example, internal state 110a admits of two possible mutually exclusive responses. To further simplify matters, it will be assumed in this example that subject s1 honestly self-reported in each data file 112-s1 shared on network 104 from their smartphone 102a (see FIG. 2). In other words, we do not assume in the present example any duplicity or incorrect reports.

In FIG. 3K community subject state $|C_1\rangle$ is shown on Bloch sphere 10 in the representation already reviewed in the background section. Community subject state $|C_1\rangle$ is conveniently expressed in a u-basis decomposition into two orthogonal subject state eigenvectors $|C1a\rangle_u$, $|C1b\rangle_u$ with two corresponding subject state eigenvalues $\lambda_a$, $\lambda_b$. To indicate the chosen decomposition we affix to subject state $|C_1\rangle_u$ the subscript "u" in FIG. 3K. The eigenvalues $\lambda_a$, $\lambda_b$ are taken to stand for the two mutually exclusive measurable indications a, b, that are mapped here to the "YES" response (R1) and "NO" response (R2) to proposition 107 about shoes 109a.

Figure 1K:
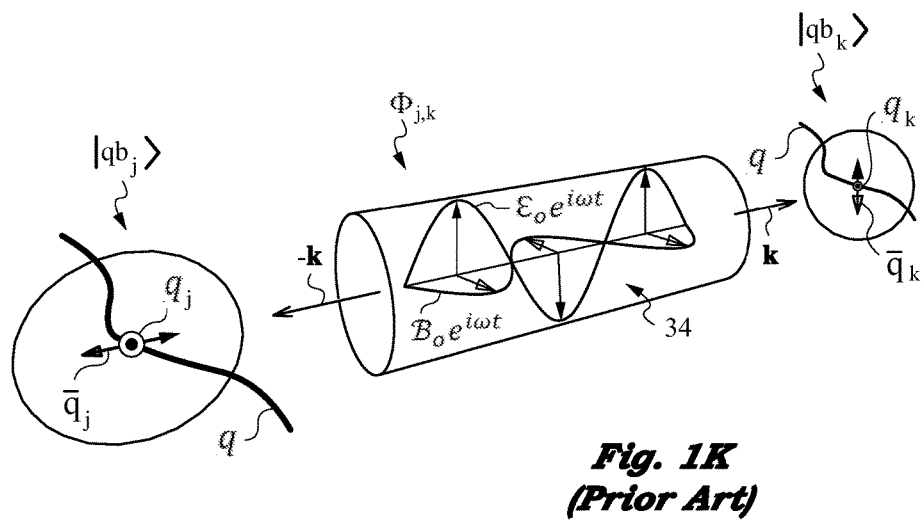
FIG. 1K (Prior Art) is a diagram visualizing in simplified terms the field interaction mechanism between two spatially separated states considered here as qubits.
Figure 1L:
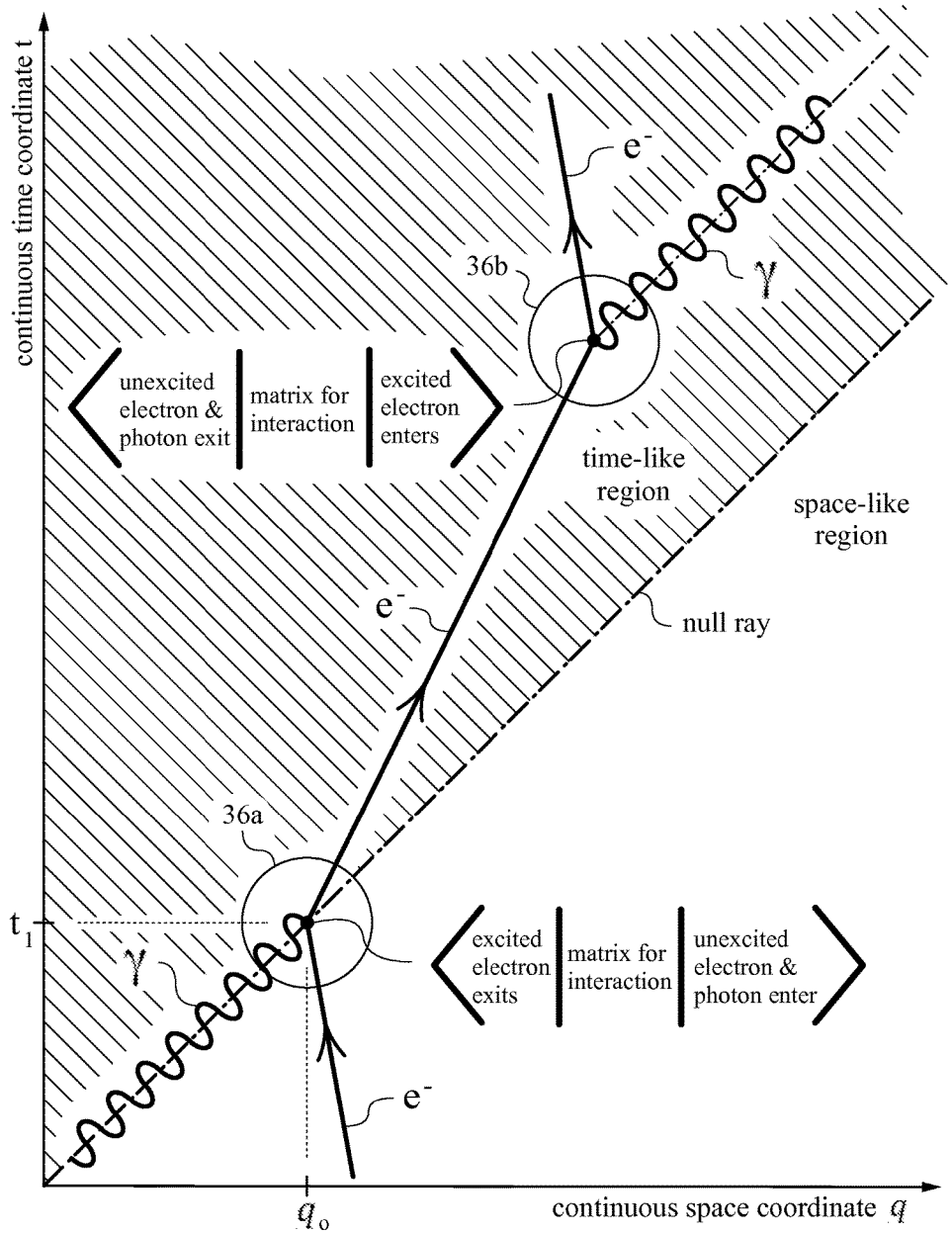
FIG. 1L (Prior Art) is a simplified Feynman diagram affording a closer look at interactions between an electron and the field embodied by its excitation mode: the photon γ.
Figure 1M:
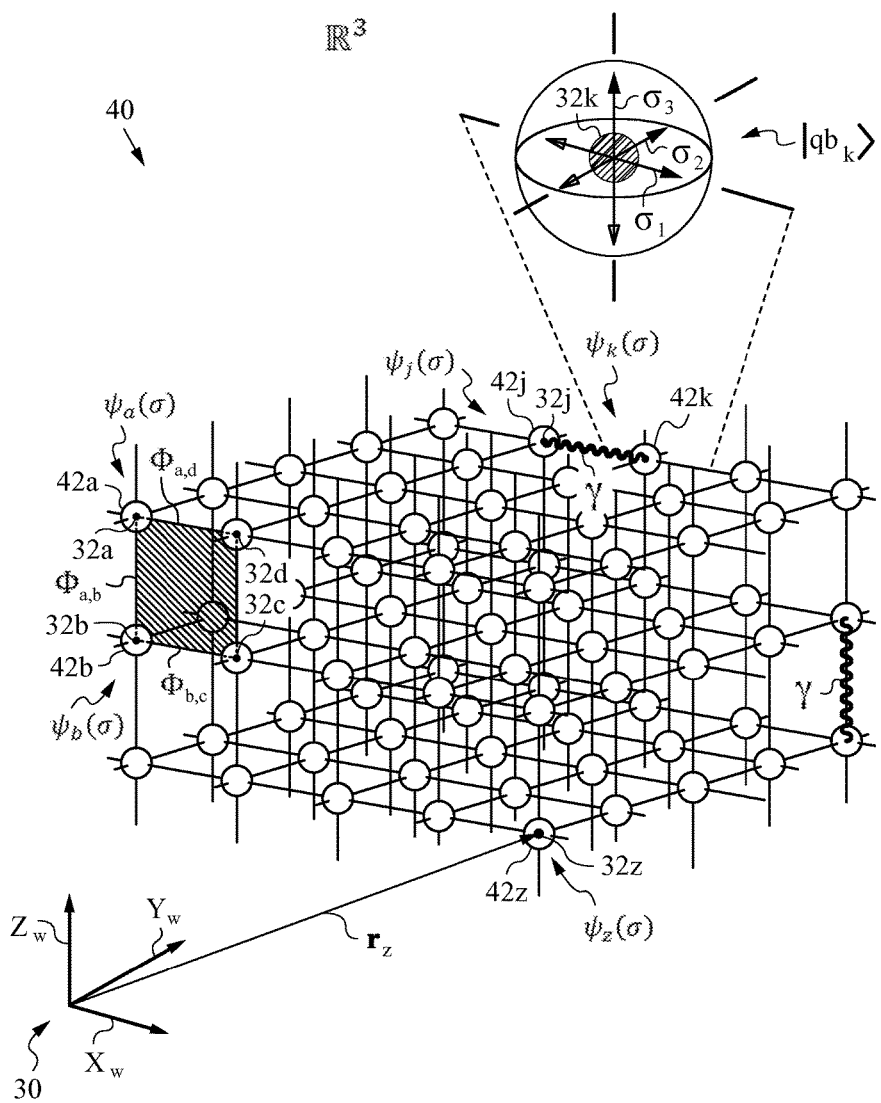
FIG. 1M (Prior Art) is a diagram of a rudimentary cubic lattice and the basic interactions it supports.
Figure 1N:
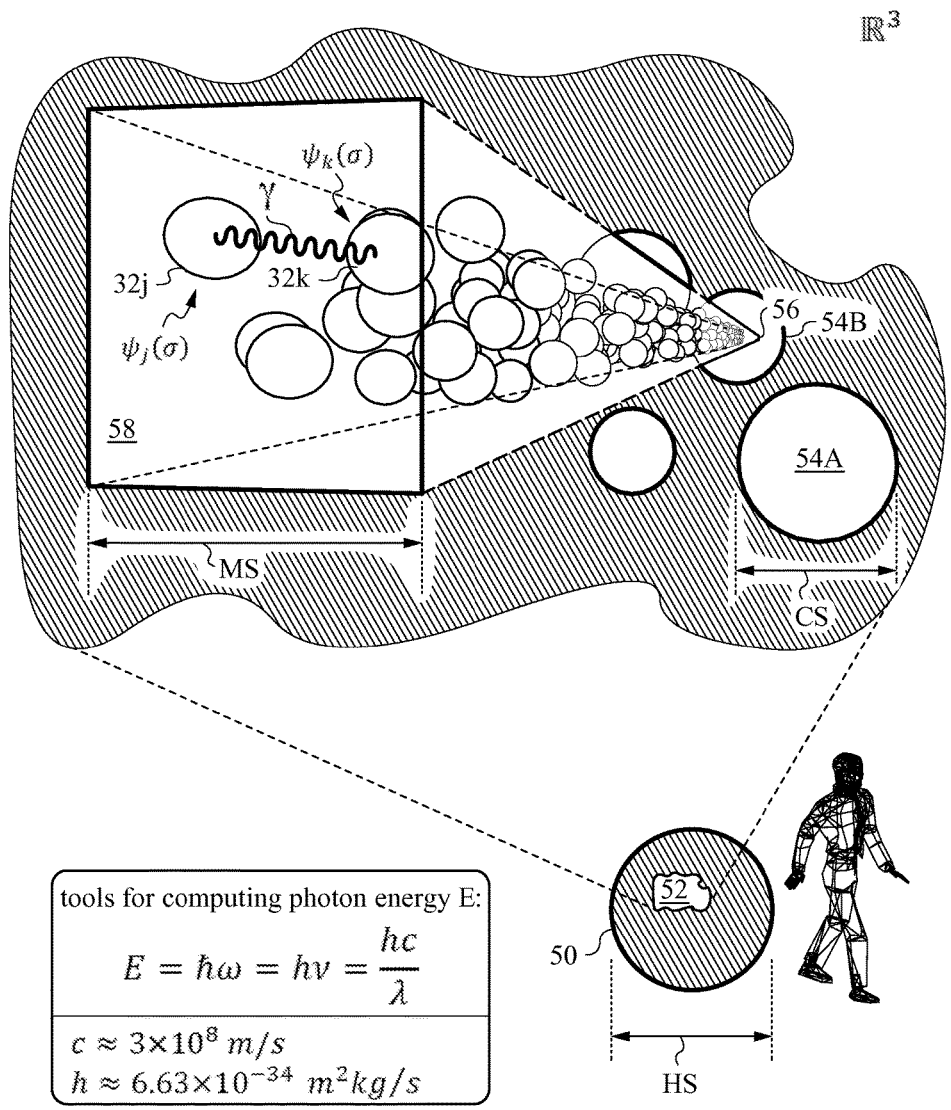
FIG. 1N (Prior Art) is a general diagram illustrating a few objects covering a size range from human scale (HS) to molecule scale (MS).

In our present practice, the chosen representation is a dyadic internal state 110a, where the two mutually exclusive parts of that state manifesting "YES" and "NO", map to the mutually exclusive eigenvectors of spin-up and spin-down. In other words, internal state 110a of community subject s1 breaks down into two mutually exclusive quantum states corresponding to judging shoes 109a to be beautiful and judging shoes 109a not to be beautiful. These mutually exclusive quantum states are mapped to the state vectors $|+\rangle_u$ and $|-\rangle_u$ in the u-basis as defined by unit vector û in FIG. 1K. To state it more directly, finding shoes 109a beautiful maps to eigenvector $|+\rangle_u$, while finding them not beautiful maps to eigenvector $|-\rangle_u$. To the extent that Bloch sphere 10 is used for representing community subject state assignments and other aspects of the invention including "unit vectors", the reader is again reminded that it serves for the purposes of better visualization (recall the limitations of quantum bit representations in real 3-dimensional space discussed in the background section).

The Bloch-sphere assisted representation of the assignment of community subject state $|C_1\rangle_u$ in the u-basis is shown in detail in the lower portion of FIG. 3K. Specifically, community subject state $|C_1\rangle_u$ is visualized in Bloch sphere 10 and its decomposition over the eigenvector states $|+\rangle_u$ and $|-\rangle_u$ is also indicated. The decomposition is similar to the decomposition of any state vector (see Eq. 7), but to properly reflect the fact that we are dealing with the quantum expression of community subject state $|C_1\rangle_u$ corresponding to community subject state 110a of community subject s1 the naming convention of the eigenvectors is changed to:

$$|C_1\rangle_u = \alpha_a |C1a\rangle_u + \beta_b |C1b\rangle_u. \qquad \text{Eq. 27a}$$

In adherence to the quantum mechanical model, the two subject state vectors $|C1a\rangle_u$, $|C1b\rangle_u$ are accepted into the model along with their two corresponding subject state eigenvalues $\lambda_a$, $\lambda_b$.

Given the physical entity on which community subject state $|C_1\rangle_u$ is based, namely either a fermion or a boson, the eigenvalues are either integral or half-integral. In the simplest case they are 1 and −1 or ½ and −½. Differently put, eigenvalue $\lambda_a=1$ (or ½) associates with finding shoes 109a beautiful internal state $|C1a\rangle_u$. Meanwhile, eigenvalue $\lambda_b=-1$ (or −½ associates with finding shoes 109a not beautiful internal state $|C1b\rangle_u$. Thus measurable indication a→R1→"YES" goes with spin-up along û (1) or state $|C1a\rangle_u$ for community subject s1. Measureable indication b→R2→"NO" goes with spin-down along û (−1) or state $|C1b\rangle_u$ for community subject s1.

Internal state 110a expressed by community subject state $|C_1\rangle_u$ indicated by the arrow is not along either of the two eigenstates $|C1a\rangle_u$, $|C1b\rangle_u$. Still, measurable indications or responses a, b do correspond to "finding shoes 109a beautiful action or response" such as "YES", and "finding shoes 109a not beautiful action or response" such as "NO". The reason for not simply equating measurable indications or responses a, b with internal states or eigenstates into which community subject state $|C_1\rangle_u$ decomposes is because indications or responses are measurable quantities. These are in fact the physically observable actions or responses community subject s1 exhibits. Hence, actions or responses a, b must map to observable eigenvalues and not eigenvectors, which are not physically observable. The latter are assigned to unobservable quantum mechanical state vectors in the spectral decomposition of community subject state $|C_1\rangle_u$; i.e., subject states $|C1a\rangle_u$, $|C1b\rangle_u$.

In accordance with the projection postulate of quantum mechanics, measurement modulo proposition 107 will cause community subject state $|C_1\rangle_u$ to "collapse" to just one of the two states or eigenvectors $|C1a\rangle_u$, $|C1b\rangle_u$. Contemporaneously with the collapse, community subject s1 will manifest the eigenvalue embodied by the measurable action or response, a or b, associated with the correspondent eigenvector to which community subject state $|C_1\rangle_u$ collapsed. Under a test situation, such as the one posed before community subject s1 by underlying proposition 107 about shoes 109a, there is an unambiguous distinction between "finding shoes 109a beautiful action or response" such as "YES", and "finding shoes 109a not beautiful action or response" such as "NO".

A typical indication or response a is to unambiguously, e.g., as defined by social norms and conventions, judge shoes 109a to be beautiful. This also means that at the time indication a of judging shoes 109a to be beautiful by community subject s1 were measured, the internal state of community subject s1 would have "collapsed" to community subject state vector $|C1a\rangle_u$. Meanwhile, under the same test situation that unambiguously distinguishes between "YES" and "NO" responses, indication or response b of not judging shoes 109a to be beautiful corresponds clearly to the response associated with community subject state vector $|C1b\rangle_2$.

In case community subject s1 judged shoes 109a not beautiful (indication b) the explanation suggested by quantum mechanics is that at the time indication b was measured on in reality or as evidenced by the most recent data file 112-s1, the internal space, awareness, thought or any ethical considerations, all of which are pragmatically reduced and assigned to internal state 110a of community subject s1 in the present quantum representation, was "collapsed" to community subject state $|C1b\rangle_2$. This projection means that the new state 110a at the time of measurement and shortly thereafter (before any appreciable evolution of state) is represented by measured community subject state $|C1b\rangle_u$ containing just the state vector $|C1b\rangle_u$, or simply put:

$$|C_1\rangle_u = |C1b\rangle_u.\qquad\text{Eq. 27b}$$

By contrast, before measurement internal state 110a of community subject s1 was still represented by the full, "un-collapsed" state vector or $|C_1\rangle_u$ as indicated by the arrow and as described by Eq. 27a.

Despite the potential suggestive nature of the quantum mechanical representation for the internal states of the human mind, we reiterate here that the present invention does not presume to produce a formal mapping for those. Instead, the present invention is an agnostic application of the tools offered by quantum mechanical formalisms to produce a useful approach of practical value.

Since community subject state $|C_1\rangle_u$ is expressed in the chosen u-basis decomposition as $|C_1\rangle_u = \alpha_a|C1a\rangle_u + \beta_b|C1b\rangle_u$ (see Eq. 27a) where $\alpha_a$ and $\beta_b$ are the complex coefficients characteristic of this spectral decomposition, it is easy to mathematically express quantum probabilities $p_a$, $p_b$ of the two outcomes. Specifically, referring back to Eq. 3, the quantum probabilities are just $p_a = \alpha_a^* \alpha_a$ and $p_b = \beta_b^* \beta_b$. In embodiments where network behavior monitoring unit 120 (see FIG. 2) is used for curating estimated quantum probabilities $p_a$, $p_b$, these are now taken to be equal to the complex coefficient norms $\alpha_a^* \alpha_a$ and $\beta_b^* \beta_b$. It is the norms that express the probabilities of observing internal state 110a of community subject s1 yield measurable indications a, b ("YES", "NO") in response to a quantum measurement or, more mundanely put, the act of observation of internal state 110a induced by confrontation with underlying proposition 107 about shoes 109a. (Although a rigorous approach might introduce a "hat" or other mathematical notation to differentiate between estimates of probabilities $\hat{p}_a$, $\hat{p}_b$ and their actual values $p_a$, $p_b$, this degree of sophistication will not be practiced herein. It is important, however, that a skilled practitioner keep the distinction in mind to avoid making common mistakes in implementing the apparatus and methods of the invention.)

We note here, that unlike the classical descriptions, the present quantum representation necessarily hides the complex phases of complex coefficients $\alpha_a$, $\beta_b$. In other words, an important aspect of the model remains obscured. Yet, we can confirm the values of the probabilities by observation. For example, by performing several measurements of the same measurable indications a, b on a number of community subjects with the same measurable indications a, b as community subject s1. In the language of quantum mechanics, we are just re-measuring quantum states $|C1a\rangle_u$, $|C1b\rangle_u$ that are mapped to "finding shoes 109a beautiful", "finding shoes 109a not beautiful" and yield measurable indications a, b with the quantum probabilities $p_a$, $p_b$, respectively.

The hidden information contained in the complex phases of coefficients $\alpha_a$, $\beta_b$ is a benign aspect of the quantum model for as long as we are considering the same internal state 110a from the same vantage point. Namely, contextualized from the vantage point of judging "beauty" of shoes 109a. In the language of quantum mechanics, complex phases will not become noticeable until we choose to look at subject s1 and their measurable indications of internal state 110a in a different basis (i.e., not in the u-basis shown in FIG. 3K but in some basis where the mutually exclusive states in terms of which internal state 110a is described are, say: "finding shoes 109a stylish", "finding shoes 109a not stylish"). The reader is invited to review FIG. 1G and associated description in the background section to appreciate the reasons for this. Further issues having to do with a change of basis with respect to the underlying proposition are treated below.

As depicted in FIG. 3K, assignment module 116 also performs another assignment dictated by the quantum model adopted herein by generating community subject's s1 value matrix $PR_{s1}$. Matrix $PR_{s1}$ is the quantum mechanical representation of underlying proposition 107 about shoes 109a as it presents itself in "beauty" context to community subject s1. This is done by ensuring that its two eigenvectors are just the two mutually exclusive states $|C1a\rangle_u$, $|C1b\rangle_u$ in the u-basis.

In the quantum mechanical representation, it is the application of the "beauty" value matrix $PR_{s1}$ to community subject state $|C_1\rangle_u$ that causes the "collapse" to one of the eigenvectors $|C1a\rangle_u$, $|C1b\rangle_u$. The latter are paired with their eigenvalues that correspond to the two mutually exclusive measurable indications or responses a, b that subject s1 can manifest when confronted by proposition 107. More formally, value matrix $PR_{s1}$ is intended for application in community subject Hilbert space $\mathcal{H}_{s1}$ that is a subset of community values state space $\mathcal{H}^{(C)}$. In the process of collapsing the wavepacket (see projection postulate in background section) the action of "beauty" value matrix $PR_{s1}$ will extract the real eigenvalue corresponding to the response eigenvector to which community subject state $|C_1\rangle_u$ collapsed under measurement. Immediately after measurement state $|C_1\rangle_u$ will be composed of just the one response eigenvector to which it collapsed with quantum probability equal to one. In other words, immediately after measurement for a time period $\tau$ during which no appreciable change can take place (i.e., no decoherence through interaction with the environment that notably includes other members of the community or unitary evolution) we can only have either $|C_1\rangle_u=|C1a\rangle_u$ for sure, or $|C_1\rangle_u=|C1b\rangle_u$ for sure.

The quantum mechanical prescription for deriving the proper operator or "beauty" value matrix $PR_{s1}$ has already been presented in the background section in Eq. 13. To accomplish this task, we require knowledge of the decomposition of unit vector $\hat{u}$ into its x-, y- and z-components as well as the three Pauli matrices $\sigma_1$, $\sigma_2$, $\sigma_3$. By standard procedure, we then derive value matrix $PR_{s1}$ as follows:

$$PR_{s1}=\hat{u}\cdot\bar{\sigma}=u_x\sigma_1+u_y\sigma_2+u_z\sigma_3, \quad \text{Eq. 28a}$$

where the components of unit vector $\hat{u}$ ($u_x,u_y,u_z$) are shown in FIG. 3K for more clarity.

Armed with the quantum mechanical representation thus mapped, many computations and estimations can be undertaken. The reader is referred to the co-pending application Ser. Nos. 14/182,281 and 14/224,041 for further teachings about the extension of the present quantum representation to simple measurements. Those teachings also encompass computation of outcome probabilities in various bases with respect to different propositions typically presented to just one or two subjects. The teachings partly rely on trying to minimize the effects from interactions between the environment and the state that stands in for the subject of interest. The present teachings, however, will now depart from the direction charted in the aforementioned co-pending applications. Instead, we will now focus on the relationship and behavior of wave functions of all community subjects vis-à-vis an underlying proposition and quantum interactions that may affect additional subject of interest that are not members of the community.

Figure 3L:
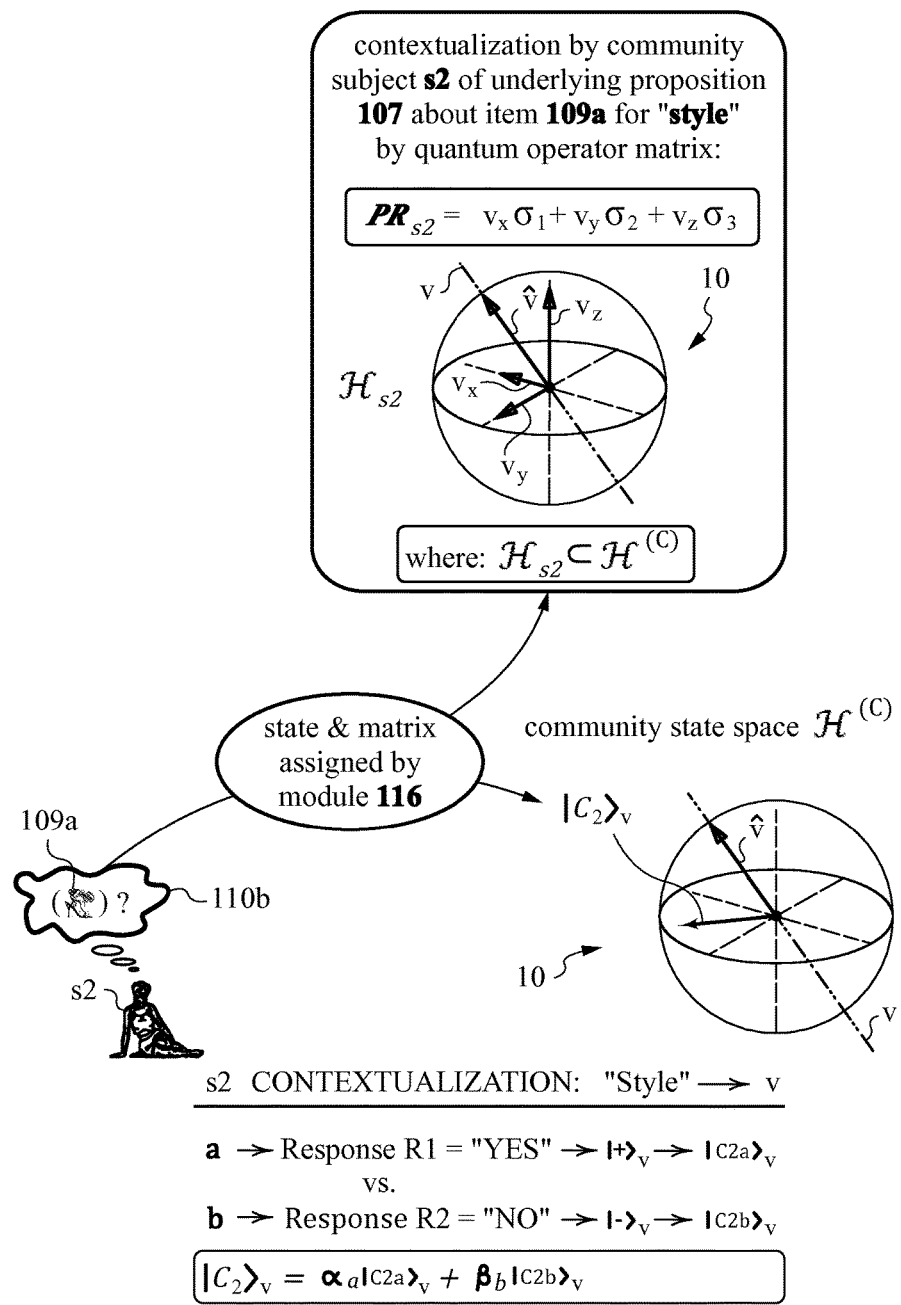
FIG. 3L is a diagram illustrating the assignment of estimated community subject state and contextualization (basis) to a second community subject by the assignment module belonging to the computer system shown in FIG. 2.

To understand the foundations behind the construction of joint quantum states involving two or more community subjects in the sense of the invention we turn to the diagram in FIG. 3L. Here, the same underlying proposition 107 about shoes 109a is presented to community subject s2. In other words, at this stage we also need to consider community subject s2 in light of underlying proposition 107 about shoes 109a. Just to recall, community subject s1 manifested measurable action b indicated by response R2 or "NO" associated with their internal state of "not finding shoes 109a beautiful". This action was quantum mechanically represented by community subject state $|C_1\rangle_u=\alpha_a|C1a\rangle_u+\beta_b|C1b\rangle_u$ being "collapsed" to the final or measured transmit subject qubit $|C_1\rangle_u=|C1b\rangle_u$ (see Eqs. 27a-b). Just as a reminder, prior to measurement this result would have been expected with quantum probability $p_b=\beta_b^*\beta_b$.

Community subject s2 learns of proposition 107 in any manner and may also learn of the response of community subject s1. The manner of transmission of relevant information is either via network 104, social network 106 or by any other medium including direct subject-to-subject communications in real life, as already mentioned above. What is important is that community subject s2 be correctly appraised of underlying proposition 107 about shoes 109a. As pointed out above, measurable indication is broadly defined based on knowledge of human subjects, preferably vetted by a skilled curator, and it can include an action, a choice or a response made openly or even internally.

It is not customary among human community subjects to include as part of information about their responses or actions the frame of mind or contextualization of underlying proposition 107 in which they made or will make their responses or actions. In other words, human subjects do not usually specify the context in which they are considering any given proposition. Especially among subjects who know each other such as community subjects s1, s2, . . . , sj it is frequently assumed by social convention that the context will be apparent. Vernacular expressions indicate this tacit understanding of context by sayings such as: "being on the same page", "being synced", "getting each other" and the like. What this means in the present quantum representation of underlying proposition 107 is that the way that community subject s1 contextualizes it, namely their choice of u-basis standing for "beauty" in our quantum representation, may be taken for granted by other community subjects who know subject s1.

Whether community subject s2 does or does not know the context, or equivalently the "beauty" u-basis adopted by community subject s1, it is likely that their own contextualization of underlying proposition 107 will differ from the one used by community subject s1 anyway. It should be noted that in very controlled communities where there is "pressure" to conform and choose the same basis or context by all members this may not be the case as often as in the case of more free communities.

We consider the general case, in which community subject s2 adopts their own v-basis that represents contextualization by "style". This contextualization is thus used by assignment module 116 in assigning community subject state $|C_2\rangle$ to community subject s2. In other words, community subject state $|C_2\rangle$ is decomposed in v-basis into eigenvectors of the v-basis rather than in the u-basis. Of course, it is possible that community subject s2 could have adopted the same u-basis by choice or by necessity of circumstances.

Meanwhile, the Bloch-sphere assisted representation of the assignment of community subject state $|C_2\rangle_v$ by assignment module 116 in the v-basis is shown in detail in the lower portion of FIG. 3L. Specifically, community subject state $|C_2\rangle_v$ is visualized in Bloch sphere 10 in its decomposition over the eigenvector states $|+\rangle_v$ and $|-\rangle_v$. Again, the decomposition is analogous to the decomposition of a typical two-level system (see Eq. 7). To reflect that we are dealing here with community subject state $|C_2\rangle_v$ corresponding to internal subject state 110b of community subject s2 the naming convention of the eigenvectors is changed to:

$$|C_2\rangle_v=\alpha_a|C2a\rangle_v+\beta_b|C2b\rangle_v. \quad \text{Eq. 27c}$$

In adherence to the quantum mechanical model, the two subject state vectors $|C2a\rangle_v$, $|C2b\rangle_v$ are accepted into the model along with their two correspondent subject state eigenvalues $\lambda_a$, $\lambda_b$. Furthermore, community subject state $|C_2\rangle_v$ is placed in a community subject Hilbert space $\mathcal{H}_{s2}$ which is a subset of the large community state space $\mathcal{H}^{(C)}$ that is obtained from the tensor product of state spaces of all community subjects s1, s2, ..., sj. This is also in keeping with the treatment of first community subject's s1 state $|C_1\rangle_u$.

Notice that just as in the case of community subject state $|C_1\rangle_u$ of subject s1 in the u-basis, the representation of internal state 110b is dyadic. In other words, the representation postulates two mutually exclusive states that subject state $|C_2\rangle_v$ can assume; they are represented by the two orthogonal eigenvectors vectors $|C2a\rangle_v$, $|C2b\rangle_v$. Because community subject s2 contextualizes shoes 109a contained in underlying proposition 107 differently from community subject s1, the eigenvectors of the two quantum representations of the internal states of these subjects are different. However, the eigenvalues associated with either pair of eigenvectors are the same. In other words, the measurable indications or responses a, b that stand in for the eigenvalues $\lambda_a$, $\lambda_b$ associated with the eigenvectors are identical for both community subject state $|C_2\rangle_v$ of subject s2 and for community subject state $|C_1\rangle_u$ of subject s1. Thus, both community subjects s1, s2 will yield as measurable or observable outcome either a "YES" or "NO" indication with respect to shoes 109a. The ability to model such a complex situation yielding the same indications or responses a, b is due to the inherent richness of the quantum representation as adopted herein.

To elucidate why the quantum mechanical representation can accomplish this, we turn our attention to internal state 110b of community subject s2 prior to measurement. This state is expressed by subject state $|C_2\rangle_v$ composed of two eigenstates $|C2a\rangle_v$, $|C2b\rangle_v$ which associate with a different context and thus carry different meanings than eigenstates $|C1a\rangle_u$, $|C1b\rangle_u$. However, their measurable indications or responses a, b still correspond to "YES" and "NO". A skilled human curator will recognize at this point that this situation is quite common. Different contexts frequently assign different meanings to the exact same actions, choices or responses (subsumed herein by the broader definition of indications).

In our example, the contextualization of community subject s2 in the v-basis corresponds to judging shoes 109a "to have style" being assigned to eigenstate $|C2a\rangle_v$. Judging shoes 109a "not to have style" is assigned to eigenstate $|C2b\rangle_v$. The actions or responses a, b still involve a "YES" and a "NO" indication.

It is important that the assignment of community subject states by assignment module 116 be reviewed to ensure that it properly reflects real experiences. Thus, a human curator should vet the initial choice of these state vectors, their decompositions and the associated eigenvalues. As indicated above, contextualization in some spaces may require more than just two eigenvectors (in spaces that are higher-dimensional). It is further preferable to confirm the choices made as well as the human meanings of the bases (contexts) and of the possible actions (eigenvalues) by measurements over large numbers of community subjects. Such confirmatory tests of the assignments should use commutator algebra to estimate relationships between different bases with respect to the same underlying proposition. The corresponding review of data to tune the assignment module's 116 assignment of community subject states, their decompositions and eigenvalues can be performed by the network behavior monitoring unit 120. Several of these issues are discussed in the co-pending application Ser. No. 14/182,281 and the reader is invited to refer thereto for further information.

FIG. 3L shows judging shoes 109a "to have style" eigenstate W24 mapped to the state vector $|+\rangle_v$ and judging shoes 109a "not to have style" eigenstate $|C2b\rangle_v$ mapped to the state vector $|-\rangle_v$ in the v-basis as defined here by unit vector $\hat{v}$. Further, given the physical entity on which community subject state $|C_2\rangle_v$ is based, namely either a fermion or a boson, the eigenvalues are either integral or half-integral (1 and −1 or ½ and −½). Measurable indication a→"YES" goes with spin-up along $\hat{v}$ or state $|C2a\rangle_v$ of community subject s2. Measurable indication b→"NO" goes with spin-down along $\hat{v}$ or state $|C2b\rangle_v$ of community subject s2.

The quantum mechanical prescription for deriving community subject's s2 "style" value matrix $PR_{s2}$ has already been presented in the background section in Eq. 13. Moreover, "beauty" value matrix $PR_{s1}$ used by community subject s1 was derived above by following this prescription. Hence, given the decomposition of unit vector $\hat{v}$ into its x-, y- and z-components as well as the three Pauli matrices $\sigma_1$, $\sigma_2$, $\sigma_3$ we obtain:

$$PR_{s2} = \hat{v} \cdot \vec{\sigma} = v_x \sigma_1 + v_y \sigma_2 + v_z \sigma_3. \qquad \text{Eq. 28b}$$

The components of unit vector $\hat{v}$ ($v_x, v_y, v_z$) are shown in FIG. 3L for clarity.

Prior to measurement, internal state 110b of community subject s2 is already represented by community subject state $|C_2\rangle_v$. This is the same as in the case of internal state 110a of community subject s1 prior to his or her measurement. The pre-measurement state is exactly the state we found described by community subject state $|C_2\rangle_v$ of Eq. 27c. Measurement, which corresponds to the application of "style" value matrix $PR_{s2}$ to the state in Eq. 25c, will yield one of the two eigenvectors or eigenstates $|C2a\rangle_v$, $|C2b\rangle_v$ with quantum probabilities as discussed above (also see Eq. 3). The measurement will further result in community subject s2 manifesting the measurable indication a or b assigned to the eigenvalue that goes with the eigenstate into which the subject's s2 quantum state $|C_2\rangle_v$ "collapsed".

At some time, upon receipt of proposition 107 about shoes 109a measurement of community subject s2 in their "style" contextualization will be provoked. Once again, however, there exists a certain probability, in addition to recording one of the two mutually exclusive measurable indications a, b ("YES", "NO"), of obtaining null response or "IRRELEVANT" 146 (see FIG. 3B). As before, null response 146 expresses an irrelevance of proposition 107 to community subject s2. This irrelevance causes non-responsiveness of subject s2. As before, null response 146 or non-response can be handled by assigning a classical null response probability $p_{null}$ that affects event probability $\gamma$ monitored by statistics module 118 (see FIG. 2). Preferably, however, upon determining that community subject s2 does not care about shoes 109a for whatever reason, creation module 117 simply removes subject s2 from consideration, just as it did for subject s1, by applying the correspondent fermionic or bosonic annihilation operator.

We are interested in cases where community subject s2 does care and is provoked to measurement when confronted by underlying proposition 107. The measurement of community subject s2 modulo proposition 107 as contextualized by community subject s2 in the v-basis is also modeled herein based on the quantum mechanical projection postulate. Specifically, measurement will cause community subject state $|C_2\rangle_v$ to "collapse" to just one of the two states or eigenvectors $|C2a\rangle_v$, $|C2b\rangle_v$. Contemporaneously with the collapse, community subject s2 will manifest the eigenvalue embodied by the response, a "YES" or b "NO", associated with the correspondent eigenvector to which community subject state $|C_2\rangle_v$ collapsed.

In our case, community subject s2 chose the judging shoes 109a "to not be stylish" internal state 110b that goes with measurable indication b→"NO". Thus, their original internal state 110b represented by community subject state $|C_2\rangle_v$ was "collapsed" to subject state vector $|C2b\rangle_v$. This projection means that the new state 110b is represented by measured community subject state $|C_2\rangle_v$ containing just the subject state vector $|C2b\rangle_v$ or simply put:

$$|C_2\rangle_v = |C2b\rangle_v. \quad \text{Eq. 27d}$$

We are very interested in situations where subjects interact and agree or disagree about underlying propositions. We are also interested in the ways in which subjects contextualize the underlying propositions centered about objects, other subjects or experiences. Further, we are interested in situations where subjects change contexts and even adopt the same context with respect to the proposition (possibly through mutual interaction such as an open conversation). The mutually adopted context could be that of either subject or a new context that may be arrived at through negotiation.

By following the above rules, assignment module 116 proceeds to assign community subject states $|C_k\rangle$ for all of community subjects s1, s2, . . . , sj that constitute the community. In doing so, it also verifies that community subjects s1, s2, . . . , sj do not to show null response with respect to underlying proposition 107 (and are thus not disqualified by creation module 117). In doing this, module 116 assigns states $|C_k\rangle$ for each community subject in their eigenbasis or based on the best estimate of their contextualization of underlying proposition 107. This means that module 116 also produces the corresponding value matrices $PR_{s1}$, $PR_{s2}$, . . . , $PR_{sj}$ for all community subjects s1, s2, . . . , sj.

Clearly, community subjects s1, s2, . . . , sj will all generally have slightly different value matrices $PR_{s1}$, $PR_{s2}$, . . . , $PR_{sj}$ modulo underlying proposition 107 about shoes 109a. For some embodiments of the invention it is advantageous, however, to average these value matrices in some manner to arrive at just a few of them or even just one that embodies the community values. In other words, it is convenient to measure a mean measurable indication modulo underlying proposition 107 as exhibited by the community of interest. Thus, assignment module 116 is tasked with assigning a community value matrix $PR_C$ that is computed based on a mean measurable indication.

Figure 3M:
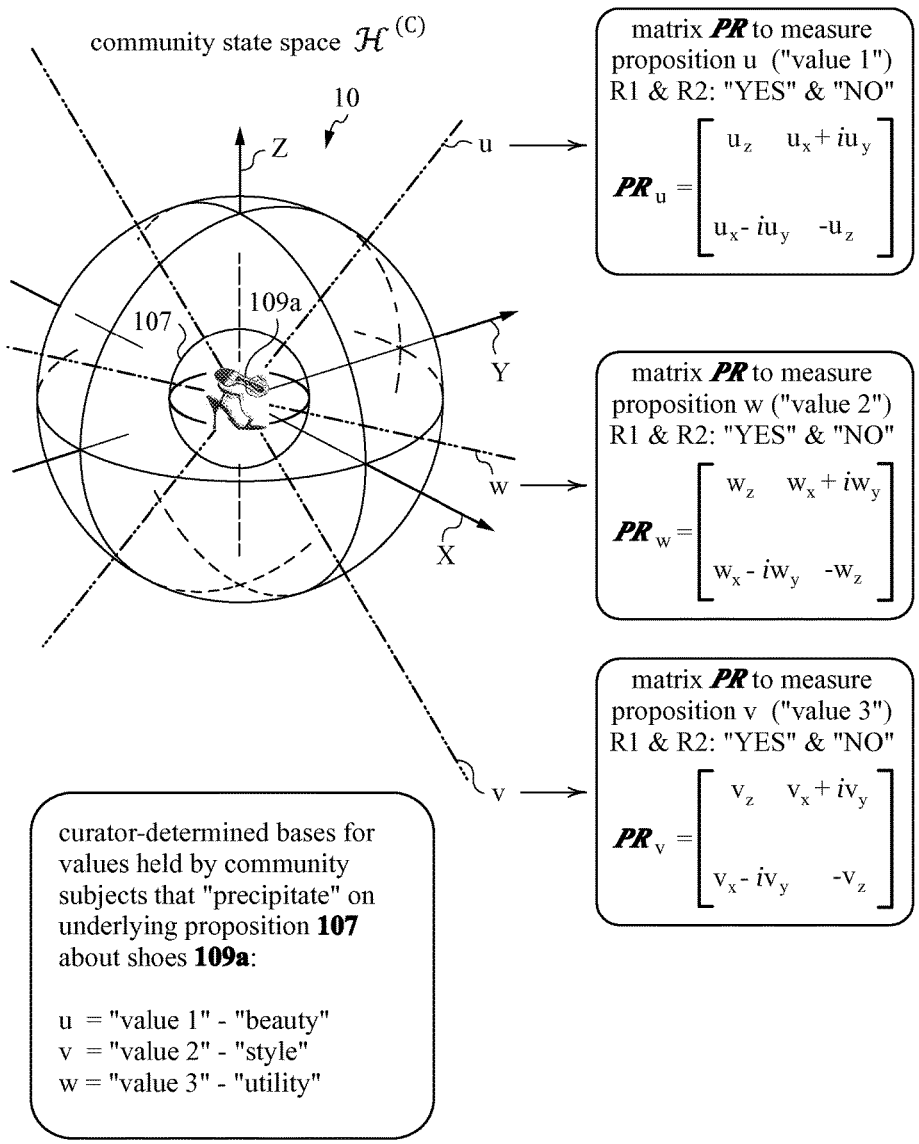
FIG. 3M is a diagram visualizing the first part of the derivation of the community value matrix based on the contextualizations found among community subjects.

FIG. 3M illustrates the process of obtaining such community value matrix $PR_C$ specifically for the case of proposition 107 about shoes 109a. For clarity of explanation, we presume that all community subjects s1, s2, . . . , sj use just one of three value matrices. The first two of these are the "beauty" and "style" or $PR_{s1}$ and $PR_{s2}$ value matrices used by community subjects s1 and s2. For notational convenience, in FIG. 3M these value matrices are re-labeled according to their u- and v-bases as $PR_u$ and $PR_v$.

The third value matrix $PR_w$ in the w-basis discovered for some of community subjects s3, s4, . . . , sj represents a third value of "utility". In other words, community subjects s1, s2, . . . , sj look at underlying proposition 107 about shoes 109a and contextualize it from the viewpoint of "beauty", "style" or "utility". All three corresponding value matrices $PR_u$, $PR_v$, $PR_w$ are shown in their full form in FIG. 3M. Of course, these are the best estimates of the matrices. In setting down the final estimates it is important that the human curator be involved in reviewing and vetting the bases and the values they designate.

The vetting of value matrices $PR_u$, $PR_v$, $PR_w$ is performed by reviewing all data files 112 generated by community subjects s1, s2, . . . , sj and any other communications that contain data relevant to proposition 107. In fact, similar propositions to proposition 107 can be used by the human curator as well. For example, data related to other types of footwear or articles of clothing can be reviewed by the human curator to ascertain that value matrices $PR_u$, $PR_v$, $PR_w$ are indeed the best estimates for those that community subjects s1, s2, . . . , sj are expected to use when confronted by proposition 107 about shoes 109a.

Preferably, of course, all communications between community subjects s1, s2, . . . , sj, including communications of important choices such as those concerning shoes 109a in particular, are mediated by network 104. In this preferred situation, the resources of computer system 100 will be able to make better predictions and aid the human curator more reliably. Indeed, the quantum mechanical representation adopted herein relies on the availability of data about community subjects s1, s2, . . . , sj and preferably in large quantities. This means not only "big data" in the sense or large data sets, but also "thick data" for each one of community subjects s1, s2, . . . , sj to validate their value matrix. Data freshness also has to be considered, since community values and hence the matrices used to represent them are likely to change over time. Therefore, corroboration of best estimates of matrices $PR_u$, $PR_v$, $PR_w$ with the freshest data, i.e., most recent data files 112 from community subjects s1, s2, . . . , sj is highly desirable.

Once all the bases are vetted and confirmed, assignment module 116 can proceed to the next step and compute the overall community value matrix $PR_C$ from value matrices $PR_u$, $PR_v$, $PR_w$. To do that, module 116 determines an average basis that we will call here the social value context or svc for short. The average basis is computed by spatially averaging the u-, v- and w-bases. In addition, a weighting should also be added. In other words, if very few community subjects s1, s2, . . . , sj use the u-basis ("beauty"), some used the v-basis ("style") and most use the w-basis ("utility") then the averaging should take this into account. The diligent practitioner will note that many different mathematical procedures can be used here and that these will have a geometrical dependence. In other words, unless all bases are collapsed into a single representation of the whole community by a single quantum state, the average social value context svc will depend on where in space the average basis is being sampled. We will first consider this simplest case of representing the whole community as collapsed into a single representation first, before introducing the proper structure, namely the graph of the community in question.

Figure 3N:
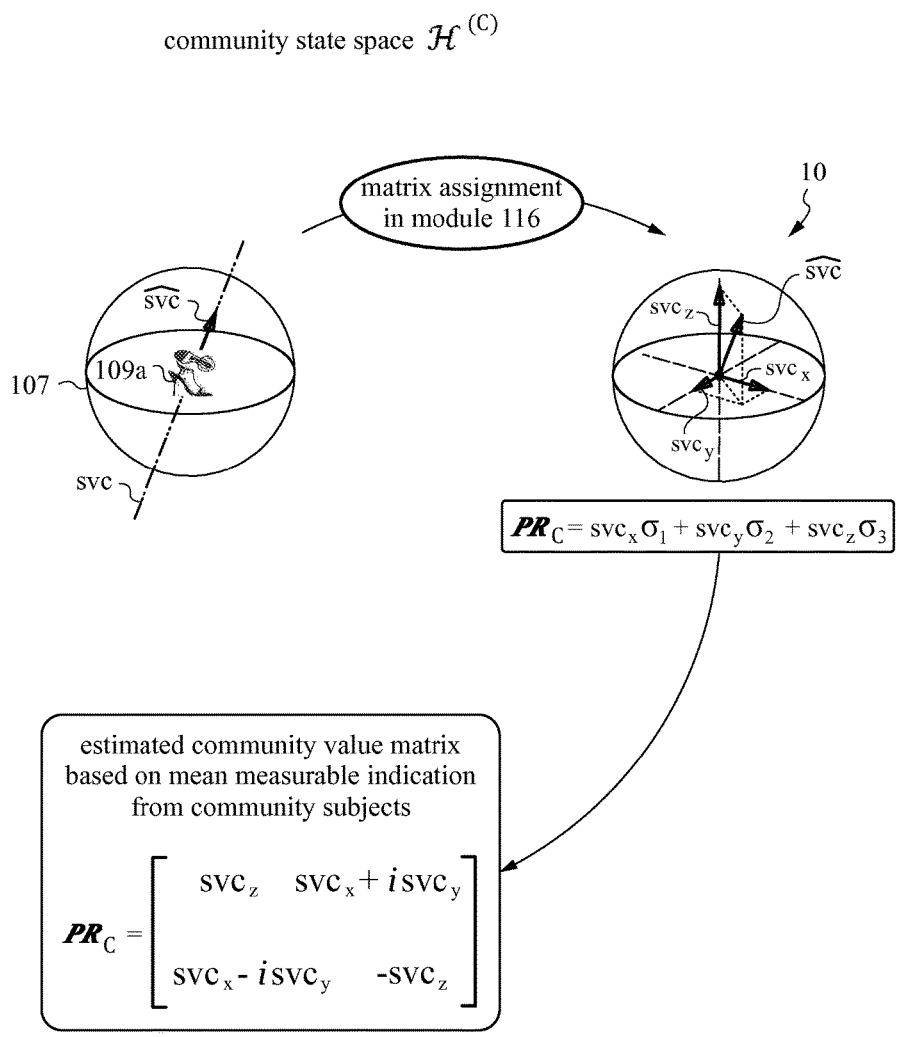
FIG. 3N is a diagram visualizing the second part of the derivation of the community value matrix based on the contextualizations found among community subjects.

FIG. 3N takes the simple case of the "geometrically collapsed" community (not to be confused with the collapse of the wave function or measurement). Here assignment module 116 simply composes a weighted average of the u-, v- and w-bases from the number of community subjects s1, s2, . . . , sj deploying value matrices $PR_u$, $PR_v$, $PR_w$ correspondent to these bases. We associate this average with a mean measurable indication that the community, in aggregate is expected to manifest modulo underlying proposition 107 about shoes 109a. The resultant is social value context svc corresponding to the axis indicated in the drawing figure. Module 116 now uses the standard quantum mechanical prescription (see Eq. 13) to generate community value matrix $PR_C$.

The construction of community value matrix $PR_C$ is shown explicitly in FIG. 3N, in analogy to the constructions shown in FIGS. 3K&L. Thus constructed, community value matrix $PR_C$ is a proper quantum mechanical operator that represents the social value context in which underlying proposition 107 is apprehended or contextualized on average by the community of interest. When the community is networked the step of measuring the mean measurable indication is preferably performed by network behavior monitoring unit 120 to further corroborate the estimates.

Having thus prepared a quantum mechanical representation of the community composed of community subjects s1, s2, . . . , sj and having derived their community value matrix $PR_C$ modulo proposition 107 about shoes 109a, we are interested in the effects of this community on a subject that is not its member. More precisely, we wish to investigate and predict a quantum state of such subject of interest modulo the same underlying proposition 107 about shoes 109a that is contextualized by the community in its social value context represented by community value matrix $PR_C$.

Figure 4A:
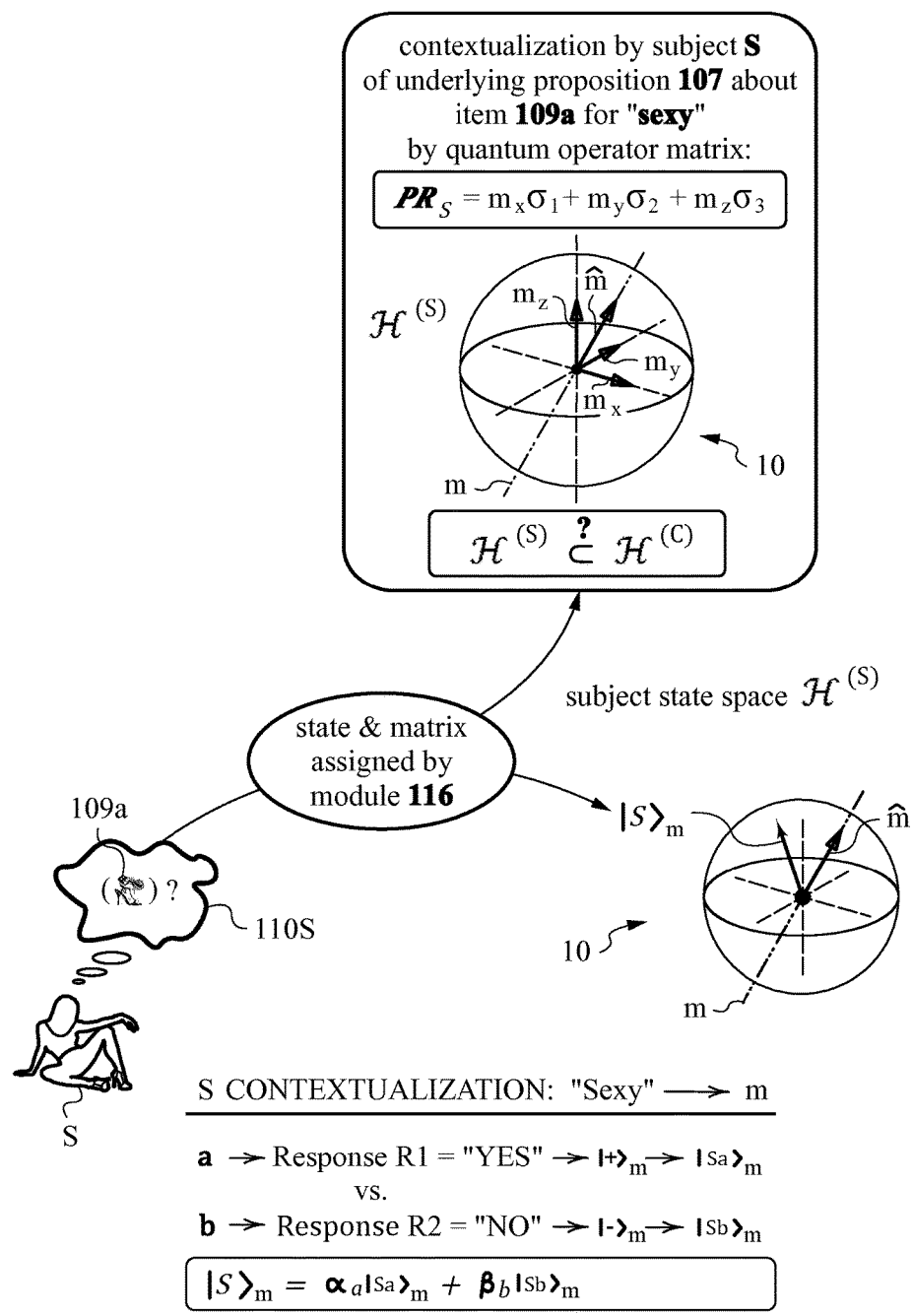
FIG. 4A is a diagram illustrating the assignment of estimated subject state and contextualization (basis) to a subject of interest by the assignment module.

FIG. 4A shows in more detail subject S of interest. This subject was already indicated in FIG. 2 above community subjects s1, s2, . . . , sj.

Now, in following the same procedures as outlined above, modules 115, 117 and 116 map, create and assign subject state $|S\rangle$ in subject space $\mathcal{H}^{(S)}$ to subject S modulo underlying proposition 107 about shoes 109a. Subject state $|S\rangle$ is the quantum mechanical representation of internal state 110S of subject S with respect to proposition 107 about shoes 109a.

In performing the above mapping, creation and assignment mapping module 115 first discovered subject S to exhibit discrete precipitation type 150 (see FIG. 3E). It also established that subject's S inner state 110S modulo proposition 107 about shoes 109a is not expected to have anomalies. Further, it has 2 non-degenerate eigenvalues that can be mapped to the two measurable indications a, b of interest (group 182 in FIG. 3E). In the present case the measurable indications are two mutually exclusive responses. Subject S is expected to exhibit one of the two mutually exclusive responses: response R1 for "YES" and response R2 for "NO" (or simply a→"YES" and b→"NO",).

Further, in analyzing data available about subject S, creation module 117 has determined that subject S is expected to exhibit the F-D anti-consensus statistic modulo proposition 107 about shoes 109a. Therefore, creating subject state $|S\rangle$ involves application of the fermionic creation operator $\hat{c}^\dagger$ by creation module 117 (also see group 208 in FIG. 3H).

Finally, as assignment module 116 adjusts the final form of the two-level subject state $|S\rangle$ it decomposes it in subject's S own m-basis. As before, the chosen decomposition is indicated by the subscript as follows $|S\rangle = |S\rangle_m$. We learned above that the decomposition basis inherently calls out the contextualization rule. Of course, it does not mean that the measurement has to occur in this basis (as we will learn shortly, a sufficiently strong forcing field aligned along a different vector will cause the state to collapse into either up- or down- as defined by the field direction). In the present invention, the basis choice expresses a subject's predisposition based on estimates formed from data and vetted by the human curator. In other words, subjects are predisposed to measure in their preferred basis and hence this is the most useful decomposition to apply when expressing their quantum states.

In the case of subject S, the contextualization rule is "sexy". Thus, eigenvalue a stands for measurable indication of internal state 110S of subject S judging shoes 109a "to be sexy". In other words, eigenvalue a indicates that subject S produces the "YES" response (R1) under measurement. Eigenvalue b stands for measurable indication of internal state 110S of subject S judging shoes 109a "not to be sexy". Eigenvalue b therefore corresponds to subject S yielding the "NO" response (R2) under measurement.

FIG. 4A also shows the assignment of subject value matrix $PR_S$ that embodies the "sexy" contextualization rule employed by subject S. The illustration takes advantage of Bloch sphere 10, as before. Notice that the eigenbasis (i.e., the eigenvectors) of subject value matrix $PR_S$ are $|Sa\rangle_m$ and $|Sb\rangle_m$. These eigenvectors correspond to eigenvalues a→"YES" and b→"NO" that manifest along with the judgment of the sexiness of shoes 109a at the center of underlying proposition 107.

The actual decomposition of subject state $|S\rangle_m$ over eigenvectors $|Sa\rangle_m$, $|Sb\rangle_m$, involves the two complex coefficients $\alpha_a$, $\beta_b$ that encode for probabilities (e.g., see Eq. 3). Their assignment implicitly involves an estimation of the expected measurable indication for subject state $|S\rangle_m$. In other words, just as in the community subject states, we have subject state $|S\rangle_m$:

$$|S\rangle_m = \alpha_a |Sa\rangle_m + \beta_b |Sb\rangle_m, \qquad \text{Eq. 29}$$

with probabilities $p_a = p_{"yes"} = \alpha_a^* \alpha_a$ and $p_b = p_{"no"} = \beta_b^* \beta_b$. The estimation of a measurable indication, i.e., the expectation value modulo underlying proposition 107 about shoes 109a is found from the standard prescription:

$$\langle PR_S \rangle_{|S\rangle} = \langle S | PR_S | S \rangle, \qquad \text{Eq. 30}$$

where the reader is reminded of the implicit complex conjugation between the bra vector $\langle S|$ and the dual ket vector $|S\rangle$. The expectation value $\langle PR_S \rangle_{|S\rangle}$ is a number that corresponds to the average result of the measurement. It represents an estimate of the expected measurable indication obtained by operating with subject value matrix $PR_S$ on subject state $|S\rangle$. In human terms, this is the expected result for asking subject S to judge shoes 109a in the context "sexy" when subject S has internal state 110S expressed by state vector $|S\rangle_m$. Therefore, the assignment of subject state $|S\rangle$ inherently bears with it an estimation of measurable indication (also understandable as a weighted average measurable indication that would be obtained from a statistically large sample of measurable indications a, b collected from many subjects prepared just like subject S) modulo underlying proposition 107.

As in the case of community subjects s1, s2, . . . , sj it is advantageous to leverage "big data" and "thick data" about subject S in particular, in order to obtain the best estimate of their state $|S\rangle$ and of their value matrix $PR_S$. An important point to reiterate and make clear is that the preferred or most likely basis or contextualization rule deployed by subject S does not imply that their state $|S\rangle_m$ is one of the eigenvectors in that basis. That would mean that for sure subject S will manifest the "YES" or "NO" eigenvalue that goes with that eigenvector in judging item 109 of proposition 107. Although this could be the case, it is more likely that state $|S\rangle_m$ will exhibit a more balanced decomposition with the complex coefficients $\alpha_a$, $\beta_b$ both being non-zero and thus indicating non-zero probabilities $p_a = p_{"yes"}$ and $p_b = p_{"no"}$ according to the rules of quantum mechanics explained above.

What is most important from the point of the present invention is to at the very least get the best possible estimate of the real-valued probabilities $p_a$ and $p_b$. In other words, estimating the closest "orbit" (see reference 26' in FIG. 1G)

is important. This, of course, is also important for community subjects s1, s2, . . . , sj in making the estimates of their states $|C_k\rangle$ and value matrices $PR_{sk}$. To some extent, however, and especially in large communities, the averaging effect will offset the need to get the best estimates for each member or community subject s1, s2, . . . , sj. On the other hand, as we are especially interested in subject S, their estimates should be as accurate as possible.

In briefly referring back to FIG. 2, we note that this is preferably accomplished by permitting assignment module 116 to devote more effort to estimating subject state $|S\rangle$ and subject value matrix $PR_S$ (to thus be able to assign subject state $|S\rangle_m$ in the m-basis decomposition) from information available on network 104 that is related to underlying proposition 107 about shoes 109a. This step relies on "big data" from all possible sources on network 104 as well as information form behavior monitoring unit 120 and any data files (not expressly shown) generated by subject S and residing in memory 108 from assignment module 116. Based on all available data, it is first corroborated that subject S indeed tends to judge items 109 similar to shoes 109a (or even shoes 109a, if such information is available) in the "sexy" context defined by the m-basis. Then, based on "big data" and "thick data" ("thick data" meaning a long and rich stream of data about subject S) generated by subject S over time, assignment module 116 gathers any and all indication(s) of the subject's S past judgments of apparel and preferably shoes as similar as possible to shoes 109a of proposition 107.

The subject's S judgments of "sexy" and "not sexy", in other words their previous measurable indications that signal judgments reached in the "sexy" contextualization with respect to the previous similar items, are tallied. The probabilities $p_a$ and $p_b$ are derived from those tallies using standard statistics known in the art. In the simplest case, the number of "sexy" judgments by subject S is divided by the total number of their judgments and the quotient is assigned probability $p_a = p_{"yes"}$. Similarly, the number of "not sexy" judgments is divided by the total number of judgments and assigned to probability $p_b = p_{"no"}$. A person skilled in the art can apply any additional tools of statistics (e.g., outlier rejection, ensuring normalization (total probability remains 1), etc.) to make certain that the probabilities obtained are based on sound calculations. Of course, knowledge of the actual complex coefficients $\alpha_a$, $\beta_b$ (whose squares yield the probabilities) will remain obscured with this approach, but the orbit we are interested in can nevertheless be well estimated. Thus, after obtaining the best estimates for subject value matrix $PR_S$ and subject state $|S\rangle_m$, in that matrix's eigenbasis, assignment module 116 has completed its task with respect to subject S.

FIG. 4A indicates another important question that has to do with subject state space $\mathcal{H}^{(S)}$. Space $\mathcal{H}^{(S)}$ is where internal state 1105 of subject S resides. In order for there to be any quantum interaction between community subject states $|C_k\rangle$ (k=1, 2, . . . , j) that represent community subjects s1, s2, . . . , sj and subject S of interest there needs to be an overlap between their spaces. In other words, community values space 200 represented by community state space $\mathcal{H}^{(C)}$ and internal value space of subject S represented by subject state space $\mathcal{H}^{(S)}$ need to overlap.

Figure 4B:
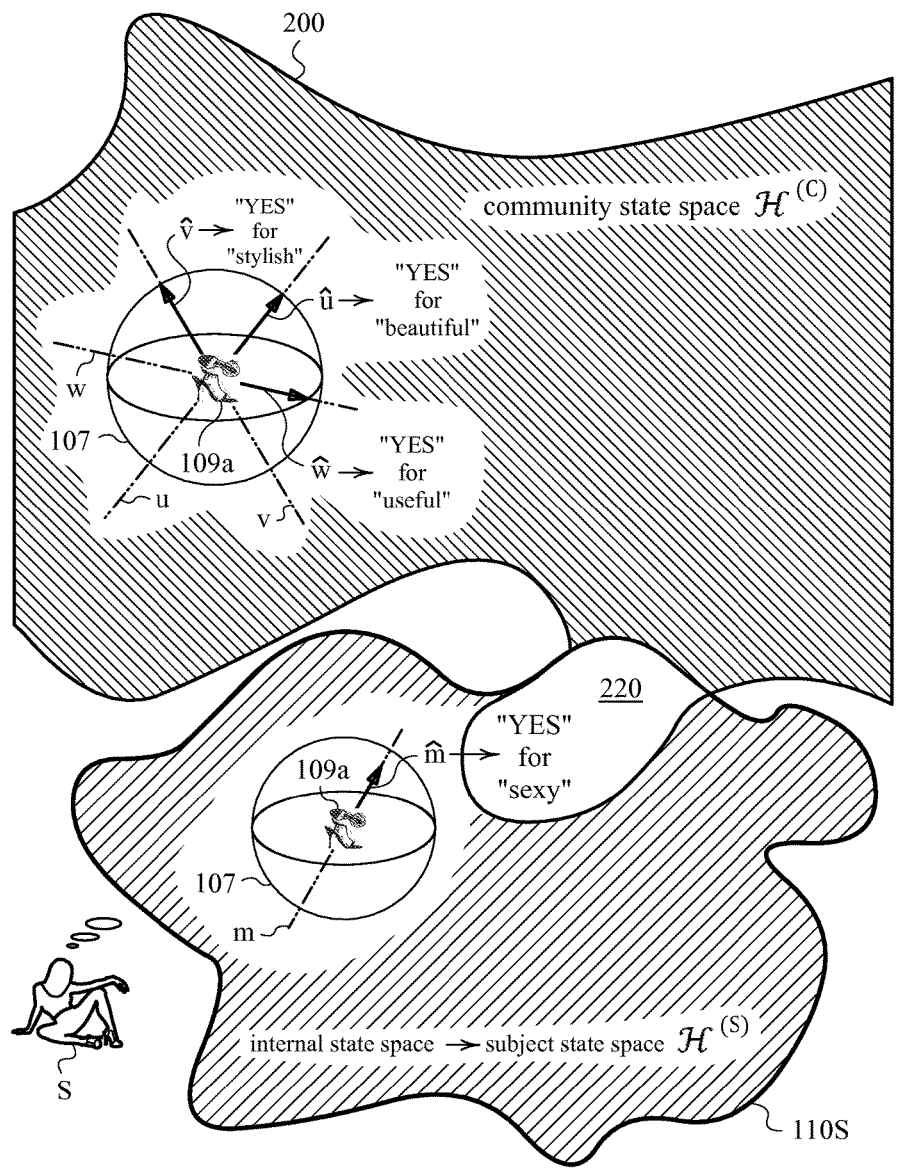
FIG. 4B is a diagram illustrating the overlap of community state space $\mathcal{H}^{(C)}$ that represents the community values space and subject state space $\mathcal{H}^{(S)}$ that represents the subject's value space.

This issue is better visualized in FIG. 4B. It is also closely related to the previous issue of determining which community subjects s1, s2, . . . , sj share community values space 200 and whose state spaces $\mathcal{H}_{s1}$, $\mathcal{H}_{s2}$, . . . , $\mathcal{H}_{sj}$ are thus subsets of the larger community state space $\mathcal{H}^{(C)}$ (which is a tensor product, as discussed above). Determination of the presence of such overlap between community subjects s1, s2, . . . , sj was previously the province of mapping module 115. Thus, the existence or non-existence of overlap between community state space $\mathcal{H}^{(C)}$ associated with community values space 200 and subject state space $\mathcal{H}^{(S)}$ associated with internal state 1105 of subject S is preferably determined by mapping module 115. This is done in the same way as before when dealing with community subjects s1, s2, . . . , sj and their Hilbert spaces.

In general, it will not always be a given that community values space 200 and subject's S values space, here indicated just by its state space $\mathcal{H}^{(S)}$ do indeed overlap. The vernacular understanding of this situation is that the community, at this point considered as the aggregate of community subjects s1, s2, . . . , sj, and subject S will not overlap if they can't have any values in common modulo underlying proposition 107. In other words, they are "not in the same universe" when it comes to considering underlying proposition 107.

The determination once again relies on the availability of "big data" and "thick data". From such historical files and any contemporaneous ones mapping module 115 cross-checks whether subject S ever considers proposition 107 about shoes 109a in a similar manner to that exhibited by the community. If subject S as known from contemporaneous and historical data files discusses similar items 109 as well as shoes 109a in particular just like community subject do, then there exists potential for the existence of overlap 220. Now, mapping module 115 uses the same three conditions as it did with determining that community subjects s1, s2, . . . , sj all share common values space 200. To restate, overlap 220 is highly likely, if at least one of the following conditions is fulfilled:

1) subject S perceives underlying propositions about same item; or
2) subject S show independent interest in the same item; or
3) subject S is known to contextualize similar underlying propositions in a similar manner (similar bases) but not necessarily about same item.

Before handing its assessment of overlap 220 for vetting by the human curator, mapping module 115 deploys the final quantitative review based on scale parameter W (see FIG. 3G). Scaling parameter W is used in preferred embodiments to test for overlap 220 between community state space $\mathcal{H}^{(C)}$ and subject state space $\mathcal{H}^{(S)}$. If, as ordered along this relevant scaling parameter W subject S belongs to a different regime or realm than the community subjects making up the community in question, then overlap 220 between them is presumed not to exist. On the other hand, if subject S and the community are close along scaling parameter W, and preferably within same slice 202 (see FIG. 3G and correspondent description) then overlap 220 is presumed to exist. As usual, the human curator should render the final verdict about the existence of overlap 220.

In the case depicted in FIG. 4B overlap 220 indeed exists. Therefore, in accordance to the present invention we will consider it possible that the community could influence subject S in their judgment of proposition 107 about shoes 109a via a quantum interaction that will be addressed in more detail below.

When state spaces $\mathcal{H}^{(C)}$ and $\mathcal{H}^{(S)}$ do overlap, there naturally emerges the question of compatibility in the Heisenberg sense between judging proposition 107 about shoes 109a in social values context defined by the averaged svc-basis and in the subject value context defined by subject's m-basis. In human terms, compatibility will be high if social value context defined by axis svc is close to aligned with subject's S value context defined by axis m. In making this comparison, we must again remember that Bloch sphere 10 is a visualization aid and thus arrest our classical thinking from building too much on geometric intuitions.

Figure 4C:
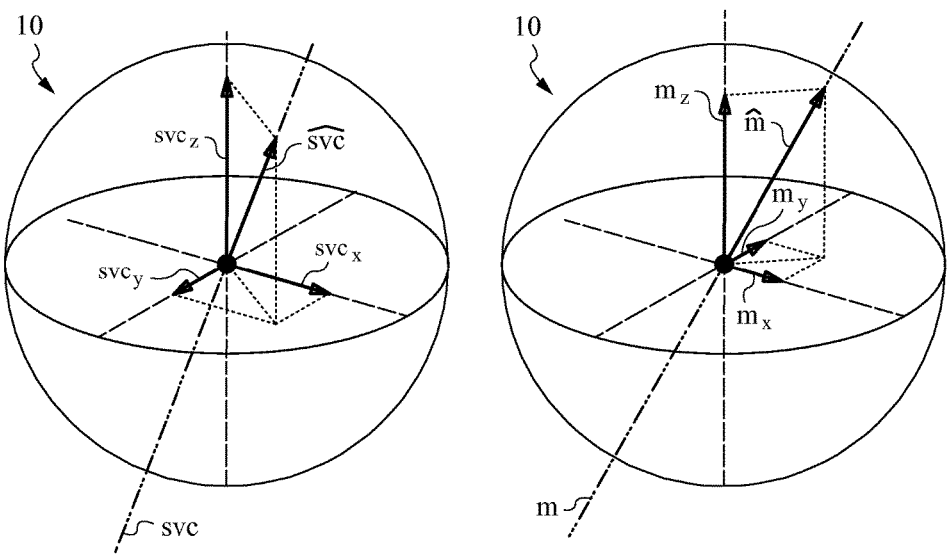
FIG. 4C is a diagram using the Bloch sphere representation for building intuition about the social value context as associated with axis svc and subject's value context as associated with axis m.

FIG. 4C shows axis svc represented in Bloch sphere 10. Similarly, the m-axis is shown in an adjacent Bloch sphere 10. The two axes are shown in adjacent spheres and broken down in terms of their three components to better visualize their difference in orientation. Note that we are justified in comparing axes svc and m because spaces $\mathcal{H}^{(C)}$ and $\mathcal{H}^{(S)}$ were just determined to overlap. Thus, we will consider the joint Hilbert space as the tensor product of the two, namely: $\mathcal{H}^{(C)} \otimes \mathcal{H}^{(S)}$.

In the geometrical sense, a good estimate of alignment and hence compatibility in judgments of proposition 107 by the community and by subject S can be obtained by taking the inner product of unit vectors $\hat{svc}$ and $\hat{m}$ along axes svc and m, respectively. Using the tools of quantum mechanics, however, the estimate of compatibility deploys the commutator between community value matrix PR$_C$ and subject value matrix PR$_S$. We have already introduced the commutator (see Eq. 14) and discussed its applications above. In review, if the commutator is zero or small, then we know that the degree of incompatibility between social value context svc and subject context m is nonexistent or small. On the other hand when it is large or maximum, then we know that the degree of incompatibility between social value context svc and subject context m is large or maximal.

Of course, the same commutator approach can be used to estimate the compatibility of judgments modulo proposition 107 between any given individual among community subjects s1, s2, . . . , sj and subject S of interest. To perform the computation, we need to know that community subject's value matrix. For community subjects s1 and s2 the steps for obtaining value matrices PR$_{s1}$, PR$_{s2}$ were shown explicitly above (also see FIGS. 3K&L). Hence, the values of commutators [PR$_{s1}$, PR$_S$], [PR$_{s2}$, PR$_S$] will quantify the degree of incompatibility between how the corresponding two pairs of subjects s1&S, s2&S contextualize underlying proposition 107 about shoes 109*a*.

Before proceeding to the operation of the next set of modules of computer system 100, it is important to remind ourselves that our explanations have been based on entities governed by quantum electrodynamics (QED). We have taken as examples of quantum states to which we mapped subject states the spins of electrons. We now wish to consider quantum interactions between such entities. In so far as these interactions are governed by QED we will inherently be bound by gauge freedom dictated under the symmetry group U(1) and exhibited by its gauge boson, namely the photon γ. Yet, the present teachings provide a new tool for investigating, predicting, modeling and simulating internal states of subject, such as human beings, and interactions between such subjects. There is therefore no presumption that QED is the ultimately correct model within possible quantum field theories for modeling such subject states and their dynamics. QED is used for the purposes of providing an enabling description of embodiments that are currently believed to be preferred. In so far as all realms or levels of the Standard Model (U(1), SU(2) and SU(3)) are described by a shared underlying quantum field formalism the choice of the U(1) symmetry group is not to be construed as limiting. What the model of the invention is committing to, however, is that the representation of subject states and fields enabling their interaction be a quantum representation within the framework of a permissible quantum field theory.

It is possible that at some future time the correct gauge and symmetry group for subjects such as human beings will be discovered (e.g., by deriving the correct Lagrangian). At that time, the quantum states used to express the subjects' internal states, value matrices and interactions should be adjusted to conform to the true gauge requirements.

Furthermore, within the context imposed by QED, the actual dynamics depend on its coupling constant, which is related to the fundamental electric charge unit e. The underlying and empirically determined fine-structure constant α of about $1/137$ is often used to define this charge-driven coupling strength (see background section). In using the present model for determining quantum interactions between states corresponding to subjects the coupling constant is not expected to remain the same. In fact, the coupling strength discovered in using the present teachings as a tool may lead to the discovery of a more appropriate coupling constant for use in conjunction with subject states representing entities such as humans. In order to obtain sufficient data to contemplate such subject-level coupling constant it would be advisable to combine data from verified predictions based on very large data sets—this would truly be a formidable undertaking reliant on the availability of "big data" and "thick data" for very large numbers of subjects.

Figure 5:
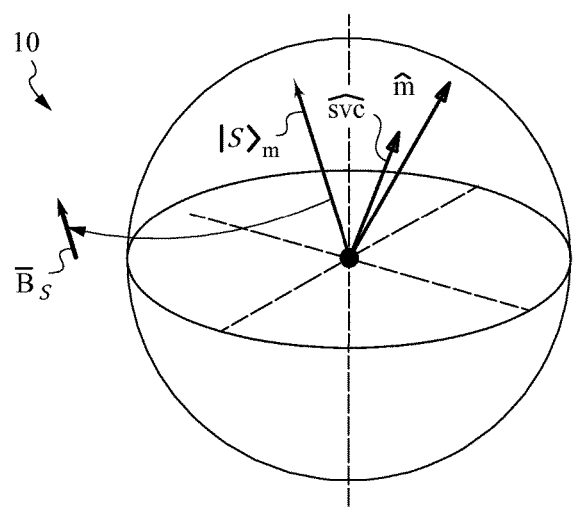
FIG. 5 is a diagram illustrating how a field is assigned to a quantum state.

FIG. 5 turns our attention to the question of fields that support inter-subject coupling within the quantum representation of the present invention and based on the QED example. While fully cognizant of the above-mentioned limitations, we will associate with each subject state a vector field $\vec{B}$ in analogy to the magnetic portion of the standard EM field. Thus, we associate with subject state |S⟩ representing subject S the vector field $\vec{B}_S$ as shown. Similarly, we associate vector fields with each one of community subjects s1, s2, . . . , sj that make up our community of interest. These vector fields are not shown in FIG. 5, but they also correspond to magnetic dipoles that point along the direction indicated by the correspondent community subject states |C$_k$⟩.

In view of the above discussion, we do not presume to know or even anticipate the absolute magnitude or strength of vector field $\vec{B}_S$ in terms of known fundamental physical constants. However, we do make the assumption that the individual magnitudes of vector fields associated with states |C$_k$⟩, |S⟩ are equal for all subjects involved in the prediction (community subjects s1, s2, . . . , sj and subject of interest S). Further, inter-subject dynamics will be presented in relative terms that apply to them only in the regime or realm of inter-subject interactions. Because the absolute value of fields representing subjects is not known no aspects of absolute timing will be addressed, although relative time differences may be legitimately contemplated as they relate to energy differences. For the purposes of the present quantum representation, it will be assumed that in this realm dipoles representing subjects interact with each other and/or any external magnetic field in accordance with the standard rules of QED.

Figure 6:
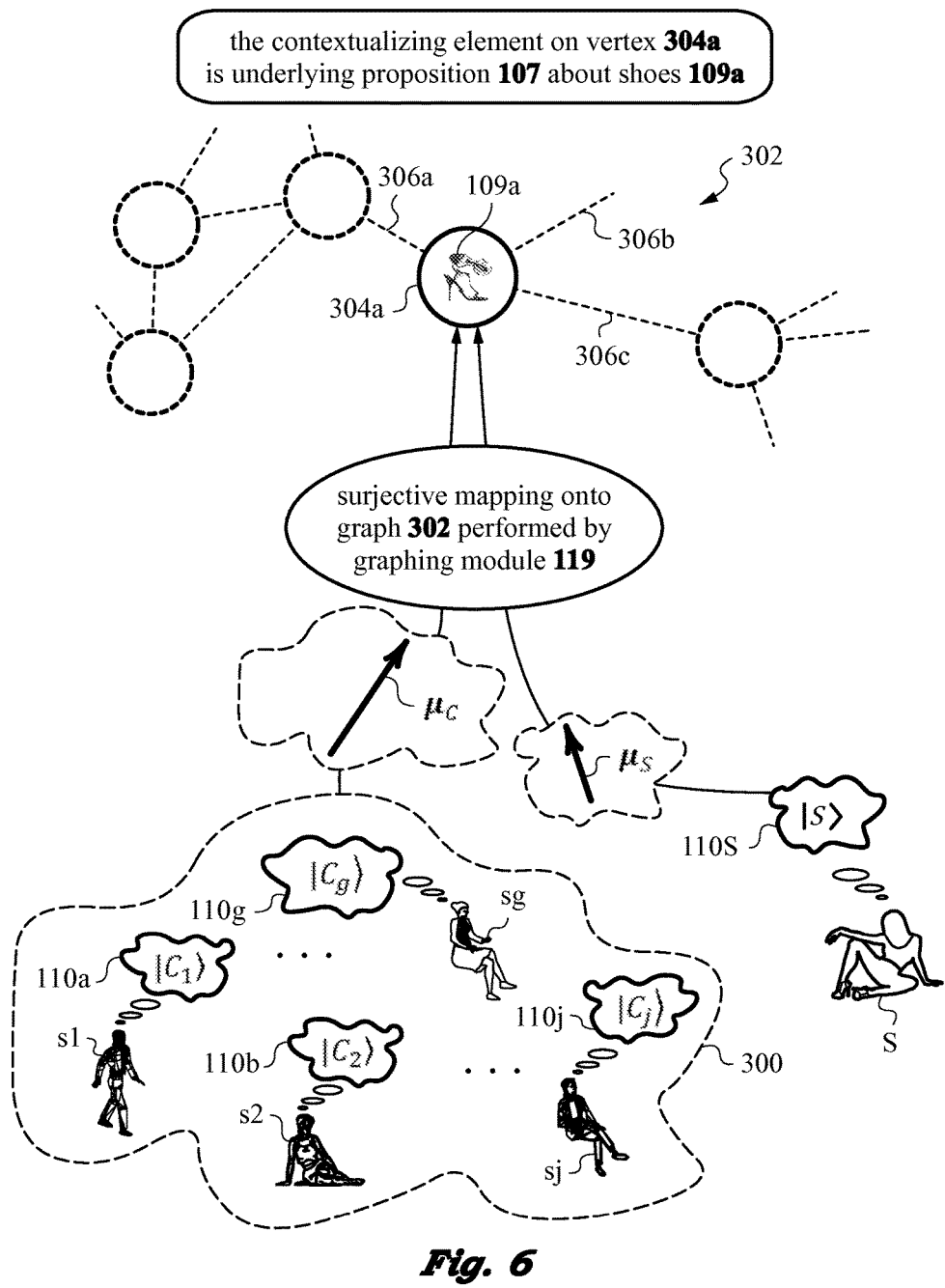
FIG. 6 is a diagram showing the operation of the graphing module of the computer system of FIG. 2 in performing a simple surjective mapping onto a graph.

FIG. 6 illustrates the operation of graphing module 119 (see also FIG. 2). The latter takes as input mapped, created and assigned subject states |C$_k$⟩, |S⟩ representing community subjects s1, s2, . . . , sj and subject S. It then measures all states |C$_k$⟩, |S⟩ in their preferred contextualizations or bases modulo underlying proposition 107 about shoes 109*a*. In performing the measurement step, graphing module 119 uses all available data on network 104 and any communications supplied by network behavior monitoring module 120 (see FIG. 2) to obtain real measurement data. In other words, graphing module 119 verifies to the extent possible measurable indications "YES" and "NO" modulo proposition 107 about shoes 109a from community subjects s1, s2, . . . , sj.

In cases where no data is available for a given community subject, graphing module 119 can either keep the estimated community subject state or collapse it. Such simulated collapse is performed in accordance with the "YES" and "NO" response probabilities, as discussed above. In the present embodiment all community subject states are collapsed or measured. The same is done with subject state |S⟩ of subject S. Then, all of the collapsed or measured subject states |$C_k$⟩, |S⟩ are taken to be represented by dipoles $\mu_k$, $\mu_S$ in accordance with the reasons discussed above.

According to a first and most simple surjective mapping of the invention, graphing module 119 combines all community subjects s1, s2, . . . , sj into a community 300. In doing so all community subject states |$C_k$⟩ are combined using the standard summing convention. In other words, all dipoles $\mu_k$ corresponding to measured subject states |$C_k$⟩ that represent community subjects' internal states 110a, 100b, . . . , 110j are merged into a single dipole $\mu_C$ as follows:

$$\mu_C = \Sigma_{k=1}^j \mu_k \qquad \text{Eq. 31}$$

Here the reader is reminded that the quantities being summed are vector quantities and the resultant community dipole representation $\mu_C$ is a vector. A convenient normalization for present purposes is to assign unit length to a single "subject dipole". Thus magnitude of dipole $\mu_C$ that represents community 300 is expressed in "subject" units.

In performing the sum and thus collapsing the effect of community 300 into just one dipole $\mu_C$ in this most simple surjective mapping, graphing module 119 still keeps track of the overall statistic of resultant dipole $\mu_C$. In other words, the B-E consensus statistics and F-D anti-consensus statistics as assigned in creation module 117 to constituent community subject states |$C_k$⟩ are also combined. The ultimate tally will yield either a fractional statistic or a whole number statistic. In the former case (sum is a fraction) the F-D anti-consensus statistic is assigned by graphing module 119 to dipole $\mu_C$. In the latter case, graphing module 119 assigns B-E consensus statistic to dipole $\mu_C$.

No summing or other actions have to be performed by graphing module 119 in the case of dipole $\mu_S$ standing in for measured state |S⟩ of subject S. However, its statistic, i.e., either B-E consensus statistic or F-D anti-consensus statistic is kept by graphing module 119.

Next, graphing module 119 places dipoles $\mu_k$, $\mu_S$ that represent states |$C_k$⟩, |S⟩ of community 300 and subject S onto a graph 302. The mapping performed by graphing module 119 in making the placement is a surjective mapping, meaning that it is an onto mapping (surjective mapping is not necessarily one-to-one). FIG. 6 provides an excellent example of a most simple surjective mapping where all subjects are mapped to just one vertex 304a of graph 302.

In the present case, vertex 304a corresponds to the one and only vertex of graph 302 associated with underlying proposition 107 about shoes 109a. Thus, any subject that registers shoes 109a is mapped to vertex 304a. Note that the mapping does not imply at all that the contextualization rules (i.e., the bases) are the same for all the subjects thus mapped. Further, although vertex 304a has edges 306a, 306b and 306c that lead to other vertices of graph 302, they are not relevant in the present embodiment.

The very simple surjective mapping according to which graphing module 119 has placed all subjects onto single vertex 304a of graph 302 has a simple and rather general purpose. It is used to get an overall quantitative indication about the effects of judgments of shoes 109a at center of proposition 107 made by community 300 in aggregate and now represented by dipole $\mu_k$ on the evolution of state |S⟩ of subject S now represented by dipole $\mu_S$. In other words, we want to predict how likely it is that community 300 may induce subject S to re-measure shoes 109a in a different contextualization and/or outright change their measurement in the same contextualization (i.e., flip their judgment between "YES" and "NO" under the "sexy" contextualization). Put in vernacular terms, we want to predict whether community 300 is likely to make subject S change their mind about shoes 109a in some quantifiable way.

Figure 7:
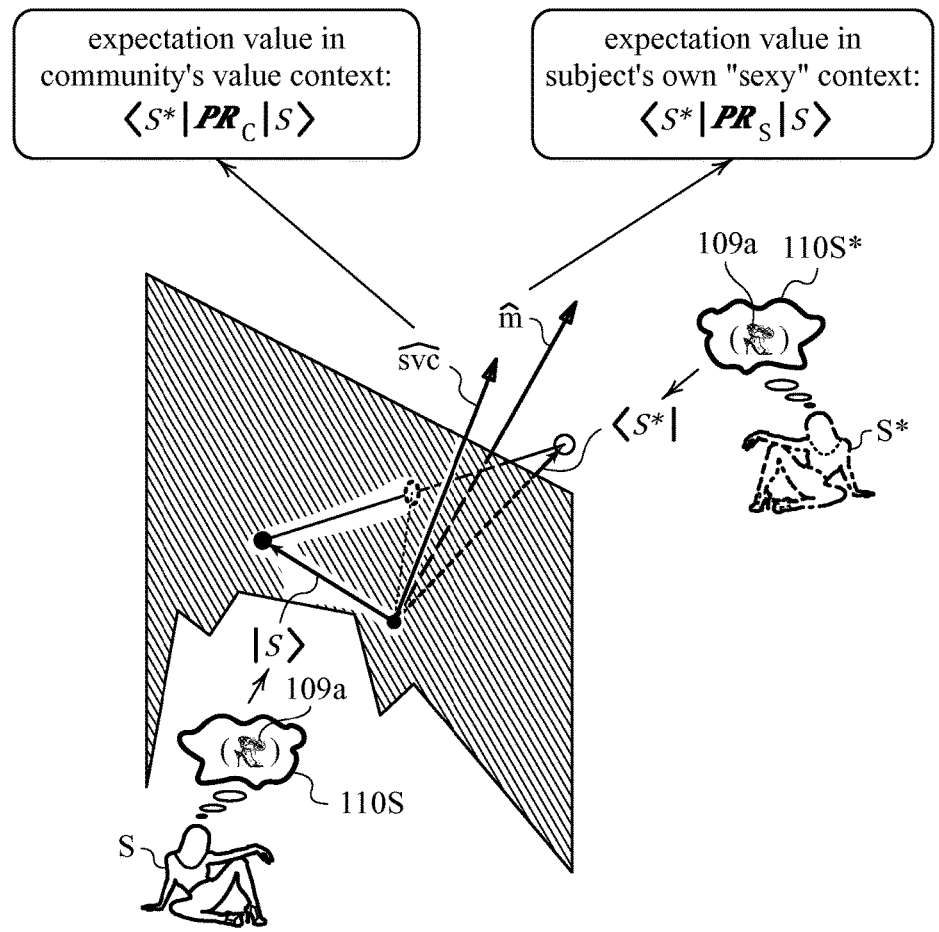
FIG. 7 is a diagram illustrating an important aspect involved in computing expectation values and the meaning of the state and the complex-conjugated state (notional and counter-notional states) in the quantum representation adopted by the present invention.

Before proceeding, it will be useful to review FIG. 7 which takes us back to state |S⟩ of subject S prior to measurement. This drawing figure also indicates by correspondent unit vectors $\widehat{svc}$ and $\widehat{m}$ the "YES" eigenvectors of the community value matrix $PR_C$ and of the subject value matrix $PR_S$. Notice that "YES" judgment eigenvector in the averaged social value context svc and the "YES" judgment eigenvector in the subject's own "sexy" context (m-basis) are not that far off from being aligned.

The expectation value of subject's S judgment of shoes 109a in the "sexy" basis (measured by applying subject value matrix $PR_S$) is obtained by taking the regular prescription (see Eq. 10a). That prescription involves subject state |S⟩), its complex conjugate ⟨S| (the complex conjugation is made explicit with the asterisk in FIG. 7 as a reminder) and subject value matrix $PR_S$. Similarly, we can also obtain the expectation value of subject's S judgment of shoes 109a in the basis deployed by community 300 and averaged over "beautiful", "stylish" and "useful" (measured by applying community value matrix $PR_C$). The same prescription holds and calls for subject state |S⟩, its complex conjugate ⟨S| and now community value matrix $PR_C$ instead of subject value matrix $PR_S$.

Just from a cautious geometrical intuition built from examining FIG. 7, we see that these expectation values will be quite close. We state this fact more formally by using the expectation value formula explicitly as follows:

$$\langle S|PR_S|S\rangle \approx \langle S|PR_C|S\rangle, \text{ or}$$

$$\langle PR_S\rangle_{|S\rangle} \approx \langle PR_C\rangle_{|S\rangle}. \qquad \text{Eq. 32}$$

In practice, the range of expectation value (given our +1 and −1 eigenvalues) will be between +1 and −1. Therefore, a difference of 0.2 or less (i.e., 10% or less) can be considered relatively small.

The above finding may become more intuitive to the reader by recalling the overall complex-conjugate relationship between states. Subject state |S⟩ (the |notional⟩ state) and the complex-conjugated subject state ⟨S| (the ⟨counter-notional| state) are always involved in deriving the real-valued expectation. In fact, their generalized dot product (inner product) must be unity, i.e., ⟨counter-notional|notional⟩=⟨S|S⟩=1 in order to ensure probability conservation. As we see by referring back to FIG. 3D both the |notional⟩ and the ⟨counter-notional| reside on the same Riemann surface RS. Thus, there is no obstruction from one of these states evolving into the other by moving along Riemann surface RS. Normally, such evolution can only occur after the passage of some amount of time. Here, however, we are taking both states into the expectation value prescription simultaneously. The meaning of this will be more apparent by referring to the practical case at hand.

In FIG. 7 subject S is indicated with internal state 110S and their internal complex-conjugated state 110S*. Both the state and its complex-conjugate are about shoes 109a at center of proposition 107. As we have seen in FIG. 3D evolution along some orbit (not necessarily the exemplary ones discussed so far or the one in FIG. 3D) takes internal state 110S to internal complex-conjugated state 110S*. In a sense, these two states are "reflections" of each other. We thus posit subject S and a "mirror image" subject S namely subject S*. Subject S* can be thought of as the same subject S after some amount of evolution. Subject S* can also be thought of as a completely different subject that currently contextualizes shoes 109a but whose bra state (the non complex-conjugated state) is represented by internal state 110S*. In other words, the ⟨counter–notional| of subject S* is the |notional⟩ of subject S.

This "flipping" can thus be understood as a change in mind about shoes 109a from the point of view of a "party" represented by subject S to the point of view of a "counter-party" represented by subject S*. In the vernacular, such opposite thinking about the same underlying proposition may express itself as: 1) "yes the shoes are sexy on me" and 2) "yes the shoes are sexy on someone else". Differently put, this pair of complex-conjugate internal states can be associated with a "party" and a "counter-party" mentality. They both certainly "see eye to eye". They also agree on judging shoes 109a in the same context but still are distinct in the sense that one would act like a "seller" and the other like a "buyer" of shoes 109a. The vernacular offers other words that fit this "flip" including the concept of the "evil twin" that knows everything in the same way but is trying to "undo" what the twin is doing. Clearly, evolution from "party" into "counter-party" or from "twin" to "evil twin" is satisfied for any subject based on everyday experience.

Having thus built new intuitions about how to consider subjects in the quantum representation and having discussed the actions of all major preparatory modules of computer system 110 we are finally ready to address the practical questions of interactions, predictions and simulations. In doing so, we will adhere to many but not all standard rules known to those skilled in the art. We will start by considering the actions of prediction module 122 and they ways in which these are supported by statistics module 118. Just prior to proceeding, however, we need to re-iterate the rules imposed on the quantum representation adopted herein by spin statistics (B-E consensus and F-D anti-consensus statistics).

FIGS. 8A-D illustrate the rules for quantum interactions on graph 302, which in the first example are very simple indeed, since the surjective map implemented by graphing module 119 has placed all states (|S⟩, |C$_k$⟩) representing all subjects on a single vertex 304a. More precisely still, graphing module 119 has taken the measured values of all states (to the extent known) and mapped them to vertex 304a as dipoles $\mu_C$, $\mu_S$. First and foremost, it will be the consensus and anti-consensus statistics of the mapped dipoles $\mu_C$, $\mu_S$ that will have a dominating effect on quantum interactions. Thus, prediction module 122 has to first take into account these statistics before predicting any quantum interactions on graph 302.

FIG. 8A illustrates a situation forbidden by consensus and anti-consensus statistics. Here dipole $\mu_C$ representing community 300 in the measured state (or as closely to measured and including best estimations for measurements (e.g., by using expectation values reviewed above)) with respect to shoes 109a exhibits the F-D anti-consensus statistic. Dipole $\mu_S$ representing subject S in the measured (or estimated) state with respect to shoes 109a also exhibits the F-D anti-consensus statistic. For visualization, F-D anti-consensus statistic is visually encoded by a half-white ball. After quantum interaction both dipoles $\mu_C$, $\mu_S$ are shown aligned in parallel, i.e., in the same quantum state on vertex 304a modulo proposition 107 about shoes 109a. This cannot happen because of the Pauli Exclusion Principle. Note that the state of dipoles $\mu_C$, $\mu_S$ being aligned in parallel but pointing down or any other direction is also disallowed.

FIG. 8B shows the allowed situation between dipoles $\mu_C$, $\mu_S$ when both are fermionic (i.e., both exhibit the F-D anti-consensus statistic). Here, after interacting via quantum interaction(s) dipoles $\mu_C$, $\mu_S$ are shown in anti-alignment (anti-parallel) with each other. We note that this is the lowest energy state for dipoles $\mu_C$, $\mu_S$. Observe that the anti-alignment can also happen in reverse, i.e., with $\mu_C$ pointing down and $\mu_S$ pointing up. Also, the axis or direction along which they are anti-aligned can be any direction. These facts will become important in constructing Hamiltonians (or Lagrangians) for graph 302 to more rigorously determine permissible states and dynamics due to quantum interactions on graph 302.

FIG. 8C shows another allowed situation when both dipoles $\mu_C$, $\mu_S$ exhibit the B-E consensus statistic. In other words, these entities are bosonic. Under consensus statistics dipoles $\mu_C$, $\mu_S$ will tend to show alignment after quantum interaction(s). They are depicted both pointing up. They could also both point down. Indeed, they could exhibit alignment along any other direction.

In FIG. 8D we find the two situations in which the spin statistics or consensus/anti-consensus statistics of dipoles $\mu_C$, $\mu_S$ are mixed. On the left is the case in which dipole $\mu_C$ representing the aggregate quantum state of community 300 is bosonic, but dipole $\mu_S$ representing the quantum state |S⟩ of subject S is fermionic. In this situation quantum interaction(s) leading to parallel alignment are allowed. Similarly, alignment is also permitted when the F-D/B-E statistics are inverted, as show in the right portion of FIG. 8D.

The lack of preference in the direction along which dipoles $\mu_C$, $\mu_S$ either align or anti-align as dictated by their statistics will be true for as long as there is no external mechanism that breaks the symmetry at vertex 304a. In other words, no direction is preferred in the absence of any external forcing or biasing fields. Of course, any dipole $\mu$ will generate a field $\overline{B}$. Thus, if there were any other dipole(s) nearby, or if their field(s) were strong enough to affect dipoles even far away, then they would affect the symmetry at vertex 304a. It is noted that graphs may range from those recognizing no effect from dipoles sitting on neighboring vertices or even further away to affecting the nearest neighbors and even positing an overall forcing/biasing field.

FIG. 9 serves to provide visual intuition about the effects of dipole $\mu_C$ representing the effect of community 300 judging shoes 109a in average aggregate context or their social value context svc, on dipole $\mu_S$ representing subject S. In this example we assume that both dipoles $\mu_C$, $\mu_S$ exhibit F-D anti-consensus statics. In other words, they will tend to anti-align, as in FIG. 8B. In the present quantum representation, this corresponds to disagreement for any judgment of shoes 109a made by community 300 and subject S in the same value basis.

In addition to showing dipole $\mu_C$, FIG. 9 also indicates its field $\overline{B}_{svc}$ in a general manner by a single vector. For more comprehensive visualizations of magnetic fields established by dipoles the reader is referred to standard literature. For the purposes of the present embodiment it is assumed that community 300 is made up a large number of community subjects s1, s2, . . . , sj such that the magnitude of field $\overline{B}_{svc}$ overwhelms the unit magnitude of field $\overline{B}_S$ created by dipole $\mu_S$ representing subject S. That is because even for a near random alignment of many dipoles the overall resultant will grow roughly as the square root of the number of dipoles or, in our case, the square root of the number of community subjects s1, s2, . . . , sj (see also discussions of random walks in more than one dimension and Markov processes).

Because community 300 is large and stable its dipole will be hard to re-orient $\mu_C$ under the influence of a small dipole, such as dipole $\mu_S$ in this case. Stated in the vernacular, subject S will have a very hard time affecting in any meaningful way entire community 300 in their overall aggregate assessment of shoes 109a. Thus, we take field $\overline{B}_{svc}$ to be constant over time periods during which we examine to first order the effects of community 300 on subject S. Specifically, field $\overline{B}_{svc}$ is treated as constant for a long amount of time after a start time $t_o$. This start time can signal the commencement of a run performed by prediction module 122.

When considering dipoles of such different field magnitudes the solution for times t≥$t_o$ is simple and well known. Namely, dipole $\mu_S$ will revolve about the axis established by field $\overline{B}_{svc}$ of dipole $\mu_C$. This revolution or precession is indicated as orbit 308. Subject state |S⟩ is also indicated here at start time $t_o$, |S($t_o$)⟩, and at a later time $t_i$, |S($t_i$)⟩. Note that field $\overline{B}_S$ of dipole $\mu_S$ representing subject S processes too. A single vector representing small field $\overline{B}_S$ along the axis of precessing dipole $\mu_S$ is indicated at times $t_o$ and $t_i$ as $\overline{B}_S(t_o)$ and $\overline{B}_S(t_i)$, respectively. For reference, the "YES" eigenvector in the subject's S "sexy" or m-basis contextualization is also indicated with the aid of unit vector $\hat{m}$ in this drawing figure.

Dipole $\mu_S$ thus precessing about the relatively strong field $\overline{B}_{svc}$ set up by dipole $\mu_C$ will exhibit a certain angular frequency $\omega_S$. In accordance with standard physics, such angular frequency $\omega_S$ of precession is given in terms of a coupling and the strength of the field. The reader is here referred to the background section and the discussion of FIG. 10 along with the formula of Eq. 25 for this standard situation in EM.

As we have already noted above, however, it is not at present known what coupling constants to deploy and how to measure field strength when dipoles $\mu_C$, $\mu_S$ are taken to stand in for internal states of human subjects. Indeed, this type of set-up and a very large number of repeated measurements are the very tools the experimentalist will need to empirically arrive at reasonable estimates of these values.

In the present embodiment, a rough estimate of these quantitative measures will be taken whenever possible as a calibration. We presume the same form of coupling as found in the prior art for EM interactions (see Eq. 22 in the background section for correspondent Hamiltonian H). Thus, the calibration is performed by inheriting the Hamiltonian from EM, but recognizing that the scaling will be accounted for by an empirically measured parameter $W_{HS}$ as follows:

$$H = W_{HS}(-\mu_S \cdot \overline{B}_{svc}), \qquad \text{Eq. 33}$$

where the negative sign remains to account for the anti-alignment exhibited by fermions. Once parameter $W_{HS}$ is estimated, the standard tools for computing the dynamics based on the Hamiltonian are deployed. Thus, the adjusted Hamiltonian formally rediscovers the aforementioned precession with a consistent estimate angular frequency $\omega_S$ that is proportional to field $\overline{B}_{svc}$. These dynamics and progressively more complicated ones are well known to those of average skill in the art and will not be revisited herein. Due note is given, however, that complicated behavior patterns including spin flipping (also see Rabi Formula) and other effects (see e.g., various flavors of level-splitting in the presence of extra fields) will manifest under this adjusted Hamiltonian, just as they do in the experimentally confirmed model appropriated here from EM.

It is now apparent why obtaining the best possible estimate for state |S⟩ of subject S was not as important as obtaining a good estimate for the overall state of community 300. Namely, as dictated by the Hamiltonian, precession of state |S⟩ about dipole $\mu_C$ representing community 300 exhibits the same angular frequency $\omega_S$ irrespective of orbit. In other words, even in the case where state |S⟩ of subject S were determined for certain by collapse or measurement to be the "YES" measurable indication, thus placing state |S⟩ along unit vector $\hat{m}$, its temporal evolution about dipole $\mu_C$ would exhibit the same angular frequency $\omega_S$. Re-stated in the vernacular, the effect of community 300 on subject S is analogous in terms of the "speed" of temporal evolution independent of whether subject S has actually already made the corresponding judgment about shoes 109a in their contextualization or not.

On the other hand, the fact that subject's S "sexy" or m-basis contextualization indicated with unit vector $\hat{m}$ is not aligned with unit vector $\widehat{svc}$ (which is not shown but lies parallel along $\overline{B}_{svc}$) indicating community's 300 "YES" judgment of shoes 109a in its averaged social value context svc is very helpful. If state |S(t)⟩ of subject S is still unmeasured, then its projection onto $\hat{m}$ will change as a function of its temporal precession in orbit 308. This means that the probability of projection in the subject's own m-basis or "sexy" contextualization will exhibit a "wobble" or perturbation due to dipole $\mu_C$ standing in for community 300.

A person of average skill in the art will recognize at this point, that having a large number of very similar subjects prepared in the same manner as subject S with respect to same community 300 but not yet declared or measured in their own contextualization ("sexy" in this case) would permit the experimenter to estimate angular frequency $\omega_S$ from measurement data. Indeed, as the present invention presents a new way of looking at the problems of estimating subject behaviors based on the quantum representation, such experimentation as well as any related tests are encouraged and should be obvious to a person of average skill in the art.

Over longer periods of time, reasonably independent systems shielded from external influences and low amounts of thermal noise tend to reach a steady state. This state is typically the state of lowest energy. In other words, the system will tend to collapse to the eigenvector with the lowest eigenvalue in the energy basis established by the Hamiltonian. This means that if dipoles $\mu_C$, $\mu_S$ graphed by graphing module 119 at vertex 304a do not experience much coupling with the rest of graph 302, e.g., via edges 304a, 304b, 304c or via any other channel that promotes exchange with the environment, then we can expect anti-alignment as steady state after some longer period of time. This is the situation already shown above in FIG. 8D. Perhaps somewhat surprisingly, due to the F-D anti-consensus statistics the steady state is characterized by an agreement on the contextualization (the average social value context svc) but a disagreement on the measurable indication (i.e., community 300 is a "YES" while subject S is a "NO").

Once again, due to the Uncertainty Principle, this time between Energy and time (note that time per se does not have a quantum operator), it is not possible to predict when unitary evolution that gave rise to the precession mechanism visualized in FIG. 9 will terminate and yield the discontinuous projection (measurement). As noted, a large number of measurements under similar experimental conditions should be used to determine what length of time can be legitimately considered long in this quantum sense. These measurements will also be useful in corroborating the value of parameter $W_{HS}$. A common sense estimate, however, suggests that the time needs to be at least long enough for human subjects to be able to give proposition 107 about shoes 109a consideration, review choices made by others and come to their private conclusions and judgments.

Such lax guidance on time is best treated, in analogy with the physical problems, by introducing the concept of a half-life τ or a general estimate of time, rather than a hard number. Those skilled in the art are very familiar with the use of such half-lives in transitions and decay phenomena and various types of relaxation times (e.g., see relaxation phenomena in Nuclear Magnetic Resonance NMR). Furthermore, the study of magnetic or spin-systems in steady state or in thermal equilibrium with the environment and/or with certain perturbations is a very well understood field by those skilled in the art.

In sum, in the most simple embodiment prediction module 122 predicts quantum interactions that occur between subject state |S⟩ and field $\overline{B}_{svc}$ on graph 302 to be localized to vertex 304a. Further, it predicts that for a certain amount of time shorter than the half-life τ, which is determined empirically in accordance with the above general guidelines, unitary evolution via precession about dipole $\mu_C$ will take place at angular frequency $\omega_S$. The precession will exhibit no "wobble" after subject S has measured or judged shoes 109a in their own contextualization. Otherwise, the precession may exhibit some wobble as subject S is conflicted. In human terms, the conflict is between making the judgment of shoes 109a in accordance with their own internal state in the m-basis, versus succumbing to societal pressures and judging shoes 109a in community's 300 average social value context or svc basis. In any event, after each successive half-life τ, the probability of continued unitary evolution decreases by a factor of 1/e ($e^{-1}$) and thus the probability of steady state with the final alignment dictated by spin statistics or consensus and anti-consensus statistics (refer back to FIGS. 8A-D) increases concomitantly.

In addition, prediction module 122 preferably cooperates with statistics module 118 (see FIG. 2). Statistics module 118 is designed to perform quantum mechanical verifications and cross-check computations based on all available data and cumulative test, prediction and simulation results. It is particularly useful in bounding and quantifying important parameters, such as, for example scaling parameters W and especially parameter $W_{HS}$. These quantifications should be continuously refined based on any on-going empirical test results and real life measurements (including, in the very particular example at hand, data about subjects' purchases of shoes 109a and other information pertaining to shoes 109a). The information should be corroborated with data on network 104 including archived data files 112 and any information gleaned from network behavior monitoring module 120 as well and empirical data from pure quantum computations carried out by computer 114. All of these measures implemented by statistics module 118 are sent to prediction module 122 to improve the quality of its predictions.

To this end, in the preferred embodiment, statistics module 118 is specifically tasked with carrying out the compatibility tests between community value matrix $PR_C$ and subject value matrix $PR_S$. Clearly, large number statistics are preferred in performing such tests as they are based on deploying the commutator algebra introduced previously. Statistics module 118 estimates the degree of incompatibility between community value matrix $PR_C$, which represents the social value context svc in which underlying proposition 107 is contextualized by community 300, and subject value matrix $PR_S$, which represents the estimated subject value context or the m-basis in which underlying proposition 107 is contextualized by subject S. Since matrices $PR_C$, $PR_S$ are quantum mechanical operators, their degree of incompatibility is most easily quantified by their commutator $[PR_C, PR_S]$. With proper estimates of parameters such as $W_{HS}$ at hand, it will be easier for statistics module 118 to estimate whether the commutator is near the minimum (zero) and the contextualization rules are thus compatible or whether the maximum of incompatibility has been reached.

This is especially important because community subjects and the subject of interest may use different semantics to describe the same contextualization rule. Although the human curator that has been and should continue to vet every step may be able to determine when such differences occur, it is preferable to computationally corroborate these human intuitions. This is especially true if subjects come from vastly disparate backgrounds (e.g., different cultures) and it is therefore difficult to divine what is meant by "sexy" and how compatible that is with "stylish" in the mind of a subject.

The simple mapping onto single vertex 304a of graph 302 and disregard for edges 306a, 306b, 306c and other vertices (see FIG. 6) in the first embodiment was deployed to better illustrate some key concepts and obtain a few overarching results about quantum interactions between community 300 and subject S in the quantum representation adopted herein. At this point, we wish to deploy a more granular mapping that will bring out additional effects of community-subject interactions. We shall proceed with the refinements in increments and examine how they affect the predictions that can be made by prediction module 122.

FIG. 10A illustrates a more granular approach initiated by graphing module 119. Here, a portion 310 of graph 302 with three vertices 304a, 304b, 304c is selected to represent community 300. Graphing module 119 then assigns all community subjects into three groups based on the contextualization rule they apply to underlying proposition 107 about shoes 109a.

All community subjects contextualizing shoes 109a in terms of "beauty" are mapped to vertex 304a. Their field contributions by individual dipoles corresponding to these community subjects are summed (see Eq. 31) to obtain dipole $\mu_{C(u)}$. Dipole $\mu_{C(u)}$ thus represents the influence of all subjects in community 300 that contextualize shoes 109a from the point of view of "beauty". Note that spin statistics, in our representation corresponding to B-E consensus and F-D anti-consensus behavior modulo proposition 107 about shoes 109a, are explicitly taken care of and indicated in the above-introduced convention. The overall fractional statistic is obtained by tracking the overall parity of fermionic community subjects in the group. If odd, then the composite is fermionic. If even, then the composite is bosonic. In this case the parity of fermions was odd and hence the half-filled ball is placed on dipole $\mu_{C(u)}$ to remind us that the overall segment of community 300 that contextualizes shoes 109a by "beauty" will exhibit F-D anti-consensus statistic.

Meanwhile, all community subjects contextualizing shoes 109a in terms of "style" are mapped to a single vertex; in this case vertex 304b. Once again, dipole $\mu_{C(v)}$ representing their total influence is obtained by summing individual contributions. The same is done for the third group of community subjects 109a contextualizing by "utility" and being represented by dipole $\mu_{C(w)}$ mapped to vertex 304c. The spin statistics obtained for both indicate composite F-D anti-consensus behavior for the second and third groups, just as was found for the first group.

From observations of community 300, graphing module determines that edges 306a, 306d connect vertices 304a, 304b as well as vertices 304b, 304c. There is no direct connection and therefore no edge between vertices 304a, 304c. As in all of the above cases, the existence of inter-group connections that are captured by edges 306a, 306d of graph 302 is inferred from available data and inter-subject communications both in network 104 and in real life, if available.

Once again, the human curator should vet the findings and review the assignment of both vertices and edges. In particular, the presumption of clustering of subjects that contextualize in the same manner is being assumed in this more granular model. Should this assumption not be warranted by data, then the experimenter should skip to the next type of surjective mapping onto graph 302 as shown in FIG. 10B for a more realistic set-up ensuring better predictions by prediction module 122.

A skilled practitioner of the art will also realize that many approaches and algorithms are available for examining clustering behaviors, especially in complex situations involving complicated graphs in high-dimensional spaces (e.g., social graphs). Some of these approaches further leverage the insights gained from quantum mechanics for practical estimations (ruling in/out the existence of clustering) and in the construction of neighborhood graphs. For additional background reading the reader is referred to the foundational work by Grover, L. K., "Quantum mechanics helps in searching for a needle in a haystack", Physical Review Letters, 1997, 79(2), pp. 325-328 and to more recent work as outlined, e.g., by Weinstein et al. in U.S. Published Application No. 2010/0119141 discussing methods for discovering relationships in data by dynamic quantum clustering.

In the surjective mapping by contextualization group there exist two corner cases. In one corner case all three groups could be in communication and thus interconnected by edges. In the other corner case, all three groups could be entirely isolated and not connected by any edge. The reader is reminded that this situation is true modulo proposition 107 about shoes 109a rather than in general. Lack of an edge thus signifies no interaction between groups about shoes 109a at all. In the vernacular, this would mean that these groups do not even exchange any views about shoes 109a (while inter-subject interactions about shoes 109a are certainly not precluded within the groups).

In this model subject S is still represented by dipole $\mu_S$. However, the mapping by graphing module 119 does not permanently assign dipole $\mu_S$ to any of the three vertices 304a, 304b, 304c. Instead, dipole $\mu_S$ is permitted to hop between vertices 304a, 304b, 304c on edges 306a, 306d. In some embodiments, even hopping to and from vertices that are beyond portion 310 of graph 302 that represents community 300 can be allowed, as indicated by arrow LH. Of course, hopping to such distant vertices that are not modulo proposition 107 about shoes 109a simply introduces a time delay or down-time as far as prediction by prediction module 122 is concerned.

Once on vertex, dipole $\mu_S$ exhibits the behavior already outlined above. Namely, precession with or without "wobble" accompanied by a doubling of the probability of collapse after each half-life τ to alignment or anti-alignment in the contextualization enforced by the dipole on the particular vertex and depending on joint consensus and anti-consensus statistics. Again, it is assumed that dipoles $\mu_{C(u)}$, $\mu_{C(v)}$, $\mu_{C(w)}$ generate fields whose magnitude is large in comparison to field $\overline{B}_S$ created by dipole $\mu_S$ and are thus not subject to influence by subject S. Differently put, subject S cannot appreciably affect the group's contextualization.

Statistics module 118 and prediction module 122 review the quantum interactions supported by graph 302 as in the prior embodiment to predict the quantum state of subject state |S⟩. Note that because dipoles $\mu_{C(u)}$, $\mu_{C(v)}$, $\mu_{C(w)}$ representing the groups contextualizing by "beauty", "style" and "utility" are smaller that dipole $\mu_C$ that was derived from all community subjects, the angular frequencies $\omega_S$ about each one of dipoles $\mu_{C(u)}$, $\mu_{C(v)}$, $\mu_{C(w)}$ will be smaller. In other words, the rate of temporal evolution about any one of dipoles $\mu_{C(u)}$, $\mu_{C(v)}$, $\mu_{C(w)}$, depending on the vertex on which dipole $\mu_S$ finds itself, will be slower because of the lesser magnitude of the corresponding field experienced by dipole $\mu_S$.

Furthermore, because of the additional freedom to hop between vertices 304a, 304b, 304c the dynamics are much more complicated in this second embodiment. In order to properly treat this situation, prediction module 122 preferably introduces the Hamiltonian H to account and solve for the possible quantum interactions. Based on the common solutions to quantum lattices of spins, a person skilled in the art will be very familiar with appropriate formulations of Hamiltonian H to describe the energy states available in portion 310 of graph 302 to hopping dipole $\mu_S$. The simplest formulation of such a Hamiltonian will include the assumption that dipoles $\mu_{C(u)}$, $\mu_{C(v)}$, $\mu_{C(w)}$ do not evolve. Note that in this case no nearest neighbor interaction terms will be contained in the Hamiltonian. Thus, the Hamiltonian will essentially just contain the sum of the three possible interactions on vertices 304a, 304b, 304c (see Eq. 33 for the expression of the single term Hamiltonian) and a kinetic term allowing for the hopping of dipole $\mu_S$. External influences can be disregarded in the simplest case or, if appreciable and confirmed by measurement and/or the human curator during vetting, they can be included in the model on which the prediction is based.

FIG. 10B finally progresses to a still more granular model for computing predictions about the likely evolution of the quantum sate of subject S by prediction module 122. At this level of detail, all community subjects are treated independently and mapped individually to their own vertices on graph 302. They are all now represented as separate dipoles of same magnitude. Specifically, in FIG. 10B we see the decomposition of each of the three groups in portion 310 of graph 302 previously represented by composite or aggregate dipoles $\mu_{C(u)}$, $\mu_{C(v)}$, $\mu_{C(w)}$ into dipoles embodied by constituent community subjects.

In order to avoid undue notational rigor, FIG. 10B explodes each of the three groups corresponding to dipoles $\mu_{C(u)}$, $\mu_{C(v)}$, $\mu_{C(w)}$ separately into its constituents. Consequently, first group 312a that includes subject s1 (see, e.g., FIG. 3K) that is now represented by dipole $\mu_{C(s1)}$ and other like-minded subjects (not explicitly called out) represented by the other dipoles in group 312a all contextualize shoes 109a in the u-basis or according to their "beauty". This, of course, is clear based on the same alignment of all dipoles in group 312a.

The B-E consensus statistic of subject s1 is reflected in accordance with our convention by the filled ball on the vector depicting dipole $\mu_{C(s1)}$ that stands in for community subject s1. Three other community subjects (not labeled) as well as still others (indicated by the ellipsis) belong to group 312a. In aggregate, of course, group 312a exhibits the F-D anti-consensus statistic. Note that the odd number of fermions (hence odd parity of any joint quantum state) ensures that the composite state exhibited by aggregate dipole $\mu_{C(u)}$ reflects the F-D anti-consensus statistic.

Groups 312b, 312c making up the aggregate dipoles $\mu_{C(v)}$, $\mu_{C(w)}$ are also exploded to visualize their constituent unit dipoles standing in for the individual community subjects. In particular, we see dipole $\mu_{C(s2)}$ with B-E consensus statistic standing in for community subject s2 included in group 312b. Also, we see dipole $\mu_{C(sj)}$ with F-D anti-consensus statistic standing in for community subject sj located within group 312c. Once again, the ellipsis indicate the community subjects not expressly shown and the spin-statistics are properly reflected by odd numbers of fermions.

It is very important to note, that in practical applications involving the importation of the quantum representation advocated herein onto any type of graph (of which lattices, social graphs and various other configurations are subsets), estimation of the correct interconnectivity is key. In other words, the edges connecting the individual dipoles within groups 312a, 312b, 312c should be discerned and input to the extent best known and/or estimated.

One of the main trade-offs between better predictions and more granular graphs now becomes apparent. The less granular model, e.g., the one of FIG. 10A, will enable prediction module 122 to issue predictions of the evolution of a quantum state on graph 302 in overall terms. Any individual interactions are "washed-out" due to the aggregate community effect. On the other hand, predictions about subject state |S⟩ represented by dipole $\mu_S$ standing in for subject S can be much more specific based on the more granular model of FIG. 10B. However, the less granular model of FIG. 10A will be more accurate than the more granular model of FIG. 10B, unless the edges interconnecting the community subjects on the topic of proposition 107 about shoes 109a are well known and properly entered by graphing module 119 (or at least very well estimated and entered by graphing module 119). Differently put, a high quality graph 302, and in this case graph portion 310, is required to make good predictions. Of course, this should come as no surprise to the skilled artisan, since deployment of the quantum representation is not a panacea and certainly does not eliminate the need for good data. Therefore, as was likely expected by the careful reader, the skilled practitioner is urged to deploy any clustering algorithms, including the quantum-based ones mentioned above, to obtain the best possible estimate of interconnections between community subjects before using the most granular version of graph 302.

In any specific case, of course, the entire prediction made by prediction module 122 will depend on the exact choice of model of which the graph is a major part. In the simplest case the graph will have one vertex with no edges or with just one loop if feedback is present (e.g., see self-interaction of same subject described in U.S. patent application Ser. No. 14/224,041). More commonly, however, the graph will have more than one vertex and more than one edge. The subject state |S⟩ and each of the community subject states |C$_k$⟩ will then be placed on one of the vertices by graphing module 119 in accordance with the surjective mapping that is data-driven.

FIG. 11A illustrates an approach to mapping that builds on pre-existing data about interconnections between community subjects. Here, the data to obtain graph 320, which is initially taken to just be the social graph, is imported directly from social network 106 when all community subjects of interest are members thereof (see FIG. 2). Next, the quantum representation will impose the usual steps of mapping, creating, assigning, graphing onto graph 320 and predicting based on quantum interactions on the graph.

In this embodiment, graph 320 is adjusted from the original social graph to a sparser graph with respect to proposition 107 about item 109e. This time, item 109e is an experiential good embodied by a movie from inventory 130 (see FIG. 2). The first adjustment is obtained by removing all nodes or vertices corresponding to community subjects that are not in the community values space modulo proposition 107 about movie 109e. Then, all subjects that exhibit precipitation different from the simple 2-level quantum state with respect to proposition 107 about movie 109e, or subjects with the desired precipitation but exhibiting degeneracy are removed. The remaining community subjects produce non-degenerate eigenvalues corresponding to measurable indications, which in this embodiment are "YES" and "NO" actions. The "YES" action corresponds to going to the theatre to see movie 109e. The "NO" action corresponds to not going to the theatre to see movie 109e. All measurable indications from community subjects are gathered form information provided by the theatres about screening attendance. For cross-check purposes, behavior monitoring module 120 (see FIG. 2) confirms theatre attendance data by verifying that contemporaneous data files 112 of community subjects reflect having or not having seen the movie.

Upon such review, graphing module 119 retains the duly qualified community subjects filtered out of original social graph 320 and produces the sparser adjusted graph 320'. Notice that FIG. 11A mentions original social graph, but only indicates pruned graph 320'. Then, graphing module 119 executes the surjective mapping onto pruned graph 320'. All community subjects are represented by dipoles, as in the previous example, but are no longer individually labeled. Their consensus and anti-consensus statistics are still indicated with the filled and half-filled balls, respectively.

As before, prediction module 122, in conjunction with statistics module 118 predict the quantum state of a newcomer, i.e., a subject S of interest that is placed onto graph 320' at some initial vertex as dictated by the quantum interactions on graph 320'. Subject S is represented by dipole $\mu_S$. Note that placement of dipole $\mu_S$ onto graph 320' is performed after the placement of all dipoles representing the community subjects.

While in the simplest case the influence on the subject S was evident from standard physics intuition, in the case of graph 320' it is necessary to deploy the correct formalism. That formalism involves a Hamiltonian that sums all possible states and modalities and reflects the energy contribution of each. A person skilled in the art will be familiar with the rules and best practices for constructing the requisite Hamiltonian. By running the model based on such Hamiltonian, prediction module 122 will be able to predict the various types of dynamics that subject S, or rather dipole $\mu_S$ that represents subject S, is likely to experience on graph 320'.

In an attempt to generate the best possible predictions, prediction module 122 should seek any further simplifications to the model. It is known that one major source of problems is social graph 320 itself, as it is very complicated. Even pruned graph 320' is likely to be very large with hundreds or thousands of nodes (vertices) for any interesting community (e.g., inhabitants of a small city). Further, the interconnections or links (edges) between nodes on a typical social graph will vary greatly in number and, possibly in strength. Reflecting these parameters within the Hamiltonian is not a conceptual problem, but the linear algebra challenges in solving for the dynamics are likely to be very computationally expensive.

FIG. 11A indicates a portion 322 of pruned graph 320' that is a good candidate for further model simplification in accordance with the invention. Specifically, portion 322 is a subgraph of pruned graph 320' with a majority of vertices having six edges. All vertices with six edges in subgraph 322 are identified by cross-hatching. There are only two vertices in the group that have one more or one fewer edges than six. Namely, the vertex labeled by the number "7" has seven edges and the vertex labeled by the number "5" has five edges. Otherwise, the vertices in subgraph 322 are fairly regularly spaced and there is no expectation of substantial variations in coupling strength (influence) along the edges. This situation allows us to reduce the dimensionality of subgraph 322 and to treat the dynamics within it separately, assuming it is in thermal equilibrium with the rest of graph 320'. A person skilled in the art will know all the tools required (afforded, e.g., by the methods of statistical mechanic) to establish whether thermal equilibrium exists on graph 320' and whether such separate treatment is warranted. The number of suitable references available to the practitioner in this field is truly vast. They range from treatments of simple spin systems on very simple lattices (e.g., 1D and 2D Ising models) along with appropriate formulation of quantum statistics and introduction to partition functions and ensembles. Solutions to models on higher dimensional lattices with analysis and their use in understanding and predicting phase behavior, including second-order phase transitions are also described in most such references. Additional concepts of relevance to extending the applicability of the present invention involve clustering, correlations, fluctuations, mean free field theories, renormalization, extensions into other realms along with the introduction of appropriate mathematical tools. The diligent reader is here advised to commence with any thorough and classic text on this subject, such as L. D. Landau and E. M. Lifshitz "Statistical Physics", $3^{rd}$ Edition, Parts 1&2, as reprinted in 2005.

FIG. 11B shows how subgraph 322 of pruned social graph 320' is remapped by graphing module 119 to a lattice 324 under the simplification. Now, given that by far the most vertices only have six nearest heighbor vertices that they are connected to, and that the vertices are rather evenly spaced, subgraph 322 is remapped to a particularly simple type of lattice 324 that is cubic. For the sake of clarity, the dipoles residing on the vertices are no longer shown. Also, for better visualization, a sub-group of just seven of the re-mapped vertices are indicated by a dashed outline 326 and partial filling in cubic lattice 324.

In a mean free field model, the field at the central vertex of sub-group 326 of seven vertices is considered just due to the six nearest neighbors to which it is linked by edges. In other words, the field generated by the neighboring dipoles placed on the six neighboring vertices is averaged at the location of the central vertex to find the mean free field that will influence the dipole sitting there. Of course, the cubic lattice and its Hamiltonian in the case of only the nearest neighbors creating a mean free field at the location of the center vertex has been studied extensively in the art of spin lattices. It is also given a thorough formal treatment by the above-cited textbook about statistical physics by Landau and Lifshitz.

In our predicament, since original social graph 320 is often too difficult to handle as one entity, breaking it up into portions that exhibit a sufficient amount of regularity to allow for simplification through re-mapping is very useful. This is especially so if the re-mapping is to a simple graph. It is even more so, if the re-mapping is to a lattice in a class that has been extensively studied for many decades, as is the case of the simple cubic lattice 324.

Evidence of candidate groups for re-mapping will be apparent to behavior monitoring unit 120 and to statistics module 118 upon examination of data files 112 (see FIG. 2). Of course, graphing module 119 will discern the telltale patterns as it is performing the first surjective mapping and any subsequent re-mapping based on the data received from mapping, creation and assignment modules 115, 117, 116 as well as input from statistics module 118. In real life, the pattern will manifest, for example, in "tightly-knit" groups of community subjects or in social structures with enforced rules (e.g., school, workplace, military) or sub-structures within them.

Now it can be fully appreciated that the graph onto which graphing module 119 places the quantum representations of the subjects, especially if it is originally derived from the social graph, should be simplified if possible. Thus, the final graph is preferably a lattice based on any quantum mechanical model known to those skilled in the art. In the present invention, the Ising Model, the Heisenberg Model and the Hubbard Model are called out in particular. The reason is that they have simple lattice Hamiltonians that support lattice hopping as well as other practical adjustments and "tweaks". Moreover, there exist many practical tools for running efficacious computations and simulations of quantum interactions on such lattices. Such lattices can be configured to reflect interactions only on the vertices, i.e., between the states mapped onto that single vertex, and/or also between nearest neighbor vertices. Of course, weaker interactions between more remote neighbors can also be included if sufficient computational resources are available to computer system 100 (e.g., if computer system 100 is implemented in a cluster).

Working with a social graph or a portion thereof that is re-mapped to a lattice enables the application of additional tools that determine how this lattice behaves when populated by spins (dipoles) representing the community subjects and the subject of interest. These tools can be deployed directly by prediction module 122 in tracking the quantum interactions on the lattice to arrive at its prediction of a subject's quantum state. Of course, we already have reviewed the fundamental quantum rules for vertex filling that prediction module 122 uses in FIGS. 8A-D. Beyond these, however, there are more large-scale effects that address filling order and possible clustering effects on the lattice. Due to the provenance of the original data from subjects, rather than from electrons or other entities with spin, the most physically appropriate parameters based on observations from solid state and statistical mechanics of fluids (e.g., crystals (with and without impurities or doping) and lattice gas models) should be very carefully vetted before deployment.

In accordance with the present invention, it is preferable to introduce a single and simple factor to track these effects. Thus, in preferred embodiments, larger-scale effects or tendencies of spin states living on lattice are reflected by a chemical potential $\mu$ that is part of the corresponding lattice Hamiltonian. Note that chemical potential $\mu$, unlike the dipole (which is also unfortunately referred to by the same Greek letter) is not a vector quantity and hence not bold-faced. For example, in the Bose-Hubbard model, which falls under the preferred Hubbard Model advocated herein, chemical potential $\mu$ is associated most simply with the last term in that Hamiltonian, which varies with the number of filled vertices as follows:

$$H = -t\sum_{(i,j)} \hat{a}_i^\dagger \hat{a}_j + \frac{U}{2}\sum_i \hat{n}_i(\hat{n}_i - 1) - \mu\sum_i \hat{n}_i. \qquad \text{Eq. 34}$$

In this specific example the bosonic spins placed on the lattice represent community subjects that exhibit B-E consensus statistics. For fermionic subjects exhibiting F-D anti-consensus statistics we deploy the fermionic creation and annihilation operators $\hat{c}^\dagger$ and $\hat{c}$ instead. The Hubbard Model would thus cease to be purely Bose and would instead be mixed (both fermions and bosons populating the lattice). The term U is a parameter that describes on-vertex interaction (positive U signals repulsion and negative U indicates attraction) and is often referred to as the potential energy term. Finally, $\hat{n}_i$ is the number operator that gives the number of spins on the i-th vertex of the lattice. Notice that the first term in Eq. 34 is kinetic and thus expressly accounts for lattice hopping but there are no inter-vertex terms. In other words, no nearest neighbor field is included in this simple Hubbard Hamiltonian.

Preferably, inter-subject quantum interactions on the lattice are tracked by prediction module 122 or simulated by simulation engine 126 (discussed below) under the conditions of thermodynamic equilibrium. In other words, community subjects whose states modulo proposition 107 regarding item 109 are in extreme flux, as may be discovered from a comparison between archived and recent data files 112 as well as information gleaned by network behavior monitoring unit 120, should preferably be excluded from predictions and/or any simulations. If the number of such "unstable-minded" community subjects is large and difficult to ignore, then their overall or net effect, which we will refer to as "group effect" should be accounted for in other ways. In fact, the "group effect" should preferably be accounted for in similar manner as the "background group effect". The background groups are assigned in situations where the community is embedded within a much larger group, the "background group" that plays a dominant role in the contextualization of underlying proposition 107 about item 109.

For example, the background group can be a religious group, a sect or a even an entire nation that has a uniform and set contextualization rule modulo proposition 107 about item 109. In a practical situation, if proposition 107 is about item 109z, which is an object instantiated by a coffee maker (refer back to FIG. 3B to recall some examples of possible item 109) it is unlikely, although certainly not impossible, that the background group would have a strongly-held contextualization rule reflecting their beliefs about proposition 107. On the other hand, when underlying proposition 107 is about item 109f, which is another subject instantiating a potential romantic interest the background group can be expected to "weigh in". The act of "weighing in" stands here for any attempts, by word or deed, of applying pressure to other subjects in order to enforce the contextualization rule adopted by the background group regarding proposition 107 about romantic interest 109f. This is the "background group effect". To complete the example, the background group may be a fundamentalist Christian or Islamic sect that will not permit contextualization of romantic interest 109f by any of the community subjects in other ways than as potential for a monogamous, heterosexual relationship with as many offspring as possible.

We will not review the many other contextualization rules that can be adopted modulo proposition 107 concerning romantic interest 109f. It is important to remark, however, that in the most general sense an item 109 has to be considered as any precipitation-inducing real entity that the subjects in question, including groups and background groups can apprehend. Items 109 need not necessarily be represented directly. In other words, any item 109 may be a token for another item 109. The item commonly referred to as money, for example, is a tokenized item 109. It is a precipitation-inducing real entity that urges people to perform in agreed upon ways to obtain it. However, money token or tokenized item 109 usually contextualizes differently in each subject's internal space; commonly as a function of the subject's own personal needs and proclivities.

Inter-subject agreement about global influence or the "background group effect" such as the commonly accepted contextualization of money 109 can be reached without committing to its subsequent contextualization(s). In other words, a subject living in a culture whose "background group effect" enforces contextualization of money 109 as the exclusive means of settling inter-subject obligations need not personally subscribe to that contextualization, despite having to earn their money 109 while operating within this understanding. Once a subject is in possession of money 109 after having earned it they are at liberty to decide that it is not legal tender but rather a worthless token and dispose of it (e.g., by burning their $100 bills in public, as sometimes shown done by stars on TV).

Despite the potentially amusing nature of the explanations we have used throughout the instant detailed description, it should not be glossed over that the quantum representation advocated herein resolves the fundamental and irreconcilable definitional problems encountered by typical classical models that posit an absolute existence of things and their attributes. Namely, the quantum representation taught herein permits items to be apprehended in many conflicted contextualizations by many different subjects. Yet, "YES" and "NO" responses or other measurable indications that lead to consensus actions are still attainable. Without delving too deep into the subject, consider item 109 instantiated by sexual intercourse. Although both participating subject likely said "YES" to start, it is possible that each meant something different in assenting to the act.

FIG. 12 illustrates a preferred mechanism 328 to be included in the prediction model implemented by prediction module 122 to account for the "group effect" and the "background group effect". Mechanism 328 is an external field simulation module that consists of two field plates 330A and 330B and auxiliary means such as power sources and wiring (not shown, but well known to those skilled in the art) to generate a uniform applied field $\overline{B}_A$. The direction of this externally applied field $\overline{B}_A$ is aligned with the contextualization (basis) modulo proposition 107 about item 109 adopted by the group or by the background group whose effect is to be included in the prediction and/or simulation. More precisely, the use of external field $\overline{B}_A$ allows prediction module 122 to include the group or background group whose effect on the community is to be accounted for without requesting graphing module 119 to explicitly map each member thereof onto any graph or lattice that is being used to model the otherwise well-behaved (i.e., near thermal equilibrium) community under study.

In the present case we find that the community is sufficiently well-behaved modulo proposition 107 about item 109 to warrant re-mapping to cubic lattice 324. Once populated, lattice 324 is placed between plates 330A and 330B to experience immersion in applied field $\overline{B}_A$ that produces the "group effect" or the "background group effect". In the case of the "group effect" that is primarily due to a large number of unstable community subjects, the summed overall contextualization pressure is likely to be small in magnitude. Of course, given that the number of unstable subjects is relatively large in proportion to the size of the community of interest (this is the reason we are accounting for their influence), the effect is nonetheless felt throughout lattice 324.

As seen in FIG. 12, under such circumstances applied field $\overline{B}_A$ is really to be considered a bias field $\overline{B}_{bias}$. Bias field $\overline{B}_{bias}$ is typically kept at a relatively low value in comparison to the strength of a "human dipole". In other words, the "group effect" of "unstable-minded" community subjects is not very strong in the minds of individuals or tiny groups of community subjects. (The relative field strength has to be expressed in relation to the "human dipole" because of the scaling parameters discussed above and given the application of EM in the remote realm of subjects and their communities.)

When accounting for the "background group effect", applied field $\overline{B}_A$ is considered to be a forcing field $\overline{B}_F$. Forcing field $\overline{B}_F$ is typically set at a relatively high value in comparison to the strength of a "human dipole". In other words, the average influence of the dogma, ideology or predisposition driving the contextualization rule of the background group is strongly felt among community subjects, whether individually, in small groups or in relatively large gatherings. The implication is not necessarily negative, as the "background group effect" may be benevolent. For example, the background group may enforce contextualizations rooted in common law or proscribed by general accounting practices. Therefore, forcing field $\overline{B}_F$ representing the "background group effect" may stand for a force tending to preserve law and order or uphold the principles of fair trade, as the case may be.

The above embodiments and especially the most recent one in FIG. 12 suggest that computer system 100 can also be instantiated in a performative physical system, rather than in a set of computing modules. Indeed, in some embodiments setting up an actual lattice in accordance with the parameters derived according to the methods of the invention is practicable. Persons skilled in the art will be familiar with the requisite resources and methods.

More generally, given that the present invention relates to computer implemented methods that are based on quantum representations and computer systems for implementing methods based on such quantum representations it is convenient under certain conditions to consider implementations in a fully quantum environment. In some particular embodiments, it may even be possible to go further by migrating the entire prediction and/or simulation to a quantum computer. Efforts are underway to develop a suitable quantum computer to perform graph or lattice-based computations directly in the quantum domain without translating instructions to classical code that manipulates classical bits. In particular, spin glass systems, which are less regular than the preferred regular lattices, but certainly more regularized that the social graph, can form the basis for a useful quantum computation that prediction module 122 and/or simulation module 126 can use in generating their output(s). D-Wave Systems, Inc. of British Columbia, Canada are presently supplying quantum computers that take advantage of quantum annealing in a spin-glass type spin lattice.

The D-Wave system is most useful when the surjective mapping is onto the less ordered Spin-Glass Model, since that is the physical foundation of D-Wave's quantum computers. In embodiments where the graph is re-mapped to a lattice such as the Ising Model, the Heisenberg Model, the Hubbard Model a correspondent physical system can be the basis of the computation, prediction and simulation just the same. In fact, since the lattice corresponds to the social situation being modeled by the surjective mapping, an appropriately initialized real lattice may be deployed by the computer system in running the predictions and/or simulations. Simulation engine 126 that simulates the quantum interactions on the lattice can thus be the physical model itself. On the other hand, it can also be a simulator with appropriate computing resources to simulate such model in software.

In most implementations of the methods of the invention, irrespective of whether the computational resources are classical or quantum, it will be convenient to translate the quantum states to qubits (quantum bits). This is possible because the preferred embodiments insist on conditions in which the precipitation modulo the underlying proposition 107 about item 109 is discrete and forms a two-level system. In cases where more complex quantum systems embody subject states representations founded on qubits may not be preferred or even practicable (e.g., in cases of continuous precipitation type; also see FIG. 3C).

All of the embodiments discussed so far, however, are discrete, non-degenerate and two-level. They can therefore be easily implemented in classical computer system 100. They also support translation to qubits. Therefore, it is convenient to translate community subject states $|C_k\rangle$ as well as subject state $|S\rangle$ to qubits. FIG. 12 illustrates this translation explicitly applied to community subject state $|C_1\rangle$ of community subject s1 introduced above (see FIG. 2). Moreover, convenient and relatively computationally efficient embodiments of the methods of invention are possible because the mean measurable indication is one of just two mutually exclusive responses a, b (e.g., "YES" and "NO" responses considered in the above embodiments) with respect to underlying proposition 107. In such situations the two mutually exclusive responses a, b are easily set to correspond to the two eigenvalues $\lambda_1$, $\lambda_2$ of the community value matrix $PR_C$ that encodes for the social value context svc.

Reliance on two-level systems that lend themselves to simulations based on spin lattices are also advantageous from the point of view of simulation engine 126. Namely, many simulation techniques are known in the art to simulate phenomena on a spin lattice that simulation engine 126 may use after simple re-translation of the meaning of the various terms based on the quantum representation advocated herein. Furthermore, random event mechanism 124 supporting any simulation runs by simulation engine 126 can also use more standard random number generation techniques when deployed in such settings. Overall, a person skilled in the art will find that modern day lattice simulations include tools to deal with the many practical limitations of quantum models that we have already mentioned herein and in the two co-pending applications (Ser. No. 14/182,281 and Ser. No. 14/224,041). Specifically, the possibility for substantial entanglement as well as some non-linearity is anticipated and treated by modern tools of applied physics and mathematics. To the extent that these tools involve large-scale linear algebra formulations, the Map-Reduce functionality in distributed systems when computer system 100 is instantiated in a cluster environment can be employed to help distribute the computational load.

In implementations where computer 114 is a standard PC, it should limit itself to procuring data files 112 from memory 108 after those have been time-stamped and archived there (see FIG. 2). In this way, computer 114 is not tasked with monitoring online activities of large numbers of subjects, including subject S. These activities should be the sole of network behavior monitoring unit 120.

The restrictions can be relaxed when computer system 100 is embodied in a more extended type architectures that is not confined to a local machine. Distributed, cloud-based, cluster-based as well as any hybrid version of such systems are appropriate architectures for computer system 100. In some of these the throughput is no longer an issue (e.g., cloud-based) and thus there is less need for carefully monitoring and managing the computer's resources. In some of these architectures that are cluster-based, mapping module 115, creation module 117, assignment module 116, graphing module 119 and prediction module 122 (and possibly even statistics module 118 and simulation engine 126) are all implemented in the nodes of a computer cluster. The partitioning of these nodes and functions can be performed in any suitable manner known to those skilled in the art of computer cluster management.

Data files 112 should either contain actual values and choices of measurable indications from among measurable indications a, b or information from which measurable indications a, b and the choice can be derived or inferred. In the easier case, the subjects explicitly provided measurable indications a, b and their choice through unambiguous self-reports, answers to a direct question, responses to a questionnaire, results from tests, or through some other format of conscious or even unconscious self-reporting. To elucidate the latter, subjects may provide a chronological stream of data in multiple data files 112. Such data files 112 may be constituted by a series of postings on social network 106 (e.g., Facebook) where community subjects are friends.

While data about community subjects is typically easier to collect and analyze due to quantity of community subjects and persistence of typically communities, the same may not always be true for any given subject of interest. Thus, estimating the measurable indication modulo the underlying proposition from the subject and capturing it in subject state |S⟩ may not be as straightforward. It is thus most convenient to collect such series of postings or streams of data related to the internal state of the subject and generated by the subject online. Similarly, it is preferred to collect a stream of data related to the underlying proposition generated by the subject online over a reasonably long time period. This process is sometimes referred to as the collection of "thick data" about a subject.

Clearly, estimating the measurable indication of the subject modulo the underlying proposition associated with any item is preferably based on such "thick data". In one embodiment, the "thick data" is a stream of data of all known references that the subject has made in relation to the underlying proposition about the item. Of course, it is always preferable that the data stream be originated by the subject. If such information is not available, someone most nearly like the subject in terms of their internal subject space $\mathcal{H}^{(S)}$ and value matrix $PR_S$ could be substituted.

Of course, the quantum representation of the present invention can be applied just to predict quantum state dynamics of only community subjects s1, s2, . . . , sj modulo underlying proposition 107 about item 109 as contextualized by them in their social value context svc. Indeed, we had to prepare this situation prior to injecting subject S of interest via surjective mapping onto the graph where graphing module 119 had already placed the entire community. It should be noted, that in order for the prediction generated by prediction engine 122 or simulation produced by simulation engine 126 to offer useful information, it is necessary to model quantum state dynamics emerging between a statistically significant number N of community subjects s1, s2, . . . , sj. In preferred embodiments of the apparatus and methods of invention, the number N should be at least in the thousands, and preferably in the tens of thousands or larger.

In following the dynamics of community subjects it is again useful to obtain the mean measurable indication modulo the underlying proposition as exhibited by the community and capture it in the form of community value matrix $PR_C$. It is also useful in many practical situations to posit a test subject matrix $PR_{St}$ that represents an estimated test subject value context in which the underlying proposition is contextualized by the test subject. The test subject in this case may not correspond to an actual subject, but rather a test entity designed to further explore the quantum state dynamics.

Of course, the test subject could also be a real subject—e.g., it could just be the subject S of interest we had modeled previously.

The most convenient foundation for setting up tests and predictions for quantum state dynamics are networked communities that exist online and generate continuous streams of data. These data can be used to verify and test and tune the prediction model under the direction of a human curator. Furthermore, in situations where all data is generated by a social network the network behavior monitoring unit can be recruited to perform the step of measuring the mean measurable indication.

Whenever the social graph is used as the original basis for the mapping (e.g., prior to any re-mapping as taught above) some additional aspects should be considered. For example, the connections, which correspond to graph edges, between the community subjects could be directional. In other words, communication flow could exhibit one-way or both-ways patterns. The information about the directionality of communications should be imported into the graph in the form of directed edges. Directed edges can represent transmit connections (uni-directional), receive connections (uni-directional) and transceive connections (bi-directional) between community subjects s1, s2, . . . , sj whose internal states are represented by community subject states |$C_k$⟩ on the graph.

The embodiments discussed above and the various advantageous adjustments are provided to enable a person skilled in the art to adapt and practice the quantum representation of the invention. The tuning of any particular model with any specific graph type as well as the application of well-known tools upon implementing the re-interpretation of the parts in view of the quantum representation will depend on the application. In general, models based on the quantum representation should be applied in the presence of large number statistics, as already hinted at above. Furthermore, the human curator should vet any final application prior to prediction and simulation runs. This is because the model concerns internal states of subject, and thus the human curator is an invaluable indicator of the correctness of the model. The more philosophically-minded practitioners will recognize that the human curator is allowing themselves to be a "tool of inquiry and corroboration". Allowing one's mind to be used in such modality is a time-honored approach among many philosophers. It is justified and bolstered by centuries of tradition in the history of human intellectual advancement and thus highly recommended in pairing with the above teachings.

It will be evident to a person skilled in the art that the present invention admits of various other embodiments. Therefore, its scope should be judged by the claims and their legal equivalents.

The invention claimed is:

1. A computer implemented method for predicting a quantum state of a subject modulo an underlying proposition contextualized by a community in a social value context, said method comprising:
   a) positing by a creation module community subjects belonging to said community and sharing a community values space;
   b) assigning by an assignment module a community subject state $|C_k\rangle$ in a community state space $\mathcal{H}^{(C)}$ associated with said community values space to each of said community subjects;
   c) performing by said assignment module the steps of:
      i) assigning a subject state $|S\rangle$ in a subject state space $\mathcal{H}^{(S)}$ associated with an internal state of said subject related to said underlying proposition;
      ii) estimating a measurable indication modulo said underlying proposition from said subject state;
      iii) assigning a subject value matrix $PR_S$ based on said measurable indication, said subject value matrix $PR_S$ representing an estimated subject value context in which said underlying proposition is contextualized by said subject;
   d) placing by a graphing module said subject state $|S\rangle$ and each said community subject state $|C_k\rangle$ on a graph according to a surjective mapping; and
   e) predicting by a prediction module said quantum state of said subject state $|S\rangle$ based on quantum interactions on said graph.

2. The method of claim 1, further comprising:
   a) measuring a mean measurable indication modulo said underlying proposition exhibited by said community;
   b) assigning by said assignment module a community value matrix $PR_C$ based on said mean measurable indication, said community value matrix $PR_C$ representing said social value context in which said underlying proposition is contextualized by said community.

3. The method of claim 2, wherein said community is a networked community and said step of measuring said mean measurable indication is performed by a network behavior monitoring unit.

4. The method of claim 2, wherein said mean measurable indication comprises one of at least two mutually exclusive responses a, b with respect to said underlying proposition.

5. The method of claim 4, wherein said at least two mutually exclusive responses a, b correspond to at least two eigenvalues $\lambda_1$, $\lambda_2$ of said community value matrix $PR_C$.

6. The method of claim 2, wherein said step of estimating further comprises estimating by a mapping module an overlap between said community state space $\mathcal{H}^{(C)}$ associated with said community values space and said subject state space $\mathcal{H}^{(S)}$ associated with said internal state of said subject.

7. The method of claim 2, further comprising estimating by a statistics module a degree of incompatibility between said community value matrix $PR_C$ representing said social value context in which said underlying proposition is contextualized by said community and said subject value matrix $PR_S$ representing said estimated subject value context in which said underlying proposition is contextualized by said subject.

8. The method of claim 7, wherein said degree of incompatibility is quantified by a commutator $[PR_C, PR_S]$ between said community value matrix $PR_C$ and said subject value matrix $PR_S$.

9. The method of claim 2, wherein said step of estimating said measurable indication modulo said underlying proposition from said subject comprises collecting a stream of data related to said internal state of said subject and generated by said subject online.

10. The method of claim 2, wherein said step of estimating said measurable indication modulo said underlying proposition from said subject comprises collecting a stream of data related to said underlying proposition and generated by said subject online.

11. The method of claim 10, wherein said underlying proposition is associated with at least one item from the group consisting of a test subject, a test object, a test experience and said step of estimating said measurable indication modulo said underlying proposition from said subject comprises collecting a stream of data related to said at least one item.

12. The method of claim 1, wherein said surjective mapping reflects quantum spin statistics exhibited by said subject state $|S\rangle$ and each said community subject state $|C_k\rangle$.

13. The method of claim 12, wherein said quantum spin statistics comprise one of at least one statistic chosen among a consensus statistic B-E and an anti-consensus statistic F-D.

14. The method of claim 1, wherein said graph comprises vertices and edges, and wherein said subject state $|S\rangle$ and each said community subject state $|C_k\rangle$ are placed on said vertices according to said surjective mapping.

15. The method of claim 14, wherein said graph comprises a lattice selected from the group consisting of an Ising Model, a Heisenberg Model and a Hubbard Model.

16. The method of claim 15, wherein said lattice is configured to reflect quantum interactions between nearest neighbor vertices.

17. The method of claim 15, wherein said lattice is configured to reflect a chemical potential $\mu$.

18. The method of claim 15, wherein said quantum interactions on said lattice are simulated at a thermodynamic equilibrium by a simulation engine.

19. The method of claim 15, wherein said lattice is immersed in an external field along a global value axis associated with a global contextualization of said underlying proposition.

20. The method of claim 15, wherein said lattice supports lattice hopping.

21. The method of claim 14, wherein said subject and said community subjects are networked and said graph comprises connections between said subject and said community subjects.

22. The method of claim 21, wherein said subject and said community subjects are members of a social network and said method further comprises monitoring of interactions between said members with a network behavior monitoring unit.

23. The method of claim 1, wherein at least one of each said community subject state $|C_k\rangle$ and said subject state $|S\rangle$ is represented by a qubit.

24. A computer implemented method for predicting quantum state dynamics of community subjects modulo an underlying proposition contextualized in a social value context, said method comprising:
a) positing by a creation module a community of said community subjects sharing a community values space;
b) assigning by an assignment module a community subject state $|C_k\rangle$ in a community state space $\mathcal{H}^{(C)}$ associated with said community values space to each of said community subjects;
c) measuring a mean measurable indication modulo said underlying proposition exhibited by said community;
d) assigning by said assignment module a community value matrix $PR_C$ based on said mean measurable indication, said community value matrix $PR_C$ representing said social value context in which said underlying proposition is contextualized by said community;
e) placing by a graphing module each said community subject state $|C_k\rangle$ on a graph according to a surjective mapping; and
f) predicting by a prediction module said quantum state dynamics emerging between a statistically significant number N of said community subjects each assigned subject state $|C_k\rangle$, where k=1, 2, . . . , N, based on quantum interactions on said graph.

25. The method of claim 24, further comprising predicting by a prediction module a maximum degree of incompatibility between said community value matrix $PR_C$ representing said social value context in which said underlying proposition is contextualized by said community and a test subject value matrix $PR_{St}$ representing an estimated test subject value context in which said underlying proposition is contextualized by said test subject.

26. The method of claim 24, wherein said community is a networked community and said step of measuring said mean measurable indication is performed by a network behavior monitoring unit.

27. The method of claim 24, wherein said surjective mapping reflects quantum spin statistics exhibited by said community subject states $|C_k\rangle$, where k=1, 2, . . . , N.

28. The method of claim 27, wherein said quantum spin statistics comprise one of at least one statistic chosen among a consensus statistic B-E and an anti-consensus statistic F-D.

29. The method of claim 24, wherein said graph comprises vertices and edges, and wherein said community subject states $|C_k\rangle$, where k=1, 2, . . . , N, are placed on said vertices according to said surjective mapping.

30. The method of claim 29, wherein said graph comprises a lattice selected from the group consisting of an Ising Model, a Heisenberg Model and a Hubbard Model.

31. The method of claim 30, wherein said lattice is configured to reflect quantum interactions between nearest neighbor vertices.

32. The method of claim 30, wherein said lattice is configured to reflect a chemical potential μ.

33. The method of claim 30, wherein said quantum interactions on said lattice are simulated at a thermodynamic equilibrium by a simulation engine.

34. The method of claim 30, wherein said lattice is immersed in an external field along a global value axis associated with a global contextualization of said underlying proposition.

35. The method of claim 30, wherein said lattice supports lattice hopping.

36. The method of claim 29, wherein said community subjects are networked and said graph comprises edges corresponding to transmit connections, receive connections and transceive connections between said community subject states $|C_k\rangle$ representing said community subjects.

37. The method of claim 24, wherein at least one of said community subject states $|C_k\rangle$ is represented by a qubit.

38. A computer system for predicting quantum state dynamics of community subjects modulo an underlying proposition contextualized in a social value context, said computer system comprising:
a) a creation module for positing a community of said community subjects sharing a community values space;
b) an assignment module for performing the steps of:
i) assigning a community subject state $|C_k\rangle$ in a community state space $\mathcal{H}^{(C)}$ associated with said community values space to each of said community subjects;
ii) assigning a community value matrix $PR_C$ based on a mean measurable indication modulo said underlying proposition exhibited by said community, said community value matrix $PR_C$ representing said social value context in which said underlying proposition is contextualized by said community;
c) a graphing module for placing each said community subject state $|C_k\rangle$ on a graph according to a surjective mapping;
d) a prediction module for predicting said quantum state dynamics emerging between a statistically significant number N of said community subjects each assigned subject state $|C_k\rangle$, where k=1, 2, . . . , N, based on quantum interactions on said graph; and
e) a non-volatile memory for storing information about at least one of said community subjects, said assignments of community subject states $|C_k\rangle$, where k=1, 2, . . . , N, said community state space $\mathcal{H}^{(C)}$ associated with said community values space, said surjective mapping, said graph, said quantum state dynamics and said quantum interactions.

39. The computer system of claim 38, wherein said graph comprises vertices and edges, whereby each said community subject state $|C_k\rangle$ representing said corresponding community subject is placed on said vertices according to said surjective mapping.

40. The computer system of claim 39, wherein said graph comprises a social graph and said community is a networked community.

41. The computer system of claim 39, wherein said graph comprises a lattice selected from the group consisting of an Ising Model, a Heisenberg Model and a Hubbard Model.

42. The computer system of claim 41, further comprising a simulation engine for simulating said quantum interactions on said lattice at a thermodynamic equilibrium.

43. The computer system of claim 41, further comprising an external field simulation module for simulating an external field along a global value axis associated with a global contextualization of said underlying proposition.

44. The computer system of claim 38, wherein said community is a networked community and said computer system further comprises a network behavior monitoring unit for monitoring said networked community.

45. The computer system of claim 38, further comprising a statistics module for estimating said quantum interactions on said graph.

46. The computer system of claim 38, further comprising a prediction module for predicting an outcome of said quantum interactions on said graph.

47. The computer system of claim 38, further comprising a simulation engine for simulating said quantum interactions on said graph.

48. The computer system of claim 38, wherein said underlying proposition is associated with at least one item from the group consisting of a test subject, a test object, a test experience.

49. The computer system of claim 38, further comprising a mapping module for finding said community state space $\mathcal{H}^{(C)}$ and a subject state space $\mathcal{H}^{(S)}$ associated with an internal state of a subject related to said underlying proposition.

50. The computer system of claim 38, wherein said creation module, said assignment module, said graphing module and said prediction module are implemented in nodes of a computer cluster.

51. The computer system of claim 38, wherein at least one of said community subject states $|C_k\rangle$ is represented by a qubit.

* * * * *